(12) United States Patent
Juchymenko

(10) Patent No.: US 12,194,407 B2
(45) Date of Patent: Jan. 14, 2025

(54) SYSTEM, APPARATUS AND METHOD FOR MANAGING HEAT TRANSFER IN POST COMBUSTION (CO2 AND H2S) GAS TREATING SYSTEMS

(71) Applicant: Victor Juchymenko, Calgary (CA)

(72) Inventor: Victor Juchymenko, Calgary (CA)

( * ) Notice: Subject to any disclaimer, the term of this patent is extended or adjusted under 35 U.S.C. 154(b) by 0 days.

(21) Appl. No.: 18/356,988

(22) Filed: Jul. 21, 2023

(65) Prior Publication Data
US 2024/0042370 A1 Feb. 8, 2024

Related U.S. Application Data

(60) Provisional application No. 63/499,654, filed on May 2, 2023, provisional application No. 63/438,126, filed (Continued)

(51) Int. Cl.
*B01D 53/02* (2006.01)
*B01D 53/04* (2006.01)
(Continued)

(52) U.S. Cl.
CPC ..... *B01D 53/0438* (2013.01); *B01D 53/0454* (2013.01); *B01D 53/1412* (2013.01); *B01D 53/1462* (2013.01); *B01D 53/1475* (2013.01); *B01D 53/18* (2013.01); *F01N 5/02* (2013.01); *B01D 2257/304* (2013.01); (Continued)

(58) Field of Classification Search
CPC ............ B01D 53/0438; B01D 53/0454; B01D 53/1412; B01D 53/1462; B01D 53/1475; B01D 53/18; B01D 2257/304; B01D 2257/504; B01D 2258/01; B01D 2259/65; F01N 5/02
See application file for complete search history.

(56) References Cited

U.S. PATENT DOCUMENTS

| 8,302,399 B1 * | 11/2012 | Freund ................... F02B 33/44 60/671 |
| 2006/0204425 A1 | 9/2006 | Kamijo et al. |
| 2012/0023946 A1 | 2/2012 | Ernst et al. |
| 2012/0036888 A1 * | 2/2012 | Vandor .................. F25J 1/0283 220/560.04 |

(Continued)

OTHER PUBLICATIONS

PCT/IB2023/057475, International Search Report and Written Opinion (Nov. 9, 2023).

*Primary Examiner* — Christopher P Jones
(74) *Attorney, Agent, or Firm* — Peter Zura; LOZA & LOZA, LLP

(57) ABSTRACT

A system, that includes a gas treating system having at least one of (i) an absorption-based system, having at least one absorber, and/or (ii) an adsorption-based system having at least one adsorber. The system further includes a combustion device, operatively coupled to the gas treating system, an Organic Rankine Cycle (ORC) operatively coupled to the combustion device and/or to the gas treating system, and a control module, wherein the control module is configured to cause energy to be diverted from one or more of combustion device exhaust flow, thermal fluid, stripped gas, compressed stripped gas, natural gas, compressed natural gas, ORC propellant, chilled thermal fluid, jacket water fluid, auxiliary cooling water, and/or turbine lube oil, through any of the gas treating system, the combustion device and/or the ORC to provide heat and/or cooling and/or power.

20 Claims, 37 Drawing Sheets

Related U.S. Application Data on Jan. 10, 2023, provisional application No. 63/405,354, filed on Sep. 9, 2022, provisional application No. 63/391,225, filed on Jul. 21, 2022.

(51) Int. Cl.
   *B01D 53/14* (2006.01)
   *B01D 53/18* (2006.01)
   *F01N 5/02* (2006.01)

(52) U.S. Cl.
   CPC .... *B01D 2257/504* (2013.01); *B01D 2258/01* (2013.01); *B01D 2259/65* (2013.01)

(56) References Cited

U.S. PATENT DOCUMENTS

| | | | |
|---|---|---|---|
| 2013/0318969 | A1 | 12/2013 | Zhou et al. |
| 2017/0074123 | A1* | 3/2017 | Versteyhe ................. F02G 5/02 |
| 2018/0216500 | A1 | 8/2018 | Williams |
| 2019/0120106 | A1* | 4/2019 | Hamad ............. B01J 20/28035 |
| 2020/0308992 | A1 | 10/2020 | Juchymenko |
| 2020/0408112 | A1* | 12/2020 | Koppauer ................. F02G 5/02 |
| 2022/0010707 | A1* | 1/2022 | Sharma ................. F01N 3/0857 |
| 2022/0249974 | A1* | 8/2022 | Van Der Walt ...... B01D 53/261 |
| 2023/0130504 | A1* | 4/2023 | Voice ................ B01D 53/1493 60/274 |
| 2023/0374362 | A1* | 11/2023 | Gao ......................... F25B 7/00 |

* cited by examiner

SYSTEM, APPARATUS AND METHOD FOR MANAGING HEAT TRANSFER IN POST COMBUSTION (CO2 AND H2S) GAS TREATING SYSTEMS

RELATED APPLICATIONS

The present application claims priority to U.S. provisional patent application No. 63/499,654, filed May 2, 2023, titled "System, Apparatus And Method For Managing Heat Transfer In Post Combustion (CO2 And H2S) Gas Treating Systems," U.S. provisional patent application No. 63/438,126, filed Jan. 10, 2023, titled "System, Apparatus And Method For Managing Heat Transfer In Co2 Recovery Systems," U.S. provisional patent application No. 63/405,354, filed Sep. 9, 2022, titled "System, Apparatus And Method For Managing Heat Transfer In Co2 Recovery Systems," and U.S. provisional patent application No. 63/391,225, filed Jul. 21, 2022, titled "System, Apparatus And Method For Managing Heat Transfer In Co2 Recovery Systems," the contents of each being incorporated by reference in their entirety herein.

FIELD OF THE DISCLOSURE

The present disclosure relates to managing heat transfer between a combustion device, a gas treating system (designed to remove CO2 and/or H2S gas from another gas stream) and an Organic Rankine Cycle ("ORC") system. Some aspects are directed to a Gas Sweetening System ("GSS") for the removal of H2S and/or CO2 gas from a 'sour' off-market specification natural gas stream, and Carbon Capture System ("CCS") for the removal of CO2 gas from a combustion devices exhaust gas stream, referred to herein also as "stripped gas" in reference to CO2 and H2S as gas that has been extracted (stripped) from the source gas (combusted exhaust gas or natural gas).

Specific to CO2 removal from combustion devices exhaust (such as a turbine, a furnace, a boiler or a reciprocating engine), an ORC system may be configured to be operatively coupled to a combustion device and a CCS or GSS recovery system. More specifically, the present disclosure relates to creating and managing utilities originated or created from the combustion devices exhaust or radiant energy, to the gas treating system and ORC system. If the combustion device is a reciprocating engines, the thermal energy from the exhaust and/or jacket water and/or auxiliary cooling water, can be recovered and, repurposed while cooling the engines exhaust gas (whether by heat recovery and reuse, or by use of a Waste Heat Chiller), prior to entering a gas treating system, and distributing thermal energy to the gas treating system and an ORC system, in order to make the sum of the parts more energy efficient than the individual sub-systems operating individually. If the combustion device only has exhaust energy to be recovered, that energy will be recovered and repurposed while cooling the combustion devices exhaust gas, prior to entering a gas treating system, and distributing thermal energy to the gas treating system and an Organic Rankine Cycle (ORC) system, in order to make the sum of the parts more energy efficient than the individual sub-systems operating individually.

BACKGROUND

Some gas treating systems applications that integrate with a combustion device and ORC that are disclosed herein include, but are not limited to, Carbon Capture Systems (CCS) and Gas Sweetening Systems (GSS). Within each gas treating application (CCS or GSS) are two gas treating technologies: Absorption stripping and Adsorption stripping processes. Within the Adsorption gas treating technologies are Temperature Swing Adsorption (TSA) and Pressure Swing Adsorption (PSA).

The typically 'Absorption-based' systems (often referred to as amine systems) and 'Adsorption-based' systems (often referred to as TSA or PSA systems) are used to separate/strip a gas compound (CO2, H2S, etc.) from the primary gas stream, whether from a 'sour' off-market specification natural gas stream (application of the GSS) or a combustion devices exhaust (application of the CCS). In the case of 'sour' off-market specification natural gas, H2S is removed from a sour natural gas stream using a GSS system, in order to sweeten the gas. In the case of natural gas with high CO2 content, CO2 is removed from a natural gas stream in order to adjust the gas composition to meet pipeline/market specifications. In the case of combusted exhaust, CO2 is removed from the exhaust stream using a CCS system in order to reduce carbon emissions.

The ORC integrated with these absorption and adsorption technologies and a combustion device are not limited to these applications (CCS and GSS) and can be applied to other applications, however the configurations provided herein are illustrative to show various applications and are not limited to the specifically depicted configurations but are applicable in the broader sense.

For CO2 removal, market specifications and environmental emissions specifications can be drivers of the need to remove CO2 from either natural gas or exhaust gas. For environmental emissions driven targets, due to the emissions of pollutants from combustion of hydrocarbon-based fuels on various stationary and mobile energy systems, as well as the emissions from manufacturing plants, have globally contributed to problems involving not only pollutants such as Sulphur, nitrogen oxides (SOx, NOx), and particulate matter, but also greenhouse gases (GHG) such as carbon dioxide (CO2) and raw methane (CH4).

Among the greenhouse gases, CO2 is purported to be the largest contributor to global warming, accounting for approximately ⅔ of the global warming effects, where atmospheric temperature rise has been correlated with increases in CO2 in the atmosphere.

An opportunity exists to separate CO2 from combustion flue gas streams in order to capture it and sequester it. The concept of separating CO2 from exhaust streams was introduced in the 1970s for commercial applications of CO2 separation/stripping. One example of CO2 recovery was for carbonating brine and creating products such as dry ice, urea, and beverages but most significantly for injecting CO2 into oil and gas formations to stimulate the production of oil by a system known as enhanced oil recovery (EOR).

There are many possible post-combustion CCS technologies that can be used to recover CO2 from combustion exhaust streams. The most evolved CCS technology at this time is chemical absorption-based amine systems, however other technologies such as Cryogenic Carbon Capture ("CCC"), Temperature Swing Adsorption ("TSA") and Pressure Swing Adsorption ("PSA") are gaining broader acceptance. Almost, in all cases, the exhaust that contains the CO2 that is being recovered, requires cooling prior to processing and the present disclosure addresses the transfer and use of thermal energy originally rejected by the combustion device in order to make the CCS system more efficient. The follow-on transfer of thermal energy and cooling are derivatives of that original rejected heat from the combustion device. The same applies to GSS systems, although the gas streams are typically starting at a lower temperature than typical combustion exhaust streams.

Most of the existing post-combustion gas treating technologies are based on chemical absorption (referred to herein as "Absorption-based"), a long-proven and mature technology. These aqueous amine systems (used for decades to remove Sulphur and CO2 from off-market specification natural gas), sometimes referred to as aqueous monoethanolamine (MEA) solutions (also known as 'solvent'), are in wide use in the petrochemical and energy industries. The MEA solvent selectively absorbs the CO2 via exothermic reaction, which originated its reaction from the reject heat of the combustion device.

While MEA is the most widely-used solvent, other solvents, such as Diethanolamine (DEA), Monoethanolamine (MEA), Methyldiethanolamine (MDEA), Diisopropanolamine (DIPA), and Aminoethoxyethanol (Diglycolamine) (DGA) may also be used.

A typical gas treating absorption-based process includes an Absorber and a Stripper, hence they are often referred to as "Absorption-stripping" systems. They are used to strip/separate a chemical compound (e.g., CO2, H2S, etc.) from a gas stream. In the case of sour gas, H2S is removed from a sour natural gas stream in order to sweeten the gas, in the case of off-market specification gas CO2 and H2S can be removed, and in the case of combustion exhaust, CO2 is removed from the gas stream and in that configuration. In these configurations, the Absorber may be referred to herein as an "Absorber" and the Stripper may be referred to herein as a "Stripper." Throughout this document, use of the terms Absorber and Stripper shall be understood to be interchangeable with the terms Absorber and Stripper.

In an absorption-based process, as shown in FIG. 37, a flue gas 3602 (in the case of a combustion devices) containing CO2 and in the case of gas sweetening flue gas containing H2S (and likely CO2), enters an Absorber 3604, typically from the bottom of the Absorber and percolates upward where it contacts 3606 in counter-current flow with an absorbent solvent (H2S/CO2-lean solution). Other configurations from distillation-columns for Absorbers exist, such as centrifugal-based absorbers and other configurations (plates, membranes, vertical and horizontal tubes for different absorption modes: falling film, spray and bubbles) are designed and configured to have either parallel or counter-flow configurations of the solvent with the gas, are all applicable to the disclosures presented herein. However for simplicity and consistency through this application, the distillation column Absorbers will be assumed. As depicted in FIG. 37, after the H2S/CO2 absorbs into the lean amine solution, the H2S/CO2-rich solvent drains from the bottom of the Absorber 3604 and proceeds to the Stripper 3610 while passing through a Cross Flow Heat Exchanger 3608 for preheating. The preheated H2S/CO2 rich solvent enters to the top of the Stripper 3610 and desorbs (separates) the H2S/CO2 at high temperature conditions and the solvent is then regenerated (or stripped) for recycling back to the Absorber 3604 via line 3612 to the Cross Flow Heat Exchanger 3608 for cross exchanging thermal energy from the "Lean Solvent" to the "Rich solvent". Regeneration is complete when the H2S/CO2-lean absorbent/solvent is pumped back to the Absorber 3604 to repeat the process.

Throughout this document, "/" is to represent "and/or".

The H2S/CO2 typically discharges from the top of the Stripper 3610 and it usually contains H2O. The H2S/CO2/H2O or CO2/H2O vapor may be run through a condenser (not shown in the figure) that precipitates out the H2O such that the higher concentration (near pure) H2S/CO2 can then be discharged from the system. In the case of H2S/CO2, the gas may be compressed for the subsequent transportation and storage/sequestration, and the H2O can be reclaimed back into the extraction process. Illustrated in the simplified example of FIG. 37 is an absorption-based amine gas treating (applicable to either GSS gas sweetening or CCS carbon-dioxide gas extraction) system.

Another gas treating system contemplated in the present disclosure includes Adsorption systems, which may also be referred to as Temperature Swing Adsorption (TSA) systems or Pressure Swing Adsorption (PSA) systems. These systems are applicable to CCS applications (removing CO2 from an exhaust gas stream) as well as for GSS applications (removing H2S, but can also include CO2) from the off-market specification (sour) natural gas.

The present disclosure makes references to Carbon Absorption and Carbon Adsorption, but one skilled in the art should understand that either system can be used for removing CO2 gas from a combustion exhaust gas and/or removing H2S (and/or CO2) gas from a natural gas/methane gas stream that requires sweetening to meet market specification requirements. Where H2S and CO2 gas can be interchanged throughout the write up (for illustrative purposes) because the important disclosure in the document is the integration of the ORC system with the gas Absorption or Adsorption systems with a combustion device.

Throughout this document, where a CCS system is described to remove CO2 gas, that same process can be applied to a GSS process for removing H2S and/or CO2 in order to have the gas meet market specifications. Therefore, in most cases, the term CCS for Absorption-based systems can be interchanged with GSS for Absorption-based systems, and CCS for Adsorption-based systems can be interchanged with GSS for Adsorption-based systems.

Adsorption processes contain a gas compound extraction device called an Adsorber. The reason adsorption systems are gaining interest is that they do not require a contactor tower (which can reach heights over 100 feet tall) and generally have a smaller foot print, meaning there is less equipment/metal required, meaning the cost of the system is typically less. Also, they do not require a solvent that can be expensive to operate and requires handling.

A typical carbon adsorption process includes a Adsorber, which operates in a cyclic/alternating (hence the use of the term "Swing Adsorption") process using multiple adsorbent contactors or adsorbers working in parallel at sequentially staggered steps of the cycle where each adsorber contains an adsorbent material (on each swing of the process) contacting flow passages for the process fluids undergoing adsorptive separation, while the other adsorber is being stripped of the CO2 it has accumulated on the alternate swing. The same applies for gas sweetening systems for the removal of H2S and/or CO2 from off-market specification natural gas streams.

For simplicity, throughout this document, the term "Absorber" and "Adsorber" can be used interchangeably, because this is where the CO2/H2S gas compound is extracted from the off-market specification natural gas source or the combustion exhaust gas, such that either shall refer to the removal stage from the combustion devices exhaust or the off-market specification (sour) gas stream by the gas treating (CCS or GSS) systems. The balance of their processes are a matter of separating, collecting the H2S/CO2 and preparing the H2S/CO2 (separating out any H2O) for disposal or compression (for transport).

One of the challenges of Absorption amine systems includes scale-up for large carbon emitting facilities such as power plants, chemical plants, refineries, etc. that would require a very large and tall absorbing contactor towers. Although present disclosure does not specify any size limitations, it shows solutions for relatively small gas treating and capture systems designed to work with off-market specification/sour natural gas streams, or one or more of: boilers and/or furnace and/or turbines and/or reciprocating engines operating independently or together, however one skilled in the art would recognize that the principles disclosed herein also apply to large-scale gas treating Carbon Capture Systems (CCS) and Gas Sweetening Systems (GSS).

The scale of gas treating systems is somewhat inefficient because the amount of stripped CO2 gas compound recovered by the CCS has to net out (subtract) the CO2 released by creating the utilities required to operate the GSS/CCS. Those utilities would typically include generated electricity used to power the GS S'/CC S' parasitic loads (pumps/fans/etc.) and thermal energy required to heat different processes within the GSS/CCS (which itself has a carbon load to it). The present disclosure addresses this challenge by integrating a heat recovery system that makes use of wasted heat from combustion devices in: 1) the gas treating GSS/CCS system (e.g. Condenser 16, Recycle 24, etc.), 2) an Organic Rankine Cycle system to generate shaft horsepower/electricity and if suitable, 3) Waste Heat Chiller(s) used to cool streams within the process which then reduce the amount of air cooling fan power required, to better utilize the thermal energy rejected from the combustion device (turbines, boilers and/or reciprocating engines exhaust and jacket water cooling fluid) within the GSS/CCS.

In some examples, it should be noted that throughout this document, if reference is being made to a Waste Heat Chiller 28 or Waste Heat Chiller(s) 28 then the Waste Heat Chiller shall be comprised of the Waste Heat Chiller itself, including Cooled Thermal Fluid Conduits 31 to convey chilled water, and a heat exchanger coupled to the end of the Cooled Thermal Fluid Conduits 31 that cools (exchanges energy with) either the gas or thermal fluid that is located at the device that the Waste Heat Chiller 28 is providing cooling to, whether that is depicted to be coupled to it in the Figures, or described in the body of this document as it providing cooling to or being coupled to. The heat exchanger is to be located at the entrance of the device that the cooling is depicted as being provided to, with the purpose of cooling the gas or the thermal fluid entering the device. For example, if a description reads that "the Waste Heat Chiller 28 provides cooling to the Exhaust Gas Cooler 19" it should be interpreted as "the Waste Heat Chiller 28 produces cooling water that is conveyed to a heat exchanger that is coupled to the Waste Heat Chiller 28 by Cooled Thermal Fluid Conduits 31, and that heat exchanger is positioned in the path of the gas or fluid that will be passing through the Exhaust Gas Cooler 19 (after it passes through the heat exchanger coupled to the Waste Heat Chiller 28), where that cooling water extracts thermal energy (cools) the exhaust gas prior to it entering the Exhaust Gas Cooler 19". This interpretation is applicable to all devices a Waste Heat Chiller 28 is shown or described to be coupled to, but most applicable to devices that perform an independent cooling operation that have an associated cooling fan with them, such as Exhaust Gas Cooler 19, Stripped Gas Cooler 23, Condenser 16, Radiator 8 (including the aerial cooler), ORC condensers, and the Inter-stage Gas Cooler(s) 92. Similarly, if reference is being made to thermal energy being supplied or provided to a device, the heating is actually being provided to the gas or thermal fluid that is entering the device mentioned.

In the case of the ORC generating shaft horsepower, that shaft horsepower can be used to generate electricity or to drive: the H2S/CO2 compressor (required to move the concentrated gas compound H2S/CO2 to storage or disposal), a boost compressor, a Waste Heat Chiller, large cooling fans, pumps or other devices requiring shaft horsepower. For convenience, the ORC will be assumed to be generating electric power for the purpose of driving various parasitic electric loads, that can include motors that will power fans, pumps, chillers, etc. The control of these various devices will be coordinated and operated by the control module of the above described system, where an artificial intelligence algorithm is used to optimize the efficiency.

As regulations around the world are implemented to incentivize the reduction of CO2 production, and the price of carbon-dioxide emissions increasing, the integration of CCS into commercial applications will thus become more prevalent as the technology and economics improve through improved efficiency, and therefore the number of applications are expected to increase. Also, by integrating an ORC system to generate shaft horsepower to generate electricity from the waste heat from either the combustion source or the CCS itself, and using waste heat to generate cooling (by using absorption chillers or adsorption chillers, as the case may require) the net carbon recovered from the CCS will increase, making it carbon recovery more efficient. Preliminary calculations show that when integrating Waste Heat Chiller(s) and the ORC system with the CCS, it may be possible to provide the overall system (ORC and the CCS system) with all (or near all) 'clean' utilities (heating, cooling and electric power) required to operate the CCS, resulting in a CCS system that recovers more CO2 than without recovering and redeploying the heat to cooling, heating and power generation. This same concept is also applicable to GSS systems when removing CO2 from the off-market specification natural gas streams.

The gas temperature entering Absorber (in an absorption-based CCS) and the Adsorber (in an adsorption-based CCS) may require a combustion devices exhaust temperature to be much lower than the combusted exhaust temperature (which is typically around 900+ degrees Fahrenheit). The high temperature exhaust should typically be cooled (to 100+/−20 degree Fahrenheit) prior to entering the Absorber or Adsorber. By capturing and using the higher-grade heat in the ORC and the CCS before reaching the Absorber or Adsorber, and capturing and using lower-grade in the ORC and Waste Heat Chiller(s), makes the CCS operation more efficient and thus more economic. The same applies in GSS systems that use the absorption and/or adsorption technologies to recover H2S and/or CO2 gas. Typically, because of the high temperature differential requirement, ORC systems can recover the combustion devices (turbines, or boilers, or reciprocating engines) exhaust heat and use that heat (along with a reciprocating engines jacket water) to generate shaft horse power via an ORC system, that can then be used for a multitude of applications such as generating electricity, running a compressor (whether that is for driving a gas compressor that moves the recovered/separated H2S/CO2 gas compound from the gas treating system, a natural gas boost compressor or other parasitic loads such as running a pump, fan, etc.). In addition, at times there is thermal energy that after first application in the ORC can then be passed and used again in the CCS system or Waste Heat Chiller(s).

For the lower grade waste heat in the combustion device's exhaust or reject heat available from the gas treating system, such as the CCS'/GSS' absorption-based Condenser (which can be used in the ORC for evaporating or preheating the propellant with in the ORC, but) it can also be used in a Waste Heat Chiller to generate cooling capacity (that is required throughout the gas treating system). Single stage Lithium Bromide Water absorption chillers typically require a minimum heat input temperature of approximately 176 degrees Fahrenheit, and two-stage absorption chiller unit requires a minimum temperature of approximately 284 degrees Fahrenheit. In a CCS or GSS gas treating system that is coupled to a reciprocating engine, engine jacket water (typically around 195 degrees Fahrenheit) is available to operate a single stage absorption chiller. Further, because an ORC can only use heat to a limited lower limit evaporating temperature (typically around 190 degrees Fahrenheit for an ORC system that uses an air-cooled condenser in combination with readily available and economic propellants), the waste heat below 200 degrees Fahrenheit is not of much use in an ORC (other than for preheating the ORC propellant) however it can be of use in a Waste Heat Chiller. An example of these lower grade waste heat sources are engine auxiliary cooling water flows or engine exhaust at or below 200 degrees Fahrenheit, or heat of compression (available for recovery from a gas compressor) where the temperature of the waste heat can be above 200 degrees Fahrenheit, but is not worth recovering the partial amount because it is required to be cooled below 200 degrees Fahrenheit, that heat (above and below the evaporation threshold) can be recovered for use in a Waste Heat Chiller or ORC propellant preheating.

Further, combining the waste heats from multiple sources at or below the ORC evaporation useable threshold (in this example, 200 degrees Fahrenheit) the remaining useable waste heat can be used in pre-heating the propellant in an ORC system or in Waste Heat Chillers that can operate at these lower temperatures. In the case of auxiliary cooling water or independent Thermal Transfer Fluids, they can be circulated to recover additional low-grade heat, but still remain additive (in the case of the auxiliary cooling water which already has thermal energy from the engines operation to reject) to the system for use, whether that is from the exhaust system or heat of compression, or the absorption-based condenser, or other sources within the system.

If the source of the recovered waste heat (e.g. auxiliary cooling water) is too low in temperature (typically around 145 degrees Fahrenheit to 175 degrees Fahrenheit) to drive the single stage Lithium Bromide Water absorption chiller, adsorption chillers may prove more suitable because they can operate with lower waste heat sources (as low as 125 degrees Fahrenheit). Therefore, throughout this document, the generic term "chiller" will be synonymous with the term 'Waste Heat Chiller' and will be used with the understanding that the waste heat source temperature available will dictate the type of appropriate chiller (absorption or adsorption) technology that will be applicable. If the term 'chiller' or 'Waste Heat Chiller' is used in the Figures, it is to be understood that either an adsorption chiller or an absorption chiller may be more suitable based on the temperature of the waste heat and therefore the two terms shall be interchangeable.

Configuring a reciprocating engine's cooling fluids with driving a Waste Heat Chiller is advantageous because reciprocating engines have a radiator 8 that can be bypassed or operated in parallel or in series with the cooling fluid flows, such that if the return temperature of the fluid to the engine is too high, the fluids flow can be fully or partially diverted through the Waste Heat Chiller or the radiator to be cooled before being returned to the engine. Should the return temperature of the cooling fluids to the engine be too low, then other waste heat streams can be used to warm it before returning to the engine. Should no suitable waste heat stream be available to reheat the cooling fluid before it returns to the engine, the engines thermostats will fully or partially close to retain/restrict the cooling water flow discharging from the engine in order for the engine to heat the fluid to the desired engine operating temperature.

Additional heat exchange within the GSS/CCS gas treating system/ORC/Chiller systems can be integrated where the recovered gas compound ($CO_2$ and/or $H_2S$) exiting the Stripper in an absorption-based system, and the Recycle 24 or Recovery 25 heat exchanger in an adsorption system, contains heat energy that can be reclaimed into the GSS/CCS, ORC or Waste Heat Chiller(s). The engines jacket water or auxiliary cooling water can be used to recover and transfer thermal energy within the systems. For boilers, reciprocating engines, turbines and furnaces, the thermal energy can be collected into a thermal transfer fluid and then distributed to the equipment that can use that thermal energy to improve the systems overall efficiency. An example may be to transfer that thermal energy for use in the GSS/CCS itself, the ORC or in a Waste Heat Chiller(s).

In an absorption-based gas treating system, heat can be recovered from the absorption systems Condenser, where the water content in the stripper's exhaust stream can be reclaimed, recovered and reused in the gas treating system, or the ORC or in a Waste Heat Chiller(s). Therefore, as that stripper discharge gas is cooled (whether in a Condenser or a chiller or a heat exchanger) when exiting the gas treating system, that heat can be recovered and put to use to improve the efficiency of the gas treating system, and/or the ORC, and/or the Waste Heat Chiller(s). Similarly, in an adsorption system, heat can be recovered from the gas Recovery heat exchanger or the Recycle heat exchanger and similarly, the $H_2O$ recovered can be reclaimed and reused.

In the case of a reciprocating engine, the equipment may be configured with at least one radiator to cool the engine (e.g., by collecting the engines radiant heat energy into engine jacket water or auxiliary cooling systems, from the combustion of the fuel in the engine) and then dissipating that heat energy through an air-cooled radiator. By using the engines cooling fluids (whether that is a glycol and water mixture or a separate thermal fluid cooling medium), the reciprocating engine, the ORC and/or the gas treating system can benefit from improved operation and/or efficiency. It should be noted that the term "Thermal Fluid" can refer to: water, glycol, a glycol and water mixture, thermal oil, synthetic thermal oil or other fluid medium typically used to transfer thermal energy through a system. Therefore, the term "Thermal Fluid Heater" refers to a heat exchanger that transfers thermal energy to (or from, in some cases) a Thermal Fluid.

BRIEF DESCRIPTION OF THE FIGURES

The present disclosure will become more fully understood from the detailed description given herein below and the accompanying drawings which are given by way of illustration only, and which thus do not limit the present disclosure, and wherein:

FIG. 15 also shows an example of the possible temperatures and device duties that the system could be operated at. The system shows the inclusion of a reciprocating engine with a radiator, coupled to an ORC system and an absorption-based CCS system (comprised of an Absorber, a Cross Flow Heat Exchanger, a Stripper with associated Reboiler and Condenser) with circulating pumps, control valves, and multiple heat exchangers in the engines exhaust, wherein an Waste Heat Chiller is connected to the engines auxiliary water cooling system where that engine auxiliary cooling water is then circulated through a heat exchanger in the exhaust stream to pick up more useable thermal energy, in order to use the collective heat to drive the operation of a Waste Heat Chiller. That chiller cools thermal fluid to be used to cool the engine exhaust prior to it entering the Absorber in the Absorption-based CCS system and to cool the CO2 gas discharging from the CCS system before it enters the CO2 gas compressor, wherein certain system controls described above may be provided by a control module under an illustrative embodiment;

DETAILED DESCRIPTION

Figure 1:
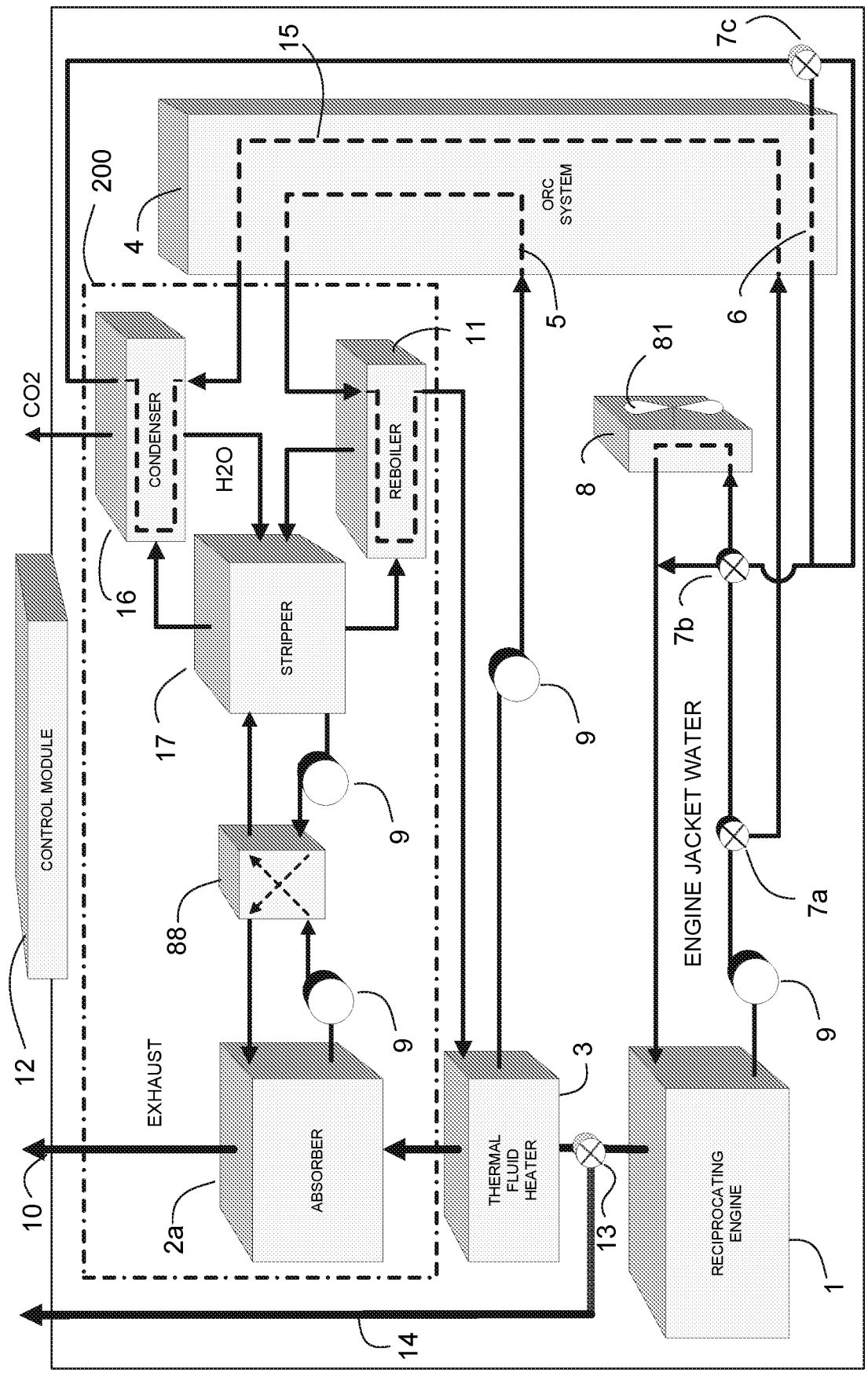
FIG. 1 illustrates a system including a reciprocating engine coupled with an ORC and a GSS/CCS system, wherein the engine jacket water is kept as a separate system from the thermal fluid system, and wherein certain system controls may be provided by a control module under some aspects of the present disclosure.

The figures and descriptions provided herein may have been simplified to illustrate aspects that are relevant for a clear understanding of the herein described devices, systems, and methods, while eliminating, for the purpose of clarity, other aspects that may be found in typical similar devices, systems, and methods. Those of ordinary skill may thus recognize that other elements (such as vessels, piping configurations, pump or compressor locations, pressure or temperature sensing and transmitting devices) and/or operations may be desirable and/or necessary to implement the devices, systems, and methods described herein. But, because such elements and operations are known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Exemplary embodiments are provided throughout so that this disclosure is sufficiently thorough and fully conveys the scope of the disclosed embodiments to those who are skilled in the art. Numerous specific details are set forth, such as examples of specific components, devices, and methods, to provide this thorough understanding of embodiments of the present disclosure. Nevertheless, it will be apparent to those skilled in the art that specific disclosed details need not be employed, and that exemplary embodiments may be embodied in different forms. As such, the exemplary embodiments should not be construed to limit the scope of the disclosure. In some exemplary embodiments, well-known processes, well-known device structures, and well-known technologies may not be described in detail.

The terminology used herein is for the purpose of describing particular exemplary embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the exemplary embodiments.

As explained briefly above, the energy efficiency of a gas treating system can be increased by configuring it with an ORC (and vice versa) and Waste Heat Chiller(s), and a combustion device (reciprocating engine, turbine, furnace, boiler, etc.). In one example the H2S and/or CO2 discharge temperature from an Absorption-based gas treating system may be condensed in the present disclosure using either an air cooled Condensers or a liquid-cooled condenser (using the engines jacket water, engine auxiliary cooling water or similar thermal fluid) that would then increase the temperature of the jacket water, auxiliary cooling water or thermal fluid such that it can be used in the ORC process to generate power, the CCS for thermal energy, or with the use of lower-grade heat in a Waste Heat Chiller (using absorption/adsorption cooling) in order to provide cooling to the various areas of the gas treating system integrated with an ORC, combustion device (whether that be a reciprocating engine, a turbine, a furnace, or a boiler) or compressors. A liquid condenser or cooler would also reduce the size of the air-cooled condenser which would help reduce the size of the Absorption-based gas treating equipment and thus the cost of the equipment. If enough liquid cooling capacity was not available to complete the condensing of the water from the discharge (CO2/H2S/H2O) gas stream, then air cooling could supplement the amount of cooling desired which would reduce the amount of parasitic load the cooling fans would require to cool the original stream if the described efficient heat exchange was not applied to it. While the terms "carbon capture", "gas sweetening" and "gas treating" is used herein, those skilled in the art will recognize that "carbon capture" is a form of "gas treating" and "gas sweetening" is another form of "gas treating", and that the terms may be considered synonymous, unless indicated otherwise.

As discussed above, incorporating an ORC system with a Waste Heat Chiller with a gas treating system, for example, to recover waste heat from a combusting device, such as a turbine, boiler, furnace, or reciprocating engine, can provide additional advantages. Specifically, by transferring different grades and types of heat from the turbine, furnace, boiler or reciprocating engine to the gas treating CCS or GSS system and/or the ORC system and/or waste heat driven chiller(s), in the various equipment combinations and embodiments discussed in greater detail below, will improve the overall efficiency of the gas treating system coupled to the reciprocating engine, furnace or turbine or boiler. Specifically, the solvent in an absorption-based system or adsorbing material in an adsorption-based system require the exhaust gas from the combustion device to be cooled from approximately 900° F.-2000° F. (depending on the combustion device) to approximately ambient air temperatures, ideally at or below 100° F. The majority of this higher grade thermal energy can be used in the CCS/GSS to supply waste heat to its own Reboiler 11, Recycle 24, Recovery 25, or in the ORC 4 (to preheat, evaporate or superheat the propellant in the ORC system) to generate higher propellant flow rate/pressures in the ORC. Whereas, the lower grade waste heat from the engine exhaust can be recovered from a wide range of temperatures where it would be used for preheating, evaporating or superheating the ORC propellant, and/or to drive Waste Heat Chillers, from the combustion devices exhaust system. In reciprocating engines with jacket water cooling and auxiliary cooling, the reject heat can also be used in Waste Heat Chillers to provide cooling to the system components and in the ORC for preheating, evaporating and/or superheating propellant in conjunction with the engines jacket water that is typically operated in the 175° F. to 200° F. range and the auxiliary cooling water that is typically operated in the 135° F. to 175° F. Hence there is a pragmatic fit between turbines, boilers, furnaces, and/or reciprocating engines, absorption chillers, adsorption chillers, ORC and CCS/GSS gas treating systems. From practical experience, the possibility exists to rank the thermal energy such that the first priority is to provide the gas treating system the higher grade thermal energy it needs to operate (e.g. Reboiler 11) without having to combust additional fuel to run it. The second priority should be using the remaining higher grade thermal energy and the medium grade temperature waste heat in the ORC system, and the third priority should be using the thermal energy that is below the threshold of useable evaporation temperature energy in the ORC should be directed to be used for preheating the propellant in the ORC, and/or in the Waste Heat Chillers (simply for the reason that the chillers can operate at lower input temperatures than an ORC can).

Heat rejected by a combustion device such as a turbine, boiler, furnace or reciprocating engine may be used to generate power in an ORC. In the boiler and furnace combustion devices, only the exhaust can be used by the CCS/GSS, the ORC and Waste Heat Chillers, whereas a turbine can provide thermal energy from the exhaust as well as hot lube oil that otherwise would be dissipated in a Turbine Lube Oil Cooler 99. In a reciprocating engine, the engines jacket water, the engines auxiliary cooling water, and the engines exhaust energy (via directly or through a heat transfer fluid) can be rejected to the Waste Heat Chiller and/or the ORC and/or CCS/GSS gas treating system, as is the case with the boiler/furnace or turbine, to improve the efficiency of the overall system, including the gas treating system, the combustion device and the ORC.

The exhaust heat rejected from a boiler or a turbine or a furnace may be used to add thermal energy to a Reboiler 11, generate power in an ORC or Waste Heat Chillers for cooling purposes (from using the waste heat to drive a chiller). The exhaust energy (via directly or through a heat transfer fluid) of the combustion device can be rejected to the Waste Heat Chiller or ORC or the CCS/GSS gas treating system to improve the efficiency of both the CCS/GSS coupled to the combustion device (reciprocating engine/boiler/turbine/furnace) and the ORC.

It should be noted that the Figures and the associated description depict recovered exhaust energy, via the Thermal Fluid Heater(s) 3, being used to transfer thermal energy to the Reboiler 11 and the ORC 4 within the same thermal fluid loop. This is not required as both the Reboiler 11 and the ORC 4 can be supplied with thermal energy from the combustion devices independent heat exchange sources, whether those are from the combustion devices exhaust waste heat or other sources.

In some examples, combining a single or multiple reciprocating engine(s) and/or boiler(s), and/or furnace(s), and/or turbine(s) and ORC(s), and Waste Heat Chiller(s) and a CCS system will further improve the energy efficiency as well as the CCS/GSS stripped gas (CO2) recovery efficiency of the overall system as disclosed herein. In the oil and gas industry, it is common to have multiple gas compressors (individually powered by reciprocating engines) and a single GSS gas sweeting amine system, all on one site. The same configuration could also be applied to CCS applications. In the case of gas compression, heat is generated by compressing gas and therefore often with multi-stage gas compression, each stage of compression requires cooling. That thermal energy can also be recovered and used in the systems being described, as a heat source for recovery and use. The combination of turbines, boilers, furnaces, and reciprocating engines waste heat is possible. In particular, at larger oil and gas sites, the reject heat from multiple combustion devices can be pooled together to transfer thermal energy to a single GSS/CCS, and/or ORC, and/or Waste Heat Chiller(s).

The system would also work by discharging exhaust energy (via directly or through a heat transfer fluid) to a thermal fluid heater (TFH) on the turbines, boilers, furnaces, and/or reciprocating engines exhaust and pumping that thermal fluid to either the CCS/GSS, or Waste Heat Chiller(s), or the ORC system to improve the gas stripping (CO2 and/or H2S) recovery efficiency of the overall system. The reciprocating engine's discharge jacket water contains energy that can be used in transferring heat to the ORC system or chiller(s), but it or another thermal fluid can also be used to extract heat from the GSS'/CCS' CO2/H2S Condensers in the case of absorption-based systems, or the Recycle 24 or the Recovery 25 heat exchangers in the case of adsorption-based systems, to then add more heat to the ORC system, further improving the stripped gas compound recovery efficiency of the GSS/CCS and the efficiency of the ORC. Similarly, a thermal transfer fluid can be used to transfer energy from any of the potential thermal source heat exchangers to the Waste Heat Chillers, to other heat exchangers in the GSS/CCS system, or the ORC. Combining these heat streams and heat sinks, and then moving them between one another can produce a more efficient use of energy and thus improve overall net ($CO_2$ or $H_2S$) stripped gas compound recovery. Such a configuration may advantageously recover useable thermal energy and place it in optimal locations such that it improves the overall ($CO_2$ or $H_2S$) gas compound recovery efficiency of the system. Further, some low-grade heat that otherwise would not be recoverable or useable can be used directly in an absorption or adsorption chiller, or upgraded with other heat sources such that the combined energy content can then be used in the ORC or Waste Heat Chiller (which typically single stage chillers require a lower grade of waste heat energy than the ORC). Heat rejected by combustion device (reciprocating engine/boiler/furnace/turbine), the heat of compression from gas compressors and elements of the CCS can be used to power the utility requirements of the Waste Heat Chiller(s), the GSS/CCS and/or the ORC. Additionally, heat rejected by the GSS/CCS can be used in the chiller or the ORC system, and rejected heat from the GSS/CCS and ORC can be used as well, for low-grade uses the Waste Heat Chiller(s) for cooling purposes, or district heating, building heating, process applications, bulk material drying, heat tracing of pipes, etc.

The CCS 200 absorption-based system may require supplemental heating in the Reboiler 11 or the peripheral equipment such as Waste Heat Chillers 28, ORC system or engine thermal fluids (such as engine jacket water or auxiliary cooling water) when the heat energy being supplied by the thermal fluid or the jacket water cannot provide adequate thermal energy to keep the Reboiler 11, the Stripper 17 or the Waste Heat Chillers 28 functioning properly. Similarly, the CCS Condenser 16, Exhaust Gas Cooler 19, $H_2S/CO_2$ Stripped Gas Cooler 23, or the Inter-stage Gas Coolers 92 on gas compressors may require supplementary cooling to the thermal fluids or gases (that pass through them) via an air cooled or liquid condenser or cooled thermal fluid (in some cases cold water) from a chiller, to provide extra cooling capacity that is required to achieve a desired temperature (e.g. to condense the $CO_2$ and $H_2O$ exhaust stream discharging from the CCS Stripper 17 in order to achieve full condensation of the $H_2O$, or cool compressed gas after compression so that it can proceed to the next stage of compression, or cool the combustion devices exhaust gas to the desired temperature prior to entering the absorber or the adsorber as the case may be). Any external energy input, or recovered waste heat that gets used, will affect the net stripped gas ($CO_2/H_2S$) reduction from the system, and the overall efficiency of the combined equipment of GSS/CCS and ORC 4 and Waste Heat Chiller 28 system will improve, compared to not combining the heat recovery and heat transfer. The GSS 201/CCS 200 may be attached to a combustion device, as described throughout this document, in order to capture (and possibly sequester or use) the carbon emissions from that device. If the GSS 201/CCS 200, or the combustion device has to generate its own electricity or obtain that electricity from the grid, then that generation of electricity produces additional carbon emissions that detract from the carbon emissions captured by the GSS 201/CCS 200, making the system less carbon efficient. Combining an ORC into the equipment mix allows the generation of clean (emission-free) shaft horsepower energy that can then be used in heat transfer or in the generation of electricity to power the CCS and combustion devices parasitic electrical loads.

Under an illustrative embodiment, a heat transfer process may begin with fuel combustion in a turbine, a furnace, a boiler or a reciprocating engine, which may be powered by combustion of hydrocarbons such as: bio-diesel, biomass, gasoline, coal, rubber tires, hydrogen, natural gas, propane, gasoline, crude oil, bunker fuel, and/or diesel, and the like.

During operation, a reciprocating engine may emit exhaust and emit radiant heat into the engines jacket water and auxiliary cooling water that may have that energy dissipated through the use of an air cooled (or other suitable) radiator, or water cooling in the case of water going vessels. In a furnace and/or boiler, there is no jacket water cooling system and therefore recovery of the heat will only be from the exhaust system. With a turbine, the majority of the thermal energy recovery will be from the exhaust system, with a potential to recover some heat from the turbines lube oil system. Reciprocating engine rejected heat may be dissipated via the engines exhaust, engines jacket water, engines lubricant and/or engines auxiliary cooling system (e.g., turbo cooling) and can be used in a similar manner described herein, provided its temperature fits into the ORC propellant system, Waste Heat Chiller or the GSS/CCS components, or for other purposes. An ORC system can use rejected waste heat from any of the available heat sources to pre-heat, evaporate or superheat the ORC working fluid (also known as propellant) and therefore insertion of that waste heat into locations in the ORC process where the working fluid (propellant) is at a lower temperature than the waste heat, is desired and that the waste heat is inserted into the propellant stream such that the energy being transferred is additive to the energy of the propellant. A Waste Heat Chiller can use rejected waste heat from any source (liquid or exhaust gas) to drive the adsorption or absorption chilling process to provide cooling to thermal fluids used in the system. Both configurations are described herein.

A combustion devices exhaust (e.g., 10) may pass through a CCS Absorber or Adsorber, as the case may be, (e.g., 2) after first passing through the Thermal Fluid Heater (e.g., 3a, 3b), or prior to passing through the thermal fluid heater as the case may be for the particular solvent or material being used in the gas treating system. The GSS/CCS system (e.g., 201/200 respectively) may then discharge (carbon reduced) engine exhaust to atmosphere. The objective of this application is to show how constructive use of energy can benefit both the GSS/CCS and the ORC.

In some illustrative embodiments, heat rejected by a reciprocating engine that is collected by the engine jacket water or auxiliary cooling water may be intercepted before it is dissipated in the radiator, and that energy can then be used in the ORC system and/or the waste heat chiller(s) and/or in the GSS/CCS applications (whether that is absorption-based technology or adsorption-based technology). In addition to the energy in the jacket water and auxiliary cooling water, additional energy can be stacked (added) to that heated jacket/auxiliary cooling water in some illustrative embodiments by adding rejected heat from the GSS/CCS (Condenser, Recycle or Recovery), or ORC, or heat of compression, or $H_2S/CO_2$ stripped gas, or the combustion devices (engines) exhaust. In some illustrative embodiments, the cooling duty provided to the GSS/CCS may be configured from the additional (stacked) heat to the jacket/ auxiliary water which may be used in the ORC system or the waste heat chiller. In some further illustrative embodiments, the heat energy can flow in multiple directions between the GSS/CCS and the ORC and Waste Heat Chiller(s), and by utilizing that heat energy, it can reduce the work required to operate the various cooling fans of the: engine's radiator fan 81, the Exhaust Gas Cooler Fan 18 (e.g., including an engine and engine exhaust gas cooler as part of the GSS/CCS), and/or the Stripped Gas Cooler Fan 87 and/or ORC systems condenser fan(s) and/or gas compressor Inter-stage Gas Cooler Fan(s) 93.

Various piping configurations and combinations described in greater detail below may produce optimal use of the rejected heat energy from the equipment and configurations described herein in FIGS. 1 through 32. In other words, many combinations of recovering waste heat from at least one combustion device (a reciprocating engine and/or one boiler, and/or one furnace, and/or one turbine), coupled to at least one GSS/CCS application (whether that be an absorption or adsorption system), to at least one ORC system, and at least one Waste Heat Chiller, and recycled to these components at appropriate insertion points into their respective processes may improve the overall system efficiency and thus the stripped gas compound recovery efficiency of these (e.g., reciprocating engine, boiler, furnace, turbine, GSS/CCS, and ORC) combustion devices in these systems.

As an example, on an ORC system, the addition of thermal energy to the ORC system should be configured at a higher temperature than the ORC systems propellant such that heat flows from the waste heat source into the ORC systems propellant, that will then be used to generate power by the ORC system, thereby increasing the output of the ORC (and hence the efficiency), and the thermal fluid should be configured at a higher temperature than the GSS/CCS systems solvent at the Reboiler 11 for use in the Reboiler 11 or the thermal fluid (or jacket water or auxiliary cooling water as the case may be) configured at a lower temperature than the H2S/CO2 stripped gas being discharged from the GSS/CCS Condenser or H2S/CO2 Stripped Gas Cooler 23 such that heat flows in the direction to improve carbon recovery efficiency and energy efficiency. Meaning, take thermal energy away from system components that need to dissipate heat and apply thermal energy to system components where the heat is additive to increasing the system process efficiency.

As an example, on a Waste Heat Chiller 28, the addition of heat energy to the chiller system should be configured at a higher temperature such that heat flows from the waste heat source into the chiller, that will then be used to generate cooling for thermal fluids for circulation to provide cooling to the system, thereby further increasing the output of the system (and hence the efficiency).

As an example, recovery of waste heat from a Stripped Gas Compressor 89 can be added to the gas treating (GSS/CCS) system 200 in any of the described or shown configurations. The heat of compression from the gas compressor can be recovered and used in the GSS/CCS, the ORC system or in driving a Waste Heat Chiller 28. If the motor driving the gas compressor is a combustion device, the reject heat from the engine driver can also be recovered and used in the GSS/CCS, or ORC system or Waste Heat Chiller 28, just as is described from recovering thermal reject energy from the combustion device exhaust 10. If multiple stages of Stripped Gas Compression 89 are being applied to the gas, then there will be at least one and possibly the same number of interfaces between each stage of compression (via a heat exchanger at each stage of compression) and GSS/CCS, the ORC system 4 or the Waste Heat Chiller 28. As described in other parts of this application, the temperature of that recovered heat will be inserted into the GSS/CCS, ORC system 4 or the Waste Heat Chiller(s) 28 appropriately, focusing on progressively cascading the heat into the appropriate point in the ORC system. As shown in the example in FIG. 12, it only shows two gas compressors where each compressor only shows one stage of compression, however this concept of compressing the gas (whether that is natural gas or stripped gas such as CO2 or H2S after it is discharged from each stage of compression) can be applied to multiple stages of gas compression, (e.g. FIG. 19, 21, 23 through 27) and can be applied to any of the Figures or configurations outlined in the Figures, or descriptions outlined in this document.

As another example of building up heat transfer, the combustion device (e.g., turbine, furnace, reciprocating engine or boiler) exhaust can be discharged either directly to the Exhaust Gas Cooler 19 in order to cool the exhaust down prior to entering the absorber 2a or adsorber 2d, or via the path of one of more Thermal Fluid Heaters (e.g., 3a and/or 3b and/or 3c and/or 19), or a combination of Exhaust Gas Cooler 19 and the Thermal Fluid Heater(s) 3a 3b 3c, prior to discharging the exhaust into the GSS'/CCS' Absorber/Adsorber. The thermal energy in the combustion devices (e.g., turbine, furnace, reciprocating engine or boiler) exhaust can be transferred and collected in a thermal fluid (e.g., via a Thermal Fluid Heater) prior to the exhaust entering the GSS/CCS system. If the combustion device is a reciprocating engine, the reciprocating engine's jacket water or auxiliary cooling water, that thermal energy can be transferred to the Waste Heat Chiller(s), and/or the ORC and/or the Reboiler 11, or extract additional rejected heat from the engine exhaust stream or the Condenser 16 stripped gas discharge stream. These types of opportunities exist to reduce the cooling duties/requirements to the combustion devices Exhaust Gas Cooler 19 (by extracting energy via the Thermal Fluid Heaters) and to reduce the duty on the Stripped Gas Cooler 23, or to a reciprocating engines Radiator 8 (by extracting energy from the engine jacket water to use in the ORC or Waste Heat Chillers), the Condenser 16 (by extracting energy from the CO2/H20/H2S discharge to use in the ORC), and/or the Stripped Gas Cooler 23, and/or heat of compression from the Stripped Gas Compressor 89, and/or heat of compression from the Natural Gas Compressor 90 which then increase the efficiency of the either each individually or collectively the combustion device's output, the gas treating systems performance and/or the ORC's output.

The figures provided herein show various configurations and embodiments comprising various piping combinations and arrangements that can be used to increase the overall energy efficiency and stripped gas CO2/H2S recovery efficacy/efficiency of the combustion device (turbine, furnace, boiler or reciprocating engine) with the coupled GSS/CCS system, and/or Waste Heat Chiller 28, and/or ORC system 4. A heat balance and energy balance may be conducted on the combustion device (furnace, turbine, boiler or reciprocating engine to which the heat recovery equipment is coupled to), the GSS/CCS, gas compressor(s), and the ORC, and the Waste Heat Chiller(s), and the parasitic electrical load required to run the various motors (that run the pumps and cooling fans) so that the appropriate configuration is applied. These calculations can be conducted by the heat recovery systems Control Module 12 such that it dynamically adjusts the flow through the system with the objective of improving the overall system efficiency and/or carbon recovery efficiency, at which the system is operating. This may be based on adjusting the available waste heat energy sources, including, but not limited to a furnace, boiler, turbine and/or reciprocating engine exhaust gas, reciprocating engine jacket/auxiliary cooling water, Exhaust Gas Cooler 19 and Stripped Gas Cooler 23, Condenser 16 cooling fans/apparatus, Waste Heat Chiller(s) 28, ORC condenser, and/or heat of compression from either a Natural Gas Compressor 90 or a H2S/CO2 Stripped Gas Compressor 89, and/or thermal fluid discharge from the CCS system, and/or thermal fluid discharge from the ORC's heat exchangers (e.g., High-ORC (5), Mid-ORC (15) and/or Low-ORC (6)). Generally speaking, the terms Low-ORC, High-ORC, and Mid-ORC generally are not intended to reflect the relative operating temperatures to one another, but are only named differently to distinguish between them and highlight the fact that there can be multiple heat streams entering the ORC (e.g., alternately "first-ORC", "second-ORC", "third-ORC" and "fourth-ORC" or "ORC #1", "ORC #2", "ORC #3", and "ORC #4"). Specifically, those heat streams may be arranged in any order, but the important aspect is such that the lowest temperature heat stream interfaces with the ORC propellant at a point where the ORC propellant that is at a lower temperature than the waste heat source entering the ORC system (without regard being given to the ordering or numbering nomenclature), and that the order in which the waste heat streams interface with the ORC may be rearranged such that waste heat is always adding (cascading) energy to the ORC. As an example, to be of benefit to the overall system, the waste heat streams should be contributing to the ORC by pre-heating, evaporating or superheating the propellant in the ORC system 4.

It should be noted that different furnace, boiler, turbine or reciprocating engine makes and models may have different output ratings (size), different performance characteristics and different efficiencies from one another. For reciprocating engines, not only are there different output ratings with different efficiencies but differing proportional heat rejection to the exhaust and engine jacket water and engine auxiliary cooling circuits (heat reject to lube oil and/or turbo) as the case may be for various reciprocating engines. Furthermore, two engines of the same make and model could be configured differently with varying fuel gas, tuning/set-up, altitude of installation, turbo configurations (turbo wheel, turbo charger size, varying turbo boost levels on those turbo's), varying thermostat opening temperature settings, etc. that affect the reject heat from an engine, resulting in different heat flows. Further yet, each reciprocating engine may have different operating conditions and loads (e.g., exhaust temperature, jacket water flow and temperature, etc.) thereby affecting the amount of heat being generated which will then affect the heat recovery equipment's operation. Accordingly, various configurations under the present disclosure may be tailored to suit a particular application having a desired (or optimal) performance/efficiency. In certain illustrative embodiments, Control Module 12 may be configured to calculate the energy efficiency or carbon recovery of any or all of the combustion devices performance, chiller(s), fans, pumps, valves, CCS components or ORC equipment components, during operation and adjust or alter the flow rates throughout the system such that energy efficiency and stripped gas CO2/H2S recovery is improved with each change.

It should be noted that different reciprocating engines 1, turbines 22, boilers or furnaces 20 makes and models may also have different efficiencies from one another. Accordingly, various configurations under the present disclosure may be tailored to suit a particular application, with a specific make or model, having a desired (or optimal) performance/efficiency. In certain illustrative embodiments, Control Module 12 may be configured to calculate the energy efficiency of any or all of the combusting devices (turbines, reciprocating engines, boilers or furnaces), waste heat chiller(s), fans, pumps, valves, CCS components or ORC equipment components during operation and adjust or alter the flow rates throughout the system such that energy efficiency is improved with each change.

Control module 12 may be configured as a processing device and include a processor or processor circuit, one or more peripheral devices, memory/data storage, and communication circuitry, among other components. The processor for the Control Module 12 may be embodied as any type of processor currently known or developed in the future and capable of performing artificial intelligence calculations/simulations or other functions described herein. For example, the processor may be embodied as a single or multi-core processor(s), digital signal processor, microcontroller, or other processor or processing/controlling circuit. Similarly, the memory/data storage of Control Module 12 may be embodied as any type of volatile or non-volatile memory or data storage currently known or developed in the future and capable of performing the functions described herein. In operation, memory/data storage may store various data and software used during operation of the Control Module 12 such as access permissions, access parameter data, operating systems, applications, programs, libraries, and drivers. The memory/data storage of Control Module 12 may be communicatively coupled to the processor via an I/O subsystem, which may be embodied as circuitry and/or components to facilitate input/output operations with the processor, memory/data storage, and other components of the Control Module 12, whether the Control Module 12 is programmed in such a manner or is a self-learning computing module. For example, the I/O subsystem may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem may form a portion of a system-on-a-chip (SoC) and be incorporated, along with the processor, memory/data storage, and other components of the Control Module 12, on a single integrated circuit chip.

The communication circuitry (communication interface) for Control Module 12 may include any number of devices and circuitry for enabling communications between Control Module 12 and one or more other external electronic devices and/or systems. Control module 12 may also include peripheral devices and may include any number of additional input/output devices, interface devices, and/or other peripheral devices. The peripheral devices may also include a display, along with associated graphics circuitry and, in some embodiments, may further include a keyboard, a mouse, audio processing circuitry (including, e.g., amplification circuitry and one or more speakers), and/or other input/output devices, interface devices, and/or peripheral devices.

The Control Module 12 may also be configured to communicate with a network such as a wired and/or wireless network and may be or include, for example, a local area network (LAN), personal area network (PAN), storage area network (SAN), backbone network, global area network (GAN), wide area network (WAN), or collection of any such computer networks such as an intranet, extranet or the Internet (i.e., a global system of interconnected network upon which various applications or service run including, for example, the World Wide Web). The communication with Control Module 12 may be configured to use any one or more, or combination, of communication protocols to communicate such as, for example, a wired network communication protocol (e.g., TCP/IP), a wireless network communication protocol (e.g., Wi-Fi, WiMAX), a cellular communication protocol (e.g., Wideband Code Division Multiple Access (W-CDMA)), and/or other communication protocols. The above concepts are not limited to programmed equipment, they are also applicable to self-learning computing equipment that will optimize the overall energy efficiency of the components or the system. While not explicitly shown in the figures, those skilled in the art will appreciate that Control Module 12 may be configured to communicate with other control modules of a heat recovery system, as well as sensors configured to sense environmental/system conditions during operation with the purpose of modeling or simulating various performance scenarios and then applying those leanings by modifying the various components within the system to optimize the system energy efficiency or stripped gas compound recovery from the CCS.

Turning to the figures, the location and/or depiction of valves (labeled as 7 for fluid valves, and 13 for exhaust diverting valve for combustion devices such as turbines, furnaces, boilers or reciprocating engines) are generally intended to represent a flow diverting mechanism in which one valve or a combination of valves operating together (e.g., via a control module or linkage system) may divert a required flow to meet the objective of increased efficiency of the turbine 22, boiler/furnace 20, reciprocating engine 1, Waste Heat Chiller 28, GSS 201, CCS 200 and/or ORC system 4. The inclusion of circulating pumps 9 and gas compressors for circulating gases is implied and their illustrated location(s) are not intended to be limiting. One skilled in the art would readily understand that alternate and/or additional locations may be configured, depending on the application, which may require movement of fluids or gases, thereby requiring equipment to divert gases or flow fluids, as required. In some embodiments, the jacket water circulating pumps inherent to the reciprocating engines may not be engineered for the additional back pressure created by adding equipment to the reciprocating engines jacket water flow system. In such a configuration, changes to the existing pump or the addition of booster pumps may be required in the fluid process loops. For thermal fluid loops the addition of a circulating pump may also be required. Conversely, an Exhaust Blower Fan 21 (whether that being an induced draft or forced draft flow booster fan to overcome backflow restriction of the combustion device, or by placement somewhere in between) on the exhaust pipe 10 may be required, provided the turbines, boilers/furnaces or the reciprocating engines allowable exhaust back-pressure is considered in the design of the thermal fluid heater(s) (heat exchangers), exhaust cooler 19, and the Absorber 2*a*.

For certain illustrative embodiments discussed herein, it is to be understood that the turbine 22, the boiler or furnace 20 and the reciprocating engine 1 should be able to operate on their own, ideally without the burden of other equipment connected to it, as if the heat recovery equipment, the ORC, the Waste Heat Chiller 28, or the GSS/CCS equipment was not connected. A default configuration may be configured such that the combustion devices exhaust is diverted by a valve (e.g., 13) to atmosphere through an exhaust diverting pipe (e.g., 14), and if the combustion device is a reciprocating engine, its jacket water and auxiliary cooling water is piped to the engine's radiator (e.g., 8) for cooling. The exhaust bypass 14 is shown on many, but not all, configuration figures and thus should be understood to be a part of any configuration shown or described. The reciprocating engines radiator is suitable to provide cooling to either, or both independently or simultaneously, the reciprocating engine jacket water or the engines auxiliary cooling water. Fan 81 that corresponds to the reciprocating engine's radiator can be split into multiple fans to provide independently controlled and operated cooling for either or both the reciprocating engine jacket water or engine auxiliary cooling water (as shown in FIGS. 9, 13 through 25, and 28 through 31). If the piping configurations herein do not directly state this, it may be implied. The same applies for the Inter-stage Gas Cooler Fans 93 on the Inter-stage Gas Cooler(s) 92 that are coupled to gas compressors, ORC 4 condenser fans, Absorption Condenser 16 fans, Stripped Gas Cooler Fans 87, or Exhaust Gas Coolers Fans 18 on other combustion equipment such as furnaces, boilers, and/or turbines.

It should be noted that boilers and furnaces are treated interchangeably in this document because they have similar exhaust gas streams relative to the other alternatives (such as turbines or reciprocating engines), do not have ancillary cooling systems (for jacket water, auxiliary cooling water or lube oil systems), and thus are labeled as combustion device 20.

In the following, the below listed reference numbers for FIGS. 1 through 32 represent illustrative apparatuses and orders or sequences (depicted as arrows in the text of the present specification) in which the thermal fluids or gases (exhaust or stripped gas) may flow as depicted in each Figure:

| Reference No. | Apparatus |
|---|---|
| 1 | Reciprocating Engine |
| 2a, 2b | Absorber |
| 2d | Adsorber |
| 3 | Heat Exchanger ("Thermal Fluid Heater" or "TFH") |
| 4 | ORC |
| 5 | Heat Exchanger ("High-ORC") |
| 6 | Heat Exchanger ("Low-ORC") |
| 7 | Control Valves |
| 8 | Reciprocating engines radiator |
| 9 | Circulating Pump |
| 10 | Engine Exhaust Pipe |
| 11 | Reboiler |
| 12 | Control Module |
| 13 | Engine Exhaust Control Valve |
| 14 | Engines Bypass Exhaust Pipe |
| 15 | Heat Exchanger ("Mid-ORC") |
| 16 | Condenser (in Absorption-based systems) |
| 17 | Stripper (in Absorption-based systems) |
| 18 | Exhaust Gas Cooler Fan |
| 19 | Exhaust Gas Cooler |
| 20 | Boiler or Furnace |
| 21 | Exhaust Blower Fan |
| 22 | Turbine |
| 23 | Stripped Gas Cooler |
| 24 | Recycle, heat exchanger |
| 25 | Recovery, heat exchanger |
| 26 | Swing 'A' Adsorption |
| 27 | Swing 'B' Stripping |
| 28 | Waste Heat Chiller |
| 29 | Gas Conduits |
| 30 | Thermal Fluid Conduits |
| 31 | Cooled Thermal Fluid Conduits |
| 32 | Gas Circulating Device |
| 40 | Radiator Cooled Gas Heat Exchanger |
| 81 | Radiator Fan (also referred to as Aerial Cooler Fan) |

-continued

| Reference No. | Apparatus |
|---|---|
| 87 | Stripped Gas Cooler Fan |
| 88 | Cross Flow Heat Exchanger (in Absorption-based systems) |
| 89 | Stripped Gas Compressor |
| 90 | Natural Gas Compressor |
| 92 | Inter-stage Gas Cooler |
| 93 | Inter-stage Gas Cooler Fans |
| 99 | Turbine Lube Oil Cooler |
| 200 | CCS System (for stripping CO2 gas from combustion exhaust) |
| 201 | GSS System (for stripping CO2/H2S gas from natural gas streams) |
| 300 | Sour Natural Gas Feed Pipe (GSS System) |
| 301 | Sweetened Natural Gas Outlet Pipe (GSS System) |
| 330 | ORC Connector Line |
| 1000 | Predictive Control Module |
| 1102 | Predictive Performance Module |
| 1200 | Control Module Operating Environment |
| 1300 | I/O Control Algorithm |

Turning to FIG. 1, a configuration where a reciprocating engine is coupled with an ORC 4 and an absorption-based CCS system 200, the engine jacket water is kept as a separate system from the thermal fluid system. Meaning, the engine jacket water circulates through the engine, the ORC 4 and the Condenser 16, but it does not directly interact with the engines exhaust Similarly, the Thermal Fluid Heater 3 interacts with the engines exhaust 10, the ORC 4 and the Reboiler 11, but it does not directly interact with the engines jacket water loop. The thermal fluid loop would typically use a thermal fluid such as thermal oil (synthetic or mineral) that is suitable to operate at higher temperatures than the engine jacket water. The engine jacket and auxiliary water is typically comprised of a water/glycol mixture and can be used in the other loops, but the other Thermal Fluid Loop (TFL) can use a heat conducting thermal fluid, thermal oil (synthetic or mineral), heat transfer fluid (synthetic or mineral), water, or a water/glycol mixture.

The engine jacket water is illustrated to show jacket water circulated in a first configuration, where the reciprocating engine jacket water is circulated from reciprocating engine 1 (bypassing the engines radiator 8) to the ORC 4 via heat exchanger 15 (transferring thermal energy to the ORC from the engine jacket water), then to the Condenser 16 (transferring thermal energy from the condenser to the jacket water), then back through the ORC via heat exchanger 6 (transferring thermal energy to the ORC from the engine jacket water), and then finally returning to the engine (having bypassed the engines radiator 8) to once again pick up radiant heat energy before being recirculated. The engine's radiator 8 may be bypassed, or operated in parallel or in series with the radiator 8, depending on the application, however in this example it was described as being bypassed to the waste heat system, and not being used to reject thermal energy to the atmosphere. Reconfiguring the piping arrangement to use the radiators capacity (in series or in parallel with split flow) to pre-cool the jacket water before it reaches the Condenser 16 may affect the overall system efficiency, but this configuration is not shown in the Figures. The concept would be to recover the heat from the engines jacket water into the ORC first, then divert the jacket water to the engine radiator 8 to pre-cool it before diverting the jacket water flow to the Condenser 16. This would have colder jacket water at the condenser than what is shown in the configurations in the Figures, which would then be more efficient at condensing the CO2 exhaust vapor (or alternatively H2S if operated in a GSS application). It is important to note that anywhere a control valve 7 is involved, these valves do not have to function exclusively as "open" or "closed". They can be operated as 2-way or 3-way valves, in partially "open" or partially "closed" thus allowing for split flow to both paths departing the control valve. The engine exhaust is illustrated to show exhaust flowed through the exhaust diverter valve 13, to the Thermal Fluid Heater 3, then through the (in this case, Carbon) Absorber 2a and then to atmosphere via exhaust pipe 10. The exhaust follows the path of configuration of recovering the exhaust heat and circulating in a closed loop through Thermal Fluid Heater ("TFH") 3, to a pump 9, followed by flowing the thermal fluid to the ORC via heat exchanger 5 (to transfer heat to the ORC system) then to the Reboiler 11 (to transfer heat to the CCS system that then uses that heat to strip the CO2 from the carrier solvent), finally returning the thermal fluid to the thermal fluid heater 3 to pick up engine exhaust energy again. The position of the pump is for illustration purposes and could be better suited to be at the lowest temperature point in the loop, pushing thermal fluid into the thermal fluid heater.

The configuration of FIG. 1 may advantageously create a relatively efficient and stable temperature differentials across the Thermal Fluid Heater 3, ORC heat exchangers 5, 15 and 6, Reboiler 11 and the Condenser 16 (thus avoiding thermal cycling within the CCS or ORC component heat exchangers) because, at a specified load, the reciprocating engine 1 emits a relatively constant exhaust temperature and jacket water flow rate, and the engines internal thermostat only discharges jacket water when it reaches the temperature setting of the thermostat, eventually reaching a steady state jacket water flow that produces a steady state of reject heat to the power output of the engine. In some illustrative embodiments, the engine's exhaust may be discharged independently or simultaneously through exhaust pipes 10 and bypass 14 and may be generally constant when being discharged from the reciprocating engine and therefore the temperature differential across the TFH 3 and the Absorber 2a should also be relatively constant.

Control module 12 may be configured to monitor the temperature of the jacket water returning to the reciprocating engine 1 and then modulate or adjust control valves 7x to vary the flow through the respective piping arrangements (e.g., to the heat recovery equipment or the radiator 8 or a combination thereof, to dissipate heat from the jacket water or to bypass the heat exchanger Low-ORC 6 to preserve heat in the jacket water in order to prevent the engines thermostats from cycling) so that appropriate return temperature ranges of the jacket water are maintained. A further detail in return temperature control can be the use of splitting the flow into multiple streams concurrently and allowing the streams to merge at another point in the process. This concept may be applied to virtually all configurations where the reciprocating engines radiator 8 can be operated in parallel to one or more other components such that the flow can be split to the radiator 8 for cooling and other component(s) (Reboiler 11, heat exchangers High-ORC 5, Mid-ORC 15, or Low-ORC 6) for cooling, or to add heat back to the radiator fluid (so that it returns to the engine at the targeted operating temperature) by diverting the jacket water flow to pick up heat from a multiplicity of components (reciprocating engine, Thermal Heating Fluid (THF) in the thermal fluid heater 3, Condenser 16) in series with one another before merging the flow streams with the flow from the radiator 8 (which could also be bypassed and have no flow through it) and the flow streams going through the other component(s). Although this is the most basic configuration, in subsequently presented configurations, the number of heat sources and heat sinks will increase however the concept is applicable to include these various components. This method of control and process flow will increase the efficiency of the individual equipment (if otherwise left to operate independently) and thus will increase efficiency of the ORC, CCS and the other/various reciprocating engine configurations depicted below (which outline the flow paths of the various gases and fluids through the various components of the systems) and thus the concept should be understood to be applied in any of the figures or configurations (including application to other combustion devices such as turbines, reciprocating engines, furnaces and/or boilers, when applicable) stated throughout. An example of this concept has been illustrated in FIG. 1 (see below for descriptions of example Configurations 1 through 8), and FIG. 2, and FIG. 3 (see below for descriptions of example Configurations 1 through 16), and FIG. 4 (see below for descriptions of example Configurations 1 through 16), descriptions outlined below. It should be noted that the jacket water and/or auxiliary water split flow can occur at the beginning, the middle or towards the end of the flow loop originating at the reciprocating engine. Meaning, wherever the flow can be split off to divert a portion of the flow to the radiator for cooling, and then have that flow merge with the stream that flowed to the other stream (such that they always merge before re-entry to the reciprocating engine), then all combinations can work, and would be suitable methods for return jacket water and/or auxiliary cooling water temperature control. At substantially the same time, the Control Module 12 may also make appropriate adjustments to the amount of air flow across the radiator to adjust the amount of heat that is rejected to atmosphere, by varying the fan speed or blade pitch operating in front of the engines radiator 8 and make adjustments to the equipment within the ORC system 4. This objective can also be accomplished by diverting exhaust gases around the Thermal Fluid Heater ("TFH") 3 and the Absorber 2*a* by controlling valve 13 to divert some or all of the engine exhaust thermal energy into the atmosphere via exhaust pipe 14. Similarly, if the returning jacket water is too cold for the engine, the same concept of split flow can be applied to either reducing the amount of thermal energy extracted from the engine jacket water by the various heat extracting heat exchangers or by adding thermal energy to the engine jacket water or auxiliary cooling water (by directing the flow to heat dissipating heat exchangers in the system), prior to return to the engine. In addition, the Control Module 12 may also make appropriate adjustments to the location and/or control of valves (labeled as 7 for fluid valves, and 13 for exhaust diverting valve for combustion devices such as turbines, furnaces, boilers or reciprocating engines) to divert heat to and away from the various components outlined in this document.

In natural gas compression arrangements where a reciprocating engine is used to drive the gas compressor, the jacket water cooling radiator may be bundled in an aerial cooler with other fin tube radiator-type sections (used to cool the compressed gas for each stage of cooling, the engines auxiliary cooling system for turbo cooling and lube oil cooling, and the engines jacket water for preventing the engine from overheating), and the aerial cooler is typically equipped with a large cooling fan to draw ambient air across the various aerial cooler gas cooling and engine radiator sections. In gas compression this aerial cooler fan may be powered by the reciprocating engines output shaft, or in some cases by electrically driven fans. This engine driven fan could also be decoupled from the reciprocating engine and converted to electric drive (e.g., with a variable frequency drive (VFD)) so that power generated by the ORC can be used to power the aerial cooler fan. Also, in natural gas compression cooling where the aerial cooler at times only has one cooling fan, the determining factor to run the cooling fan may at times be dictated by the amount of cooling the jacket water requires or at times by the amount of cooling the compressed gas requires or at times by the amount of cooling the auxiliary cooling water requires. For clarity, converting a mechanically driven fan to electrically driven can be done for any configuration, and the electric VFD drive of the cooling fan is not required, but it would make the system more efficient, only running the fan when it is required to provide the amount of cooling required. Ideally, separate electric VFD driven fans would be configured to run the amount of air drawn across the individual corresponding cooling coils in the aerial cooler sections, independently. Meaning, the air flow across: the cooling fins for the engines jacket water radiator section of the aerial cooler, the cooling fins for auxiliary cooling water section of the aerial cooler, and the cooling fins for the gas compression cooling section for each inter-stage cooling section of the aerial cooler, could have the corresponding fans be run independently, thereby further increasing the efficiency of the cooling system. Further, by integrating Waste Heat Chillers 28 to provide cooling to the various products flowed through the aerial cooler, it would lessen the electric load of the fan motors driving the independent cooling fans, making the cooling system more efficient, thereby making the overall system more efficient and thus more carbon efficient.

The recovered energy from the reciprocating engines exhaust (via the Thermal Fluid loop), the engines jacket water loop, the engines auxiliary cooling loop, and the CCS condenser, may be arranged in the ORC system 4 such that the lower temperature stream is used where a lower propellant temperature in the ORC system 4 process is located. Therefore, the thermal energy is transferring from the higher temperature thermal fluid into a lower temperature ORC process (whether that is for preheating, evaporating, or for super heating). Additionally, the various heat streams, from the individual or combined sources, should progressively add energy in the ORC system 4, such that each energy stream is progressively getting the ORC propellant hotter than the previous heat stream, all adding and increasing the ORC system 4 propellant, at each interface (heat exchanger). Meaning, thermal energy entry into the ORC system is dictated by progressively increasing the temperature of the ORC's propellant (working fluid) and not necessarily as depicted in the Figures.

In FIG. 1 through FIG. 7, the first recovery loop recovers the heat from the reciprocating engines jacket water and Condenser 16, where this first recovery loop may comprise the reciprocating engine 1, the engines jacket water, Condenser 16, the heat exchanger Low-ORC 6 and Mid-ORC 15 in the ORC system 4, and the reciprocating engines radiator 8. The second recovery loop is comprised of a thermal fluid heater TFH 3 in the exhaust stream that operates with a segregated heat recovery loop (using water, water/glycol, or thermal oil) to transfer thermal energy to the ORC system 4 via heat exchanger High-ORC 5 and to the Reboiler 11. The direction of thermal fluid flow is illustrative and its direction of flow can be reversed if desired. Meaning, thermal fluid can flow from the thermal fluid heater TFH 3 to the Reboiler 11, then to the ORC system 4 via heat exchanger High-ORC 5 before returning to the thermal fluid heater TFH 3.

In the examples of FIGS. 5, 6, 7, 9, 13 through 25, 28, 30, and 31, the engine's auxiliary cooling system is shown to integrate with the CCS, Waste Heat Chiller(s) and/or ORC.

Figure 28:
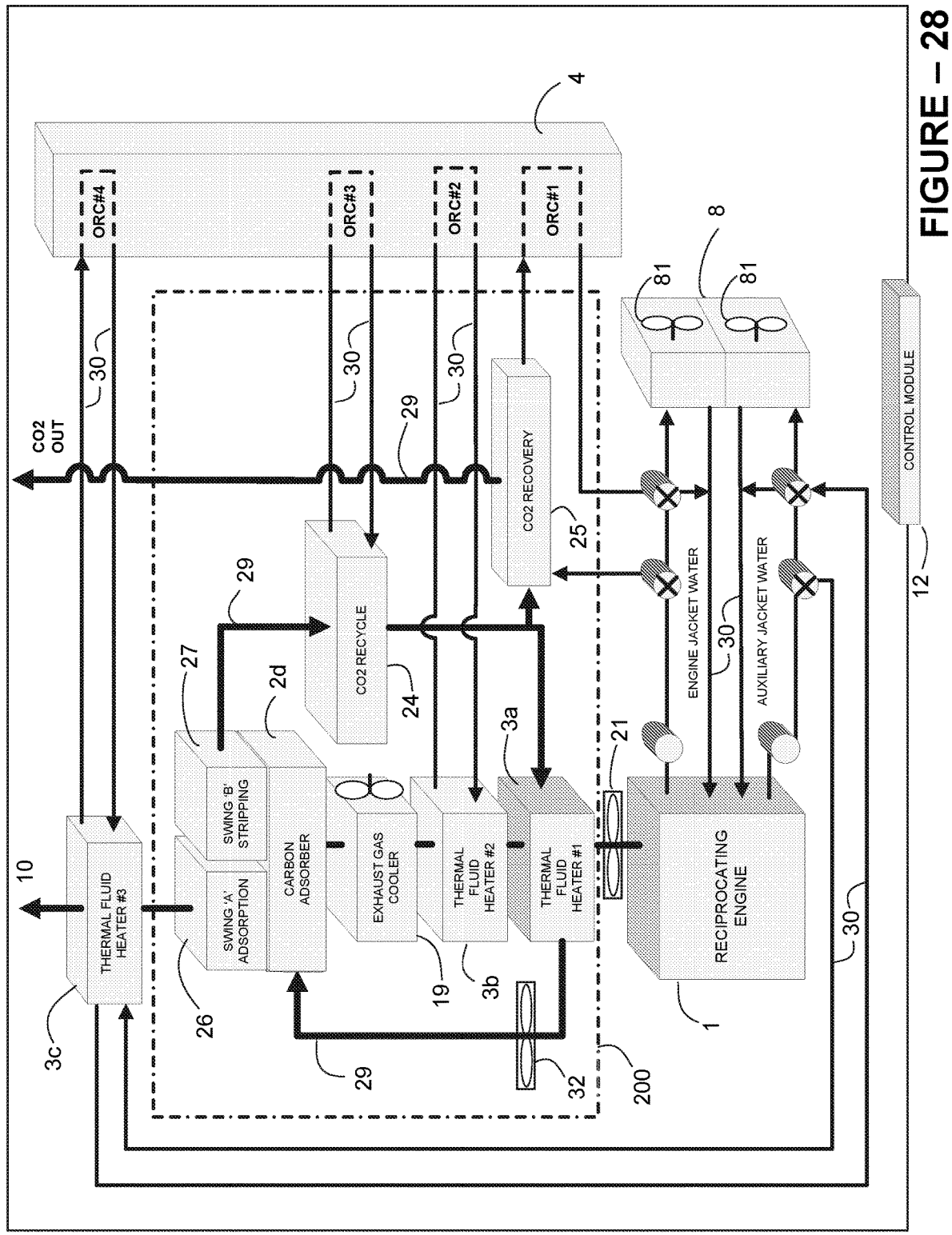
FIG. 28 shows a similar configuration as disclosed in FIG. 20 wherein the CO2 stripped gas compressor is not shown and the Waste Heat Chiller is replaced with a heat exchanger, and wherein the heat exchanger combines the thermal energy from the auxiliary cooling water with a portion of the engine exhaust's thermal energy that is being discharged from the Adsorber, and then transfers the collected thermal energy to the ORC under some aspects of the present disclosure.
Figure 29:
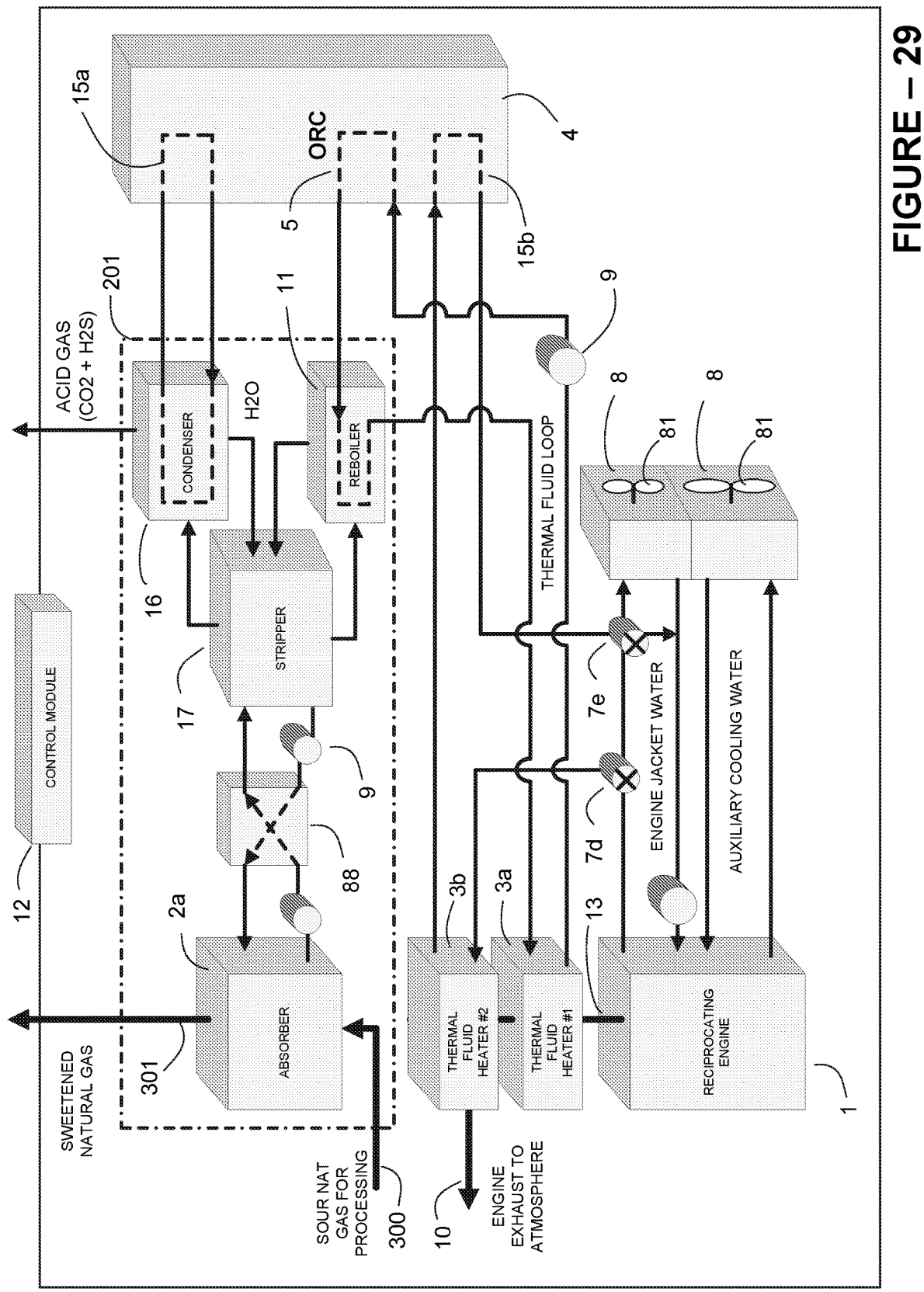
FIG. 29 shows an absorption-based GSS system coupled to an ORC system and a reciprocating engine, wherein Thermal Fluid Heater #1 distributes thermal energy to the ORC and the GSS systems Reboiler, and the engine jacket water is circulated to the Thermal Fluid Heater #2 to pick-up/stack additional thermal energy which is then transferred to the ORC, and wherein thermal energy from the GSS Condenser is also transferred to the ORC, and where combustion exhaust is vented to atmosphere and not treated, under some aspects of the present disclosure.
Figure 30:
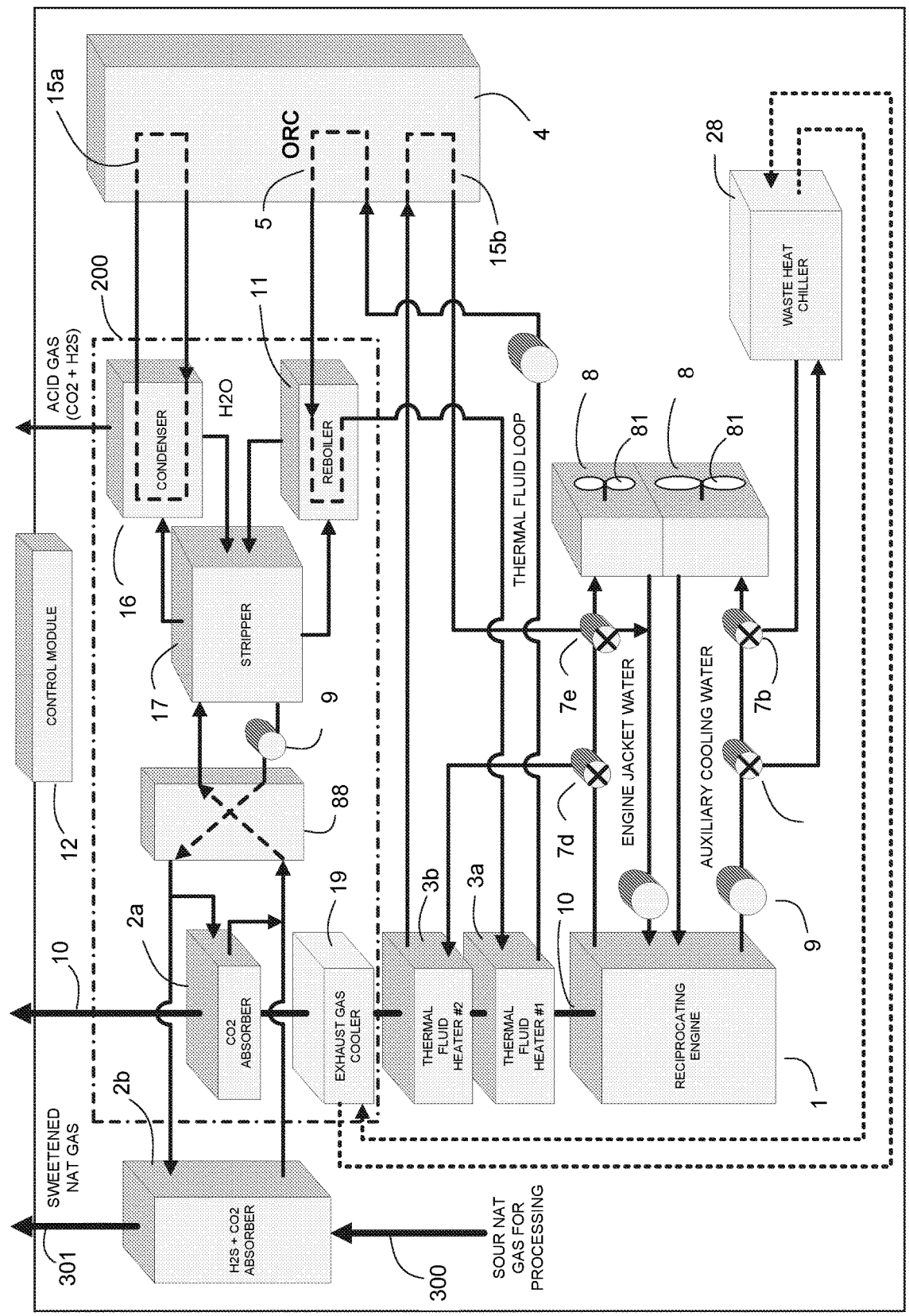
FIG. 30 shows an absorption-based CCS absorber configured in parallel with an absorption-based GSS absorber, wherein two streams of gas from the two absorbers are being cleaned up by using the balance of the CCS systems plant, wherein the byproducts from both absorbers is combined for stripping, reboiling and condensing in a single amine balance of plant system, as well as a waste heat chiller configured to use the engines auxiliary cooling water to run the chiller to provide cooling to the engine exhaust prior to it entering the CCS absorber under some aspects of the present disclosure.
Figure 31:
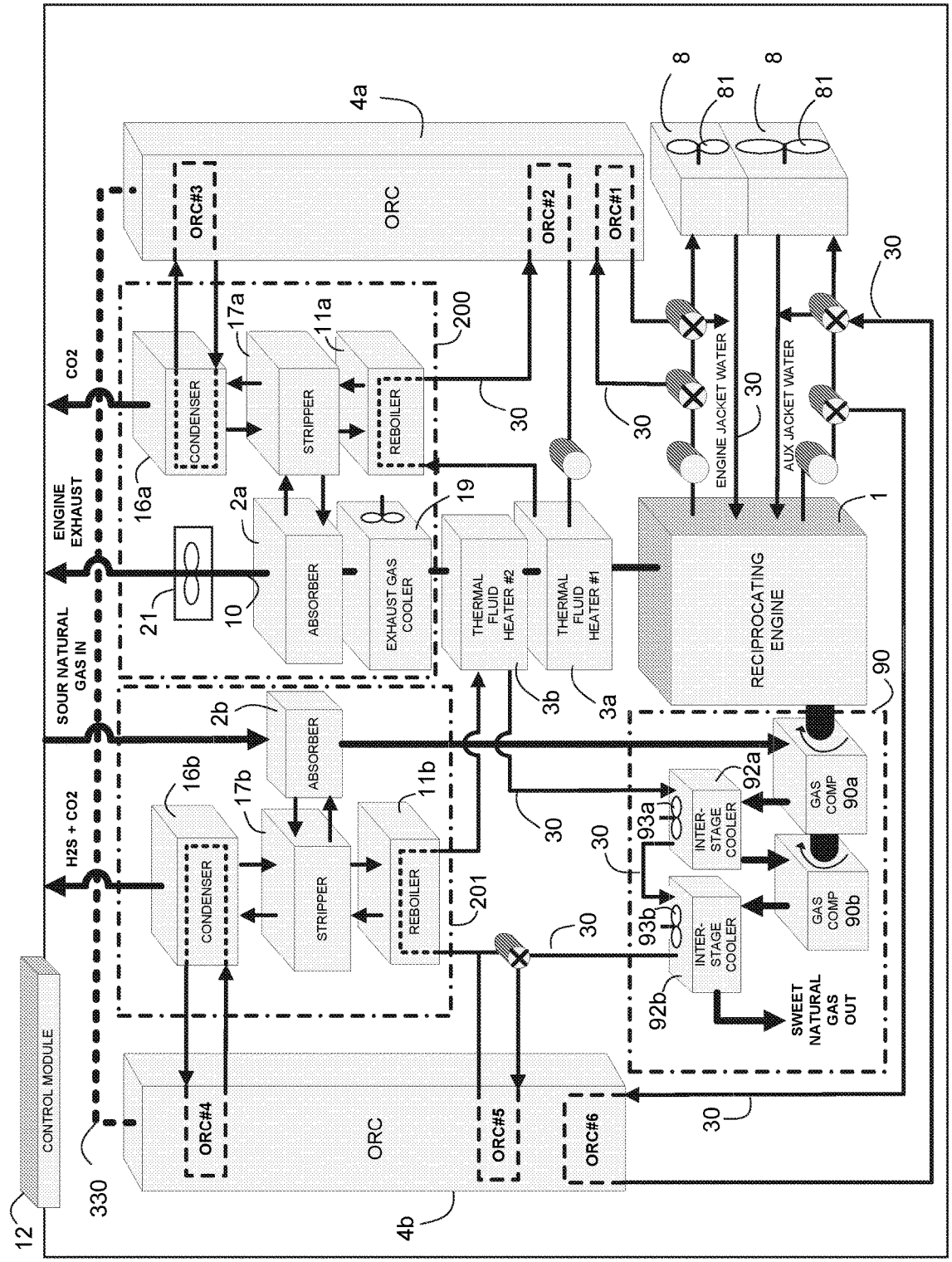
FIG. 31 shows an engine coupled to a natural gas compressor, configured with a single ORC system, integrated with two separate absorption-based systems (one CCS and the other GSS) configured to recover CO2 and H2S under some aspects of the present disclosure.

It should be noted that in any of the FIGS. 1 through 15, 22, and 23, the absorber-based CCS can be operated as a GSS where instead of processing the engine exhaust 10 through the Absorber 2a to recover CO2, the system can be operated to process off-market specification natural gas through the Absorber 2a to recover H2S and/or CO2, similar to the way depicted in FIG. 29 through 31. Similarly, if applying adsorption (TSA or PSA) gas treating technology, the CCS can be operated as shown in FIGS. 16 through 21, and 24 through 28, where instead the engine exhaust 10 is processed through the Adsorber 2d to recover CO2.

Figure 32:
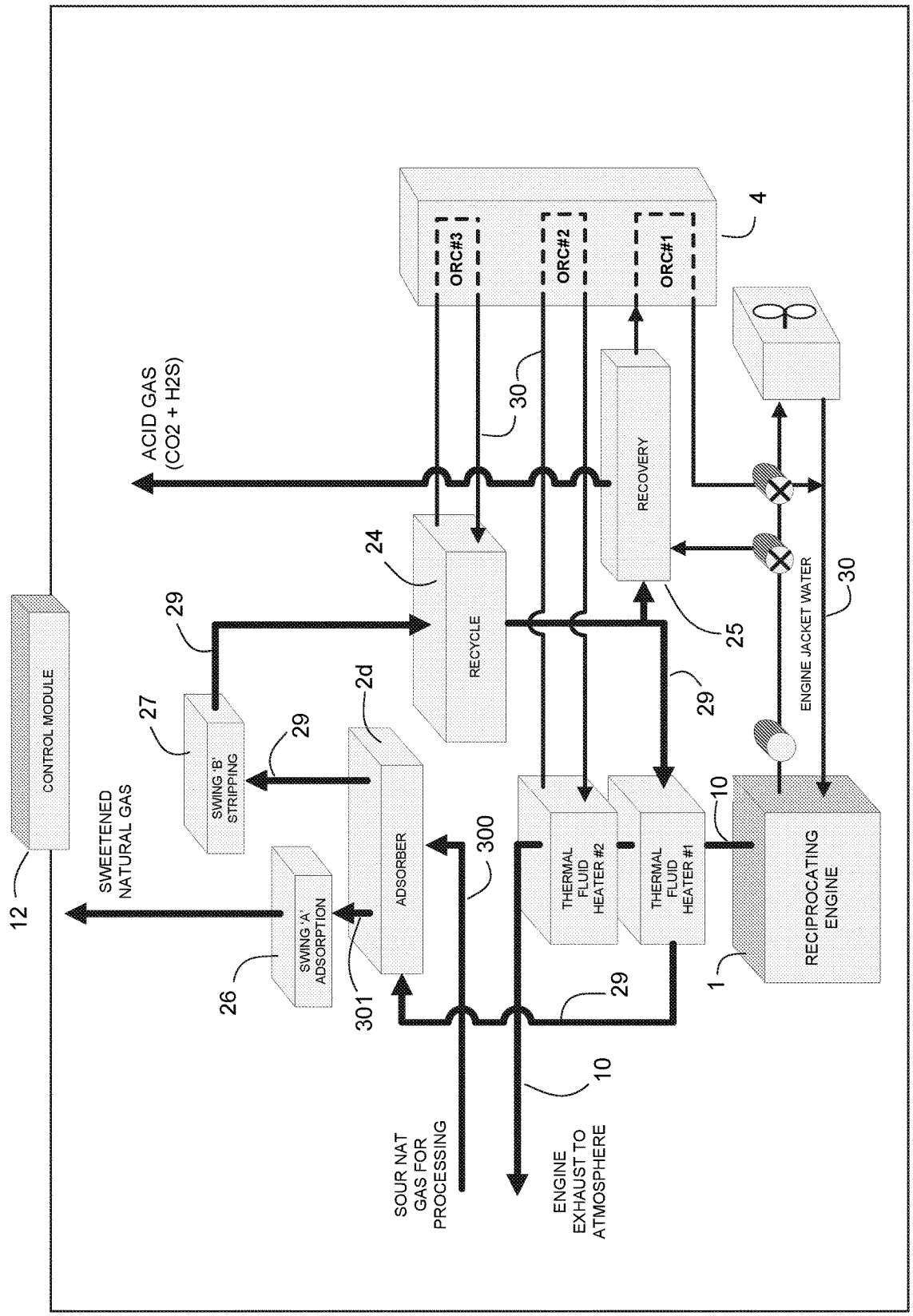
FIG. 32 shows gas treating GSS adsorption system similar to the absorption-based system in FIG. 29, where the adsorption system treats a methane gas stream to recover H2S/CO2 under some aspects of the present disclosure.

Similarly, the TSA or PSA system can be operated as a GSS 201 to process off-market specification natural gas through the Adsorber 2d to recover H2S and/or CO2, similar to the way depicted in FIG. 32.

The following are exemplary component configurations depicting the order in which thermal fluid and/or engine jacket water and/or auxiliary cooling water and/or system gases and/or propellant flow through the configurations of FIGS. 1 through 32 and in other illustrative embodiments disclosed herein. Where a '+' sign is used, it is to show a separate thermal loop in which a separate thermal fluid or gas (exhaust gas or stripped gas) is used to move thermal energy around the system shown in the figure. Where a '[' sign indicates the start of a potential path and ']' sign indicates the end of the potential path, and where '/' is used to in between two ']' and '[' symbols, indicating the separation of the two possible paths. The '[ ]/[ ]' indicates a possible path of one of the flow directions that occur at a split in the flow in the configurations and the flow is then assumed to take the path set out by the Control Module 12 until the flows merge again (however the re-merging is not stated or described in the configuration nomenclature but assumed to be understood by somebody skilled in the art) at an appropriate convergence point. Further, where a '(' sign indicates the start of a nested potential path and ')' sign indicates the end of the nested potential path, and where '/' is used to in between two ')' and '(' symbols, indicating the separation of the two possible paths. The ( )/( ) indicates a possible path of one of the flow directions that occur at a split in the flow in the configurations and the flow is then assumed to take the path set out by the Control Module 12 until the flows merge again (however the re-merging is not stated or described in the configuration nomenclature but assumed to be understood by somebody skilled in the art) at an appropriate convergence point. For example, in "Configuration 1" of FIG. 1 shown below, the designation 1→9→7a→[7b]/[15→16→7c→(6/bypass 6)→7b]→(8/bypass 8)→1 illustrates that the flow from Absorption-based gas treating system the engine jacket water can flow from the engine, through the booster pump, through the diverter valve 7a, through the heat exchanger in the Mid-ORC 15, then through the Condenser 16, through the diverter valve 7c and then through Low-ORC 6 or bypass around Low-ORC 6, to then merge the two flows at diverter valve 7b where it again faces the potential for split flow to the engine radiator 8 (i.e., 16→7c→[6/bypass 6]→7b→[8/bypass 8]→1) and the engine. One partial stream of the total flow bypasses the ORC system (Low-ORC 6), and the remaining portion of the total flow flows through the ORC system (Low-ORC 6) which returns (shown as dashed line) flow back to control valve 7b which then returns all of that flow to the reciprocating engine 1 (i.e., 6→1). In a further split, where diverting valve 7b further splits the merged flow to the engine directly and partially through radiator 8 and the engine, where it is merged with the other part of the flow that circulated through radiator 8 (i.e., 8→1), prior to entering the reciprocating engine.

Furthermore, it should be appreciated by those skilled in the art that the specific sequences are illustrative only, and are not intended to be limiting. Alternate or additional sequences are contemplated in the present disclosure. In certain illustrative embodiments, sequences starting with a particular component (e.g., reciprocating engine 1) that "circle back" to the component (e.g., 1→9→15→16→1) may be considered a closed-loop configuration, where a component from which a sequence starts also may serve as the ending point of the sequence. Specifically, because the source of the thermal energy is usually originated by the combustion device, in most cases, depicted throughout as a reciprocating engine 1, the sequencing/numbering applied starts and finishes at the reciprocating engine 1, but can be shown starting at any other point in the sequence and finishing back at that sequence. In other energy transfer configurations, where the thermal energy is not transferring from the combustion device, the same technique applies.

Various illustrative configurations for FIG. 1 show the first set of configurations referring to the:
engine jacket water flow path
+
the engine exhaust flow path
+
the thermal fluid flow path:
Configuration 1:
   1→9→7a→[7b]/[15→16→7c→(6/bypass 6)→7b]→(8/bypass 8)→1
+
   1→13→[14]/[3→2a→10]
+
   3→9→5→11→3
Configuration 2:
   1→9→7a→7b→[8]/[bypass 8]→1
+
   1→13→[14]/[3→2a→10]
+
   3→9→5→11→3
Configuration 3:
   1→9→7a→15→16→7c→6→7b→[8]/[bypass 8]→1
+
   1→13→[14]/[3→2a→10]
+
   3→9→5→11→3
Configuration 4:
   1→9→7a→15→16→7c→6→7b→8→1
+
   1→13→[14]/[3→2a→10]
+
   3→9→5→11→3
Configuration 5:
   1→9→7a→15→16→7c→6→7b→bypass 8→1
+
   1→13→[14]/[3→2a→10]
+
   3→9→5→11→3
Configuration 6:
   1→9→7a→15→16→7c→bypass 6→7b→8/1→1
+
   1→13→[14]/[3→2a→10]
+
   3→9→5→11→3

Configuration 7:
1→9→7a→15→16→7c→bypass 6→7b→8→1
+
1→13→[14]/[3→2a→10]
+
3→9→5→11→3

Configuration 8:
1→9→7a→15→16→7c→bypass 6→7b→bypass 8→1
+
1→13→[14]/[3→2a→10]
+
3→9→5→11→3

Figure 2:
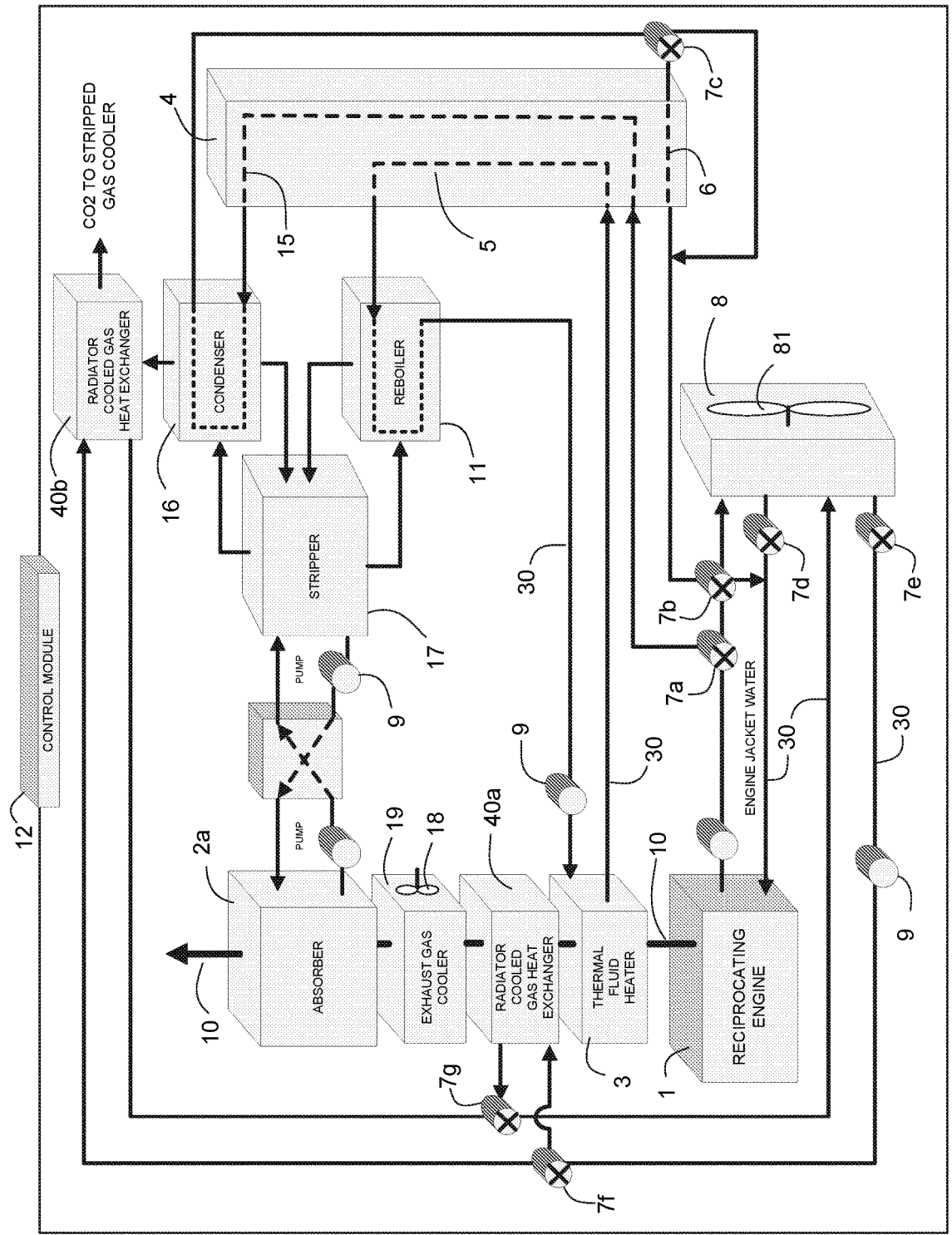
FIG. 2 illustrates the system of FIG. 1, wherein two radiator cooled gas heat exchangers are added to the system in FIG. 1, where a thermal fluid is configured to circulate between the two radiator cooled gas heat exchangers and the engine radiator, under some aspects of the present disclosure.

Turning now to FIG. 2, this configuration is substantially similar to the configuration illustrated in FIG. 1, with the addition of two Radiator Cooled Gas Heat Exchangers (40a and 40b) that provide cooling to the exhaust gas stream and the CO2 stripped gas being the main difference. When the ORC 4 system and the Condenser 16 can receive all the thermal energy the engine jacket water is intended to dissipate prior to returning to the engine, the engine jacket water can flow along the path (1→7a→15→16→7c→[6/bypass 6]→7b→bypass 8→1), If the radiator fan 81 remains operational without any thermal fluid (engine jacket water or auxiliary cooling water) flowing through it, the operation of the radiator 81 is drawing parasitic power to run it and therefore the cooler could be used more effectively. In this case, the radiator/aerial cooler can be re-purposed to provide cooling to other streams in the system that require cooling. In this example, Radiator Cooled Gas Heat Exchanger 40a and Radiator Cooled Gas Heat Exchanger 40b are coupled to the engine radiator 8 to flow a thermal fluid between these components in order to use the radiator to cool a thermal fluid circulating between the radiator 8 and Radiator Cooled Gas Heat Exchanger 40a and Radiator Cooled Gas Heat Exchanger 40b. The thermal fluid flow to the Radiator Cooled Gas Exchangers (40a and is diverted by the control valves 7d, 7e, 7f, and 7g that can be used to isolate and proportion flow to the Radiator Cooled Gas Exchangers (40a and 40b) as required by the Control Module 12. Control valve 7d prevents backflow of the thermal fluid circulating from the radiator into the jacket water system. Control valve 7e prevents backflow of the engine jacket water from entering the Radiator Cooled Gas Heat Exchanger (40a and 40b) system. Control valve 7f allows cooled thermal fluid to flow to either Radiator Cooled Gas Heat Exchanger 40a or Radiator Cooled Gas Heat Exchanger 40b or both from the aerial cooler. Control Valve 7g allows hot thermal fluid to flow from either Radiator Cooled Gas Heat Exchanger 40a or Radiator Cooled Gas Heat Exchanger 40b or both back to the aerial cooler. Additionally, the Control Module 12 can partially open control valves 7f or 7g to allow a proportionate flow to and from the Radiator Cooled Gas Heat Exchangers (40a and FIG. 2 shows the Radiator Cooled Gas Heat Exchangers (40a and 40b) coupled to the engine radiator 8. Their role is to extract thermal energy from the combusted exhaust gas prior to it entering the CCS 200 (and GSS 201 for gas sweetening) absorber 2a, and extracting thermal energy from the stripped gas as it discharges from the CCS, prior to the stripped gas entering the Stripped Gas Cooler 23. Not shown in this example, but applicable with the same concept is coupling the engine radiator 8 to a Radiator Cooled Gas Heat Exchanger inserted between a gas compressor stage and the associated inter-stage gas cooler in order to provide cooling to the compressed natural gas (in the case of a natural gas compressor 90) and to provide cooling to the compressed stripped gas (in the case of a stripped gas compressor 89). This configuration can replace the cooling benefits that could be garnered from a Waste Heat Chiller 28 without the need to purchase the Waste Heat Chiller equipment because the radiator is usually an existing component to any reciprocating engine 1. Further, this configuration will reduce or eliminate the operation of the cooling fans (Exhaust Gas Cooler Fan 18, Stripped Gas Cooler Fan 87, and Inter-stage Gas Cooler Fan 93) associated with the heat streams being cooled by the Radiator Cooled Gas Heat Exchangers 40. Similar to the configurations in FIG. 1, the following would apply to both FIG. 1 and FIG. 2, where depending on how much the temperature of the jacket water is reduced in the heat exchanger 5, 15 or 6, the jacket water may be returning to the engine at too hot or too cold of a temperature for the engine not to start adjusting or cycling its thermostatic valves. Accordingly, the ORC heat exchangers should be designed (sized) to recover the desired amount of thermal energy such that the amount of energy added back to the jacket water by the Condenser 16 can then be extracted from ORC heat exchanger 6. This will allow the Control Module 12 to divert jacket water flow appropriately to return the jacket water to the engine at the appropriate/desired temperature. If the configuration has the heat exchanger 15 in the ORC extract more thermal energy from the jacket water than desired, then the Condenser 16 will have to add back (make-up) for the amount of energy extracted beyond the desired amount and the jacket water will not have enough energy in it to give up any thermal energy to heat exchanger 6 in the ORC. If the heat exchangers are designed properly, it will prevent the engine thermostats from modulating, which if they started modulating, they would reduce the flow of jacket water which would then cause cascading performance issues in the ORC system. In the case where an absorption-based CCS has a Condenser 16 that adds heat back to the jacket water that re-added energy can be extracted in ORC heat exchanger 6. Monitoring of the jacket water temperature between control valve 7c and the Condenser 16 will allow the Control Module 12 to determine whether the jacket water should be diverted through ORC heat exchanger 6 (to extract additional thermal energy from the jacket water) or bypassing heat exchanger 6 and not further cooling the jacket water. The Control Module would then take another temperature reading at the entrance to control valve 7b to determine whether cooling of the jacket water is required in the radiator, or only partial cooling is required where it would then split the jacket water flow to the radiator and the engine at the same time until the desired temperature is achieved prior to returning to the engine 1, or if the jacket water is at the appropriate temperature, it would be diverted directly to the engine. Similarly, care must be taken so as not to return the jacket water to the engine at too high of a temperature for risk of the reciprocating engines control system shutting down the engine in an overheat situation. Thereby, the ORC system should be extracting the desired energy from the jacket water loop/stream prior to returning to the engine 1, and the Control Module 12 should be controlling/diverting jacket water flow to return the jacket water to the engine at the desired temperature. To maintain steady state conditions in the ORC, the desire is to recover and dissipate thermal energy from the various sources and sinks that transfer thermal energy to the ORC to also have it be in steady states of thermal energy transfer.

Alternatively, if the engine's returning jacket water is over cooled by the ORC 4 or the engines radiator 8, or in combination, the engine thermostatic valve will reduce the flow rate through the engine by partially (and potentially fully) closing the thermostatic valve inherent to the engine.

This will retard or stop jacket water flow through the engine which will then retain the jacket water in the engine for a longer period until it reaches the appropriate discharge temperature, at which time then, the thermostatic valves will start to open again discharging the warmed jacket water. In this configuration, the jacket water flow will not be steady (because the engines thermostatic valve will be modulating and inhibiting flow) thereby disrupting the steady state flow of the jacket water which would then affect the operation of the ORC system by modulating the amount of heat being transferred into the ORC system. To prevent the engine thermostat from modulating, the ORC should consume the amount of radiant thermal energy the engine is looking to dissipate plus the thermal energy captured in the jacket water from the CCS Condenser 16 before it returns to the reciprocating engine 1, such that the net heat extracted from the jacket water by the ORC plus the amount added back by the Condenser 16 is the amount of energy that they reciprocating engine requires to dissipate so as not to modulate the engines thermostatic valve, which would then modulate the amount of jacket water flow from the engine. By lowering the temperature of the jacket water beyond the normal temperature range via the ORC system 4, some or all of this energy lost from the jacket water will be recovered from heat rejected by the CCS Condenser 16 where the jacket water will pick-up (stack) heat from the treated gas (also referred to as "Stripped Gas") being exhausted from the CCS. By having the flow to the engines radiator controlled by the Control Module 12, if the jacket water it too hot to return to the engine, all or part of the jacket water flow can be diverted to the radiator to achieve the desired jacket water return temperature to the engine. The net result of bypassing the radiator, additional heat energy will not be extracted from the jacket water flow before it is returned to the reciprocating engine 1, and the reciprocating engines thermostatic valve will not modulate and affect the amount of jacket water flow. Simply put: reject thermal energy from reciprocating engine+reject thermal energy from CCS Condenser (via cooling)=amount of thermal energy transferred to the ORC system+thermal losses.

On the other hand, if not enough energy is removed from the jacket water, then the opposite problem will be created and the Control Module 12 will have to make other system flow adjustments (by controlling flow valves) to either pick up less heat from the Condenser 16, reject more heat to the ORC system, or reject heat to the radiator 8 (by operating the radiator in parallel and proportioning jacket water flow to the other components) or divert exhaust heat around the ORC heat exchangers 5, 6 or 15. Subsequent Figures and configurations will show independent thermal loops delivering thermal energy to the ORC, where independent circulating pumps and diverting valves can control the flow rate of the fluid (or gas when dealing with heat of compression energy recovery) to the ORC. Not all cases will be presented and not all control valve locations will be shown in the Figures or configurations, but somebody skilled in the art would understand alternate configurations and where the appropriate locations for control valves would be required in order to achieve returning the reciprocating engines jacket water or auxiliary cooling water to the engine at the targeted temperature that would prevent the engines onboard thermostats from cycling. In the various configurations described herein, the engine's required reject heat should be configured to balance with the amount of energy the ORC and/or the CCS system is extracting from the engines jacket water or auxiliary cooling water.

As in the previous configuration, Control Module 12 may monitor the temperature of the jacket water, thermal fluid flow and gas flows at various places throughout the process and determine whether more cooling or more heating is required to operate the CCS and ORC system stably, and specifically the jacket water prior to returning to the reciprocating engine 1 by modulating control valves 7a, 7b, 7c and/or 13 to vary the flow through the respective piping arrangement so that appropriate jacket water return temperature ranges are maintained. At the same time, Control Module 12 will also make appropriate adjustments to the fan operating in front of liquid and gas flowing heat exchangers, and specifically the fan in front of the engines radiator 8 section, to the fans associated with the Exhaust Gas Cooler 19 and the Stripped Gas Cooler 23, and adjustments to the equipment within the ORC system 4.

In FIG. 2 the configuration shows the integration of two Radiator Cooled Gas Heat Exchangers (40a and 40b) that are coupled to the engine radiator 8 via Thermal Fluid Conduits 30. The flow to the radiator 8 and the Radiator Cooled Gas Heat Exchangers is controlled by the Control Module 12 which diverts the modulating control valves 7a through 7g to direct flow to and from the various heat exchangers (including the radiator 8). To stop engine jacket water from flowing to the engine radiator the modulating control valves 7a and 7b would adjusted to divert the engine jacket water to flow to the ORC 4 (via heat exchanger Low-ORC 6 heat exchanger). Modulating control valve 7d prevents backflow from the engine radiator 8 when the thermal fluid circulating to the Radiator Cooled Gas Heat Exchangers 40 is active. All of the modulating control valves would be controlled by the Control Module 12 and the controller would divert the engine jacket water around the radiator 8 and divert thermal fluid through the radiator to the Radiator Cooled Gas Heat Exchangers.

Figure 3:
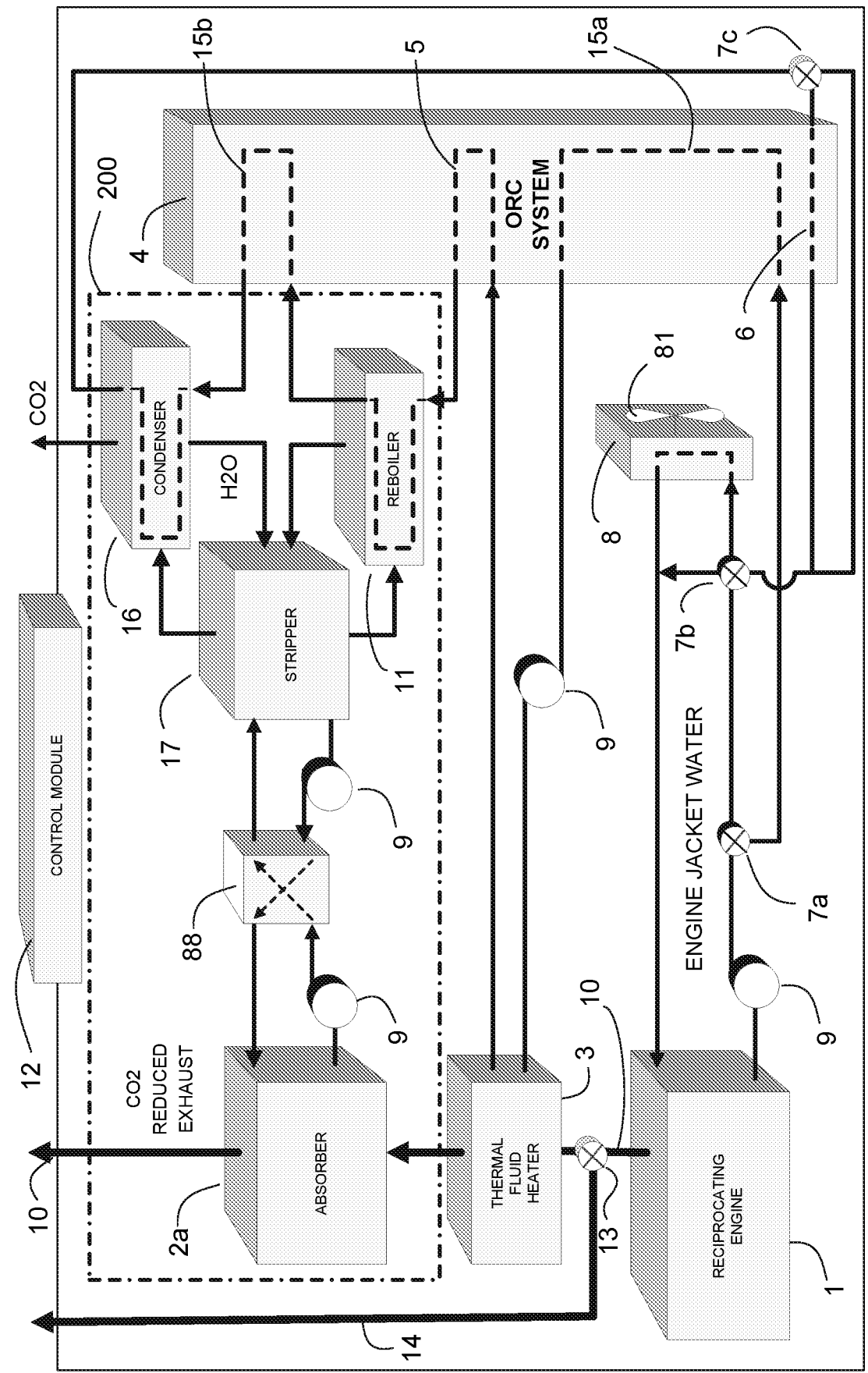
FIG. 3 illustrates the systems of FIG. 1, wherein the reciprocating engines jacket water is circulated from the reciprocating engine to the ORC and to the Condenser without an independent thermal fluid loop, and sending jacket water from the reciprocating engine throughout the components of the entire system under some aspects of the present disclosure.

The example of FIG. 3 is similar to the configuration described in FIGS. 1 and 2, where the reciprocating engines jacket water is circulated from the reciprocating engine 1 to the ORC 4 and to the Condenser 16, however the configuration presented in FIG. 3 differs by eliminating the independent thermal fluid loop (of recovering heat from the engines exhaust) described in FIGS. 1 and 2, and directly sending the jacket water from the reciprocating engine 1 through the ORC 4 (via heat exchanger 15a), through the exhaust Thermal Fluid Heater 3, back through the ORC (via heat exchanger 5), through the Reboiler 11, back to the ORC 4 (via heat exchanger 15b), then through the Condenser 16, and if required, back through the ORC 4 (via heat exchanger 6) or through the radiator 8 (or through both simultaneously) before being returned to the engine 1. Specifically, circulating jacket water from the reciprocating engine to the ORC system 4 (Mid-ORC 15a heat exchanger), then to the TFH 3 to pick up more heat before sending the jacket water to the ORC system 4 again (High-ORC 5), then sending the jacket water to the Reboiler 11 (to add heat to the Stripper 17 to facilitate separation of CO2/H2S from the solvent), then back to the ORC 4 (Mid-ORC 15b heat exchanger), then to the Condenser 16 (to provide cooling to the CO2/H2O stream being exhausted from the Stripper 17 vessel) before returning and proportioning all or some of the jacket water flow to the ORC 4 (Low-ORC 6 heat exchanger), the engine radiator 8 before being remerged back to the engine 1. The thermal fluid used in this configuration may typically be comprised of a water/glycol mixture. Similar to the previous section, the Control Module will be monitoring temperatures along the flow paths to determine where the control valves 7 need to divert flow in order to have the jacket water return to the engine 1 at the desired temperature (at full flow rate).

Figure 4:
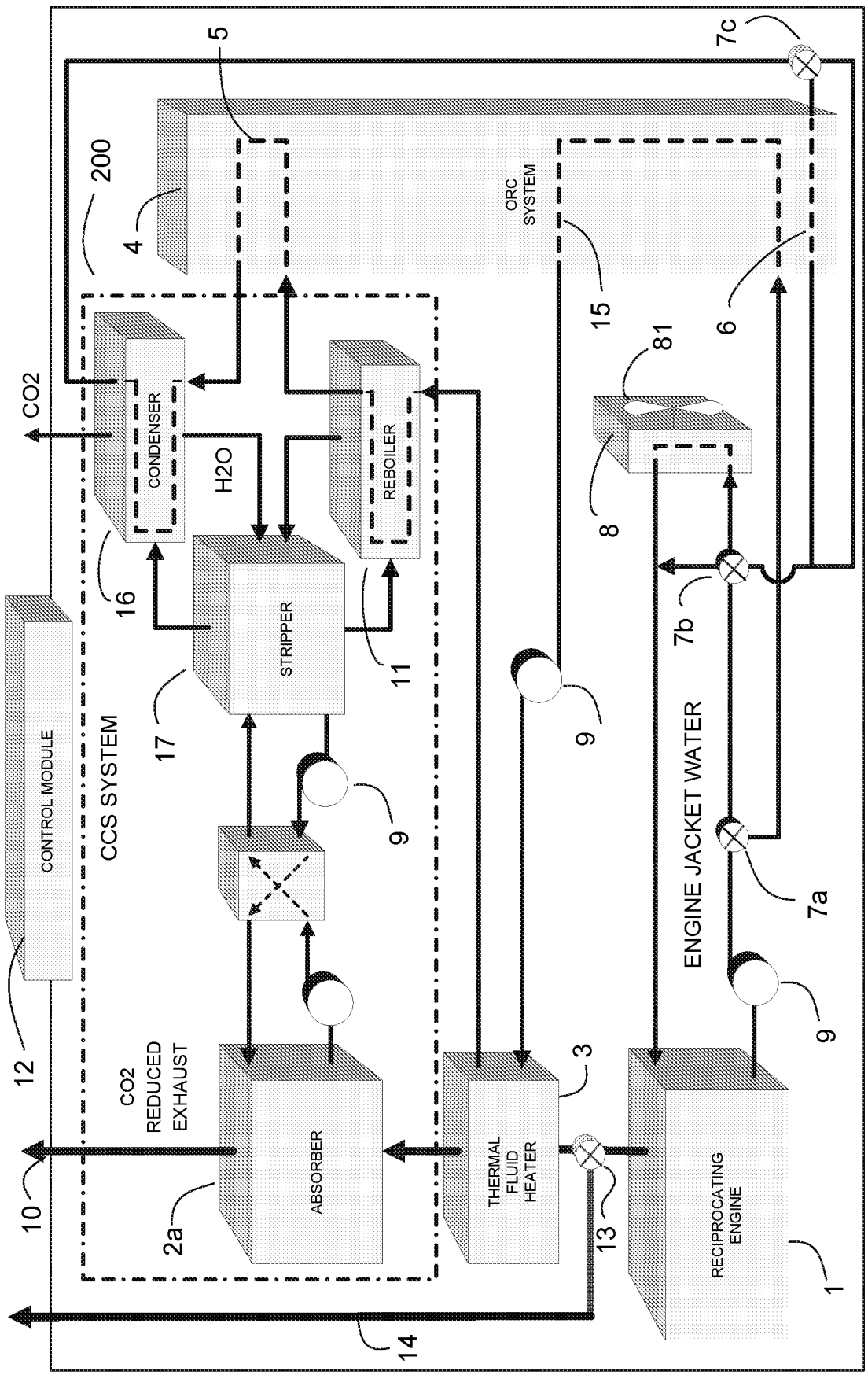
FIG. 4 illustrates the system of FIG. 3, with the difference of three heat exchangers being used in the ORC instead of four under some aspects of the present disclosure.

The embodiments of FIGS. 1 and 2 did not combine the engine exhaust heat (shown to be transferred to the TFH 3) with the jacket water. In FIGS. 3 and 4 the engine jacket water is circulated throughout the ORC 4 and the CCS 200 and the engine exhaust via thermal fluid heater 3. Therefore, the system will add thermal energy to the engine jacket water and extract thermal energy from the engine jacket water along its journey through the system, both starting at the engine and returning to the engine. With the radiator 8 configured in parallel to the waste heat recovery equipment, once the thermal energy from the jacket water is removed by the ORC system 4 and the Reboiler 11, and thermal energy is added to the jacket water by the reciprocating engines exhaust and radiant heat and the Condenser 16, the jacket water is returned to the reciprocating engine 1 to repeat the process. If the radiator 8 is configured in series with the waste heat recovery equipment, then the same path is followed as with the radiator in parallel with the exception that all (or part flow when split by a control valve) is returned to the reciprocating engine 1 to repeat the process. In addition to diverting the jacket water flow around (bypass) the radiator, if diverting through the radiator, its fan 81 can be controlled to trim heat rejection through the radiator 8 when configured in either series or parallel getting the jacket water temperature to the appropriate temperature before returning to the engine to provide adequate cooling for the engine. The jacket water flow rate in combination with the temperature differential (engine jacket water discharge temperature minus the return temperature) of the jacket water will dictate the amount of thermal energy rejected from the engine, which should equal the amount of energy transferred to the ORC 4 and GSS 201 or CSS 200.

As previously described, the engines radiator 8 can be configured to be bypassed, or operated in parallel or in series or in combination of partial series and partial parallel and partial bypass with the ability to split flow via control valves 7 with the ORC 4, CCS 200 and engine 1 (including radiator 8), described such that the Control Module 12 can monitor the temperature of the jacket water returning to the reciprocating engine 1 and control jacket water flow to either the waste heat recovery system, the CCS system, or to the engines radiator or to a combination of the various systems, via control valves 7a, 7b and 7c. In some examples, flow control and diverting valves can be placed in between components that could then divert all, some or none of the jacket water flow to that component, which would then provide the system the appropriate flows to maintain a stable and full jacket water flow through the reciprocating engine. While not explicitly shown in FIG. 1 through FIG. 4, the aforementioned diversion techniques including the redirected flow of the engine jacket water cooling fluid may also be applied as well in the system to the engine auxiliary cooling (for turbo and lubricating oil cooling) water system, and to other thermal fluids and gases in the system. These techniques are also applicable to all FIG.'s and configurations described herein.

If enough energy from the engines jacket water was not removed by the ORC system 4 prior to return back to the reciprocating engine 1, the engines radiator 8 may be configured in parallel to the above described system in some illustrative embodiments thereby allowing the radiator 8 to remove additional thermal energy from the jacket water such that the two systems can operate in parallel. If controlling the return temperature of the jacket water and flow rate to the engine is proving difficult in this arrangement, then operating it in series with control of the cooling fan for the radiator 8 may prove more effective, however the surface area of the radiator heat exchanger may extract more energy than desired. Subsequent figures and configurations show independent thermal loops delivering thermal energy to the ORC, where independent circulating pumps and diverting valves can control the flow rate of the fluid (or gas when dealing with combustion exhaust energy and heat of compression energy recovery) to the ORC, and thus may prove more effective to stable operation.

As in the previous configuration, Control Module 12 may monitor the temperature of the jacket water returning to the reciprocating engine 1 and then modulate flow by various heat diverting or heat dissipating control modes, including diverting heat away from the heat recovery equipment such as diverting exhaust gases around the TFH 3 by controlling valve 13 to divert the exhaust gas into engine exhaust pipe 14 to divert exhaust flow around the equipment in bypass piping. Generally speaking, the hierarchy in the control system should be first to optimize the operation of the combustion device (in this case the reciprocating engine) because it is the inherent driver of the system and the ORC and the CCS are add-ons to make the primary driver more efficient. It is also the primary source of thermal energy for either the ORC 4 or the CCS 200, because without the combustion device (reciprocating engine) running there will not be thermal sources for the ORC 4 or the CCS 200. The Control Module 12 may use heat diversion around any of the ORC 4 (High-ORC 5, Mid-ORC 15, or Low-ORC 6) heat exchangers, or engine jacket water flow to the CCS 200, or engine jacket water to the radiator 8 such that the return temperature, in combination with the flow rate, of the jacket is in the appropriate range to achieve an energy balance (where the main objective is to achieve engine reject heat required to keep the engine operating at the desired load and using that rejected energy to its fullest value). The Control Module 12 operating algorithm may be programmed to calculate the overall carbon capture from the CCS 200 (or in the case of H2S recovered from the GSS 200), and the ORC system 4 so that the appropriate diversions are applied.

For the Reboiler 11, supplementary firing may be required to add thermal energy that is required beyond what the thermal fluid or the jacket water can provide to it to keep the Stripper 17 functioning properly.

Figure 8:
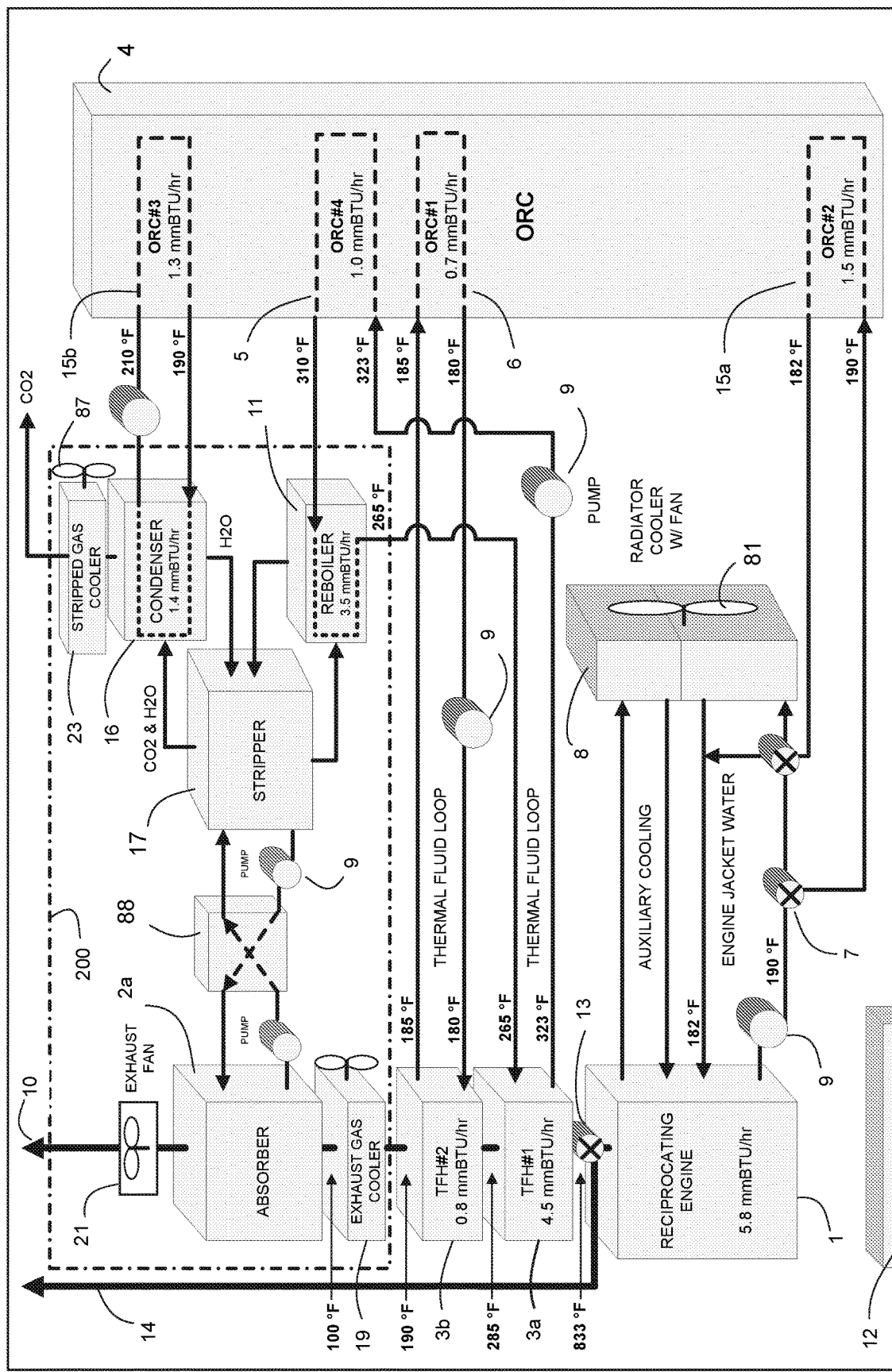
FIG. 8 illustrates a system for using supplementary cooling to add cooling capacity that is required to condense CO2 exhaust stream from CCS Stripper in order to achieve full condensation of H2O from the Stripper or to provide cooling to get the CO2 gas temperature to the desired temperature before sending it to further into the system under some aspects of the present disclosure.

For the Condenser 16, supplementary cooling may be required to add cooling capacity that is required to condense the CO2/H2O exhaust stream from CCS (and H2S/CO2 from the GSS) Stripper 17 in order to achieve full condensation of $H_2O$ from the Stripper to keep it functioning properly, or adequate cooling to get the CO2 gas temperature to the desired temperature before sending it to the next step in moving the CO2 (such as to a gas compressor, a pipeline, or CO2 process). FIG. 8 shows examples using CO2 Stripped Gas Cooler 23 and engine Exhaust Gas Cooler 19.

Various illustrative configurations for FIG. 3 show the first set of configurations referring to the:

engine jacket water flow path

+ the engine exhaust flow path:

Configuration 1:

1→9→7a→7b→[8]/[bypass 8]→1

(flow through 8 and bypassed around 8 can be proportioned)

+

1→13→3→2a→10

Configuration 2:
   1→9→7a→[7b]/[15a→9→3→5→11→15b→16→7c→
      (6/bypass 6)→7b]—[8/bypass 8]→1
   +
   1→13→3→2a→10
Configuration 3:
   1→9→7a→15a→9→3→5→11→15b→16→7c→6→
      7b→[8/bypass 8]→1
   +
   1→13→3→2a→10
Configuration 4:
   1→9→7a→15a→9→3→5→11→15b→16→7c→6→
      7b→8→1
   +
   1→13→3→2a→10
Configuration 5:
   1→9→7a→15a→9→3→5→11→15b→16→7c→6→
      7b→bypass 8→1
   +
   1→13→3→2a→10
Configuration 6:
   1→9→7a→15a→9→3→5→11→15b→16→7c→bypass
      6→7b→[8/bypass 8]→1
   +
   1→13→3→2a→10
Configuration 7:
   1→9→7a→15a→9→3→5→11→15b→16→7c→bypass
      6→7b→8→1
   +
   1→13→3→2a→10
Configuration 8:
   1→9→7a→15a→9→3→5→11→15b→16→7c→bypass
      6→7b→bypass 8→1
   +
   1→13→3→2a→10
Configuration 9:
   1→9→7a→7b→[8/bypass 8]→1
   (flow through 8 and bypassed around 8 can be proportioned)
   +
   1→13→[14]/[3→2a→10]
   (potential split between path 14 & 3)
Configuration 10:
   1→9→7a→[7b]/[15a→9→3→5→11→15b→16→7c→
      (6/bypass 6)→7b]—[8/bypass 8]→1
   +
   1→13→[14]/[3→2a→10]
   (potential split between path 14 & 3)
Configuration 11:
   1→9→7a→15a→9→3→5→11→15b→16→7c→6→
      7b→[8/bypass 8]→1
   +
   1→13→[14]/[3→2a→10]
   (potential split between path 14 & 3)
Configuration 12:
   1→9→7a→15a→9→3→5→11→15b→16→7c→6→
      7b→8→1
   +
   1→13→[14]/[3→2a→10]
   (potential split between path 14 & 3)
Configuration 13:
   1→9→7a→15a→9→3→5→11→15b→16→7c→6→
      7b→bypass 8→1
   +
   1→13→[14]/[3→2a→10]
   (potential split between path 14 & 3)
Configuration 14:
   1→9→7a→15a→9→3→5→11→15b→16→7c→bypass
      6→7b→[8/bypass 8]→1
   +
   1→13→[14]/[3→2a→10]
   (potential split between path 14 & 3)
Configuration 15:
   1→9→7a→15a→9→3→5→11→15b→16→7c→bypass
      6→7b→8→1
   +
   1→13→[14]/[3→2a→10]
   (potential split between path 14 & 3)
Configuration 16:
   1→9→7a→15a→9→3→5→11→15b→16→7c→bypass
      6→7b→bypass 8→1
   +
   1→13→[14]/[3→2a→10]
   (potential split between path 14 & 3→2a→10)

FIG. 4 is similar to the embodiment of FIG. 3, where the primary difference is FIG. 3 configurations contemplates 4 heat exchangers in ORC 4 whereas FIG. 4 configurations only contemplate 3 heat exchangers in ORC 4. Because of the requirement in FIG. 3 to show 4 heat exchangers in the ORC, it should be noted that in FIG. 3 heat exchanger Mid-ORC 15 was used twice and therefore was given the terminology Mid-ORC 15a and Mid-ORC 15b. Meaning, the primary difference between FIGS. 3 and 4 is that in FIG. 4 the heat picked up from the Thermal Fluid Heater is sent directly to the Reboiler 11, whereas in FIG. 3 it is diverted from the thermal fluid heater 3 to the ORC High-ORC 5, then sent to the Reboiler 11. In FIG. 4 the flow path is from the thermal fluid heater 3 directly to the Reboiler 11, then to the ORC High-ORC 5, then to the Condenser 16, then to Low-ORC 6 or the engine radiator or directly to the engine 1.

FIG. 4 also differs from that described in FIG. 3 in that the heat gathering and dissipation is rearranged in a different order and the ORC system 4 uses three heat exchangers (5, 6, and 15) in place of four heat exchangers (5, 6, 15a, 15b). Also in FIGS. 3 and 4, thermal energy from the reciprocating engine jacket water is initially transferred to the ORC system 4 at heat exchanger 15, where the jacket water is cooled, and is then pumped to THF 3 to pick up thermal energy from the reciprocating engines exhaust but in FIG. 4 the heat energy picked up from the exhaust is transferred to the engine jacket water which then looks to dispense thermal energy into the heat exchanger in the Reboiler 11 to meet the requirements of the Reboiler. From here, the jacket water takes the path of transferring heat to further dispense more thermal energy in the ORC 4 (at High-ORC 5), then picking up heat from Condenser 16 before being sent to be cooled at either ORC's Low-ORC 6 or the engine radiator 8 (if required), prior to being returned to reciprocating engine 1.

In the configurations outlined below, the heat exchangers (High-ORC 5, or Mid-ORC 15, or Low-ORC 6) in ORC system 4 may be configured to extract more heat from the jacket water than would otherwise be removed by an ORC using an engines jacket water as a heat source because other thermal sources (beyond the reciprocating engines radiant reject heat) can contribute thermal energy into the engine jacket water or auxiliary cooling water—similar to that described in the configuration associated with FIGS. 1 and 2. That is, the radiant thermal energy rejected from the reciprocating engine 1 into the jacket water (or the auxiliary cooling water) is what is typically designed into thermal transfer from a reciprocating engine to an engines radiator, and in ORC based heat recovery systems, to an ORC system.

In this case, the amount of energy extracted from the jacket water may exceed the amount of energy expected to be dissipated in the engine radiator described above because the additional heat extracted can be added back to the jacket water from the thermal fluid heater 3 and the Condenser 16 such that the amount of energy extracted by the ORC system 4 can be added back to the jacket water to return it to the engine at the appropriate temperature (with the appropriate amount of cooling applied to it) such that the engines thermostatic valves do not adjust and remain wide open. This alternating of heat-in, heat-out, heat-in, etc. can cause return temperatures to the engine that are too hot or too cold, and therefore use of the radiator 8 in the final stages of return to the engine assist the Control Module 12 in maintaining a stable operation of the system, if the return temperature is too high. If the return temperature is too low, then appropriately positioned control valves will direct flow away from the heat sinks (ORC 4 heat exchangers) such that the engine jacket water (or auxiliary cooling water) is not over cooled prior to returning to the engine. The net result is the heat energy will be added back to the jacket water flow before it is returned to the reciprocating engine 1, and the reciprocating engines thermostatic valve will not modulate and affect the amount of jacket water flow. Simply put, for stable operation of the ORC and CCS systems, the target for the Control Module 12 is: reject thermal energy from reciprocating engines radiant energy+recovered exhaust energy from the Thermal Fluid Heater 3+reject thermal energy from CCS Condenser (via cooling)=amount of thermal energy transferred to the ORC system+the Reboiler 11+engine radiator. The role of the Control Module 12 will be to determine the temperatures returning to the engine are at the appropriate temperature and adjust control valves to direct (a variety of) flow(s) within the system to get the engine jacket water (or auxiliary cooling water) returning to the engine at the targeted temperature.

Because the net heat rejection from the reciprocating engine is to be no different than when operating exclusively with a radiator only (without heat recovery, the ORC 4 or the CCS 200), however when combining it with controlled heat transfer to an ORC system 4 and/or with CCS 200, the overall energy efficiency will be increased because the system components are using more of the available heat to move it to where it can be utilized. Meaning the energy provided to operate the CCS 200 is recovered from heat sources that would otherwise have been vented to atmosphere, and the energy transfer to the ORC 4 is increased by recovering the reject heat from the Condenser 16 (even though the rejected heat from the engine is unchanged), thereby increasing the power generated by the ORC, thereby increasing the overall efficiency of the entire system.

In the case where not enough thermal energy is removed from the jacket water or too much thermal energy is added to the engines jacket water (e.g., from the reciprocating engine 1, the CCS Condenser 16, or the thermal fluid heater 3) prior to returning to the engine 1, the Control Module 12 can change control valves 7 position such that the engines existing radiator 8 be configured to be bypassed, or operated in parallel to the heat recovery system and can therefore be used to cool the jacket water by splitting the flow between the radiator 8 and the waste heat recovery system (CCS 200 and ORC 4). Similar to what is described in the previous figures/embodiments, the radiator 8 may be configured to be bypassed all together, or operated either in series or in parallel to the heat recovery equipment. The Control Module 12 can use this configuration to adjust the returning jacket waters (and auxiliary cooling waters) temperature to balance the optimal power generation from the ORC 4 and the stripped gas compound (CO2) production from the CCS 200 to optimize the overall efficiency of the system, with the ultimate target to remove more CO2 per energy unit input into the reciprocating engine. It may be that generating more power from the ORC may have more value to the equipment owner than to recover the stripped gas compound from the CCS 200, and therefore that will be programmed into the Control Module 12 to have the system perform in the manner most beneficial to the system operator. The Control Module 12 has multiple control elements and control valves 7 (7*a*, 7*b* and 7*c*) to activate to achieve the desired jacket water return temperature. As previously mentioned, not all control valves are shown in the Figures or configurations and therefore somebody skilled in the art would understand where the appropriate locations for control valves would be required in order to achieve returning the reciprocating engines jacket water or auxiliary cooling water to the engine at the targeted temperature that would prevent the engines onboard thermostats from cycling.

Various illustrative configurations for FIG. 4 show the first set of configurations referring to the:

engine jacket water flow path

+ the engine exhaust flow path:

Possible Engine Jacket Water Flow Paths:

1→9→7*a*→7*b*→8→1 or

1→9→7*a*→7*b*→[8]/[bypass 8]→1 or

1→9→7*a*→15→9→3→11→5→16→7*c*→bypass 6→7*b*→bypass 8→1 or

1→9→7*a*→15→9→3→11→5→16→7*c*→bypass 6→7*b*→8→1 or

1→9→7*a*→15→9→3→11→5→16→7*c*→bypass 6→7*b*→[8]/[bypass 8]→1 or

1→9→7*a*→15→9→3→11→5→16→7*c*→6→7*b*→bypass 8→1 or

1→9→7*a*→15→9→3→11→5→16→7*c*→6→7*b*→8→1 or

1→9→7*a*→15→9→3→11→5→16→7*c*→6→7*b*→[8]/[bypass 8]→1

Possible Exhaust Gas Flow Paths:

1→13→3→2*a*→10 or

1→13→14

Some examples of possible combinations and permutations of the various flow paths shown in FIG. 4 are, for example:

Configuration 1:

1→9→7*a*→7*b*→8→1

+

1→13→[14]/[3→2*a*→10] (flow between 14 and 3→2*a*→10 can be proportioned)

Configuration 2:

1→9→7*a*→7*b*→[8]/[bypass 8]→1

+

1→13→[14]/[3→2*a*→10] (flow between 14 and 3→2*a*→10 can be proportioned)

Configuration 3:
 1→9→7a→15→9→3→11→5→16→7c→bypass 6→7b→bypass 8→1
 +
 1→13→[14]/[3→2a→10] (flow between 14 and 3→2a→10 can be proportioned)
Configuration 4:
 1→9→7a→15→9→3→11→5→16→7c→bypass 6→7b→8→1
 +
 1→13→[14]/[3→2a→10] (flow between 14 and 3→2a→10 can be proportioned)
Configuration 5:
 1→9→7a→15→9→3→11→5→16→7c→bypass 6→7b→[8]/[bypass 8]→1
 +
 1→13→[14]/[3→2a→10] (flow between 14 and 3→2a→10 can be proportioned)
Configuration 6:
 1→9→7a→15→9→3→11→5→16→7c→6→7b→ bypass 8→1
 +
 1→13→[14]/[3→2a→10] (flow between 14 and 3→2a→10 can be proportioned)
Configuration 7:
 1→9→7a→15→9→3→11→5→16→7c→6→7b→8→1
 +
 1→13→[14]/[3→2a→10] (flow between 14 and 3→2a→10 can be proportioned)
Configuration 8:
 1→9→7a→15→9→3→11→5→16→7c→6→7b→[8]/ [bypass 8]→1
 +
 1→13→[14]/[3→2a→10] (flow between 14 and 3→2a→10 can be proportioned)

The system control applied by Control Module 12 may be similar to the previously described systems such that it will be predicated on returning the jacket water to the reciprocating engine 1 with the appropriate temperature with the appropriate amount of energy extracted such that the engines thermostatic valves remain wide open without causing an overheat situation. The amount of energy extracted from the jacket water will be based on the return temperature of the jacket water and the jacket water flow rate. The control option available to the control module is to divert flow to the various components such that the returning jacket water temperature is at the desired temperature when paired to the flow rate of the engine, which allows the control module to calculate the dissipated amount of energy from the jacket water from the time it discharges from the engine and when it returns to the engine. As an example, the remainder of the system may operate to maximize power generation or maximize the net CO2 recovery (gross CO2 recovery from the combustion device less the utility parasitic loads of the system, where the parasitic loads have a carbon footprint), which in turn will generate the lowest energy-in divided by CO2 recovered ratio (or alternatively the highest weight of CO2 recovered per unit of energy consumed).

One consideration of the described system that increases ORC power generation when compared to a configuration without a CCS system, is in the system with the CCS system the ability to cool the engine exhaust beyond normal heat recovery conditions presents itself. Generally, good heat recovery design practice is to leave enough thermal energy in the exhaust stream in order to have the exhaust discharge from the exhaust system (in the 250 to 350 degrees Fahrenheit range) in order to not condense the exhaust gases in the exhaust system and form condensates. These condensates can form acids, which would cause corrosion to the exhaust system and would require containment, collection and disposal, as well as plume dispersion issues. In the case where ORC is combined with a CCS system, the exhaust gases need to be cooled to the point where condensates do form so that the exhaust can be directly piped into the CCS Absorber/Adsorber. The target temperatures for many of the CCS systems is to have the exhaust stream in the 80 degrees Fahrenheit to 120 degrees Fahrenheit range. This lower exhaust temperature would allow more thermal energy recovery from the exhaust to then be used in the ORC system 4 and/or in the Waste Heat Chillers 28 and/or in the CCS 200. Accordingly, because more heat can be recovered by condensing the exhaust gas stream in preparation to flow the exhaust gas for treatment in the CCS Absorber/Adsorber, more energy extraction from the exhaust stream can be justified than without the CCS 200 system. 'Over-cooling' the exhaust gas is possible without a CCS system, but the increased material costs of the exhaust piping, the collection and handling of the condensate and plume dispersion issues often do not justify the operational issues and increased costs for the incremental heat recovery, however with the implementation of a cost on carbon, the economics of doing so improve. In other words, the challenge of extracting too much energy out of the engine exhaust stream, by lowering the discharge exhaust temperature (below the dew point) is eliminated, because the CCS Absorber 2a or 2b (and/or Adsorber 2d in Adsorption-based systems) can now accept the exhaust gas directly. Prior to configuring the Absorber/Adsorber into the system, a risk is that exhaust gases would start condensing in the exhaust piping system which would lead to those condensates becoming acidic and corrode equipment. This would also lead to plume dispersion issues at the exhaust systems discharge. When a CCS 200 system is coupled to the engine with an ORC 4 system and Waste Heat Chiller however, the exhaust gas can be lowered beyond the normal heat recovery range, and also, at times, if desired, transfer heat to the engine jacket water or auxiliary cooling water to be used in the ORC 4 (such that heat still transfers to the various heat exchangers in the ORC system 4) or the Waste Heat Chillers.

The control of the exhaust flow can also be controlled by the Control Module 12, however if bypassing the Thermal Fluid Heater 3 and the Absorber 2a, exhaust will be vented to atmosphere (without having the CO2 removed) and therefore caution should be applied to this practice, however with piping reconfigurations of installing a bypass around Thermal Fluid Heater 3 the exhaust can be diverted to Absorber 2a, however the load on the Exhaust Cooler 19 and Exhaust Cooler Fan 18 will be increased.

Figure 5:
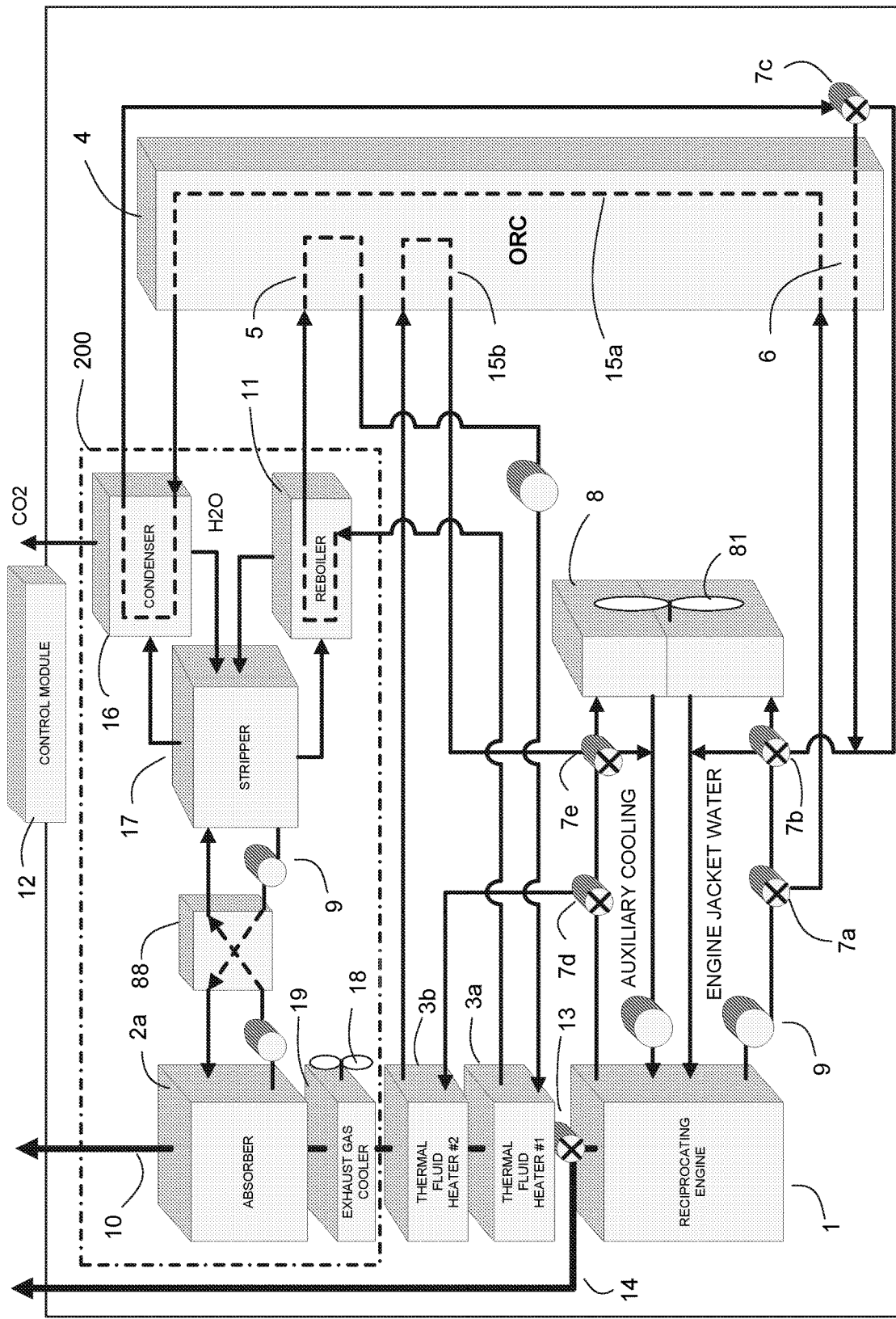
FIG. 5 illustrates a system using multiple thermal fluid heaters to reduce the parasitic load of the CCS system, and wherein two heat exchangers are configured in the exhaust recovery stream under some aspects of the present disclosure.

Consideration for recovering exhaust gas temperature may also be applied to the examples of FIG. 1 and FIG. 2, as well as to all configurations described in this document. Specifically, the exhaust can be cooled by recovering that energy in the thermal fluid heater(s) TFH 3, down to the temperature where the heat is only useable in the ORC 4 or in a Waste Heat Chiller 28. FIG. 5 shows multiple TFH's (3a and 3b), which then reduces to load duty on the Exhaust Gas Cooler Fans 18 associated with the engine Exhaust Gas Cooler 19, which reduce the exhaust gas temperature to direct vent the exhaust gas into the Absorber 2a or 2b, or Adsorber 2d. This reduced cooling duty reduces the parasitic load of the CCS system 200 when operating it compared to operating it without the ORC 4 system. Similarly, the CCS' stripped gas (CO2) exhaust can be cooled in the Condenser 16 down to the temperature where the H2O is condensed out and the CO2 can be discharged from the CCS system, which then reduces to load duty on the Stripped Gas Cooler Fans 87 associated with the CCS CO2 Stripped Gas Cooler 23. This reduces the parasitic load(s) of the CCS system 200 while at the same time increasing the performance from the ORC 4 and Waste Heat Chiller(s), and hence the net carbon recovery, when compared to operating the CCS without the ORC 4 system.

While not explicitly shown in FIG. 1 and FIG. 2, a configuration is contemplated in the present disclosure as shown in FIG. 5 that is similar to FIG. 1, but where two Thermal Fluid Heaters 3 are configured in series with one another. The first Thermal Fluid Heater 3a would recover a higher temperature thermal fluid that would be piped to the Reboiler 11 and/or ORC system 4 (High-ORC 5) such that it provides energy for maintaining the thermal requirements of the CCS absorption-based Stripper 17. The second Thermal Fluid Heater 3b could recover a lower exhaust temperature into a separate thermal fluid (e.g., thermal fluid, engine jacket water or auxiliary engine cooling water) that would then be used in the (not shown in this example, but applicable Waste Heat Chillers 28 or in the) ORC system where the temperature would still be high enough (for e.g., the temperature of the jacket water) in temperature to transfer energy into the ORC 4 (via Low-ORC 6, Mid-ORC 15 or High-ORC 5) depending on where the temperature of the thermal fluid fits into the function of preheating, evaporating or superheating. Meaning, the thermal energy in the thermal fluid circulating from Thermal Fluid Heater 3b could be combined or inserted with the other thermal energy from the engine jacket water or the engine auxiliary cooling water or the CCS Condenser 16, such that the fluids would together optimize the performance of the overall system. This use of Thermal Fluid Heaters 3a and 3b in combination with engine jacket water or auxiliary cooling water allows the other wasted thermal energy from the reciprocating engines exhaust (the balance of the heat recovery system) to be used for either pre-heating, evaporating and/or superheating the propellant in the ORC system 4 or in a Waste Heat Chiller 28. In other words, this configuration may allow the reciprocating engine 1 to operate independently (and use its internal thermostatic valve to vary the jacket water flow rate) as well as permit the ORC system 4 or the Waste Heat Chiller 28 to operate independently.

Additionally, the ORC system may be configured under the present disclosure to have flexibility in the amount of energy it can recover, because the ORC system propellant pump can be controlled to vary the propellant flow through the ORC so that in times when there is less heat available, the propellant pump slows down the flow rate, and when there is more heat, the propellant pump speeds up the propellant flow rate. Therefore, by diverting the various thermal streams to the ORC 4, and varying the propellant flow rate, and then additionally using the jacket cooling function from the radiator 8 and other control valves to divert thermal fluid (including jacket water and auxiliary cooling water) flow, so that the overall system can be controlled to target increases in efficiency.

The examples disclosed herein illustrate advantages of using the Control Module 12 to manage the thermal energy throughout the system, such that the engines radiator 8 may be available to be bypassed, or operated in series or in partial-parallel (by splitting the flow to the radiator 8 and other components simultaneously) to the entire heat recovery system. In addition to using the engine radiator to trim-cool the final temperature of the jacket water before its return to the engine, the Control Module 12 can control the diverting valves 7 throughout the system to divert heat to or from various elements so as to optimize the efficiency of the system. Meaning, when heat is recovered and not consumed in the CCS 200, the Waste Heat Chillers 28 or the ORC 4, the reciprocating engines radiator 8 becomes integral to the heat recovery system and can be bypassed, or used in series or in full or partial-parallel flow, depending on the heat trimming of the jacket water (or auxiliary cooling water) that is required. In some illustrative embodiments, the flow from the reciprocating engine 1 jacket water and/or auxiliary cooling water can be split between the radiator 8 and heat exchanger Low-ORC 6. This split flow will provide heat to the ORC system 4 and cooling the balance of the jacket water from the engine in the radiator, thereby creating a proportioning flow system that can be used for jacket water return temperature control.

In some other illustrative embodiments (as shown in FIGS. 3 through 7, 13 through 15, 22, 24, 25, 29 and 30), the return temperature of the jacket water and/or auxiliary cooling water to the reciprocating engine can be controlled by the Control Module 12 by either flow diversion through the use of control valves 7 or by diverting reciprocating engine exhaust gases using valve 13 into the engine exhaust pipe 14 around the thermal fluid heaters 3, the Waste Heat Chillers 28, and the Absorber 2a such that the circulating thermal fluids will not capture as much heat from the reciprocating engines exhaust, or split the exhaust flow between exhaust pipe 10 (with the two heat recovery elements) and exhaust pipe 14. Although not shown, in place of bypassing the entire exhaust gas flow, diversion piping (with control valves) could be installed around any of the Thermal Fluid Heater 3 heat exchangers in order to: 1) now waste the useable thermal energy in the exhaust system by venting it to atmosphere via bypass pipe 14 and 2) bypass the CCS 200 gas treating system. In addition, the Control Module 12 can also control the cooling fans in front of the various coolers in the system such as the radiator fan 81 associated with the engines radiator 8, the Exhaust Gas Cooler Fan 18 associated with the Exhaust Gas Cooler 19, the Stripped Gas Cooler Fan 87 associated with the Stripped Gas Cooler 23, the Inter-stage Gas Cooler Fans 93 associated with gas compressor Inter-stage Gas Cooler 92, the ORC condenser fans (not shown) and other adjustments to the equipment within the ORC system 4.

The embodiment of FIG. 4 is similar to that described in FIG. 3 above, but differs in that the engines jacket water could be sent through the ORC system 4 to be cooled three times, in place of four times as shown in FIG. 3. It also shows the addition of a circulation pump (between the thermal fluid heater 3 and the ORC 4) as the engines jacket water pump is only suitable to limited back pressure and a booster pump would more than likely be required. Similarly, the engine exhaust back pressure can be a limiting factor to the amount of equipment placed in the exhaust system and therefore an Exhaust Blower Fan 21 may be required to assist the exhaust gases to pass through any additional heat exchangers or equipment in order to prevent excessive back pressure on the reciprocating engine or other combustion devices, as shown in FIG. 8 through FIG. 12, FIG. 15 through FIG. 20, FIG. 22 through FIG. 28, and FIG. 31. If a figure does not show an Exhaust Blower Fan 21, it is not because it is not needed and may have been omitted from the figure for convenience.

One of the sub-objectives influencing the Control Module 12 algorithms or self-learning (artificial intelligence) software should be to cool the exhaust to the desired target temperature of the engine exhaust entering the Absorber 2a or Adsorber 2d, as the case may be, which can increase the temperature delta across the Thermal Fluid Heater(s) 3. Another factor to be programmed into the control algorithm is the operation of the ORC system 4. That is, fluid temperature and flow should be compared to the modeled/targeted results that will achieve the targeted performance of the ORC system 4 versus the targeted performance of the CO2 recovery extraction in the CCS system 200, all the while ensuring that the return temperature of the reciprocating engine jacket water (and auxiliary cooling water, if applicable) has extracted the appropriate thermal energy from the engine such that the thermostatic valve inherent to the engine does not modulate unnecessarily. The algorithm will need to compare the expected net carbon recovery while also modulating flow in the system to extract the correct amount of thermal energy from the reciprocating engines jacket water to achieve the appropriate return temperature of the jacket water to the reciprocating engine 1 and lower the engine exhaust temperature to the point where the Absorber 2a is also functional (whether that all happens in the thermal fluid heater 3, or bypassing some exhaust to atmosphere, or with supplementary cooling from a heat exchanger or air cooled exchanger). The use of the thermal energy should be managed by the control algorithms in the Control Module 12 to maximize the economic value of the amount of stripped gas (CO2) recovered versus the value of the shaft horsepower (that can be converted to electricity) generated by the ORC 4, and the thermal energy being recovered and dispersed throughout the system should be adjusted to maximize the value to the system owner. Meaning, the system should divert the thermal energy to where the most net economic gain can be had from the system, evaluating based on the value created from the ORC 4 and the value created by the CCS 200.

The piping arrangement shown in FIGS. 1 through 4 allows for cooling in the existing radiator either before returning to the engine so that the system does not affect the engines internal thermostatic (temperature dependent position) valve or in extreme conditions, overheat and shut down the engine or modulate flow to increase the jacket waters temperature by having a longer residence time in the engine. The same applies to the engines auxiliary cooling water (not shown in FIG. 1 through 4).

Another embodiment may be realized where the configuration is similar to the previous figures but narrows to a specific application of a reciprocating engine driving a natural gas compressor (known in the industry as a "compressor package"). In this arrangement, the compressor package may comprise an aerial cooler which includes cooling sections for the engines radiator for the engine jacket water along with cooling sections for each stage of gas compression and cooling sections for the engines auxiliary cooling system to cool the engine turbo or the engine and/or compressor lube oil (in some engine configurations, the auxiliary cooling is blended into the radiator fluid). These aerial coolers are typically equipped with a single large diameter cooling fan powered by the reciprocating engine 1. As described in U.S. Pat. No. 8,528,333, titled "Controlled Organic Rankine Cycle System for Recovery and Conversion of Thermal Energy", U.S. patent application Ser. No. 12/554,853, titled "Supplementary Thermal Energy Transfer in Thermal Energy Recovery Systems" and U.S. patent application Ser. No. 13/961,341, titled "Controlled Organic Rankine Cycle System for Recovery and Conversion of Thermal Energy", each of which is incorporated by reference in their entireties herein, the concept of off-loading the fan load from the reciprocating engine to be driven by an alternate power source (electrical with VFD) still applies.

Further, each stage of gas compression requires cooling whether the jacket water in the radiator section requires cooling or not (because the jacket water may be getting cooled by an ORC system connected to the gas compressor). Therefore, because this fan will be operating whether there is engine jacket water flowing through the radiator or not, the opportunity exists to make use of this cooling capacity to the thermal fluid used in the cooling of the CCS Condenser 16 at no parasitic energy consumption (fan already being power for gas cooling) and at no additional capital cost (radiator section of the aerial cooler already exists to cool the engine during normal operation when no ORC system connected or in parallel to an ORC system). Although this configuration is not shown, it would be an economic use of existing cooling equipment at no additive equipment cost of parasitic load to the system. Meaning, additional cooling capacity is available within the aerial cooler's radiator and auxiliary cooling water sections that can be applied to assist cooling any number of components in the system (ORC 4 propellant, Thermal Fluid Heater 3, Condenser 16, Exhaust Gas Cooler 19, Stripped Gas Cooler 23, Recycle Heat Exchanger 24, Recovery Heat Exchanger 25, Inter-stage Gas Cooler 92).

Further, the heat of compression, in addition to the reciprocating engine, could be another heat source in the above-described systems. Recovering this thermal energy and applying/using it in the process to further improve the operating performance of the ORC 4 and/or the CCS 200 and/or the gas compression system. This additional heat recovery (cooling of the compressed gas) will improve overall system performance because the parasitic load of operating the existing gas cooling fan(s) in front of the aerial cooler section that has compressed gas flowing through it will be reduced or eliminated. If there is a single cooling fan 81 in front of the aerial cooler it will already be running regardless of what is passing through the cooler sections and therefore there will be no additional parasitic load/cost to the additional cooling capacity, however, should the ORC be recovering all of the aerial cooler's duty (e.g., engine jacket water, engine auxiliary cooling water and heat of compression) then the aerial cooler fan 81 can be turned off, or at a minimum decoupled if driven by the engine, or if driven by an electric motor with a VFD, slowed down to reduce the parasitic load of that fan 81. As described above, this configuration may be less likely and therefore installation of independent cooling fans (in front of the fin-tube sections of each of the engine jacket water, engine auxiliary cooling water and each inter stage of compressed gas cooling), with independent VFD (variable frequency drive) control, for the various sections of the aerial coolers duties may be the most economical and operationally flexible solutions.

In the foregoing and the following detailed descriptions, it can be seen that various features are grouped together in individual embodiments for the purpose of brevity in the disclosure. This method of disclosure is not to be interpreted as reflecting an intention that the subsequently claimed embodiments require more features than are expressly recited in each claim.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, any disclosure is not intended to be limited to the examples, figures and designs described herein, but rather are to be accorded the widest scope consistent with the principles and novel features disclosed herein.

The embodiment of FIG. 5 illustrates an example of a more complex configuration, where two heat exchangers are configured in the exhaust recovery stream. The first heat exchanger is Thermal Fluid Heater #1 (TFH #1) 3a and it is designed to recover exhaust temperatures of approximately 1000° F. (+/−200° F.) and heat a thermal fluid (preferably a thermal oil) from approximately 265° F. to 500° F., the second heat exchanger is the Thermal Fluid Heater #2 (TFH #2) 3b which is designed to accept the engine exhaust from THF #1 at a lower temperature (because heat was transferred to the thermal fluid in TFH #1) from approximately 285° F. to 190° F. and it can be used to stack heat into either the engines auxiliary cooling fluid (typically used to cool motor oil and/turbos) or the engines jacket water from typically 190° F. for engine jacket water, and typically 145° F. to 175° F. for engine auxiliary cooling water, up to approximately 190-210° F., or a separate and independent thermal fluid (independent from the engine jacket water, the engine auxiliary cooling water or the thermal fluid from TFH #1). Also, an independent thermal fluid loop could be utilized in TFH #2 such that it would create its own circulation loop, transferring the thermal energy recovered from the exhaust gas to the ORC 4. A third heat exchanger in this example may be configured as a cooler (e.g., air cooled or liquid cooled) and it would be used to further cool the exhaust stream to approximately 85-125° F. so that it can be direct piped into the Absorber 2a, where after the CO2 is removed from the exhaust stream, it is then vented to atmosphere.

In some examples, the exhaust gases can be bypassed around the above-described heat exchangers via control valve 13. Exhaust control bypass valve 13 is implied to all configurations whether shown or not on the Figures.

FIGS. 3, 5, 6, 7, 8 and 12 illustrate configurations having four heat exchangers in the ORC system 4. Those heat exchangers are shown in the examples as HIGH-ORC 5, MID-ORC 15a, MID-ORC 15b, and LOW-ORC 6. HIGH-ORC 5 heat exchanger can receive its thermal energy from TFH #1 (3a) which is recovering engine exhaust thermal energy or from the Condenser 16. MID-ORC 15a heat exchanger can receive its thermal energy from the engines jacket water or engines auxiliary cooling water thermal energy or from Condenser 16. MID-ORC 15b heat exchanger receives its thermal energy from the engines auxiliary cooling water or the engines jacket water or TFH #2 which also captures thermal energy from the engines exhaust system via heat exchanger thermal fluid heater #2 (3b). LOW-ORC 6 heat exchanger receives its thermal energy from a combination of engine radiant heat from the engines discharge jacket water or auxiliary cooling water. In some examples, the engine jacket water or engine auxiliary cooling water will have to deduct the thermal energy dissipated into the ORC 4 MID-ORC heat exchanger and then add back the thermal energy picked up from the Condenser 16. It should be noted that the heat exchangers in the ORC system 4 do not necessarily have to operate independently, and the thermal energy being delivered to the ORC 4 to the various heat exchangers (HIGH-ORC 5, MID-ORC 15a, MID-ORC 15b, and LOW-ORC 6) can be comingled/combined such that the thermal fluid they are receiving from the rest of the process can work in unison in a single (or multiple) heat exchangers so long as those incoming streams of thermal energy perform the same function (preheater, evaporator or superheater). Meaning, all or none of the thermal fluids could perform the preheating function, the evaporating function or the superheating function, or they could all perform any combination of function, herein.

The various loops in FIG. 5 may be configured as follows, under some examples:

In a CCS 200 system, engine jacket water may be discharged from the engine at approximately 190° F. (to 210° F.) and from there, the jacket water can be cooled in the radiator and returned to the engine at approximately 180° F. The radiator is typically sized to dissipate a required amount of thermal energy the engine manufacturer requires, and it is typically based on the engine jacket water or auxiliary cooling water flow rate specified for the engine and the amount of cooling provided by the ambient air conditions blowing across the radiator. The engines thermostats will automatically control the flow through the engine in order to achieve the desired thermal energy rejection from the jacket water. The radiator and thermostats can continue to be utilized in their configuration and with the addition of an ORC or CCS system. As described previously, the Control Module 12 will actively control various control valves and pumps in the system to optimize system efficiency. For example, if the jacket water is diverted by control valve 7a around the engine radiator 8, the jacket water will flow to the ORC 4 (via heat exchanger MID-ORC 15a) where it will transfer thermal energy into the ORC propellant to perform either preheating, evaporation or superheating function. From the MID-ORC 15a heat exchanger the jacket water will flow to the CCS Condenser 16 at approximately 175° F. where it will cross exchange with the CO2/H2O flowing through the CCS condenser 16 to cool the vapor such that the $H_2O$ will precipitate out of solution (that water will then be recirculated into the CCS 200 system) and the CO2 will be vented out of the condenser making it available for compression/transportation/storage/etc. The jacket water then travels back towards the reciprocating engine 1 at a temperature higher than 175° F. where it will pass through control valve 7c that will either divert the jacket water to LOW-ORC 6 heat exchanger in the ORC 4 (to add heat to the ORC 4 and reduce its temperature) or to control valve 7c will split the flow between the LOW-ORC 6 heat exchanger in the ORC 4 and the bypass around LOW-ORC 6 to control valve 7b, where it will then divert flow to either the engine radiator 8 or the engine, or have its flow split between the engine radiator 8 and the engine 1.

The engine's auxiliary cooling water is discharged from the engine at a variety of temperatures (depending on the engine make and model) typically ranging between 135° F. and 190° F. This auxiliary cooling water typically cools the engines turbo and or lube oil, and then is flowed to the engine's radiator 8 (where it has its own cooling coils, independent of the engine jacket water cooling coils, in the radiator) to dissipate that heat before being returned the engine. In this configuration the cooling water (glycol/water mixture) can be diverted by Control Module 12 (via various control valves and pumps in the system) to optimize system efficiency where it will circulate the auxiliary cooling water to absorb additional heat energy from the engine exhaust and transfer it to the ORC 4. Specifically, in the configuration shown, the auxiliary cooling water is discharged from the engine 1 and diverted by control valve 7d where it can be flowed to Thermal Fluid Heater #2 3b or split flowed to the engine radiator 8 and the Thermal Fluid Heater #2 3b. The flow that was diverted to Thermal Fluid Heater #2 3b can then be further split flowed on its return to be diverted to the radiator 8, the engine 1 or split flowed between the engine 1 and the radiator 8. If the entire flow of the auxiliary cooling water is diverted to the radiator, the auxiliary cooling water will be cooled and returned to the engine 1 to pick up thermal energy to be dissipated in the radiator. If it is diverted to the bypass control valve 7d, the cooling water will flow to the Thermal Fluid Heater #2 3b and pick up thermal energy (while cooling the engine exhaust gas) to transfer thermal energy to MID-ORC 15b heat exchanger in the ORC 4. The auxiliary cooling water then travels back towards the engine 1 where it will pass through control valve 7e that will either divert the auxiliary cooling water to either the engine radiator 8 or the engine 1, or have its flow split between the engine radiator 8 and the engine 1 in order to achieve the correct return temperature to the engine 1.

Figure 7:
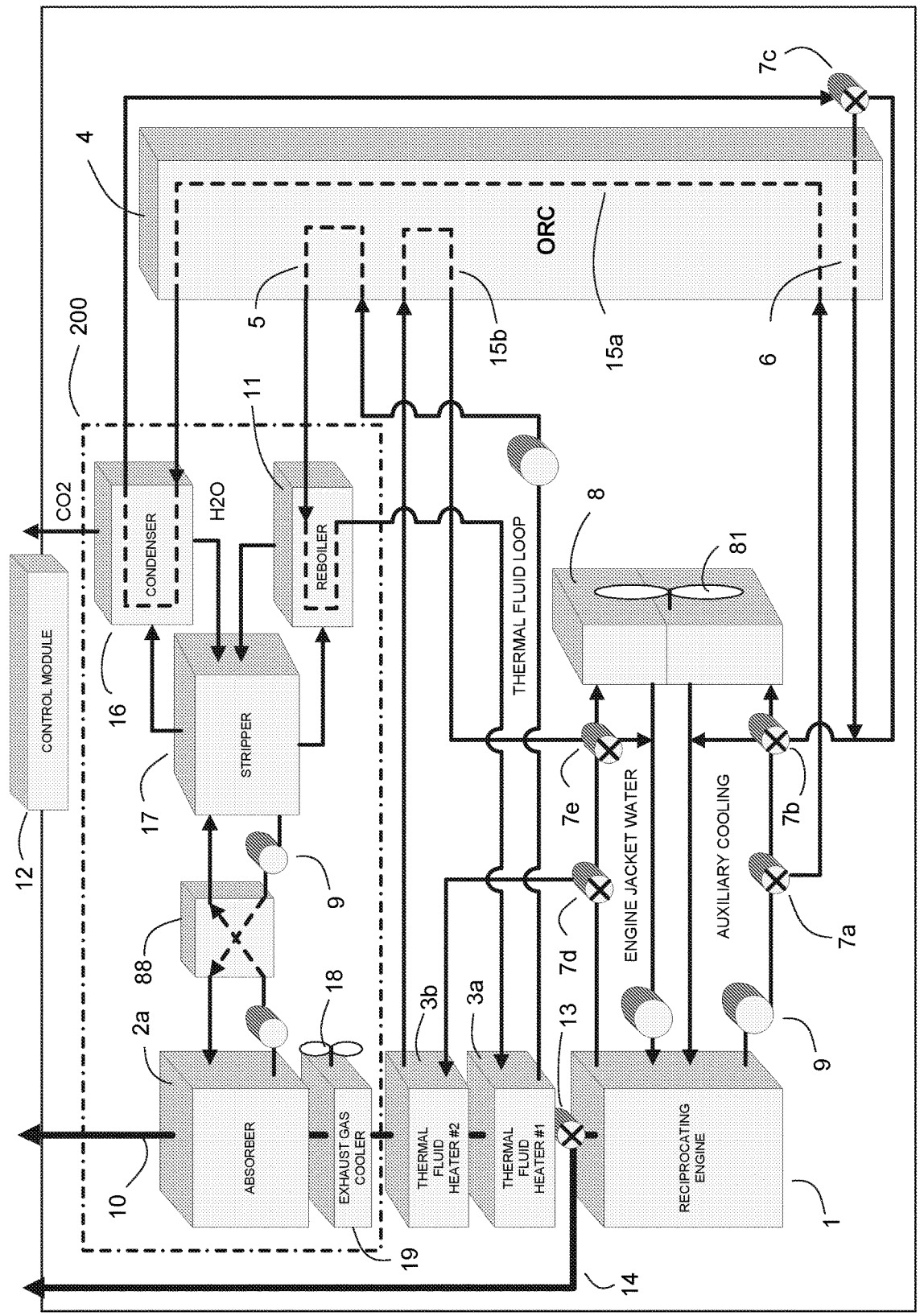
FIG. 7 illustrates a system similar to FIG. 5, wherein the roles of the engine jacket water and the auxiliary cooling water are exchanged, in which the engine's auxiliary cooling system is now integrated with the CCS and ORC, wherein sources of fluid are interchanged between loops such that the flows pick up the energy from the various heat sources and deliver those to the ORC, and wherein a valve configuration between the engine and the air cooler is reversed to accommodate the flow path under some aspects of the present disclosure.

It should be noted that the description in the previous two paragraphs could interchange the source of the fluid (engine jacket water and engine auxiliary cooling water) between the two described loops such that the flows pick up the energy from the various heat sources and deliver those to the ORC 4 via MID-ORC 15a, MID-ORC 15b, and LOW-ORC 6, as shown in FIG. 7.

It should also be noted that the speed of the radiator fan 81 can be controlled to speed up or slow down the airflow through the radiator 8 to meet the reject heat duty required in the radiator 8. Further projecting this concept, that all cooler fans in the system can be sped up or slowed down in order to adjust the amount of cooling provided to the device, may be determined by the Control Module 12.

It should also be noted that the speed of the Exhaust Gas Cooler Fan 18 can be controlled to speed up or slow down the airflow through the Exhaust Gas Cooler 19 to meet the reject heat duty required by the Control Module 12.

It should be further noted that the fluid (labeled "Auxiliary Cooling" water) can be either sent to Thermal Fluid Heater #2 first (as shown) or flowed to the ORC first, before being reverted to the other. If diverted to the ORC first, then the valve configuration between the engine and the air cooler would need to be reversed to accommodate that flow path (as shown in FIG. 7).

It should further be noted that throughout the disclosures in this document, the CCS system could be operated as a GSS system, where 'sour' off-market specification natural gas stream is processed through the gas treating equipment (to recover H2S and/or CO2) in place of gas treating engine exhaust (to recover CO2).

The thermal fluid circulated in the Thermal Fluid Heater #1 3a is the highest temperature fluid in this configuration. The engine exhaust gas entering the Thermal Fluid Heater #1 3a is expected to be approximately 1000° F. (+/−200° F.) and discharging at approximately 400° F. This exhaust gas is expected to heat the thermal fluid from approximately 265° F. up to approximately 325° F. The thermal fluid can be heated to much higher temperatures (up to 750 degrees Fahrenheit, but that elevated temperature tends to degrade the thermal fluid may not be necessary) for use in an ORC or in a CCS Reboiler 11. This thermal fluid can be circulated in either direction, meaning it can flow to the CCS Reboiler 11 first and then to the HIGH-ORC 5 heat exchanger then returning to the Thermal Fluid Heater #1 3a, or in the opposite direction from the Thermal Fluid Heater #1 3a to the HIGH-ORC 5 heat exchanger then to the CCS Reboiler 11, before returning to the Thermal Fluid Heater #1 3a. The circulating pump 9 can be located anywhere in the loop and therefore is shown on FIG. 5 as representative in nature.

Within the CCS 200 loop in all of the FIG.'S, configurations and combinations presented herein, the cooled engine exhaust flue gas (typically cooled to between 85 to 125° F.) which contains CO2 enters an Absorber 2a from the bottom (if it is a contactor tower) and percolates upward where it contacts in counter-current flowing CO2 absorbing solvent (CO2-lean solution). It should be noted that the Absorber configuration does not necessarily have to be a contacting tower but can be a centrifugal contactor, a drum contactor, or any other device configured to contact exhaust gas with a lean solvent solution to facilitate interface and exchange/contact of the solvent with the gas. After the lean solution absorbs the CO2 into it, the solvent becomes known as "rich" in CO2 (CO2-rich solvent) it drains the bottom of the Absorber 2a and passes through an economizing heat exchanger to the Stripper 17. The CO2-rich solvent discharges from the Absorber 2a at approximately 120-150° F. while passing through a Cross Flow Heat Exchanger 88 for preheating the CO2-rich solvent to approximately 195 to 230° F. before entering the Stripper 17. The preheated CO2 rich solvent enters to the top of the Stripper 17 and desorbs (separates) the CO2 at high temperature conditions of approximately 230-265° F. where the solvent is then regenerated to 215-250° F. for recycling back to the Cross Flow Heat Exchanger 88, and then to the Absorber 2a at approximately 85 to 105° F. The now CO2-lean absorbent/solvent is pumped back to the Absorber 2a via the other side of the heat exchanger, entering the Cross Flow Heat Exchanger 88 at approximately 215° F. and exiting the Cross Flow Heat Exchanger 88 at approximately 105° F., then entering the Absorber 2a as a CO2-lean solvent to repeat the process. The CO2 discharged from the top of the CCS Stripper 17 typically contains H2O. The CO2/H2O vapor enters the condenser at approximately 230-265° F. that precipitates out the $H_2O$ by cross exchanging the flue gas in a condenser such that the pure CO2 can discharge from the Condenser 16 at approximately 200-210° F., and then can then be compressed for the subsequent transportation and storage, and the H2O can be reclaimed back into the carbon extraction process. It should be noted that the temperatures provided herein are used as non-limiting examples only, and that other temperatures are contemplated in the present disclosure.

Figure 6:
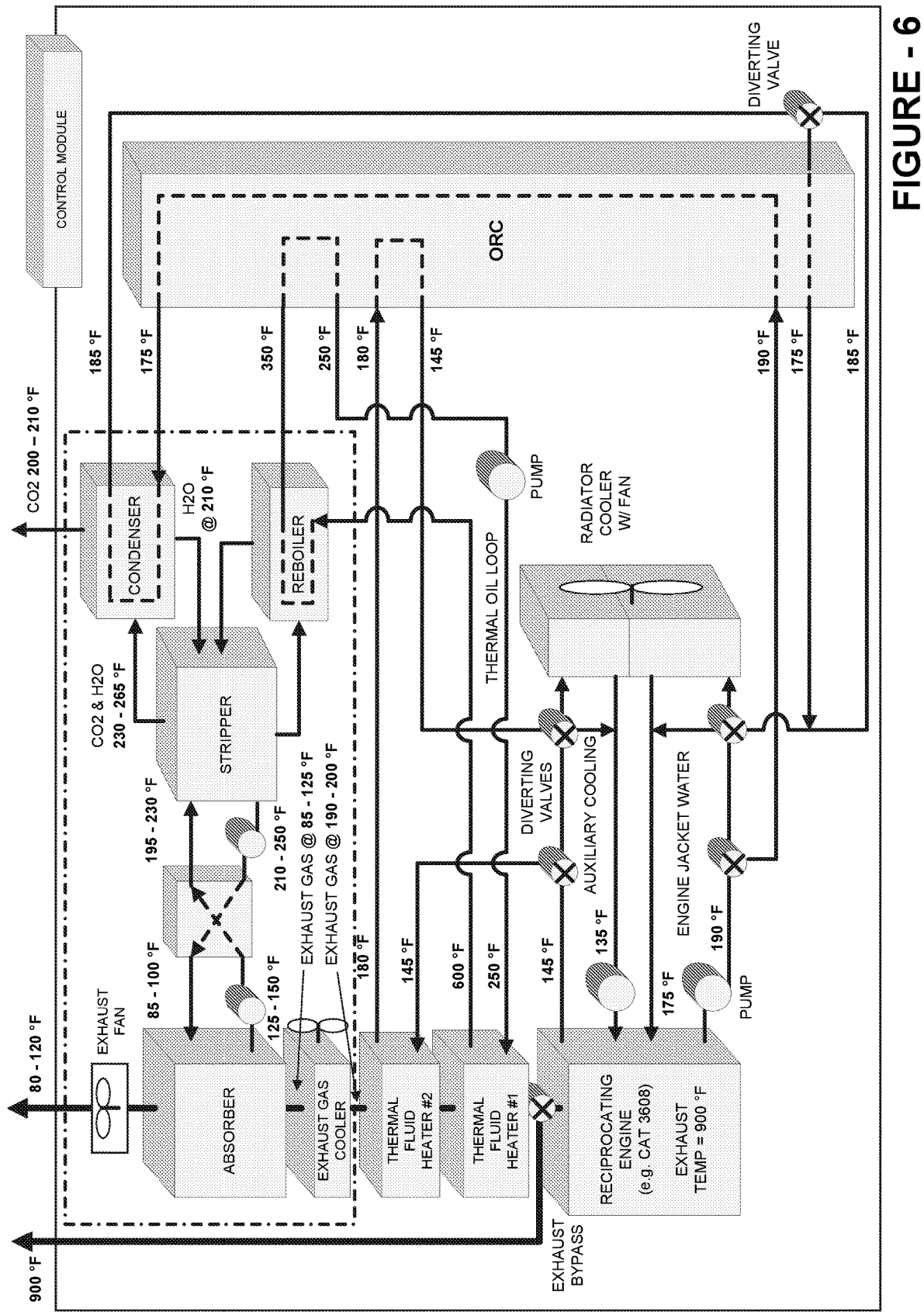
FIG. 6 illustrates a variety of operating temperatures for the configuration shown in FIG. 5 according to some aspects of the present disclosure.

FIG. 6 provides examples of approximate temperatures of the various fluids and gases in a CCS configuration. It should be noted that the temperatures provided throughout this document are used as non-limiting examples only, and that other temperatures are contemplated in the present disclosure.

In some examples, the combustion device's exhaust back pressure can be a limiting factor to the amount of equipment placed in the exhaust system and therefore an Exhaust Blower Fan 21 (induced draft or forced draft) may be used to prevent excessive back pressure on the combustion devices (turbine, furnace, boiler, or reciprocating engines) exhaust system. This would apply to either a boiler, a furnace, a turbine, or a reciprocating engine.

The exemplary fluid flow paths provided below are outlined for each of the fluids shown in FIG. 5 and FIG. 6 where the various flow paths can be mixed and matched with flow path combinations of each fluid. It would be prohibitive to list all possible permutations and combinations for each possible configurations, as one having ordinary skill in the art would appreciate additional and/or alternate temperatures that could be utilized. The structure of the flow paths for each fluid will be presented in the following manner:

Engine jacket water flow path

+

Engine auxiliary cooling water flow path

+

Thermal Fluid Heater #1 flow path

+

Engine exhaust flow path:
Possible Engine Jacket Water Flow Paths:
  1→9→7a→7b→8→1
  or
  1→9→7a→7b→[8]/[bypass 8]→1
  or
  1→9→7a→15a→16→7c→bypass 6→7b→bypass 8→1
  or
  1→9→7a→15a→16→7c→bypass 6→7b→8→1
  or
  1→9→7a→15a→16→7c→bypass 6→7b→[8]/[bypass 8]→1
  or
  1→9→7a→15a→16→7c→6→7b→bypass 8→1
  or
  1→9→7a→15a→16→7c→6→7b→8→1
  or
  1→9→7a→15a→16→7c→6→7b→[8]/[bypass 8]→1

Possible Engine Auxiliary Cooling Water Flow Paths:
  1→7d→7e→8→1
  or
  1→7d→7e→[8]/[bypass 8]→1
  or
  1→7d→3b→15b→7e→bypass 8→1
  or
  1→7d→3b→15b→7e→8→1
  or
  1→7d→3b→15b→7e→[8]/[bypass 8]→1

Possible Thermal Fluid Heater #1 Thermal Fluid Flow Paths:
  3a→11→5→9→3a
  or
  3a→9→5→11→3a Possible Exhaust Gas Flow Paths:
  1→13→3a→3b→19→2a→10
  or
  1→13→14

Some examples of possible combinations and permutations of the various flow paths shown in FIG. 5 are, for example:
Configuration 1:
  1→9→7a→15a→16→7c→bypass 6→7b→8→1
  +
  1→7d→3b→15b→7e→bypass 8→1
  +
  3a→11→5→9→3a
  +
  1→13→3a→3b→19→2a→10
Configuration 2:
  1→9→7a→15a→16→7c→6→7b→8→1
  +
  1→7d→3b→15b→7e→8→1
  +
  3a→11→5→9→3a
  +
  1→13→14
Configuration 3:
  1→9→7a→15a→16→7c→6→7b→[8]/[bypass 8]→1
  +
  1→7d→3b→15b→7e→[8]/[bypass 8]→1
  +
  3a→9→5→11→3a
  +
  1→13→3a→3b→19→2a→10

The energy recovered from THF #1 will be transferred to the thermal fluid that will then transfer some or all of that thermal energy to HIGH-ORC 5 heat exchanger in the ORC 4 and the CCS Reboiler 11. The direction of flow can operate in either direction and that will be determined by the conditions of the specific engine configurations. The energy recovered from THF #2 will be transferred to the thermal fluid that will then transfer some or all of that thermal fluid to MID-ORC 15b heat exchanger in the ORC 4. The energy recovered from the CCS Condenser 16 will be transferred to the reciprocating engines jacket water which will then transfer some or all of the energy picked up from the Condenser 16 (and potentially more thermal energy) to LOW-ORC 6 heat exchanger in the ORC 4. The associated circulation pumps 9 will be placed in the appropriate location in their respective loops (e.g., typically where the coolest operating temperature is). It should be noted that the use of two Thermal Fluid Heaters 3a and 3b could be applied to the exhaust heat recovery from any combustion device, include a turbine, reciprocating engine, boiler and/or furnace, for interfacing with an ORC 4 and/or CCS 200.

The various loops in FIG. 7 may be configured as follows, under some examples:

The engine's auxiliary cooling water is discharged from the engine at a variety of temperatures (depending on the engine make and model) typically ranging between 135° F. and 190° F. This auxiliary cooling water typically cools the engines turbo and/or lube oil, and then is flowed to the engines radiator 8 to dissipate that heat before being returned the engine. In FIG. 7, for example, if the auxiliary cooling water is diverted by control valve 7a around the engine radiator 8, the auxiliary cooling water will flow to the ORC 4 heat exchanger MID-ORC 15a where it will transfer thermal energy into the ORC propellant to perform either preheating, evaporation or superheating function (depending on the propellant). From the MID-ORC 15a heat exchanger the auxiliary cooling water will flow to the CCS Condenser 16 (possibly at a lower temperature than the temperature at which it left the engine), where it will then cross exchange with the CO2/H2O discharge from the CCS condenser 16 to cool the CO2/H2O vapor (that would typically be over 212° F.) such that the H2O will precipitate out of solution (where that condensed water will then be recirculated into the CCS 200 system and the CO2 stripped gas will be vented out of the Condenser 16 making it available for compression/transportation/storage/etc.). The auxiliary cooling water then travels back towards the engine 1 at a temperature higher than the temperature which it originally left the MID-ORC 15a at, where it will then pass through another control valve 7c that will either divert the auxiliary cooling water to LOW-ORC 6 heat exchanger in the ORC 4 (to transfer more heat to the ORC 4, which will reduce its temperature) or to control valve 7b, or control valve 7c will split the flow between the LOW-ORC 6 heat exchanger in the ORC 4 and the control valve 7b, where it will then divert flow to either the engine radiator 8 or the engine, or have its flow split between the engine radiator 8 and the engine 1.

Similarly, the term engine "auxiliary cooling water" can be used synonymously with engine "jacket water" in the previous examples to reflect the possibility that the engine jacket water can conduct the same path with higher temperatures, when it is discharged from the engine at approximately 190° F. From there, one possible path is the jacket water can be cooled in the radiator and returned to the engine at approximately 180° F. There are other possible paths, as well. The Control Module 12 may be configured to actively control various control valves and pumps and fans in the system to optimize system efficiency. In this configuration the engine cooling jacket water (glycol/water mixture) can be diverted by Control Module 12 (via actively control various control valves and pumps in the system) to optimize system efficiency where it will circulate the engine cooling jacket water to absorb additional heat energy from the engine exhaust and transfer it to the ORC 4. Specifically, in the configuration shown, the engine cooling jacket water is discharged from the engine 1 and diverted by control valve 7*d* where it can be split flowed to the engine radiator 8 and the Thermal Fluid Heater #2 3*b*, or diverted to the radiator 8, or diverted to the Thermal Fluid Heater #2 3*b*. If diverted to the radiator, the engine jacket water will be cooled and returned to the engine 1 to pick up thermal energy to be dissipated in the radiator. If diverted to the ORC by control valve 7*d*, the cooling water will flow to the Thermal Fluid Heater #2 3*b* and pick up thermal energy (while cooling the engine exhaust gas) to transfer thermal energy to MID-ORC 15*b* heat exchanger in the ORC 4. The engine jacket water then travels back towards the engine 1 where it will pass through control valve 7*e* that will either divert the auxiliary cooling water to either the engine radiator 8 or the engine 1, or have its flow split between the engine radiator 8 and the engine 1 in order to achieve the correct return temperature of the engine jacket water to the engine 1.

It should be noted that the description provided above could interchange the source of the thermal fluids (engine jacket water and engine auxiliary cooling water) between the two described loops such that the flows pick up the energy from the various heat sources and deliver those to the ORC 4 via MID-ORC 15*a*, MID-ORC 15*b*, and LOW-ORC 6.

It should be noted that when descriptions of the auxiliary cooling water is being sent to the radiator 8, that radiator can be functionally equivalent to an aerial cooler (as described above) and will have separate cooling lines/sections for auxiliary cooling water, engine jacket water and each stage of gas compression. Meaning the tubes containing the various fluids or gases will be piped to congregate at the radiator 8 (or aerial cooler) without intermixing their fluids or gases, for the purpose of having air drawn across their respective tubes to cool the fluids or gases within those tubes.

It should also be noted that the speed of the radiator fan(s) 81 can be controlled to speed up or slow down the airflow through the various radiator 8 sections to meet the reject heat duty required by either the gas, engine jacket water or auxiliary cooling water.

It should also be noted that the speed of the Exhaust Gas Cooler Fan 18 can be controlled to speed up or slow down the airflow across/through the Exhaust Gas Cooler 19 to meet the reject heat duty in the exhaust stream, as required by the Control Module 12.

It should be further noted that the fluid in Thermal Fluid Loop can be either sent to Thermal Fluid Heater #1 3*a* first to add heat to the thermal fluid, then on to CCS Reboiler 11 to transfer heat to the reboiler, then to ORC HIGH-ORC 6 to transfer heat to either evaporate or superheat the working fluid in the ORC 4, and then returning to the Thermal Fluid Heater #1 3*a* to pick up heat again, or the thermal fluid can be flowed in the reverse order.

It should moreover be noted that recovering the exhaust energy (for integration with a CCS system 200, or GSS system 201) from the engines exhaust through multiple heat exchangers (to get the exhaust temperature lowered) would more than likely require an Exhaust Blower Fan 21 (induced draft or forced draft) in order to facilitate the flow (passing through of) and dispersion of the exhaust gases from the exhaust equipment, which should be contemplated for all of the examples and configurations outlined throughout this document.

In FIG. 8, some exemplary expected temperature and heat exchanger duties are shown under some aspects of the present disclosure. The engine jacket water is shown to supply heat to the ORC 4, and the auxiliary cooling water is not. It is possible to recover heat from both the engine jacket water and the engine auxiliary cooling water simultaneously, even though this configuration is not shown in this figure.

Also in FIG. 8, the thermal fluid heater #1 (TFH #1) 3*a* circulates between the ORC (via heat exchanger ORC #4) and the CCS Reboiler 11. In the shown example, the thermal fluid is diverted to the ORC 4 first, and then diverted to the CCS Reboiler 11 before being returned to TFH #1. This configuration can have the thermal fluid flowing in the opposite direction as well, and still achieve the overall objective.

The flow through thermal fluid heater #2 (TFH #2) is shown as an independent thermal fluid loop with its own circulating pump, recovering exhaust heat to transfer to the ORC 4 (via heat exchanger ORC #1).

The thermal fluid circulated between the CCS Condenser 16 and the ORC 4 (via heat exchanger ORC #3) is an independent loop with its own circulating pump.

By reducing the temperature of the engine exhaust prior to entering the Exhaust Gas Cooler 19, the size of the Exhaust Gas Cooler can be smaller and/or the load on the exhaust gas cooler fan 18 will be reduced, making the CCS 200 system more energy efficient.

By reducing the temperature of the CO2 gas prior to entering the Stripped Gas Cooler 23, the load on that Stripped Gas Cooler Fan 87 will be reduced, making the CCS 200 system more energy efficient.

By reducing the temperature of the engine jacket water or the engines auxiliary cooling water prior to entering the radiator 8, the load on that radiator fan(s) 81 will be reduced, potentially making the system more energy efficient.

In a case where thermal energy is also being recovered from the heat of compression from a gas compressor (see FIG. 9, FIG. 12, FIG. 16 through 21, and FIG. 23 through FIG. 27), the heat of compression can be added to the CCS 200 heat exchangers, the ORC 4 system or added to a Waste Heat Chiller 28 at any of the listed heat exchangers, potentially even adding additional heat exchangers to the ORC system 4 or Waste Heat Chillers 28 to the process. Those heat exchangers could be added before, after or in between any of the heat exchangers described above, at which time appropriate naming will be applied to them. Meaning, the thermal energy recovered from the heat of compression can be directly added to the CCS 200 by diverting the hot compressed gas to exchange thermal energy with a heat exchanger co-located at a device in the system where the thermal energy can be used (e.g. the CCS 200 or the ORC 4 or the Waste Heat Chillers 28), or can be cross exchanged into a thermal fluid so it can be piped to the device in the system where the thermal energy can be used (e.g. the CCS 200 or the ORC 4 or the Waste Heat Chillers 28), or the hot compressed gas thermal energy can be 'stacked' (add the thermal heat from the heat of compression) to another thermal fluid already circulating through the system.

Further, if the motor driver of the gas compressor is a combustion device such as a turbine or reciprocating engine, that exhaust energy (and jacket water/auxiliary cooling water, if applicable) can also be recovered and added to the overall system described comprising of an ORC 4, CCS 200 and engine (reciprocating engine 1 or turbine 22).

Figure 9:
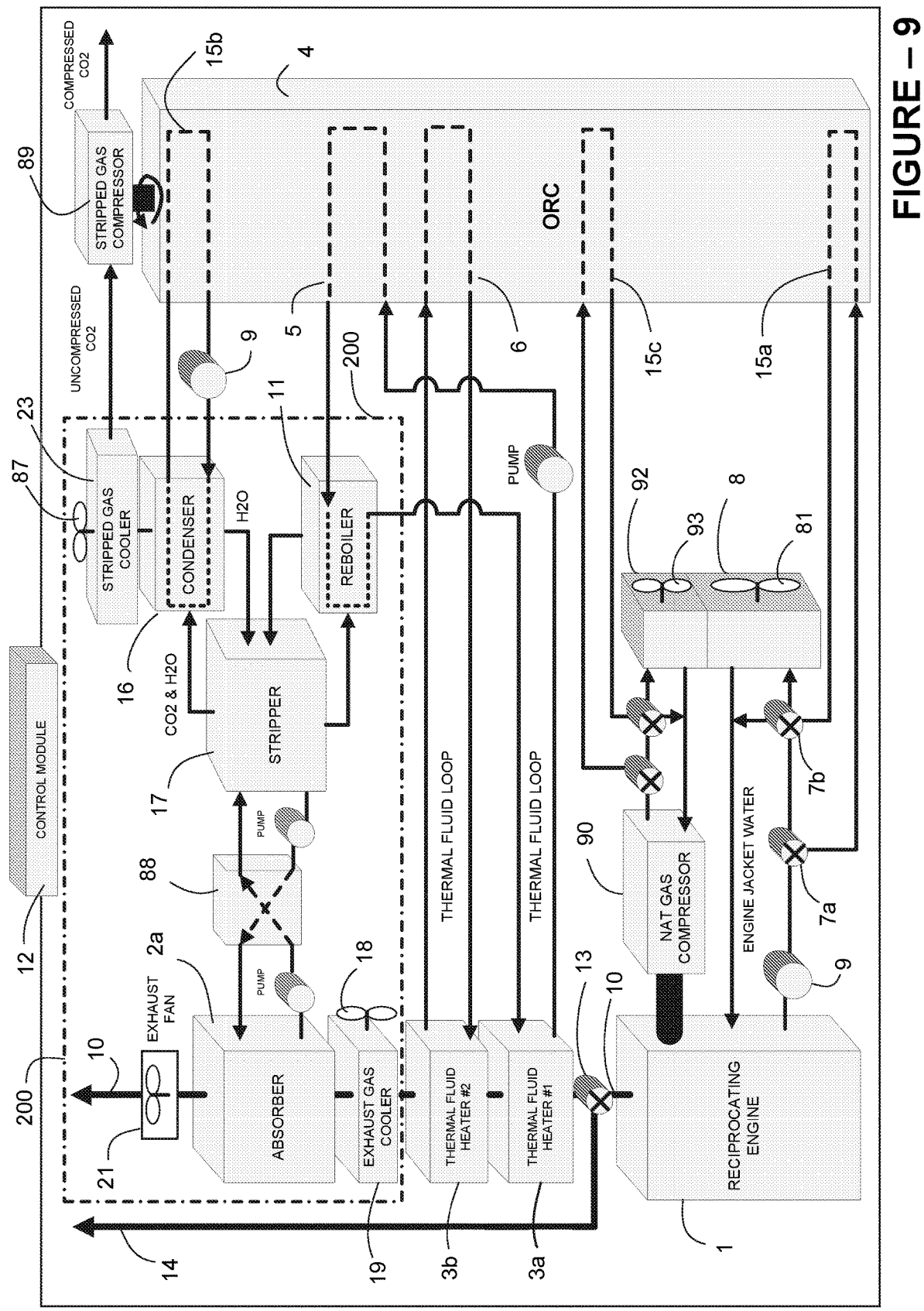
FIG. 9 illustrates a system where a natural gas compressor is added to the reciprocating engine and a CO2 gas compressor is directly driven by the ORC under some aspects of the present disclosure.

In the example of FIG. 9, a Natural Gas Compressor 90 is added to the reciprocating engine 1 and a (CO2 and/or H2S) Stripped Gas Compressor 89 is added and shown to be directly driven by the ORC 4 rotating output shaft (driven by the expander's rotating output shaft of the ORC, not shown).

The heat of compression from compressing the gas is usually dissipated through an aerial cooler. In the case of the Natural Gas Compressor 90, as shown in the example, the aerial cooler is comprised of two cooler sections. The first section is the engine's radiator 8 with cooler fan 81, where the jacket water cooling coils and/or the engines auxiliary cooling water coils are circulated within radiator 8. The additional section of the aerial cooler is the Inter-stage Gas Cooler 92 section(s). This gas cooler section is shown to have its own Inter-stage Gas Cooler Fans 93. Sometimes, the aerial cooler fan of a gas compressor (driven by the reciprocating engine or by an electric motor) may be configured with a single fan (not shown in FIG. 9) in front of both sections 8 and 92, combining the function of cooler fan 81 and Inter-stage Gas Cooler Fans 93. The inter-stage cooling for the (CO2) Stripped Gas Compressor 89 may require similar configuration to that of the Natural Gas Compressor 90, therefore any description provided for the natural gas compressor is applicable to the (CO2) Stripped Gas Compressor 89 described throughout this document, and the two can be interchanged (where applicable) as well as the heat recovery and cooling techniques described throughout the document.

The heat of compression from the Natural Gas Compressor 90, in FIG. 9, is shown to be transferred to the ORC system 4 (via heat exchanger Mid-ORC 15c), where that heat will be fit into the appropriate temperature range of the ORC propellant. In the examples in this document, the temperatures of the thermal fluids transferring to the ORC propellant are to progressively get hotter and, therefore add thermal energy to the ORC in the process, and therefore, the heat of compression is to be transferred to the appropriate stage(s) in the ORC system 4.

If multiple stages of compression are being applied, then there will be multiple interfaces between the heat of compression from each Inter-stage Gas Cooler 92 and the user of that thermal energy by direct exchange of gas to the receiving device (examples being the ORC system 4 the CCS 200 or Waste Heat Chiller 28) or by receiving thermal fluid medium (examples being engine jacket water or auxiliary cooling water or thermal fluid) between the heat exchanger associated with each Inter-stage Gas Cooler 92 and the other device. As described above, the thermal energy of that recovered heat will be transferred to a fluid (engine jacket water or auxiliary cooling water or thermal fluid) and then transferred and inserted into the ORC system 4, CCS 200 or Waste Heat Chiller 28 appropriately. The example shown in FIG. 9 only shows one stage of compression which is directly exchanging hot compressed gas with the ORC 4. Although not shown in FIG. 9, the thermal energy from the heat of compression can be transferred to a thermal fluid, to then transfer the thermal energy to the end device. Further, the concept of transferring thermal energy from each stage of compression (via Inter-stage Gas Cooler sections 92) is also applicable to transferring thermal energy to Waste Heat Chiller(s) in order to provide cooling (via chilled thermal fluid) to various components within the system.

In the example of FIG. 9, a (CO2) Stripped Gas Compressor 89 may be added to the discharge of the CCS Stripped Gas Cooler 23 discharge line. The heat of compression from the (CO2) Stripped Gas Compressor 89 can be recovered in the ORC system to extent of the integration of the system with the ORC and the CCS (similar to that shown in FIG. 12). Additionally, the reject heat from the (CO2) stripped gas compressor driver/engine can be applied in the same manner as described for the other combustion devices described in this application.

Figure 12:
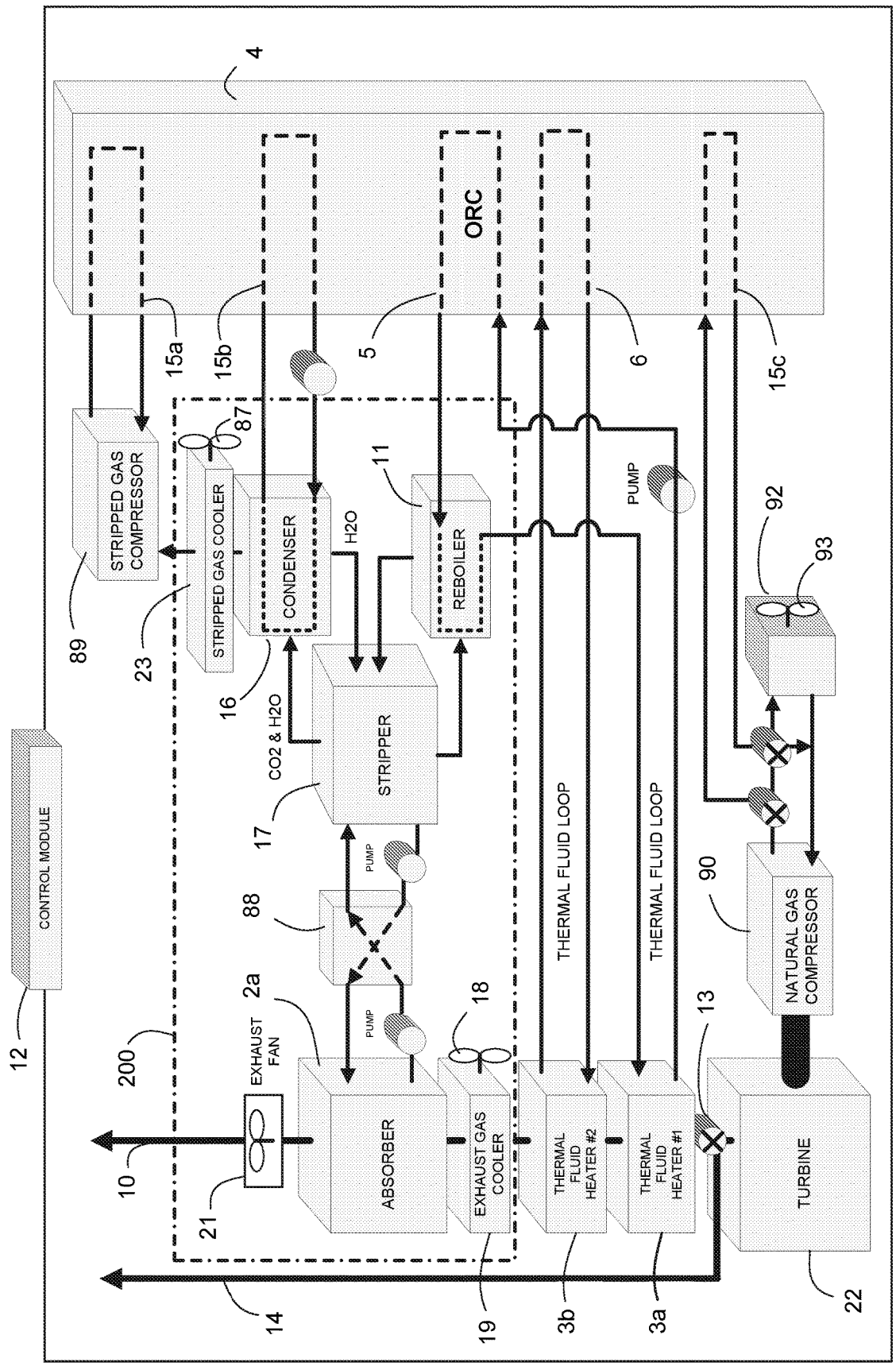
FIG. 12 illustrates a system where a natural gas compressor is added to the turbine engine, wherein the heat from the engine and heat of compression is passed to the ORC in combination with the exhaust heat recovery is used for integration of the system with the ORC and the CCS under some aspects of the present disclosure.

If multiple stages of compression of the (CO2) Stripped Gas Compressor 89 are being applied, then there could be the same number of interfaces between each stage of compression (via a heat exchanger at each stage) and then the thermal energy being transferred to the end device, whether that is an ORC system 4, the CCS Reboiler 11, or if applicable, to a Waste Heat Chiller 28. As described above, the temperature of that recovered heat will be inserted into the ORC 4 or into a Waste Heat Chiller 28 system appropriately cascading in progressive temperature order. The example shown in FIG. 12 illustratively only shows one stage of compression on the Natural Gas Compressor 90 (a configuration that would be observed with a screw compressor), however it is likely there would be multiple stages of compression for a reciprocating compressor.

It should be noted that various Waste Heat Chiller 28 interconnectivity combinations are shown in FIG. 13 through FIG. 27 (with the exception of FIG. 16) where various thermal sources are used to fuel the Waste Heat Chiller(s). An important aspect to the Waste Heat Chiller integration is to use the waste heat from the primary stream to provide the thermal energy that is required to the Waste Heat Chiller, where that cooling generated will also cool the primary stream. This interaction cools the primary stream (because it gives up thermal energy to the Waste Heat Chiller) and then using the cooling from the Waste Heat Chiller, further cools the primary stream that requires more cooling (by using the chilled thermal fluid exiting the Waste Heat Chiller on the cold side). This can be particularly useful in the exhaust gas stream entering the Exhaust Gas Cooler 19, the stripping gas stream entering the Stripped Gas Cooler 23, the engine jacket water entering the radiator or aerial cooler, and the compressed gas exiting the compressor and entering the Inter-stage Gas Cooler 92, because the process reduces the primary stream twice (once by using heat on the hot side of the Waste Heat Chiller and the second time by using the chilled thermal fluid exiting the cold side of the Waste Heat Chiller to cool the primary stream), which then reduces the work the associated fans (Exhaust Gas Cooler Fan 18 for Exhaust Gas Cooler 19, Stripped Gas Cooler Fan 87 for Stripped Gas Cooler 23, Radiator Fan 81, and Inter-stage Gas Cooler Fan 93) have to do to cool the primary stream. Expanding this concept beyond a single stream recovering heat and providing cooling to just one stream, it can be applied to multiple primary streams such that the concept can also be applied to other non-related streams. The overall net energy balance will be worked out by the Control Module 12 or by Control Module 1000 to increase the overall system efficiency.

Figure 10:
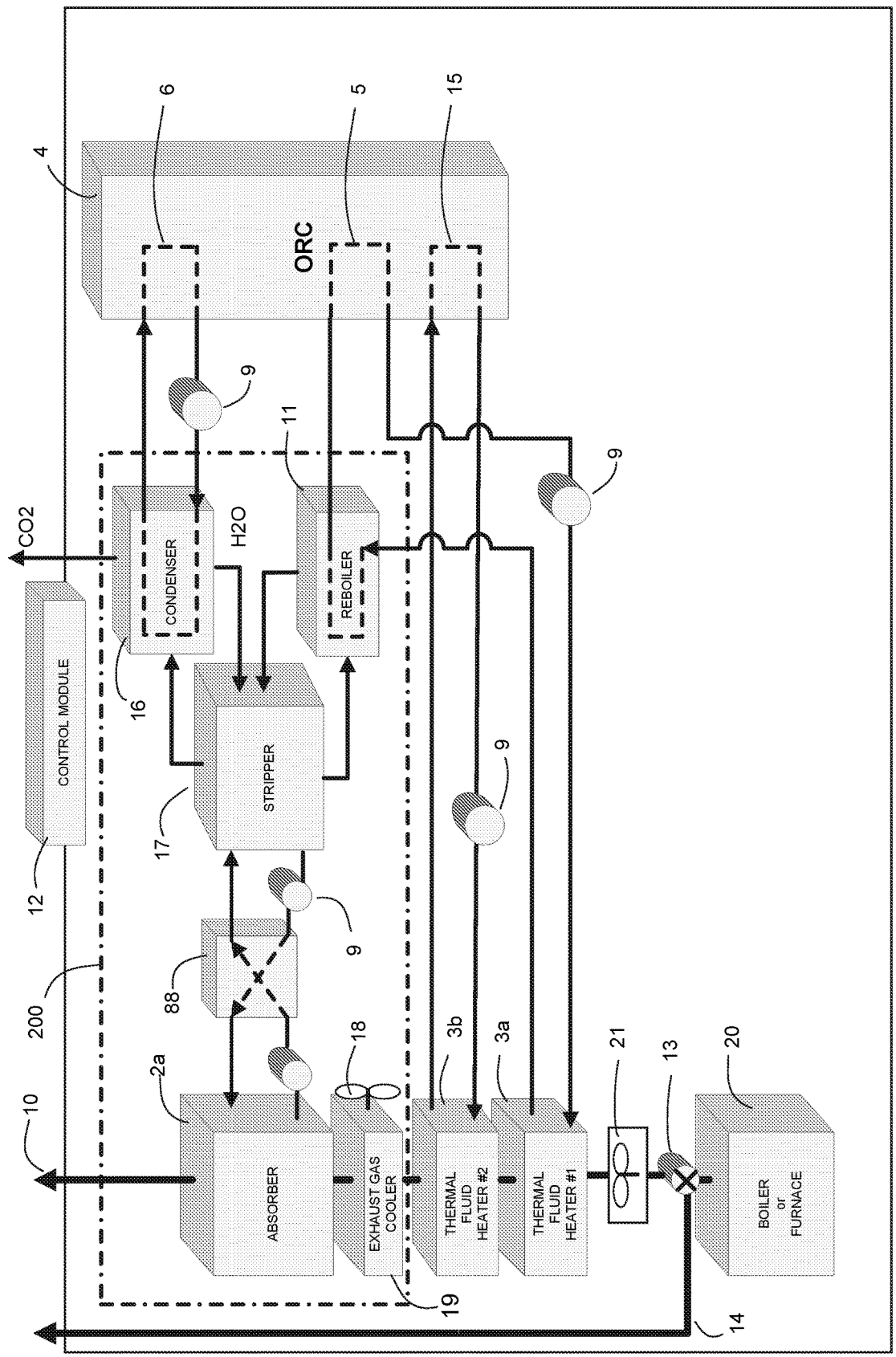
FIG. 10 illustrates a system utilizing exhaust heat recovery for a boiler, furnace, and wherein an Exhaust Blower Fan is configured as a partially induced fan and partially a forced draft fan inserted in between the entry and discharge of the exhaust gas system under some aspects of the present disclosure.
Figure 11:
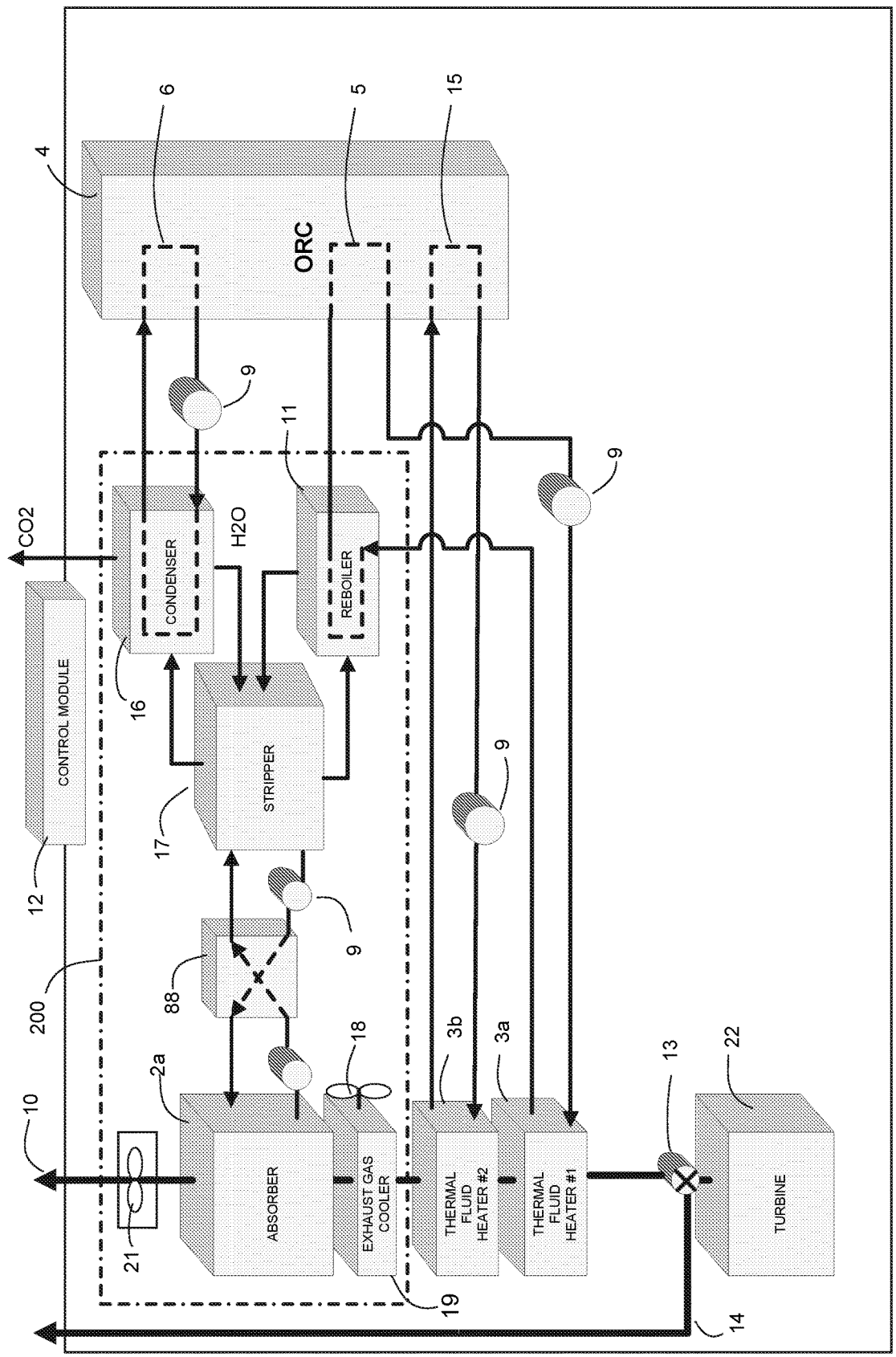
FIG. 11 illustrates a system similar to FIG. 10, wherein the combustion boiler or furnace are replaced with a turbine engine, and wherein an Exhaust Blower Fan is configured as an induced fan inserted at the discharge of the exhaust gas system in some aspects of the present disclosure.

The examples of FIG. 10 and FIG. 11 show configurations utilizing exhaust heat recovery only, for a boiler, furnace or turbine. These figures illustrate the exhaust being discharged from the combustion device and that exhaust gas being cooled through a series of heat exchangers 3a and 3b and an Exhaust Gas Cooler 19. Here, three heat exchangers are shown in the exhaust recovery stream. The first heat exchanger is thermal fluid heater #1 (TFH #1) 3a and is configured to recover exhaust temperatures of approximately 1900° F. and heat a thermal fluid (preferably a thermal oil) from approximately 350° F. to 750° F. The second heat exchanger is the thermal fluid heater #2 (TFH #2) 3b that is configured to accept the engine exhaust from THF #1 at approximately 400-600° F. and it is to heat a separate loop of thermal fluid from to approximately 200-350° F. The third heat exchanger is a Exhaust Gas Cooler 19 (can be air cooled or liquid cooled) and it is used to cool the exhaust stream to approximately 85-125° F. so that it can be direct piped into the Absorber 2a, where after the CO2 is removed from the exhaust stream, the combustion devices exhaust is then vented to atmosphere. The temperatures presented here are for illustrative purposes only, and should not limit the interpretation of the present disclosure. In FIG. 10 the Exhaust Blower Fan 21 is shown as a forced draft fan and in FIG. 11 the Exhaust Blower Fan 21 is shown as an induced fan. The Exhaust Blower Fan 21 can be inserted into the exhaust system in any location that is suitable, including locations mid-stream such that the fan operates partially as an induced draft fan and partially as a forced draft fan.

Similar to the previously disclosed configurations for reciprocating engines, the same configurations can apply to other combustion devices such as turbines, boilers or furnaces. In the exhaust heat recovery, the first exhaust heat exchanger Thermal Fluid Heater #1 3a captures and transfers thermal energy from the combustion devices exhaust to the CCS 200 (Absorption-based) Reboiler 11 and the ORC 4 (via heat exchanger High-ORC 5). The second exhaust heat exchanger Thermal Fluid Heater #2 3b captures residual (turbine, boiler or furnace) exhaust heat into a thermal fluid and transfers the captured energy to the ORC 4 (via heat exchanger Mid-ORC 15).

In FIG. 12 a Natural Gas Compressor 90 is coupled to the turbine 22 engine, as shown in the figure. The turbine does not have a jacket water cooling system but does have a lube oil system that requires heat rejection. Thus, the system has potential heat sources of heat of compression, in combination with the exhaust heat recovery, in combination with heat recovery from the turbines lube oil system, which may be integrated with the ORC and the CCS. Shown in this example is the thermal energy recovery from the compressors heat of compression and then passed to the ORC 4 (via heat exchanger Mid-ORC 15c). Although not shown in this figure, the turbines lube oil system can provide thermal energy to use in the system similar to engine jacket water and/or auxiliary cooling water for reciprocating engines supplying thermal energy for use in the overall system (ORC 4 and CCS 200 and Waste Heat Chillers 28), it should be noted that the thermal energy from the lube oil system can be recovered (at a higher temperature than typical engine jacket water or auxiliary cooling water) and integrated for use in the ORC 4, Reboiler 11 or Waste Heat Chiller(s) 28.

If multiple stages of compression are being applied, then there can be multiple interfaces (between each Inter-stage Gas Cooler 92, not shown in FIG. 12) that is dissipating the heat of compression through an exchanger from the turbine driven Natural Gas Compressor's 90. Specifically, heat of compression intended to be dissipated via Inter-stage Gas Cooler(s) 92 is intercepted into a thermal fluid and diverted (or directly diverted as a gas) to the ORC system 4, the CSS Reboiler 11 or the Waste Heat Chiller 28 for use in the system. The temperature of the recovered heat will be inserted into the ORC system 4, the CSS Reboiler 11 or the Waste Heat Chiller 28 at the appropriate location to integrate the heat for the most effective result. The example shown in FIG. 12 only shows one stage of compression.

In FIG. 12, a (CO2) Stripped Gas Compressor 89 is added to the stripped gas discharge from the CCS system 200. The heat of compression from the (CO2) stripped gas compressor can be recovered in the ORC system 4, the CSS Reboiler 11, or the Waste Heat Chiller 28 to extent of the integration of the systems.

If multiple stages of compression to the (CO2) Stripped Gas Compressor 89 are being applied, then there can be one commensurate interface between each Inter-stage Gas Cooler 92 (via a heat exchanger at each stage of compression) and the ORC system 4, the CSS Reboiler 11 or the Waste Heat Chiller 28. As described above, the temperature of that recovered heat (whether the heat transfer medium is the compressed gas or a thermal fluid) will be transferred and inserted into the system appropriately or combined with other heat streams to effectively transfer the thermal energy for use in ORC system 4, the CSS Reboiler 11 or the Waste Heat Chiller 28. The example shown in FIG. 12 only shows one stage of compression for the Stripped Gas Compressor 89 and one stage of compression for the Natural Gas Compressor 90 with each compressor transferring the heat of compression to the ORC 4.

If the engine (reciprocating or turbine) propelling/driving the (CO2) Stripped Gas Compressor 89 emits thermal energy, it can be also recovered similarly to the other methods already described in this application. It should be understood by those skilled in the art that, while specific forms of "compression" are described in this document, the concept of compression for the purposes of improving efficiency and/or carbon capture is contemplated for other gases (e.g., natural gas) disclosed herein.

The embodiments of FIG. 13 through FIG. 27 and FIG. 30 (with the exception of FIG. 16) illustrate examples of a more complex configuration, where a Waste Heat Chiller 28 is added to the combustion device(s) 1, 20 or 22, CCS 200, and ORC 4 systems. The addition of a Waste Heat Chiller(s) is another configuration of waste heat being utilized to the previously disclosed configurations to improve the overall efficiency of the system. The Waste Heat Chiller can be either an absorption-based chiller or an adsorption-based chiller. This is not to be confused with the absorption and adsorption gas treating (CCS 200), as described throughout this document. The primary difference between the two types of chillers is based on the temperature required to drive the chilling system. Absorption chillers require a higher waste heat temperature to drive the ammonia or lithium bromide systems (single stage chiller will operate at lower temperatures than a two-stage absorption chiller) than adsorption chillers. It is to be noted that no circulating pumps have been shown in the Figures to show the circulation of the chilled water from the Waste Heat Chillers 28, however it would be understood by anybody skilled in the art that circulating pumps would be required to flow the chilled water from and back to the chillers.

Figure 13:
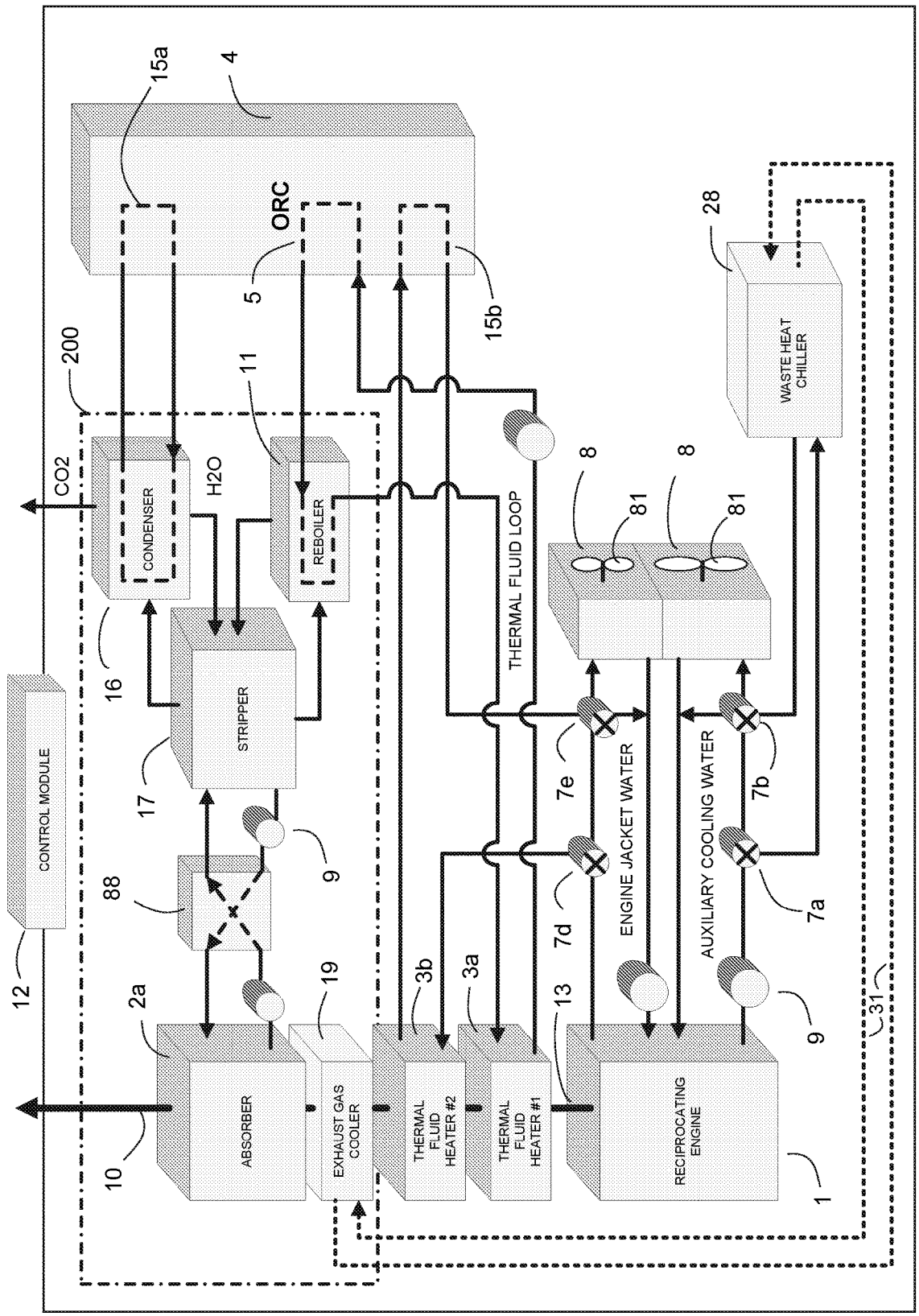
FIG. 13 shows an example of a system including a reciprocating engine with a radiator, coupled to an ORC system and an Absorption-based (amine based chemical absorption) CCS system with circulating pumps, control valves, and multiple heat exchangers in the engines exhaust, wherein a waste heat chiller is connected to the engines auxiliary water cooling system in order to have the waste heat chiller cool the thermal fluid to be used to cool the engine exhaust prior to it entering the Absorber in the CCS system, wherein certain system controls may be provided by a control module under some aspects of the present disclosure.

FIG. 13 is very similar to the configuration shown in FIG. 7 with the exception that the thermal fluid circulated to and from the CCS 200 Condenser 16 is an independent thermal fluid, whereas in FIG. 7 the thermal fluid circulating into and out of the Condenser 16 is auxiliary cooling water. In FIG. 7, thermal energy in the auxiliary cooling water is first circulated to the ORC 4 (via heat exchanger Mid-ORC 15a) to transfer energy to the ORC, after which it is discharged to the Condenser 16 to extract thermal energy from the Condenser 16 (which then provides cooling to the discharging stripped gas) after which the auxiliary cooling water is discharged to control valve 7c which then diverts (as determined by the Control Module 12) whether the auxiliary cooler water (in whole or in part) is then returned to the ORC 4 (via heat exchanger Low-ORC 6) or the engine 1 or the radiator 8. In FIG. 13, the engines auxiliary cooling fluid (typically used to cool motor oil and/turbos or gas compression cylinders, operating typically in the 145° F. to 175° F. range) is used to drive a Waste Heat Chiller 28 (absorption or adsorption, depending on the temperature and flow rate) to provide cooling to the engine exhaust, prior to the engine exhaust entering the CCS 200 system (whether that is to an Absorber 2*a* in an absorption-based CCS system or a Adsorber 2*d* in a temperature or pressure swing adsorption system).

In FIG. 13, the ORC has 3 three thermal fluid energy streams delivered to it. The first thermal fluid stream delivers energy from the engines jacket water to Thermal Fluid Heater #2 which picks up (stacks) additional thermal energy to engine jacket water and is then transferred to heat exchanger Mid-ORC 15*b* where that thermal energy is transferred to the propellant in the ORC 4, after which the jacket water is returned towards the engine where it will divert to the radiator (for additional cooling) or return directly to the engine 1 (or some amount of split flow will be applied where only partial cooling is required). The second thermal fluid stream to the ORC delivers energy from the Thermal fluid heater #1 which circulates a thermal fluid to the ORC 4 to heat exchanger High-ORC where energy is transferred to the ORC 4, then with energy remaining in the thermal fluid to be transferred to Reboiler 11, where the temperature of the thermal fluid is reduced further by transferring thermal energy to the Reboiler 11, and then is transferred back to the Thermal Fluid Heater #1 to pick up thermal energy to restart the heat transfer loop. The third thermal fluid stream of thermal energy delivered to the ORC 4 (via heat exchanger High-ORC 15*a*) is from the Condenser 16 which operates on its own thermal fluid on its own loop. Although a pump or pumps would be required to circulate the thermal fluids, not all are shown or depicted but anybody skilled in the art would understand that a circulation pump would be required and where an appropriate location for the pump(s) would be.

Figure 14:
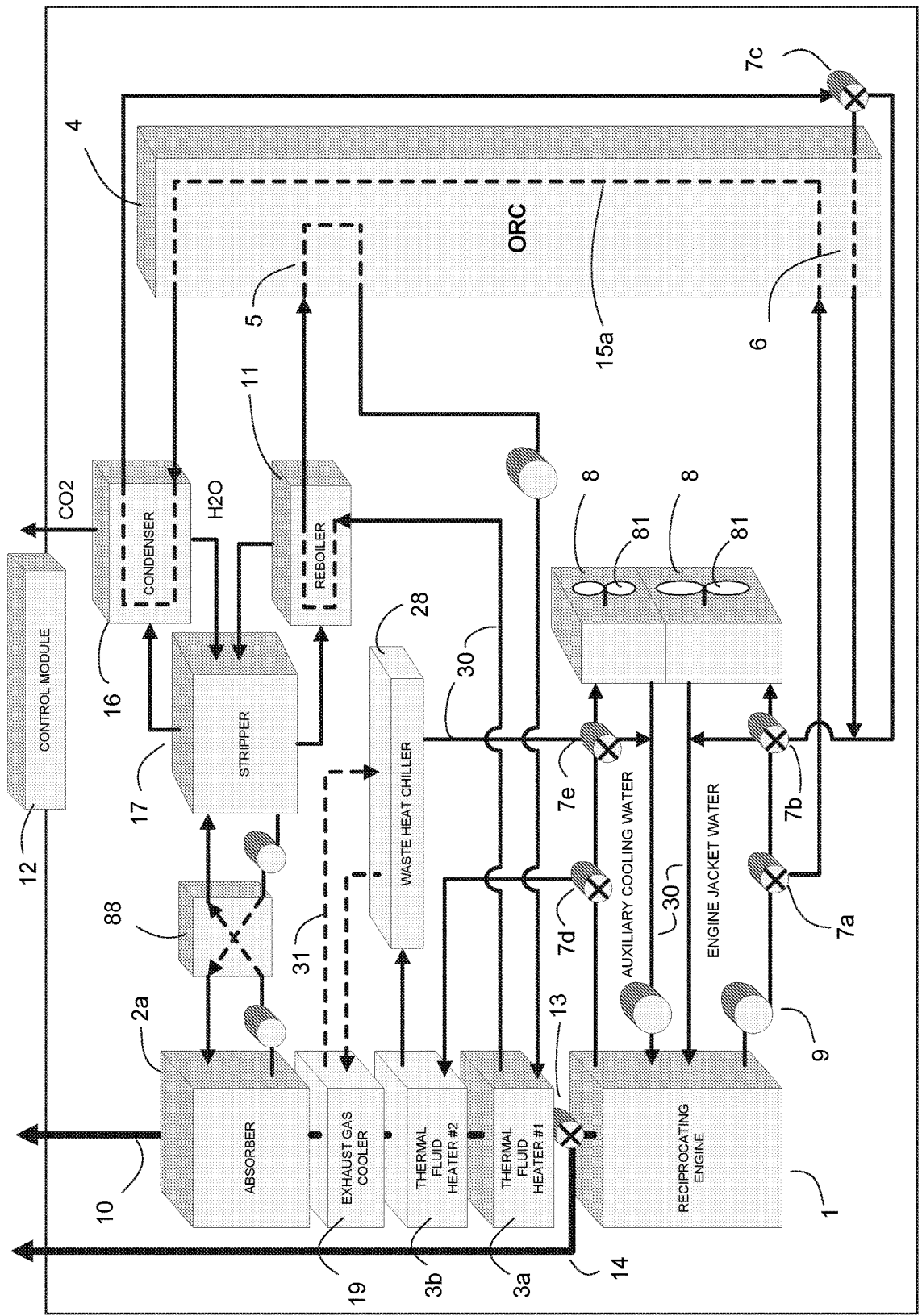
FIG. 14 shows an example of a system including a reciprocating engine with a radiator, coupled to an ORC system and an Absorption-based CCS system with circulating pumps, control valves, and multiple heat exchangers in the engines exhaust, wherein engine auxiliary cooling water may be circulated through an exhaust heat exchanger to pick up (stack) more useable thermal energy into the auxiliary cooling water, and wherein that thermal fluid flows to a waste heat chiller that cools the thermal fluid that may be used to cool the engine exhaust prior to it entering the Absorber, and wherein jacket water is circulated to the ORC system then discharged to the CCS' Condenser to collect more thermal energy under some aspects of the present disclosure.

FIG. 14 is similar to FIG. 13 which shows the use of auxiliary cooling water being used to provide energy to the Waste Heat Chiller 28 however in FIG. 14, additional waste heat energy is added to the auxiliary cooling from the Thermal Fluid Heater #2 exhaust stream to add energy to the auxiliary cooling water which is then transferred to the Waste Heat Chiller 28. As can be understood by one skilled in the art, adding (stacking) additional waste heat to the auxiliary cooling water provides a bump up in energy that can then be transferred to the Waste Heat Chiller 28 to produce chilled water (or thermal fluid) for cooling. This bump (stacking) of thermal energy to a lower grade thermal energy will provide more thermal energy that can then generate more cooling that will improve the overall system efficiency which will then improve the stripped gas (in this case CO2) recovery. In this example, thermal energy that had previously been shown (in FIG. 13) to be transferring thermal energy from Thermal Fluid Heater #2 to the ORC is now transferring that thermal energy to the auxiliary cooling water to increase (stack) the thermal energy being supplied/transferred to the Waste Heat Chiller 28, to be used to produce more chilled thermal fluid (water, in some cases) for system cooling that can then be used to cool the combustion exhaust gas prior to it entering the carbon-dioxide Absorber 2*a*. The more the exhaust gas is cooled (prior to entering the Absorber 2*a*) the more efficient the absorption process is. This concept is shown using auxiliary cooling water as the thermal fluid medium when coupled to a reciprocating engine however the same concept could be applicable to lube oil in a turbine 22 application being circulated to the exhaust's Thermal Fluid Heater 3 to pick up additional thermal energy to power a Waste Heat Chiller 28.

By using waste heat sources to generate cooling to apply to (in place of using that thermal energy in the ORC 4 or CCS 200) the cooling may improve the overall systems efficiency whether that be in CO2 or H2S extraction or the power generated by the ORC 4. The Control Module 12 should be programmed to make the determination of where the thermal energy is better applied and will then divert the thermal energy to where it is more advantageous. The provision of cooling/chilling from waste heat can be applied to any of the disclosed configurations in this application document. Meaning, waste heat is shown to generate cooling into the system for the intention of improving the overall gas treating (in this case CO2) recovery efficiency, ORC 4 shaft-power generation, and the overall system efficiency. Specifically, it shows an example of the engines auxiliary cooling water being used to generate cooling for the engine exhaust before entering the CCS 200 system, but as described in the previous paragraph, it can also be applied to other thermal fluids (e.g. engine jacket water, lube oil, thermal oil) being heated with exhaust energy from any combustion device in Thermal Fluid Heater 3 to then transfer that thermal energy to a Waste Heat Chiller 28 that will provide cooling to another part of the process to improve overall efficiency by reducing the cooling fan load at the various air coolers (e.g. Exhaust Gas Cooler Fan 18, Stripped Gas Cooler Fan 87, and Inter-stage Gas Cooler Fans 93).

As shown in FIG. 14, the system includes a reciprocating engine with a radiator, coupled to an ORC system and an amine-based chemical absorption CCS 200 system (comprised of an Absorber 2*a*, Cross Flow Heat Exchanger 88, a Stripper 17 with associated Reboiler 11 and Condenser 16) with circulating pumps 9, control valves 7, and multiple Thermal Fluid Heater 3 heat exchangers in the engines exhaust 10, wherein a Waste Heat Chiller 28 is connected to the engine 1 auxiliary cooling water system. The auxiliary cooling water is circulated through a Thermal Fluid Heater #2 3*b* to stack (pick-up) additional energy into the auxiliary cooling water stream before it is sent to the Waste Heat Chiller 28. The Waste Heat Chiller creates chilled thermal fluid (water) to be used in the cooling of the exhaust gas in Exhaust Gas Cooler 19, prior to the exhaust gas being discharged into the CCS system's Absorber 2*a* for CO2 gas extraction from the exhaust gas stream. The auxiliary cooling water is configured with the engines radiator 8 cooling system to operate either in parallel or in series with the radiator based on the valve configurations shown.

This configuration adds thermal energy from the exhaust stream to the auxiliary cooling water, in order to use the pooled thermal energy to drive the Waste Heat Chiller 28 to create cooling water to be used in the process to cool various streams such as exhaust gas prior to it reaching (or in, as part of) the Exhaust Gas Cooler 19, stripped gas prior to it reaching (or in, as part of) the Stripped Gas Cooler 23, natural gas that is compressed by a compressor prior to it reaching (or in, as part of) the Inter-stage Gas Cooler 92, or stripped gas compound that is compressed by a gas compressor prior to it reaching (or in, as part of) the Inter-stage Gas Cooler 92. Blending/stacking the two streams allows use of some of the waste heat energy in the auxiliary cooling water and waste heat from the exhaust, while also reducing the temperature of the engine exhaust prior to the exhaust entering the Exhaust Gas Cooler 19, thereby reducing the amount of cooling the Exhaust Gas Cooler Fan 18 has to provide to reach the target exhaust temperature (before entering the CCS 200 system's Absorber 2*a*). This blended/stacked higher-temperature auxiliary cooling water will create chilled water (thermal fluid) to be used to cool the engine exhaust prior to it entering the Absorber 2*a* in the Absorption-based CCS system (or Adsorber 2*d* in an adsorption-based system), wherein certain system controls may be provided by a Control Module 12 under an illustrative embodiment. The same concept of reducing energy consumption to cool the various gas streams with the work of a cooler fan can either be significantly reduced or eliminated by providing cooling from Waste Heat Chiller(s) that can provide the cooling not only the Exhaust Gas Cooler 19 but also to stripped gas prior to it reaching (or in, as part of) the Stripped Gas Cooler 23, natural gas that is compressed by a compressor prior to it reaching (or in, as part of) the Inter-stage Gas Cooler 92, or stripped gas compound that is compressed by a gas compressor prior to it reaching (or in, as part of) the Inter-stage Gas Cooler 92.

The Control Module 12 can perform calculations to determine whether the waste heat is better used for chilling via a Waste Heat Chiller 28 than in the ORC 4, with the determining factor being on improving the overall system efficiency. Should the Control Module 12 determine that the stripped gas (CO2 or H2S) recovery can be increased by using more of the engine exhausts thermal energy for chilling purposes, and as a result less energy can be sent to the ORC 4 (e.g., Thermal Fluid Heater #1) and more extracted into the chilling process (e.g., Thermal Fluid Heater #2) by design of the heat exchanger sizing or by diverting exhaust gas flow. Potential exists for the system to self-balance the cooling load with the amount of energy recovered from the exhaust such that the energy balance point between the two streams can be flexible. Meaning, the Thermal Fluid Heater #1 can be sized to send the appropriate amount of thermal energy to the Reboiler 11 and the balance or thermal energy (above the return temperature to the engine) being spilled to the ORC 4. Similarly, the back end of the Thermal Fluid Heater #2 can have a moving exchange point such that adequate cooling is provided by the Waste Heat Chiller 28 such that any surplus thermal energy collected by Thermal Fluid Heater #2 can then be transferred to the ORC system for conversion into additional shaft horsepower.

Also, by using the engines auxiliary cooling water as the thermal fluid, final trimming of the return temperature to the engine can be achieved by diverting valves diverting the auxiliary cooling water to the radiator 8 or directly back to the engine, or a blend thereof to meet the amount of thermal energy that is required to be extracted from the auxiliary cooling water.

In some examples, anywhere where the auxiliary cooling water or the engine jacket water are shown as the thermal fluid to be used to transfer thermal energy around, an independent thermal fluid can be used that is not returned to the engine 1. By isolating the thermal fluid away from the engine, it provides a level of protection to the engine, but also creates a situation where the amount of energy dissipation has less control (due to the isolated thermal fluid not being connected to the engine radiator that has the inherent and built-in ability to dissipate heat).

Figure 15:
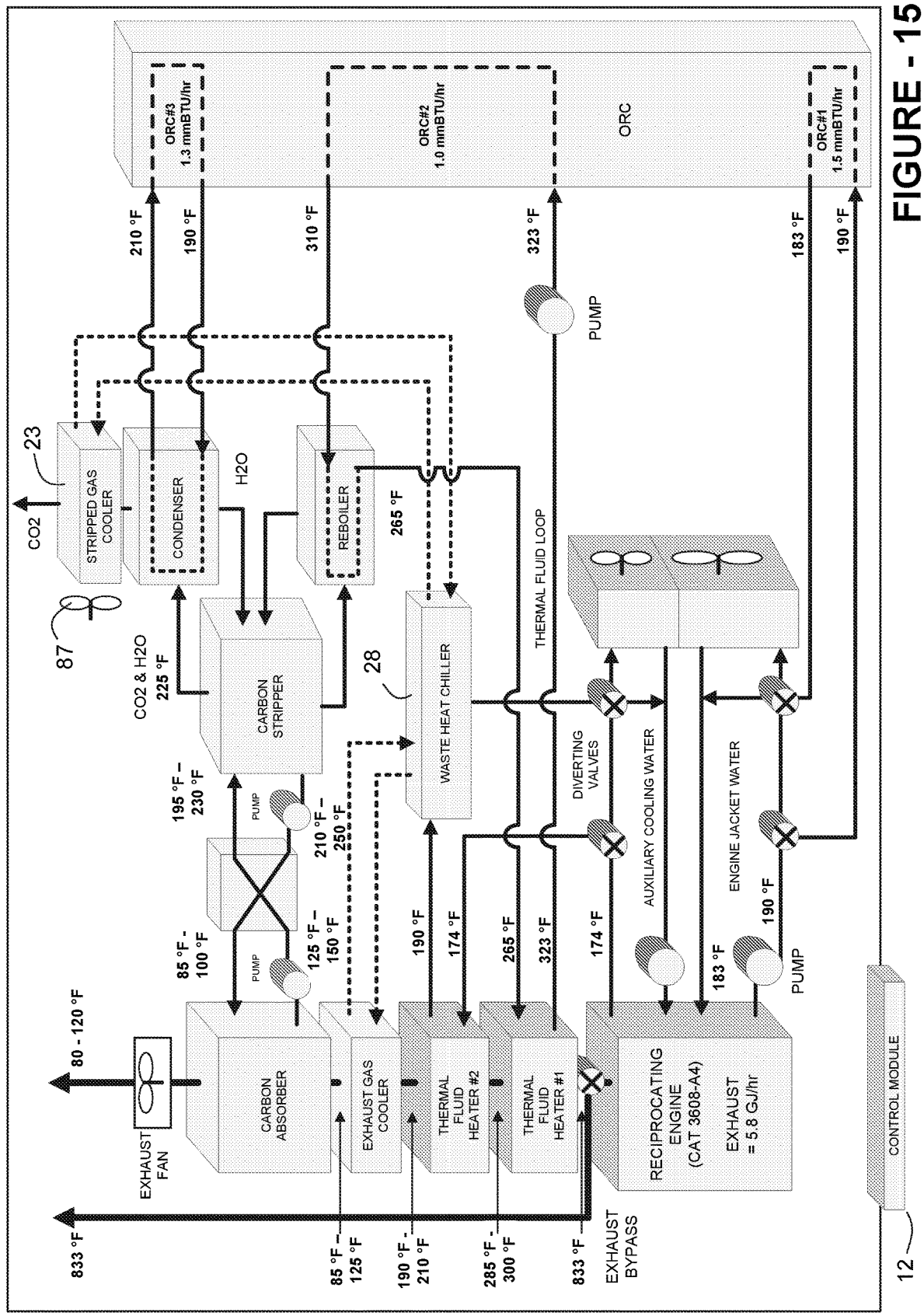
FIG. 15 shows a similar configuration to that shown in FIG. 14 with the addition of supplying cooling to the CO2 Stripped Gas Cooler, and further illustrating examples of the possible temperatures and device duties that the system could be operated at under some aspects of the present disclosure shows a similar configuration to that shown in FIG. 14 with the addition of supplying cooling to the CO2 Stripped Gas Cooler.

FIG. 15 depicts possible temperatures and operating duties of the various heat exchangers that could be experienced in the configuration. The example of FIG. 15 is similar to what is shown in FIG. 14, with the addition of a CO2 Stripped Gas Cooler 23 added to the system. In FIG. 15, chilling capacity expanded to the Waste Heat Chiller 28 to provide cooling to both the (CO2) Stripped Gas Cooler 23, as well as the Exhaust Gas Cooler 19. Should adequate cooling be provided to the Exhaust Gas Cooler 19, any surplus cooling capacity can be diverted and applied to any number of cooling applications in the system. The Control Module 12 could perform these calculations on an ongoing basis and divert chilled cooling water to (or thermal fluid from other devices can be diverted to the Waste Heat Chiller 28) in order to provide cooling.

Figure 16:
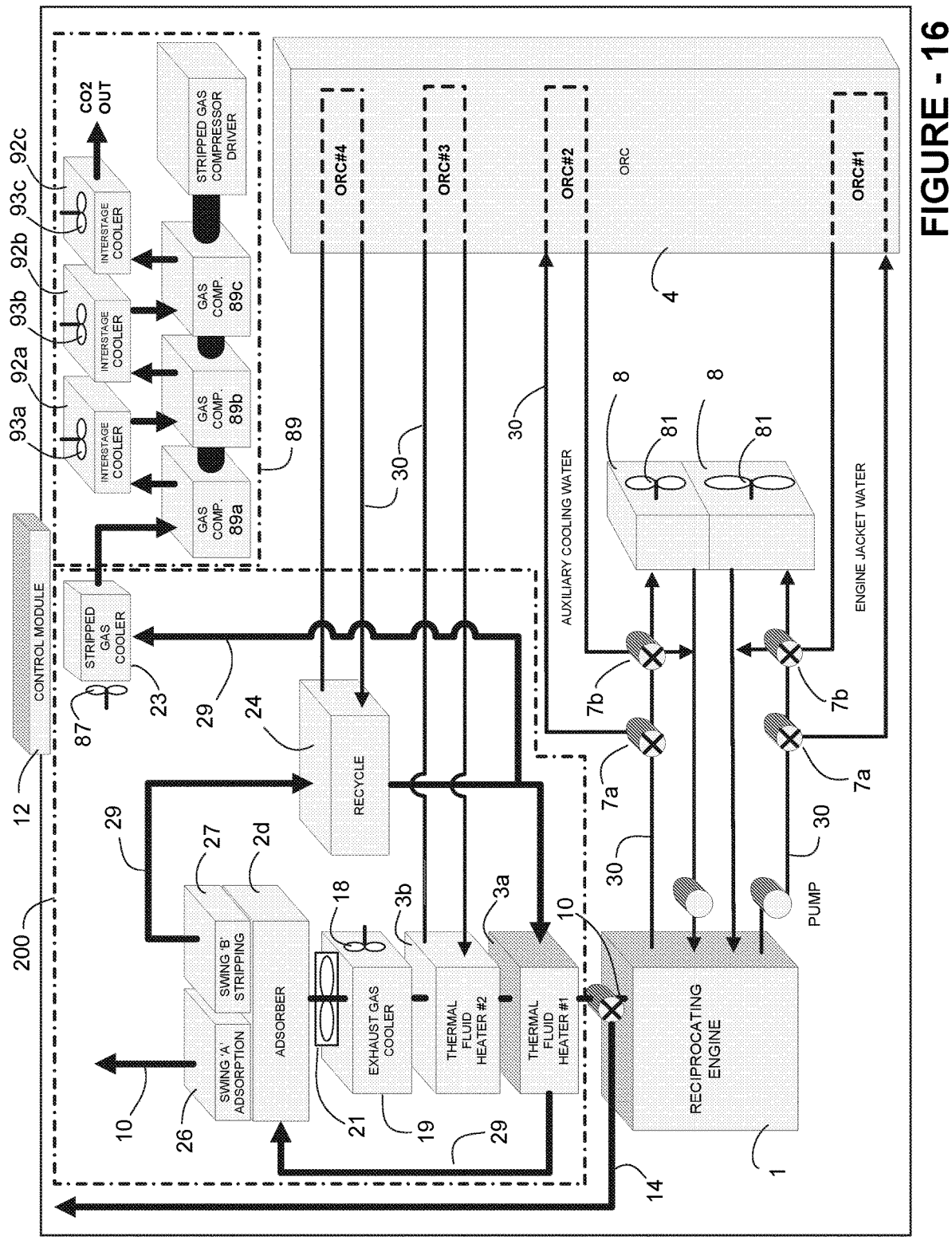
FIG. 16 illustrates a system including a reciprocating engine with a radiator, coupled to an ORC system and a temperature/pressure Swing Adsorption CCS system with circulating pumps, control valves, and multiple heat exchangers in the engines exhaust, and a CO2 gas compressor configuration, wherein certain system controls may be provided by a control module under some aspects of the present disclosure.

FIG. 16 introduces Temperature Swing Adsorption (TSA) or Pressure Swing Adsorption (PSA) CCS system 200. It uses the principal of adsorbing CO2 out of the exhaust stream of a combustion device. In this case, the combustion device is a reciprocating engine. It should be noted that the TSA or PSA adsorption systems shown in FIGS. 16 through 21 and FIGS. 24 through 28, are applicable to recover H2S from a 'sour' off-market specification gas stream(s), similar to that shown in FIG. 32.

It should be noted that the Adsorber 2*d* in this example has appended to it two modules that alternate functions when they 'swing' from one function to the other. During the first swing the Swing 'A' Adsorption module is Adsorbing CO2 and Swing 'B' module is being scrubbed of the CO2 that has accumulated on the adsorption material during the previous swing. When the next swing takes place, the roles of the two devices reverses such that Swing 'A' module is now being scrubbed of the CO2 accumulated over the previous swing and Swing 'B' module is now functioning as an Adsorber collecting and accumulating CO2 onto its adsorption material. In the TSA or PSA adsorption systems shown in FIGS. 16 through 21, FIGS. 24 through 28 and FIG. 32, only one swing is being shown consistently with the understanding that when the process swings to alternate the two modules' functions, the associated piping and configurations also adjust such that the easiest way to understand the goings on is to change the labeling on the two modules where "Swing 'A'" module gets labelled "Swing 'B'". The same will apply to the next swing, where the modules reverse back to their original position as described in the first swing. Meaning, as the process swings, the associated piping connections, their labeling, and their function also swings.

In some examples, the Adsorber 2*d*, may have appended to it two modules, Swing 'A' Adsorption module and the Swing 'B' Stripping module, both of which are an integral part of the Adsorber 2*d*. These modules perform the actual function of the Adsorber 2*d* (i.e., adsorbing and stripping, respectively) and the role of the module labeled "Adsorber 2*d*" is to act as a diverting valve to direct the flow of the exhaust gas in a CCS application (or natural gas when in a GSS application) to the Swing 'A' Adsorption module, and direct the stripped gas (CO2 or H2S, as the case may be) to the Swing 13' Stripping module. The details of this function are not depicted in the figures nor is the detail of this function described with each example or explanation, however it should be understood by one skilled in the art that this is the case. Therefore, for any descriptions describing that the gas flow is directed to the Adsorber 2*d*, it is understood that the Adsorber 2*d* will divert the appropriate gas to the appropriate module.

It should be further noted that this Adsorption process is applicable to recover H2S from a 'sour' off-market specification gas streams, similar to that shown in FIG. 32.

Figure 22:
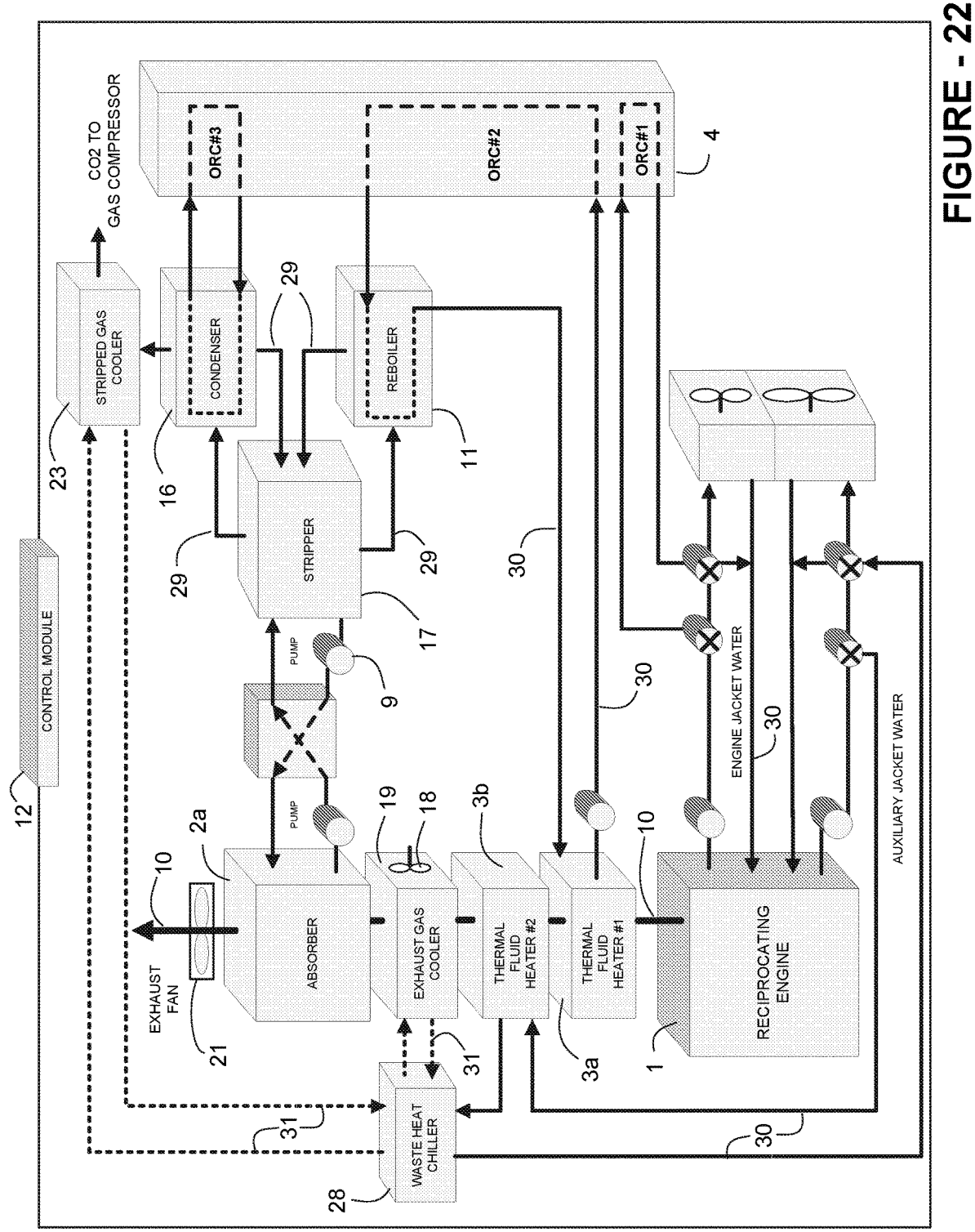
FIG. 22 shows an absorption-based CCS system with thermal energy recovery from the engine auxiliary water, with it being flowed through a heat exchanger in the exhaust system order to add/stack thermal energy to the auxiliary cooling water, before it is then discharged to the waste heat chiller to provide cooling to both an Exhaust Gas Cooler and a CO2 Stripped Gas Cooler, under some aspects of the present disclosure.
Figure 23:
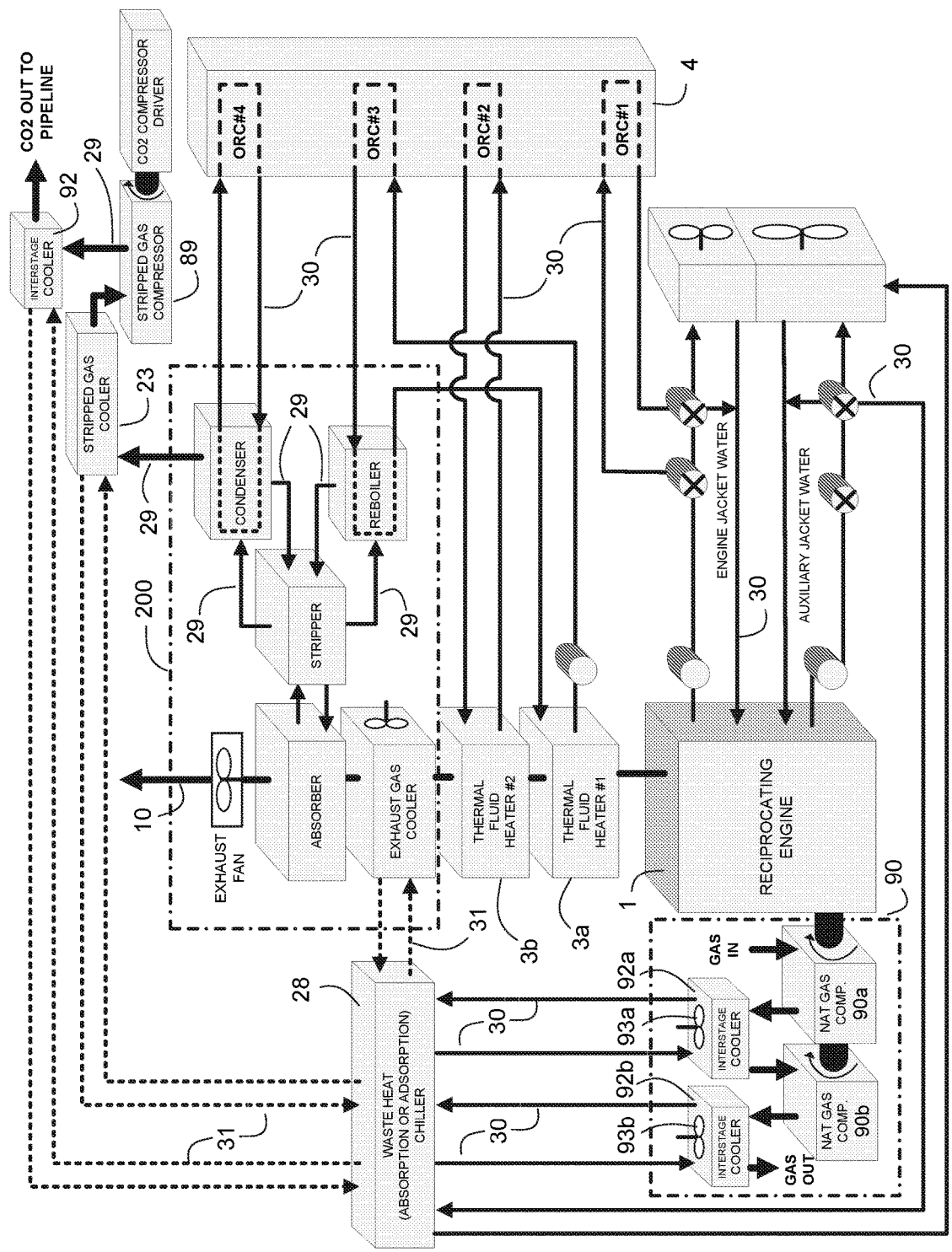
FIG. 23 shows a similar configuration as disclosed in FIG. 21 with an absorption-based carbon capture system in place of an adsorption-based carbon capture system, where in FIG. 21 the adsorption-based system is configured for recovery of thermal energy from the engine exhaust discharging from the carbon adsorber via Swing 'A' Adsorption module (and Swing 'B' Stripping module on alternate swings), in FIG. 23, the absorption-based CSS is providing thermal energy to the waste heat chiller from the auxiliary cooling water, the heat of compression from the natural gas compressor (for the compressed gas being diverted to the inter-stage gas coolers, and then providing cooling to the exhaust gas entering the exhaust gas cooler, stripped gas entering the stripped gas cooler and the stripped gas entering the inter-stage gas coolers (that are associated with the stripped gas compressor), under some aspects of the present disclosure.

The examples shown in FIG. 16 through FIG. 28 (with the exception of FIG. 22 and FIG. 23) show the carbon adsorption-based CCS 200 process in various configurations, coupled to various combustion devices such as reciprocating engines, turbines and boilers/furnaces. It should be noted that boilers and furnaces are treated interchangeably in this document because they have similar exhaust gas streams relative to the other alternatives (such as turbines or reciprocating engines), and thus are labeled as combustion device 20. FIG. 22 and FIG. 23 show the Absorption-based, chemical absorption amine, carbon recovery CCS 200 system.

FIG. 16 shows a reciprocating engine with a radiator, coupled to an ORC 4 system and an adsorption-based CCS system 200 (comprised of a: Exhaust Blower Fan 21 to help draw the exhaust gas through the various restrictive components added into the exhaust pipe 10 system, Adsorber 2d to extract CO2 from the exhaust stream, a Swing 'A' Adsorption module 26 of the Adsorber 2d which collects CO2 onto an adsorber material, and Swing 13' Stripping module 27 of the Adsorber 2d where the collected CO2 (from the previous swing) is now being removed/stripped from the adsorber material in this module by using an inert gas such as nitrogen, or as shown in the cases and other Figures in this document, using the recycled CO2 gas itself to purge the CO2 off of the adsorption material, including an associated CO2 Recycle 24 heat exchanger which is used to extract thermal energy from the recirculating CO2 stream (so that the thermal energy collected from the recirculating CO2 stream can be passed to the ORC 4 to cross exchanger with the ORC propellant) with circulating pumps, control valves, and multiple Thermal Fluid Heater 3 heat exchangers in the engines exhaust, and a (CO2) Stripped Gas Compressor 89 configuration as described in the previous sections, wherein certain system controls may be provided by a Control Module 12 under this illustrative embodiment. It is to be noted that although the Figures and words in the document refer to CO2 as the purge gas on the alternating vent swings with the Adsorption based CCS 200, any gas can be used for purging, but if using a gas that is not the same as the gas being stripped (in this case CO2), then that gas will have to be separated out of the stripped (CO2 in this case) gas stream that is recovered by the system prior to the CO2 being compressed. Therefore, when terminology such as CO2 Recycle 24, or CO2 Conduits 29, or CO2 Gas Circulating Device 32 are used, the specificity of "CO2" in the labelling can be replaced with "Purge Gas" or "Stripped Gas", considering that any inert gas that could be used to strip/purge the CO2 off of the Adsorber 2d. Thereby, 'Purge', or 'Purge Gas', or 'Stripping Gas' or 'Stripped Gas' Cooler 23, Recycle 24 heat exchanger, or 'Purge Gas' or 'Stripped Gas' Recovery 25 heat exchanger, 'Purge' or 'Stripped' Gas Conduits 29, or 'Purge' or 'Stripped' Gas Circulating Device 32 would be applicable terms to use.

Further, if using TSA or PSA is being used in a GSS application to extract H2S and/or CO2 gas from a 'sour' or off-market specification natural gas stream, then typically any gas (including H2S or CO2) could be used to strip the H2S and/or CO2 compounds from the adsorption material because the stripped gas (which usually includes H2S and some CO2 gas as well) is typically disposed of into an acid gas disposal well. Therefore, because it is being disposed of into a disposal well, any gas can be used to scrub the H2S/CO2 gas in a GSS application because contamination of that stripped gas does not matter, however in a CCS application where CO2 is being extracted, then it is desirable to use CO2 gas for stripping purposes in order to keep the CO2 from being contaminated with another gas.

It should be noted that when one of the modules appended to the Adsorber 2d is being stripped of accumulated CO2, the other module may be functioning as an adsorber collecting and accumulating CO2 onto its adsorption material, and when the process "swings" the role of the two modules reverses.

The adsorption-based CCS system can be a temperature swing or pressure swing adsorption system in some examples. The combustion device (in this case a reciprocating engine) exhaust gases pass through the exhaust pipe(s) 10 through multiple Thermal Fluid Heater heat exchangers 3a, 3b, to the Adsorber 2d and is then directed into the Swing 'A' Adsorption module in order to adsorb the CO2 gas out of the exhaust stream, all the while Swing 'B' is being stripped of the CO2 is has been collecting on the previous swing. After a period of time, the systems swing/alternate such that the exhaust gas flow is now swung/redirected by Adsorber 2d to the Swing 'B' Stripping module 27 where the CO2 is now being adsorbed in this adsorber, and Swing 'A' Adsorber is being scrubbed of the CO2 it had collected in the previous swing. In this example, the nomenclature was selected for the sake of communicating the function for one of the swing states. In other words, the two vents alternate functionality between adsorbing and stripping, such that the removed CO2 from the engine exhaust stream is collected on the adsorption material on the adsorber, while the other swing has the CO2 being stripped/scrubbed/cleaned off of the adsorber and collected into the 'Stripped' Gas Conduits 29. The CO2 removed from the module being stripped may then be collected and circulated to the CO2 Recycle 24 heat exchanger where it is cooled and some of the CO2 is recycled through the CCS 200 process in order to increase its concentration of CO2 and the balance of the circulating CO2 is then discharged from the CCS 200 system towards the Stripped Gas Cooler 23. The waste heat from the CO2 Recycle 24 is recovered and transferred to be used in the ORC 4 (shown as "ORC #4" conduit/heat exchanger) for the purpose of any one of preheating, evaporating or superheating the ORC propellant. The exhaust gas from the combustion device may discharge from the adsorbing module with the majority of the CO2 removed from the exhaust gas) is then discharged to atmosphere.

In some examples, after the CO2 discharges from the CO2 Recycle 24 heat exchanger, it will be cooler than the temperature at which it entered the CO2 Recycle 24 heat exchanger, and that CO2 gas will then split its flow along two paths; the first path will discharge a slip stream of concentrated CO2 from the CCS 200 process to the CO2 Stripped Gas Cooler 23 (where the CO2 will be cooled) prior to entering the (CO2) Stripped Gas Compressor 89, the second stream will recirculate back to the stripper to remove more CO2 off of the adsorbing material. For the first path, the circulating CO2 may be 2d→27→29→24→29→23→89→atmosphere. The gas compressor at the end of the discharging slip stream of stripped gas is comprised of: 1) a compressor driver (which is usually a gas driven reciprocating engine, or can be an electric motor driven compressor, or can be the ORC's expander can drive the compressor directly instead of generating electricity with the shaft horsepower generated by the ORC expander component), 2) at least one stage of gas compression, and 3) a compressed gas cooler that corresponds to each compressor stage (Inter-stage Gas Cooler 92), to remove the heat of compression from the compressed gas (where there are multiple stages of gas compression required, there will be a corresponding gas cooler stage). For the second path beyond the split in flow, the majority of that gas will continue circulating the scrubbing gas through the $CO_2$ piping along the path of 2d→27→29→24→29→3a→29→2d, in order be recirculated through the stripping process such that adequate amounts of stripping gas are available to perform that function in the stripping module. The other/second path will circulate the cooled CO2 into the Thermal Fluid Heater #1 (also referred to as TFH #1) 3a, where the CO2 stream will pick up thermal energy from the exhaust into the CO2, and diverted to the CCS 200 Adsorber 2d which then diverts the scrubbing gas into the 'Stripping' module in order to dislodge/strip the CO2 collected on the module. Meaning, if the Swing 'B' Stripping module 27 is currently being stripped, the CO2 gas will be diverted through Swing 'B' Stripping module 27, and if Swing 'A' Adsorption module 26 is in the stripping mode, then the CO2 gas will be diverted to that module by the Adsorber 2d. The CO2 loop restarts from this point, and the CO2 continues recirculating through the Adsorber 2d, on so on.

The heat transfer to the ORC 4 system in FIG. 16 is shown with 4 heat sources feeding thermal energy into the ORC process at ORC #1, ORC #2, ORC #3, and ORC #4, similar to that shown in FIGS. 8, 17, 18, 19, 23 and 28 that may be labeled Low-ORC 6, Mid-ORC 15a, Mid-ORC 15b and High-ORC 5. The 4 thermal energy sources in this configuration are: 1) engine jacket water which corresponds with heat transfer to "ORC #1", 2) engine auxiliary cooling water which corresponds with heat transfer to "ORC #2", 3) exhaust energy recovered through Thermal Fluid Heater #2 which corresponds with heat transfer to "ORC #3", and 4) CO2 reject heat dissipated in CO2 Recycle 24 heat exchanger (as part of the reject heat from CCS 200) which corresponds with heat transfer to "ORC #4". As mentioned previously, the nomenclature assigned to "ORC #1", "ORC #2", "ORC #3", and "ORC #4", do not necessarily represent or reflect the buildup of heat, nor the sequence in which the transferred energy to the propellant is utilized in the ORC, nor do they necessarily correspond to the other terminology used (e.g., High-ORC (5), Mid-ORC (15) and/or Low-ORC (6)) in any particular order, other than that the terminology is interchangeable.

Also shown in the example of FIG. 16 is the addition of a (CO2) Stripped Gas Compressor 89. Although not shown, the heat of compression from the CO2 compressor can be recovered in the ORC 4 system or in a Waste Heat Chiller 28 system, to the extent of the integration of the system with the ORC 4, the Waste Heat Chiller 28 and the CCS 200 (similar to Natural Gas Compressor 90 waste heat integration shown in FIG. 12) but the Natural Gas Compressor 90 is not shown in FIG. 16. Regarding integrating a CO2 Adsorption-based process in place of a CO2 Absorption-based process, the heat recovery and ORC processes remain relatively similar, where the two systems both have combustion device exhaust being cooled prior to entry into the CCS 200 system, where the combustion exhaust gas has removed the vast majority of the CO2, with the CCS 200 system discharging the stripped CO2 gas from the system, and thermal energy (heat) is distributed to a variety of heat sinks such as the ORC 4 system, the Waste Heat Chillers 28 or the CCS 200 system itself. Heat recovery from the CCS 200 system is shown in the various configurations and applicable and interchangeable between the two CO2 recovery systems. In other words, the reject heat from the CCS 200 (CO2) gas stripping and heat recovery system can be applied in the same manner as described for the other combustion devices described in this application.

Figure 17:
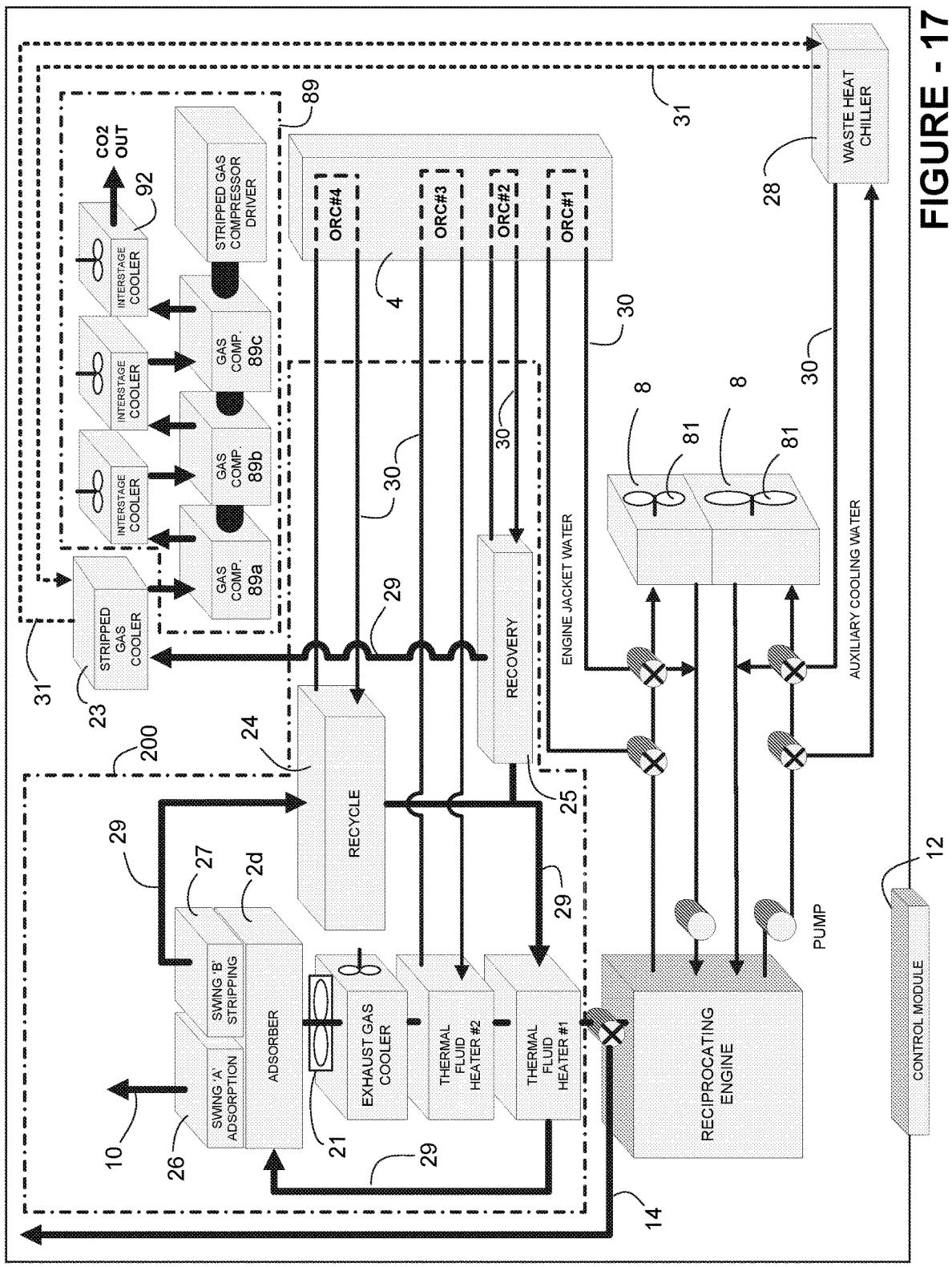
FIG. 17 shows a similar configuration as disclosed in FIG. 16, with the addition of a CO2 Recovery heat exchanger inserted to recover thermal energy from the CO2 stream leaving the CCS system to transfer that thermal energy to the ORC, and the addition of a waste heat chiller recovering thermal energy from the reciprocating engines auxiliary cooling water, which is used to cool the CO2 passing through the Stripped Gas Cooler, before the CO2 enters the stripped gas compressor for transport under some aspects of the present disclosure.

FIG. 17 is similar to the example of FIG. 16 with the addition of: 1) the (CO2) Recovery 25 heat exchanger, which is inserted to recover thermal energy from the CO2 slip stream that will discharge from the CCS 200 system. In this example, the slip stream of CO2 gas flows from the main recirculating CO2 gas stream. The slip stream can be diverted away from the main recirculating CO2 gas stream anywhere in the recirculating CO2 loop that circulates between the Adsorber 2d, Swing 'B' Stripping 27, the Recycle 24, and Thermal Fluid Heater #1 3a, and back to Adsorber 2d (e.g., 2d→27→29→24→29→3a→29→2d). In other words, the diversion to Recovery 25 can be tapped into the process upstream of Recycle 24 heat exchanger or downstream of the Recycle 24, as shown, and 2) the addition of a Waste Heat Chiller 28 recovering the thermal energy to be dissipated from the reciprocating engines auxiliary cooling water (which is then used to cool the CO2 in the CO2 Stripped Gas Cooler 23, before the CO2 enters the (CO2) Stripped Gas Compressor 89, for transport). The waste heat recoverable from the (CO2) Recovery 25 heat exchanger can be used in the ORC 4 (shown via ORC #2 heat exchanger), amongst other locations in the ORC 4 or used in a Waste Heat Chiller 28. It is contemplated in the present disclosure to use that thermal energy (also known as "heat" throughout this document) to contribute to or drive a Waste Heat Chiller 28;

Similar to the example of FIG. 16, FIG. 17 also shows 4 heat sources feeding thermal energy into the ORC 4 process (similar to that shown in FIGS. 8, 18, 19, 23 and 28, where the ORC is coupled to an absorption-based CCS 200 or an adsorption-based CCS 200, as the case may be), however the 4 thermal energy sources in this configuration are different in that: 1) engine jacket water is diverted via Thermal Fluid Conduits 30 and control valves 7, to the ORC 4, which corresponds with heat transfer to "ORC #1" in the ORC 4, 2) thermal energy recovered from the CO2 that is to be discharged from the CCS 200 system (via CO2 Gas Conduits 29 on its way to being compressed) through the (CO2) Recovery 25 heat exchanger, where the thermal energy is transferred to "ORC #2" in the ORC 4, 3) exhaust energy recovered through Thermal Fluid Heater #2 and transferred to the ORC 4 via Thermal Fluid Conduits 30, which corresponds with heat transfer to "ORC #3" in the ORC 4, and 4) thermal energy recovered from the CO2 that is recirculated through CO2 loop, that includes Recycle 24 heat exchanger (as part of the reject heat from CCS 200) and that thermal energy is transferred via Thermal Fluid Conduits 30, which corresponds with heat transfer to "ORC #4" in the ORC 4.

Although not shown, thermal energy from the Recovery 25 heat exchanger can be diverted (and transferred) to drive a Waste Heat Chiller 28 (not shown) in place of that thermal energy being transferred to the ORC 4.

It should be noted that where possible, a thermal fluid is the preferred method to transfer thermal energy throughout the system because the thermal conductivity of liquid exchange (liquid-to-liquid) is more efficient than gas exchange (gas-to-gas), with gas-to-liquid having heat transfer efficiency somewhere in between.

In this example, the engine 1 auxiliary cooling water is being used to drive a Waste Heat Chiller 28 that is providing cooling to a thermal fluid (could be water, amongst various options), via Cooled Thermal Fluid Conduits 31, to the (CO2) Stripped Gas Cooler 23 in order to lower the temperature of the CO2 gas prior to it entering the (CO2) Stripped Gas Compressor 89.

It should be noted that the Cooled Thermal Fluid Conduits 31 are not necessarily bound to be transferring cold liquid from the Waste Heat Chiller(s) 28 to the devices requiring cooling but could also be conduits to transfer the hot gas or hot liquid from the devices that require the cooling, to the Waste Heat Chiller 28. Meaning, the hotter medium can be conveyed to the Waste Heat Chiller 28 in place of the chilled thermal fluid (water/liquid) being conveyed to the device requiring cooling.

Figure 18:
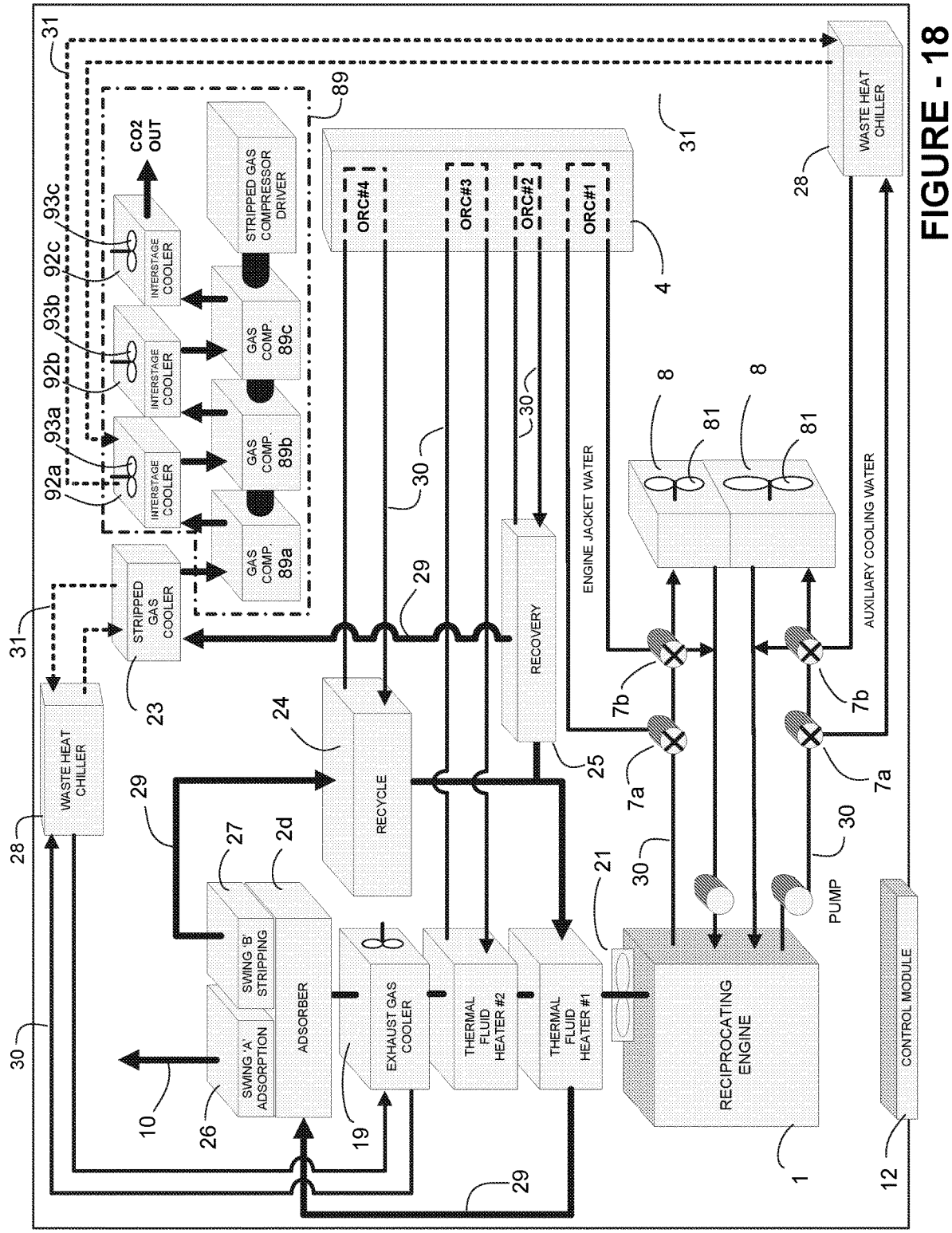
FIG. 18 shows a similar configuration as disclosed in FIG. 17 with the waste heat chiller now extracting thermal energy from the auxiliary cooling water in order to provide cooling to the first stage of compression on the CO2 compressor, plus the addition of a second waste heat chiller recovering the thermal energy from the exhaust gas cooler (a heat exchanger), where extracting thermal energy from the exhaust gas stream reduces the amount of exhaust gas cooling that will be required by the exhaust gas cooler fan, and the waste heat chiller output duty is used to cool the CO2 prior to it entering the Stripped Gas Cooler (also reducing the Stripped Gas Cooler Fan duty) before it then enters the stripped gas compressor for transport, under some aspects of the present disclosure.

The example of FIG. 18 is similar to the example of FIG. 17 however, a second Waste Heat Chiller 28 is added to the configuration. The first Waste Heat Chiller 28 that was driven by the reject heat from the auxiliary cooling water now provides cooling to the first stage of compression on the (CO2) Stripped Gas Compressor 89 via Cooled Thermal Fluid Conduits 31. The application of this concept is not limited to the first stage of compression and could be applied to all stages of compression. The second Waste Heat Chiller 28 recovers thermal energy from the Exhaust Gas Cooler heat exchanger and provides cooling via Cooled Thermal Fluid Conduits 31 to the (CO2) Stripped Gas Cooler 23 before the CO2 enters the (CO2) Stripped Gas Compressor 89 for transport. The configuration only shows cooling being provided to the first stage of compression on the (CO2) Stripped Gas Compressor 89, however in reality, if the Waste Heat Chiller 28 has enough chilling capacity, that chiller could provide cooling to all of the stages of compression of the CO2 compressor, in addition to other gas streams that require cooling. In addition, other Waste Heat Chiller(s) 28 can provide cooling to the other stages of compression.

In FIG. 18, the location of Exhaust Blower Fan 21 has been moved to illustrate it operating as a forced draft fan (from an induced draft fan as has been previously shown in other configurations). The new location shown is on the engine's exhaust discharge, where the engine exhaust would flow via Exhaust Pipe 10 prior to the exhaust entering the Thermal Fluid Heater #1. Location matters in that a cooler exhaust temperature will be less taxing on the fans life expectancy and therefore locating it in a cooler gas stream is better, however, there may be reasons to locate the Exhaust Blower Fan 21 in the higher temperature exhaust stream. It should also be noted that the system is not limited to a single Exhaust Blower Fan 21. Further yet, the Exhaust Blower Fan 21 is not necessarily limited to the understanding of a traditional fan with fan blades. It can include a variety of other configurations such as a blower, compressor, etc.

FIG. 18 also shows waste heat recovery from the Exhaust Gas Cooler 19 heat exchanger (along with the exhaust gas cooler fan 18) to a Waste Heat Chiller 28. The exhaust gas may take as much waste heat energy to convert to cooling as the Waste Heat Chiller 28 is configured for, and then the remaining thermal energy that has to get removed from the exhaust gas stream (prior to entering the CCS 200 Adsorber) may be extracted by the Exhaust Gas Cooler Fan 18, under the control of Control Module 12. The exhaust gas cooler fan 18 may be controlled in order to extract the desired amount of energy to achieve the exhaust gas temperature target such that the CCS system 200 will perform optimally. This configuration is slightly different from the ones shown previously in that it relies on split cooling from the Exhaust Gas Cooler Fan 18 and the Waste Heat Chiller 28. In the other configurations, the thermal energy supplied to the Waste Heat Chiller 28 is direct and controlled. In this case, the energy extracted is determined by the cooling load and finished off with the exhaust gas cooler fan 18.

Additionally, it should be noted that the Exhaust Gas Cooler 19 may require a heat exchanger that can utilize chilled thermal fluid to exchange with the exhaust gas passing through it, as well as have a fin-tubed section that would be associated with the Exhaust Gas Cooler Fan 18 that would have exhaust gas pass through it and be cooled by air exchange across it.

It should be noted that the Exhaust Gas Cooler 19 serves a plurality of functions; it extracts thermal energy from the exhaust gas (prior to the exhaust entering the Adsorber or Absorber) to the Waste Heat Chiller 28 via a gas-to-liquid heat exchanger, which then diverts this heated thermal fluid to the Waste Heat Chiller 28, and then the Waste Heat Chiller 28 delivers cooling (via a cooled thermal fluid) to another stream in the process that requires cooling (e.g. a fin-tube heat exchanger can be inserted into the CO2 exhaust gas flow path prior to the gas entering the Stripped Gas Cooler 23 to provide cooling to that CO2 gas, which will then reduce the electrical load on the Stripped Gas Cooler Fan 87).

This configuration particularly applies to circumstances where a Waste Heat Chiller 28 is applied in the system. It reduces the amount of cooling the (air) cooler will have to provide to the heat recovery side of the Waste Heat Chiller, and it does the same (reduces the amount of cooling the system will have to provide) on the other end of the Waste Heat Chillers output side.

In other words, when using Waste Heat Chillers in the process, they not only reduce the thermal energy in the stream which they recover from (which then reduces the amount of cooling the system has to provide), they also do the same on the other end of the Waste Heat Chillers system by providing cooling to the gas/liquid stream so the cooler can do less work.

In the other described applications of Waste Heat Chillers, if the Waste Heat Chiller is recovering waste heat from a gas, then a gas-to-liquid heat exchanger may be used on the inlet side of the Waste Heat Chiller, and if the waste heat is a liquid, then that liquid can be diverted directly to the Waste Heat Chiller or another heat exchanger can be inserted in between the source heat and the Waste Heat Chiller. Similarly, on the outlet side of the Waste Heat Chiller, a chilled thermal fluid may flow to either a liquid-to-gas heat exchanger or to a liquid-to-liquid heat exchanger to cool the other fluid, however, the liquid that is going to be cooled by the chilled thermal fluid from the Waste Heat Chiller could be diverted directly into the Waste Heat Chiller to cool that fluid flow directly. In other words, the medium that is to be cooled could be flowed/piped through the Cooled Thermal Fluid Conduits 31 (bringing the heat to the Waste Heat Chiller 28 in place of bringing chilled water to the medium looking to be cooled), then that heat medium will be run through the Waste Heat Chiller 28 to cool that stream before returning it to its origin.

Pumps are inherent in moving fluids throughout any of the systems disclosed herein, and one skilled in the art would readily understand this concept and would understand where they should be located. Accordingly, specific references to pumps is not made herein for the purposes of brevity.

Figure 19:
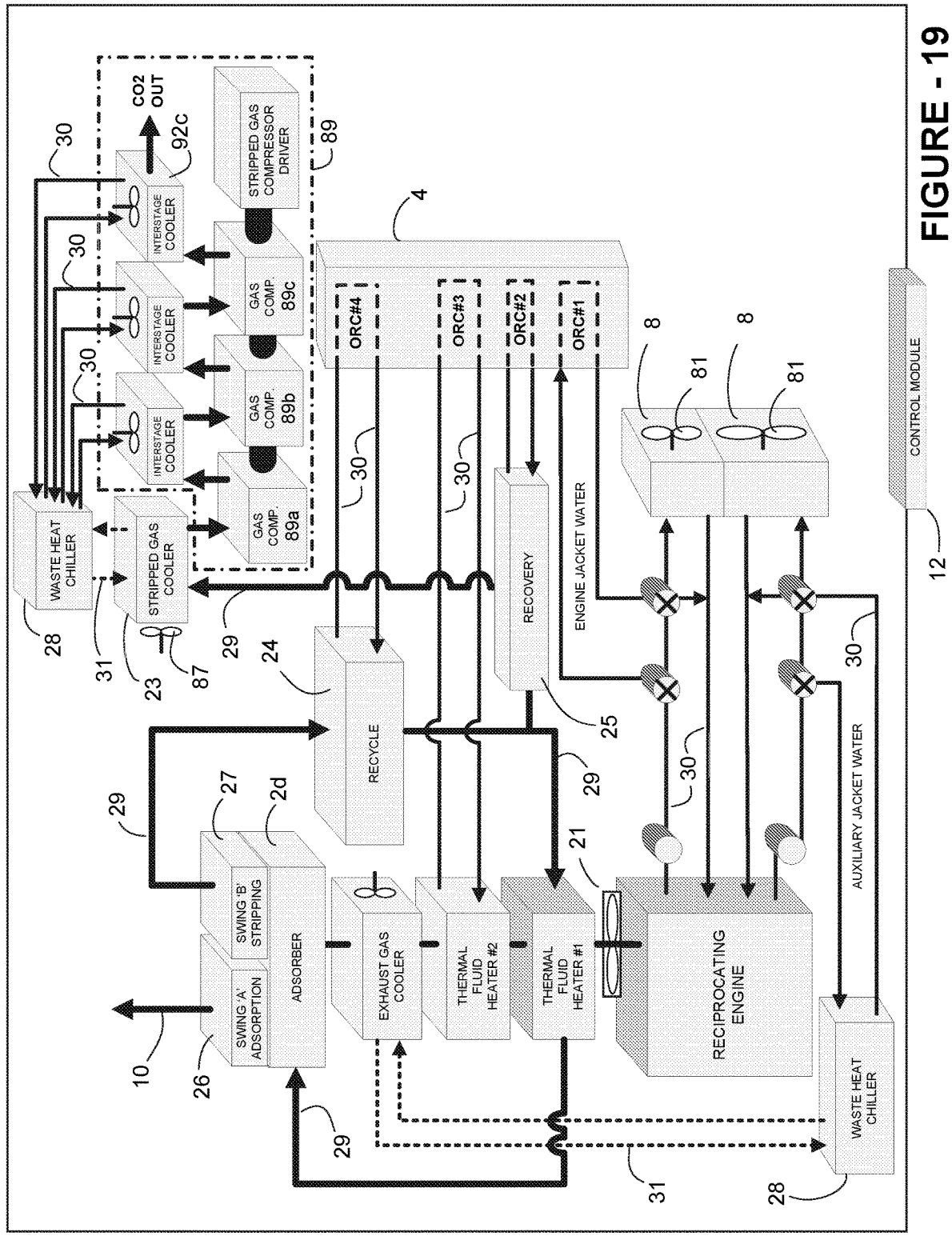
FIG. 19 shows a similar configuration as disclosed in FIG. 16, with the addition of a CO2 Recovery heat exchanger that is inserted to recover thermal energy from the CO2 stream leaving the CCS system, and the addition of a waste heat chiller recovering the thermal energy to be dissipated from the reciprocating engine's auxiliary cooling water for cooling the engine exhaust before it enters the Adsorber, and a second waste heat chiller for recovering thermal energy from the heat of compression from the (CO2) inter-stage gas coolers gas compressor and using that cooling duty to cool the CO2 gas entering the (CO2) Stripped Gas Cooler, before then entering the (CO2) stripped gas compressor, under some aspects of the present disclosure.

The example of FIG. 19 is similar to the example of FIG. 18 in that two Waste Heat Chillers 28 are shown. The first Waste Heat Chiller 28 may be configured to recover the thermal energy from the engines Auxiliary Cooling Water and is shown to provide cooling to Exhaust Gas Cooler 19 (similar to the Auxiliary Cooling Water being used to drive a Waste Heat Chiller as shown in FIGS. 17 and 18) for the purpose of cooling the combustion exhaust gas to the target temperature (typically 100° F., +/−20° F.). The Exhaust Gas Cooler Fan 18 will operate as required (by increasing or decreasing the air drawn across the Exhaust Gas Cooler) in order to have the exhaust gas reach the desired temperature prior to the exhaust gas entering the Adsorber 2.

Also shown in FIG. 19 is the use of the second Waste Heat Chiller 28 using reject heat from the heat of compression from the (CO2) Stripped Gas Compressor 89 system, where the thermal energy is intercepted and recovered from the individual stages of compression (prior to the CO2 reaching the Inter-stage Gas Coolers 92) and that thermal energy is then used to generate cooling by the Waste Heat Chiller that is then used to cool the CO2 gas prior to it entering the (CO2) Stripped Gas Cooler 23. By extracting heat of compression thermal energy from each stage of compression, the amount of cooling required for each stage is reduced and therefore the amount of fan cooling required will also be reduced, making the system more efficient. This configuration not only increases the efficiency of the (CO2) Stripped Gas Compressor 89 (because cooler and more dense gas enters the first stage of compression) more gas can be moved through the Stripped Gas Compressor 89 or the Natural Gas Compressor 90, where each inter-stage of compression will be able to pack more molecules of gas with each stage (piston stroke) of the compressor. Thus, a smaller compressor may meet the gas flows if the gas is cooled prior to compression. In addition, the Inter-stage Gas Cooler Fan(s) 93 typically function to cool the heat of compression after each stage of compression. These fans will run less air across them because the amount of thermal energy that has to get dissipated will be less because some of that energy was already transferred to the Waste Heat Chillers' 28 and therefore the Inter-stage Gas Cooler Fan(s) 93 will have to work less, making the system more efficient. Similarly, heat exchange configurations will need to accommodate chilled thermal fluid to exchange with the compressed gas passing through pipes, prior to the stripped gas reaching the Inter-stage Gas Coolers 92. In some examples, fin-tubed heat exchangers may be inserted into the piping prior to the Inter-stage Gas Coolers 92, which would then reduce the amount of work the Inter-stage Gas Cooler Fan(s) 93 would require to cool the stripped gas.

Figure 20:
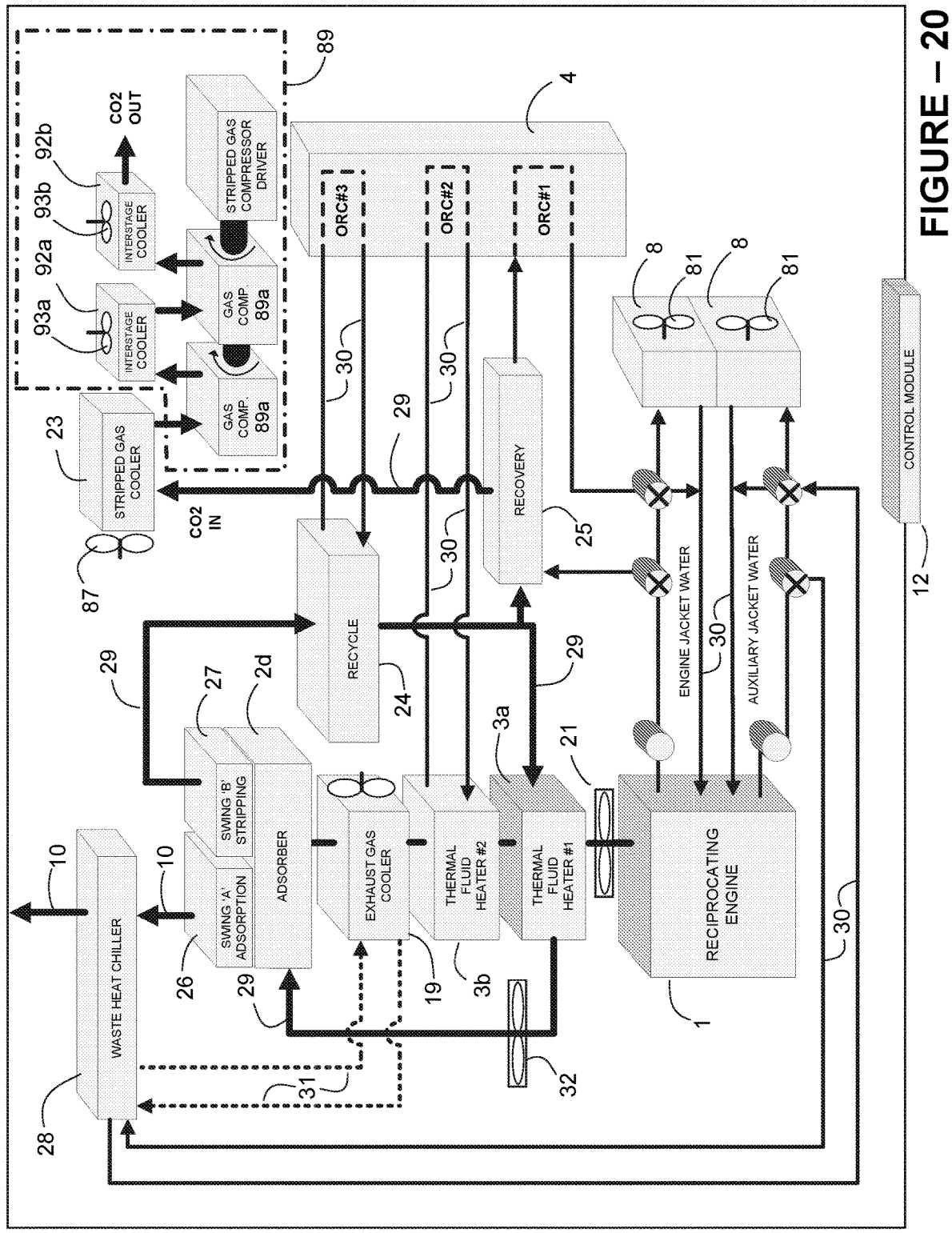
FIG. 20 shows a similar configuration as disclosed in FIG. 19, with the addition of diversion of the engines jacket water to the CO2 Recovery heat exchanger, to pick up thermal energy from the CO2 Recovery heat exchanger before the jacket water is then diverted to the ORC system, and then subsequently the engine jacket water may be returned to the engine's radiator or diverted directly back to the engine for reheating; the waste heat chiller may be modified to not only recover thermal energy from the engine's auxiliary cooling water, but the addition of thermal energy from the engine exhaust discharging from the Adsorber via Swing 'A' Adsorption module (and on alternate swings from the Swing 'B' Stripping module), in order to supply cooling to the exhaust gas entering the Exhaust Gas Cooler via Cooled Thermal Fluid Conduits, under some aspects of the present disclosure.

The example of FIG. 20 is similar to the example of FIG. 19 however there are two primary changes. The first is that, in this configuration, the engine's Jacket Water is first diverted (via Thermal Fluid Conduits 30) to the (CO2) Recovery 25 heat exchanger (to pick up more heat energy into the engine jacket water) before it is then diverted to the ORC system 4 where that energy is then transferred to the ORC propellant via heat exchanger "ORC #1", and then the engine jacket water is subsequently returned to the engine's radiator 8 or bypassed (fully or partially) and then diverted back to the engine 1 for reheating, to restart the loop. The control valves may be configured to flow the engine jacket water in parallel, in series, or in a split flow between series and parallel to the radiator and the engine 1, or bypass the radiator 8 altogether. This ability to control the returning temperature of the engine jacket water to the engine is important to operating the engine in order to achieve uninterrupted and consistent (not fluctuating) engine jacket water flow rate. This configuration reduces the number of interfaces between the ORC 4 and the rest of the system from four (4) heat exchanges in the ORC to three (3) heat exchanges in the ORC. In essence, by combining the jacket water energy with the (CO2) Recovery 25 energy, the one stream is being diverted to the ORC 4 via heat exchanger "ORC #1". The CO2 is circulated through the CO2 Recycle loop via CO2 Gas Circulating Device 32. Although the Gas Circulating Device 32 only appears in FIG. 20 and FIG. 28, it is understood to be included in all Adsorption-based CCS 200 or GSS 201 systems.

It is noted that the Gas Circulating Device 32 may be configured as a gas compressor, a blower, or other gas circulating device and not necessarily a fan. One skilled in the art would understand that, to circulate a gas, a gas compressor may be more effective.

The second change is that FIG. 20 also has added Waste Heat Chiller 28 unit recovering thermal energy from the exhaust discharge from the Swing 'A' Adsorption module 26. Meaning, the auxiliary cooling water is circulated from the engine 1 to the second Waste Heat Chiller 28, which also recovers thermal energy from the engines combustion exhaust that is discharging from the Adsorber's 2d appended Swing 'A' Adsorption module 26, via the Exhaust Pipe 10 conduits. In other terms used earlier in this document, the thermal energy into the Waste Heat Chiller 28 is stacking the heat that is to be rejected from the auxiliary cooler water with the energy picked up from the exhaust discharge from the Adsorber 2d (specifically from the CO2 discharging from the Swing 'A' Adsorbing module 26). The cooling capacity generated by this second Waste Heat Chiller 28 can then be used to cool the Exhaust Gas Cooler 19 (as shown), or cool any other stream in the system that requires cooling such as the Inter-stage Gas Cooler 92 on any gas compressors (Natural Gas Compressor 90 or Stripped Gas Compressor 89) or the (CO2) Stripped Gas Cooler 23.

Figure 37:
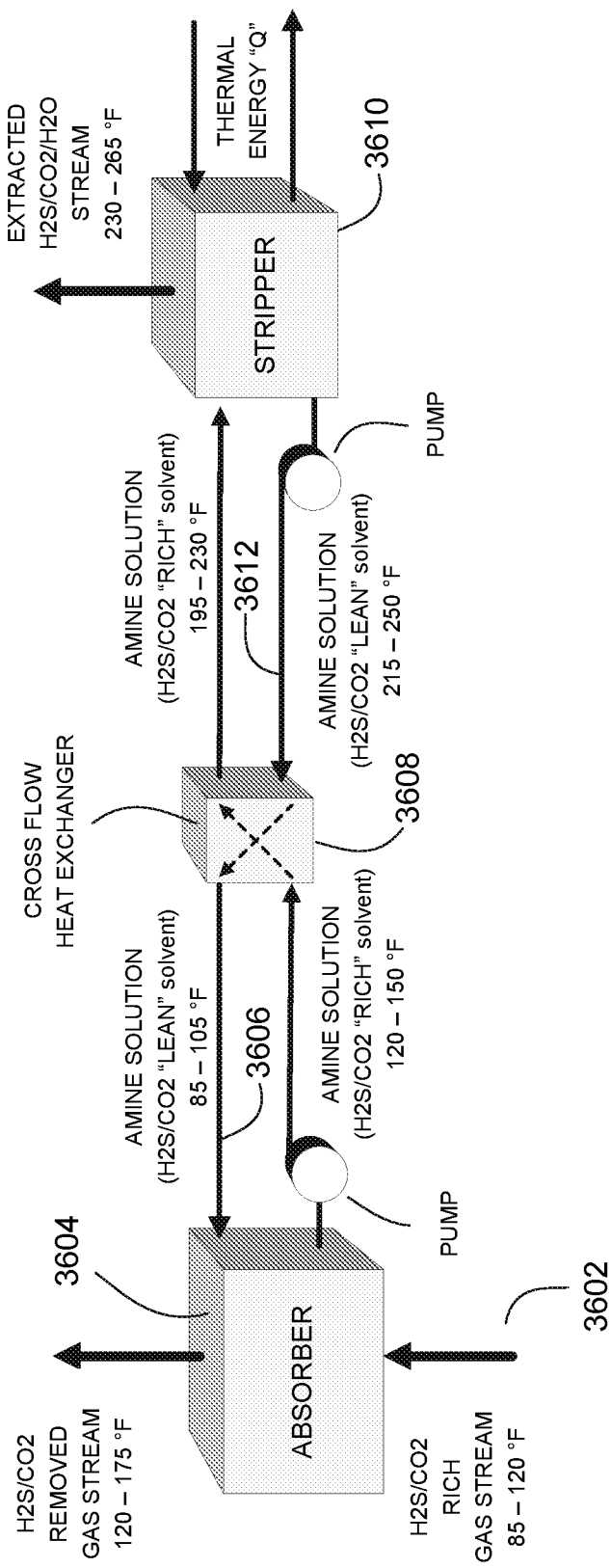
FIG. 37 illustrates a simplified example of an absorption-based (amine) CCS carbon-dioxide extraction system and process diagram for CO$_2$ absorption using amines according to the prior art.

It should be noted that recovering thermal energy from the exhaust gas discharging an Absorber 2a or 2b is not explicitly shown in the figures nor described in the description, however one skilled in the art would understand that there is useable heat in that exhaust stream (as shown in FIG. 37) and therefore this is yet another thermal energy stream that can be recovered and used in the system.

It should be further noted that, when the TSA or PSA swings/alternates which module the Adsorber 2d diverts the exhaust gas to, the Waste Heat Chiller 28 may pick up the exhaust being vented from the alternate module. In other words, if the Swing 'B' is adsorbing, then the Waste Heat Chiller will be collecting thermal energy from the Swing 'B' Stripping module 27 (not shown). Conversely, if Swing 'A' is adsorbing on the alternate swing, then the Waste Heat Chiller 28 will be collecting thermal energy from the Swing 'A' Adsorption module. The example of FIG. 20 illustrates the Swing 'A' Adsorption module 26 being coupled to the Waste Heat Chiller 28, and the Swing 'B' Stripping module 27 recirculating the CO2 stripping/stripped gas. It should be noted that a single Waste Heat Chiller 28 may be adequate in this location, and that the piping can be configured to merge the discharge from the two modules on the Adsorber 2d to deliver the thermal energy to a single Waste Heat Chiller 28.

Figure 21:
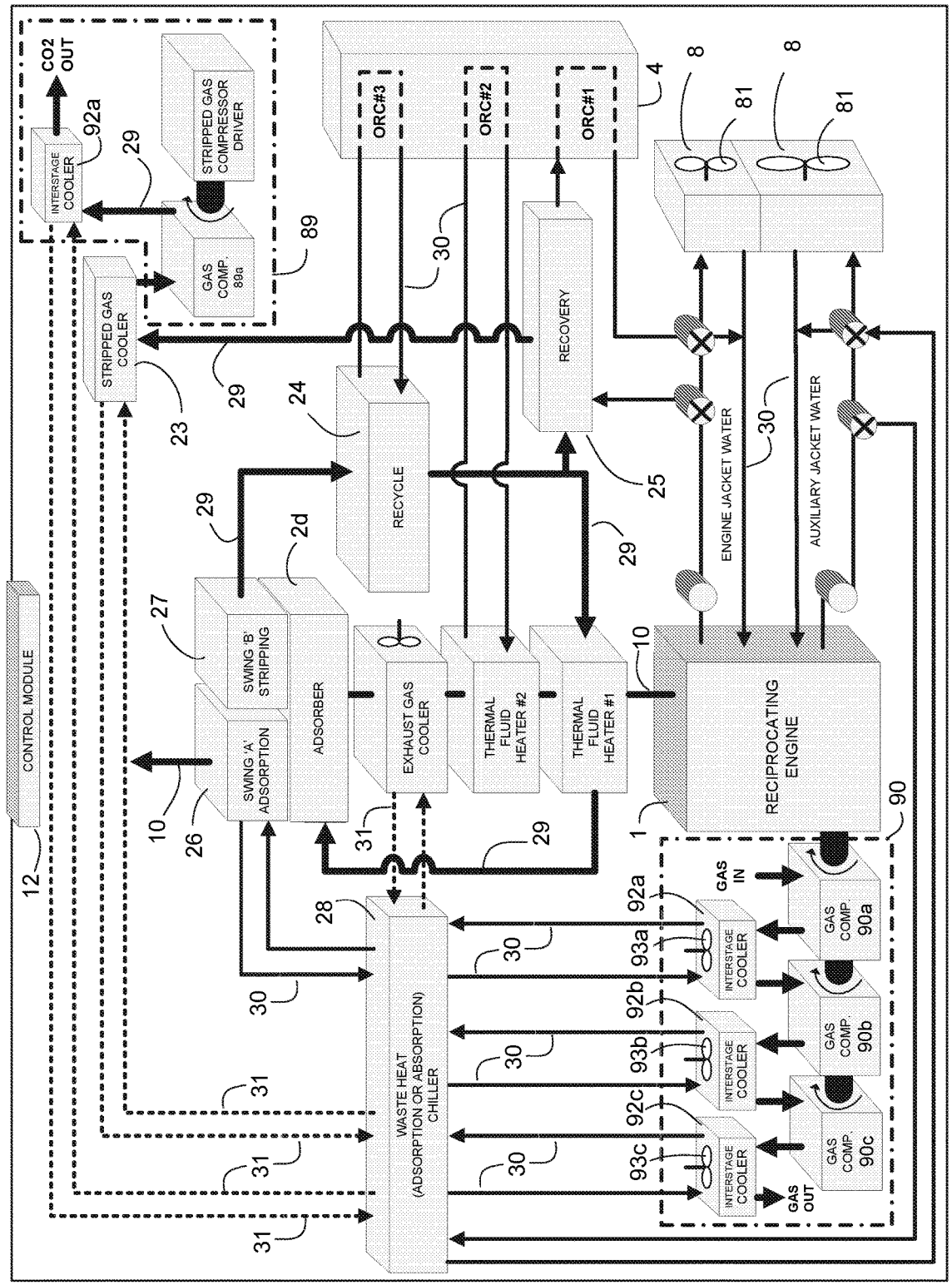
FIG. 21 shows a similar configuration as disclosed in FIG. 20 with the addition of a natural gas compressor to the reciprocating engine, and additional thermal energy diverted into the waste heat chiller from the Inter-stage gas coolers on the natural gas compressor plus the thermal energy into the waste heat chiller as shown in FIG. 20, with the chiller directing chilled thermal fluid to the Exhaust Gas Cooler plus chilled thermal fluid to the CO2 Stripped Gas Cooler plus the Inter-stage gas coolers of the CO2 Gas Compressor under some aspects of the present disclosure.

FIG. 21 depicts the example of FIG. 20 with the addition of a Natural Gas Compressor 90 to the reciprocating engine 1 (with at least one stage of gas compression) plus the addition of a Waste Heat Chiller 28 that uses engine auxiliary cooling water, thermal energy to be rejected from the Inter-stage Gas Coolers 92 of the gas compression stages, and the engines 1 combustion exhaust that ends up discharging from the Adsorber 2d, via Swing 'A' Adsorption module 26 via the Exhaust Pipe 10 conduits, (recovering some of the thermal energy that would otherwise be vented to atmosphere), to drive the Waste Heat Chiller 28. The recovered thermal energy from the auxiliary cooling water, the exhaust venting to atmosphere and the heat of compression to be dissipated in the Inter-stage Gas Coolers 92, may be blended/stacked and used at the Waste Heat Chiller 28 to generate cooling. In this example, Waste Heat Chiller 28 may provide cooling to the Exhaust Gas Cooler 19, the (CO2) Stripped Gas Cooler 23 and the Inter-stage gas coolers 92 that are a part of the (CO2) Stripped Gas Compressor 89. It should be noted that heat can be recovered from either the Natural Gas Compressor 90 or the (CO2) Stripped Gas Compressor 89, and cooling can be provided to either gas entering that compressor's Inter-stage Gas Coolers 92. The cooling supplied to the gas entering the Inter-stage Gas Coolers 92 may be configured to reduce the motor load (work) of the Inter-stage Gas Cooling Fans 93 associated with the Inter-stage Gas Coolers 92. Thus, by recovering the heat of compression from the inter-stages of the gas compressor, it dually extracts thermal energy from the Inter-stage Gas Coolers 92, making them require less cooling from either the Inter-stage Gas Cooler Fans 93. If liquid cooling is applied to the Inter-stage Gas Coolers 92, then less liquid flow will be required to the Inter-stage Gas Coolers 92, or will provide additional cooling, which may make the associated gas compressor more efficient;

Further, the Natural Gas Compressor 90 and the (CO2) Stripped Gas Compressor 89 are depicted in the figures as being separate from the Inter-stage Gas Coolers 92, but it should be noted that the Inter-stage Gas Cooler(s) 92 may be configured as an integral part of any Natural Gas Compressor 90 or Stripped Gas Compressor 89 system, and may be considered as integrated within any Natural Gas Compressor 90 or Stripped Gas Compressor 89. The Inter-stage Gas Coolers 92 are shown in the examples as separate to assist in explaining their heat dissipating roles within the compressors' operation (e.g. the Inter-stage Gas Cooler section of an aerial cooler, described earlier).

FIG. 21 shows an example of a CCS system 200 with the engines 1 auxiliary cooling water being diverted to a Waste Heat Chiller 28 that utilizes the thermal energy in the auxiliary cooling water that needs to be dissipated before being returned to the engine. In this example, the auxiliary cooling water also stacks (picks-up) thermal energy from the heat of compression of the Natural Gas Compressor 90 (as also shown in FIG. 9). In FIG. 9, the heat of compression is shown to be transferred to the ORC 4 for use in the ORC 4, whereas in FIG. 21 the thermal energy from the heat of compression is transferred to the Waste Heat Chiller 28. The combined thermal energy available (from the auxiliary cooling water and the heat of compression) to drive the chiller will be used to provide cooling to the exhaust prior to its entry to the Exhaust Gas Cooler 19, and/or prior to the CO2 entry to the Stripped Gas Cooler 23, and/or prior to the compressed gas' entry to the Inter-stage Gas Cooler(s) 92 (that are part of either the CO2 Stripped Gas Compressor 89 or part of the Natural Gas Compressor 90). Although it is not necessary that the heat of compression be necessarily recovered (into the Waste Heat Chiller 28) prior to the cooling being applied to the compressed gas, such recovery would make the process more efficient to extract the energy from the gas prior to applying cooling to it.

Also, it should be noted that in some examples, when reference is made to cooling being supplied or provided to a device, the cooling is actually being provided to the gas or thermal fluid that is entering the device. For example, if a description reads that "the Waste Heat Chiller 28 provides cooling to the Exhaust Gas Cooler 19" it should be interpreted as "the Waste Heat Chiller 28 produces cooling via a cooled thermal fluid, that is conveyed to a heat exchanger by Cooled Thermal Fluid Conduits 31 to the Exhaust Gas Cooler 19, that is positioned in the path of the exhaust gas (in this case, or a fluid in other case) that will be passing to the Exhaust Gas Cooler 19 (after it passes through the heat exchanger coupled to the Waste Heat Chiller 28), where that cooling water extracts thermal energy (cools) the exhaust gas prior to it entering the Exhaust Gas Cooler 19. This interpretation is most applicable to devices that perform a cooling operation, such as Exhaust Gas Cooler 19, Stripped Gas Cooler 23, Condenser 16, Radiator 8 (including the aerial cooler), ORC condensers, and the Inter-stage Gas Cooler(s) 92, in particular devices that have an associated cooling fan with them. Similarly, if reference is being made to thermal energy being supplied or provided to a device, the heating is actually being provided to the gas or thermal fluid that is entering the device mentioned.

In the case of recovering waste heat from a gas or thermal fluid stream, and then applying the cooling that becomes available from a Waste Heat Chiller 28 to that same stream, it is thermodynamically more efficient to recover the waste heat from that stream (at a higher temperature) prior to providing cooling (from that Waste Heat Chiller 28) to that same stream. As an example, if recovering heat of compression from a compressed gas stream between a compressor stage and the inter-stage gas cooler associated with that stage of compression, the recovery of the heat of compression to the Waste Heat Chiller 28 would be advantageous to the system (which would in the process cool the compressed gas) prior to further cooling that same stream of compressed gas with the cooling from the Waste Heat Chiller 28. This configuration is efficient in that it reduces the temperature of the compressed gas (by extracting thermal energy to the Waste Heat Chiller 28) prior to apply cooling to that compressed gas (from the Waste Heat Chiller 28), which would further reduce its temperature, thereby reducing the amount of cooling the Inter-stage Gas Cooler 92 would have to provide (less work) because the motor driving the Inter-stage Gas Cooler Fan 93 would not have to work as hard to move as much air to cool the compressed gas to the same temperature. This concept may be applicable to all streams requiring cooling whether from air-cooling or from direct liquid heat exchange.

Similar to the description provided for recovering thermal energy from the heat of compression (that would normally be dissipated in the Inter-stage Gas Cooler 92) that provides cooling to the compressed gas, in this example depicted in FIG. 21, the cooling to the gas compressed in the (CO2) Stripped Gas Compressor 89 can be applied by extracting thermal energy from the heat of compression from the compressed gas that is compressed in the Natural Gas Compressor 90. The cooling would be applied to the stripped gas prior to it entering the Inter-stage Gas Cooler(s) 92. The amount of energy that normally would be required to be dissipated from each stage of compression by the Inter-stage Gas Cooler(s) 92 will be reduced, and therefore the duty of cooling for that stage of compression is also reduced. Similar to what was described above for the Waste Heat Chillers 28 using the heat of compression to feed waste heat to the Waste Heat Chiller 28, the addition of the heat exchanger section (that was described as being coupled to the Waste Heat Chiller 28) may be required to be added between the compressor stage and the Inter-stage Gas Cooler(s) 92 in order to cool (extract thermal energy from the compressed gas from the heat of compression), prior to the compressed gas entering the Inter-stage Gas Cooler(s) 92. Therefore, there may be two stages of cooling in between the compression of the gas and the cooling of the compressed gas. The first stage is recovery of thermal energy from the heat of compression that is sent to power the Waste Heat Chiller 28 and the second stage of cooling is further heat extraction by passing the compressed gas through the heat exchanger coupled to the Waste Heat Chiller 28 that provides cooling to the compressed gas. This means that this waste heat can be collected and transferred to (either the ORC 4, the CCS 200 or the) Waste Heat Chiller(s) 28. In this example of the waste heat driving the Waste Heat Chiller 28, where the Waste Heat Chiller(s) 28 provides cooling to compressed gas (that has already had it temperature reduced by the heat exchanger coupled to the Waste Heat Chiller 28, prior to final cooling of each stage of gas compression cooling by the Inter-stage Gas Cooler(s) 92. This cooling can also be applied to the Exhaust Gas Cooler 19 or the (CO2) Stripped Gas Cooler 23 in a similar manner (with the addition of an integral heat exchanger). This heat extraction from the various heat sources for use in generating cooling via a Waste Heat Chiller 28 reduces the amount cooling that the stream recovered from requires, making the amount of cooling (by operating a cooling fan) required of the thermal source less, which then means the parasitic loads of the CCS system 200 are reduced, making it more efficient, and therefore making the CO2 recovery more efficient.

Further, by reducing the amount of cooling that the Inter-stage Gas Coolers 92 require to meet their target temperature, because the Inter-stage Gas Cooler Fan(s) 93 do not have to work as hard, makes the compressors operation more efficient and with cooler gas entering each stage of compression, the compressor is able to move more gas through it. This is accomplished because the compressor can pack more molecules into the first stage of (and each stage that has the chiller connected) compression with cooler/denser gas. This will allow the compressor to move more gas and will make the system more efficient, while also contributing to making the CO2 carbon recovery more efficient.

Similar to other system descriptions provided, the chilled water from the Waste Heat Chiller 28 may provide overall system efficiency improvement, which may lead to less energy consumed by the system which will result in a more efficient system which will result in more net carbon recovery. This may be accomplished in the primary application of removing heat from a waste heat source that requires cooling by reducing the temperature of the source (e.g. exhaust gas that it in itself requires cooling), reduce the work conducted by the cooling fan (e.g. Exhaust Gas Cooler Fan 18) to draw air across the coolers for that waste heat source (either the Exhaust Gas Cooler 19, the (CO2) Stripped Gas Cooler 23, or any stage of compression in either the (CO2) Stripped Gas Compressor 89 or the Natural Gas Compressor 90). If the chilled water from the Waste Heat Chiller 28 is then applied to provide further cooling of the waste heat source(s), the parasitic fan(s) (e.g., Exhaust Gas Cooler Fan 18) loads are further reduced making the system yet more efficient.

Adding the heat of compression to the auxiliary cooling water is but one way in which waste heat can be combined and used to generate cooling that will help the CCS 200, the ORC 4 and/or the combustion device (reciprocating engine 1, turbine 22, boiler or furnace 20) system be more efficient. The chilled water cooling can be applied to any component in the overall system that requires cooling, meaning the cooling can be applied to the Natural Gas Compressor 90, the Inter-stage Gas Coolers 92, the Natural Gas Compressor 90, the exhaust Stripped Gas Cooler 23, the CO2 Recycle heat exchanger 24, (CO2) Recovery 25 heat exchanger, Swing 'A' Adsorption module 26, Swing 'B' Stripping module 27, the CO2 Condenser heat exchanger 16, (CO2) Stripped Gas Compressor 89, the CO2 gas compressors Inter-stage gas cooler(s) 92, and the ORC 4 condenser.

The example of FIG. 21 shows a configuration including a single Waste Heat Chiller 28, where the waste heat from multiple sources is collected in this single Waste Heat Chiller 28 and then the chilled water is distributed, via Cooled Thermal Fluid Conduits 31, to a multiplicity of heat exchangers where cooling in the process is advantageous. The multiple heat sources and multiple cooling heat exchangers can be broken into individual Waste Heat Chiller 28 configurations, or in any combination of waste heat sources, Waste Heat Chiller(s) 28 and heat exchangers, where the chilled water can be distributed to a single cooling heat exchanger, or to a multiple combination of cooling heat exchangers. The combinations can be driven by the capacities and duties of the waste heat available as well as the cooling capacity from the Waste Heat Chiller 28 being distributed by the Control Module 12 such that the best use of the cooling capacity is applied where the most efficient outcome of system efficiency, performance and carbon recovery are achieved. In some cases, not all waste heat will be recovered if the cooling requirements are met with less waste heat being recovered and subsequently the opposite is also true that not all cooling requirements will have their requirements met with the amount of chilled water available for distribution (based on the amount of waste heat available). In some examples, predictive processing (i.e., artificial intelligence) may be used to predict and determine the most effective operation of the combustion device (1, 20 or 22), ORC 4, CCS 200 and the associated parasitic loads, as described in greater detail herein.

As mentioned previously, auxiliary cooling water does not have to be the medium required to recover waste heat; any thermal transfer fluid can be used. It has been shown in these examples because its temperature is typically too low to be effectively used in an ORC system (other than for preheating) but remains available for use in the overall process, in particular with Waste Heat Chiller(s) 28. In the case of engine auxiliary cooling water, its temperature is high enough to use in some absorption chiller systems, and is useable by adsorption chillers if stacked/blended with higher temperature waste heat to generate cooling. If stacked/blended with other waste heat sources, its use and efficiency improve in either absorption or adsorption chillers, making better use of the waste heat energy that has to be rejected anyways. Because the overall CCS system 200 requires heating, cooling and electricity, the decision to use the waste heat for cooling may be because the energy that is to be dissipated in the radiator 8 can be put to use, and something productive can be extracted from it in the system. In some examples, waste heat configured for cooling could contribute more to the overall system by providing cooling from a Waste Heat Chiller 28 than it would to the electric power generated by the ORC system. Such a configuration may reduce the amount of electric load of the overall CCS system 200 by reducing the amount of cooling required (typically accomplished by running air cooling fans to draw air across cooling fins), the ORC 4 and the other equipment requires to operate by providing cooling that then reduces the amount of fan cooling required in the system. Meaning, the system becomes more efficient not only because more heat is recovered (and therefore more power is generated by the ORC 4) but because the parasitic loads of the running the electric cooling fans within the CCS 200 (and the ORC 4) are reduced, increasing the overall net efficiency and hence makes the carbon recovery system more efficient. Once again, predictive processing applied to the Control Module 12 may be configured to provide the optimal operation of the system to maximize the overall efficiency of the system.

FIG. 22 shows an amine-based chemical absorption-based CCS 200 system where waste heat (from the engines auxiliary cooling water and the Thermal Fluid Heater #2 3b) is used to drive a Waste Heat Chiller 28 that provides cooling to the CO2 gas stream entering the Stripped Gas Cooler 23 and the exhaust entering the Exhaust Gas Cooler 19.

In this example, auxiliary cooling water from the engine is circulated to the engines exhaust (into Thermal Fluid Heater #2 3b) to recover additional thermal energy which will be used in the Waste Heat Chiller 28. The cooling (chilled thermal fluid) produced from the Waste Heat Chiller 28 will be diverted towards the Exhaust Gas Cooler 19 and applied to the exhaust gas entering the Exhaust Gas Cooler 19, which will further cool the exhaust gas entering the Absorber 2a. Chilled water from the same Waste Heat Chiller 28 is also circulated via Cooled Thermal Fluid Conduits 31 (the dashed lines) to provide cooling to the gas entering the (CO2) Stripped Gas Cooler 23 in order to reduce the temperature of the CO2 gas prior to it entering the (CO2) Stripped Gas Compressor 89. The more the CO2 gas is cooled before entering the first stage of compression on the (CO2) Stripped Gas Compressor 89 the more efficiently the (CO2) Stripped Gas Compressor 89 will operate.

If adequate cooling cannot be generated by the Waste Heat Chiller 28 to satisfy both coolers (19 and 23), then the chilled water can be diverted to one of the two coolers (19 or 23), or it can be diverted to both and the cooling fans associated with each cooler (the fan for Exhaust Gas Cooler 19 is Exhaust Gas Cooler Fan 18, and for the (CO2) Stripped Gas Cooler 23 is Stripped Gas Cooler Fan 87), will complete the amount of cooling required by operating and drawing ambient air across the devices fin-tubed exchangers to achieve the desired target temperature of the gas (exhaust or CO2, respectively). All of this can be controlled by the Control Module 12 and/or the predictive processing components of the control system.

FIG. 23 is similar to the configuration shown in FIG. 21 with the primary difference being that FIG. 23 illustrates an Absorption-based chemical amine absorption CCS system 200 (with the Cross Flow Heat Exchanger 88 not shown in this Figure but is shown in the other Absorption-based absorption CCS 200 systems such as FIGS. 1 through 15, 22, 29, and 30), whereas in FIG. 21, the adsorption-based CCS system components are shown but not identified as CCS system 200.

Another difference is that FIG. 23 shows 4 thermal heat exchangers within the ORC 4 whereas FIG. 21 shows 3 thermal heat exchangers with the ORC 4 system. FIG. 21 shows 3 thermal heat exchangers because the engine jacket water is combined with the (CO2) Recovery 25 heat exchanger. FIG. 21 can be shown with 4 thermal exchanges by separating the jacket water and the (CO2) Recovery 25 combined heat collection and the two heat streams can be diverted to the ORC 4 individually, which then result in 4 thermal exchanges with the ORC 4 and the rest of the CCS system 200 and the engine 1.

In another example, FIG. 23 could be configured with 3 thermal exchanges because under the configuration shown, and the energy transferred from Thermal Fluid Heater #2 3b to the ORC 4 ("ORC #2") could be repurposed and combined with the thermal energy diverted to the Waste Heat Chiller 28 and combined with the other waste heat energy transferred to the Waste Heat Chiller 28, or it could be combined with the engine jacket water to transfer the combined thermal energy to the ORC 4 via a common heat exchanger within the ORC, such as a new, larger "ORC #2".

Figure 24:
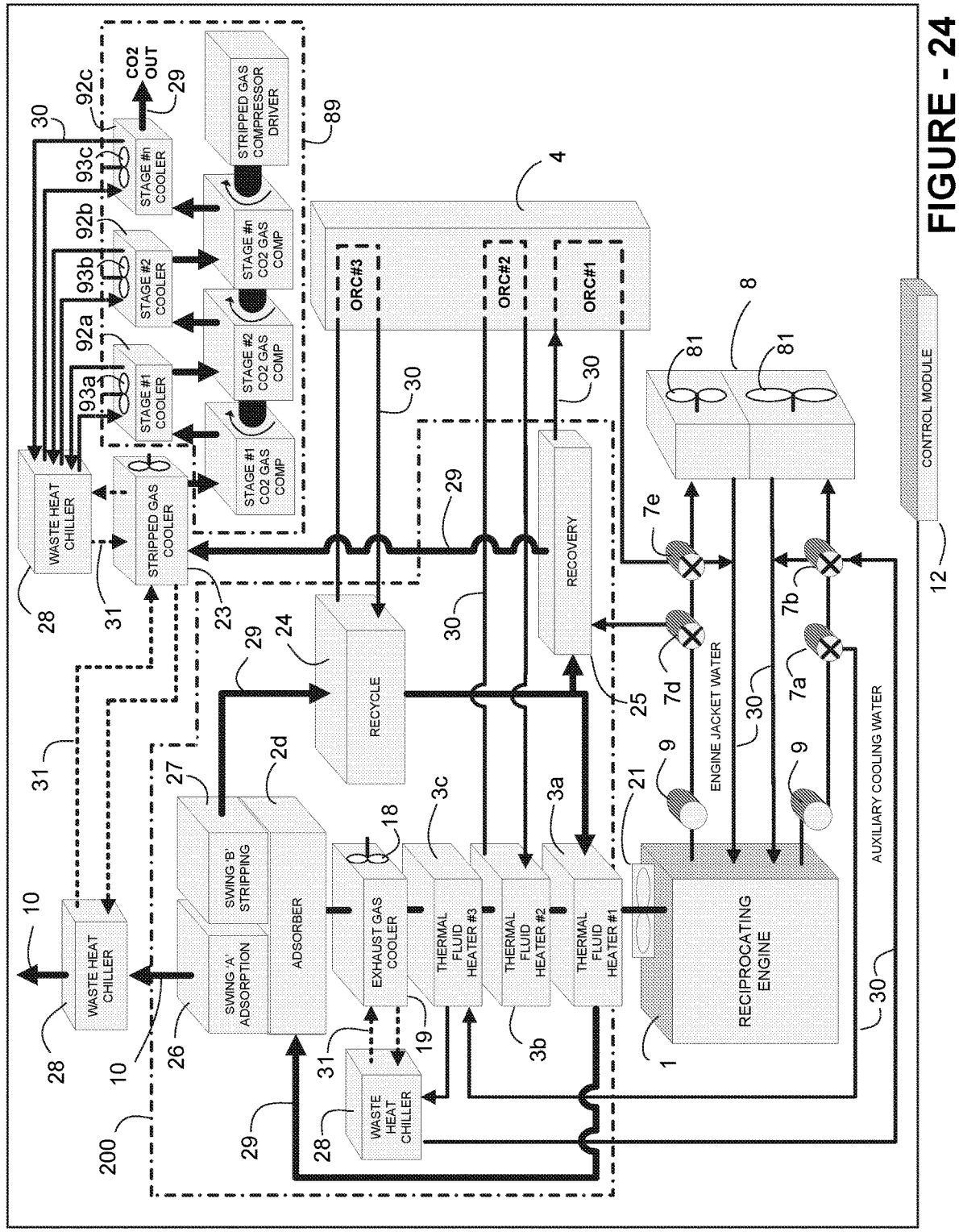
FIG. 24 shows a reciprocating engine coupled to an adsorption-based CCS with an associated stripped gas compressor including three waste heat chillers and an ORC, where the first waste heat chiller is configured to assist in recovering thermal energy from the exhaust gas of the engine, the second waste heat chiller being configured to assist in recovering thermal energy from the engine exhaust discharging from the CCS adsorption-based system and the third waste heat chiller being configured to assist in recovering thermal energy from the heat of compression from the CO2 stripped gas compressor, under some aspects of the present disclosure.
Figure 25:
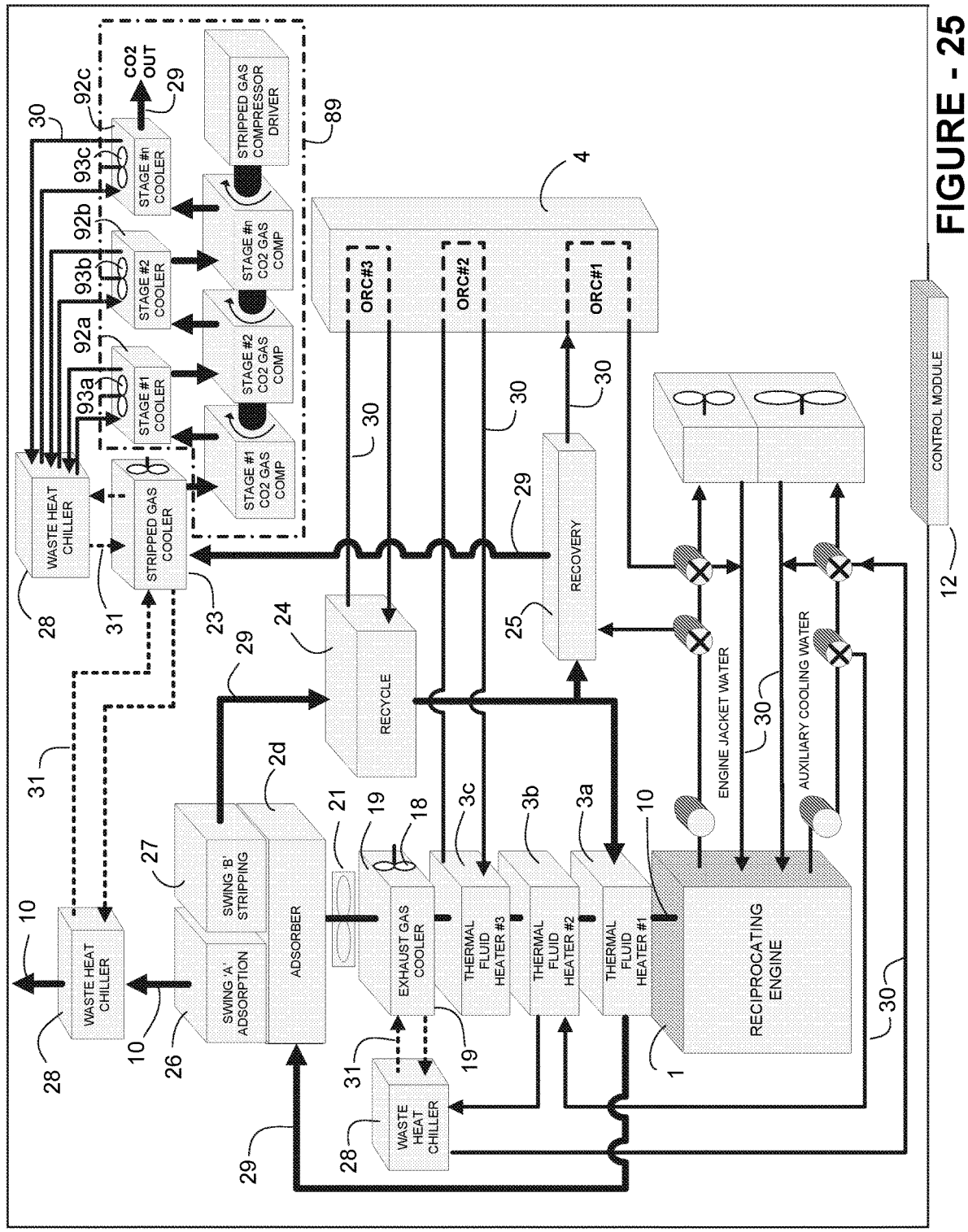
FIG. 25 shows a similar configuration as disclosed in FIG. 24 wherein the auxiliary cooling water is diverted to Thermal Fluid Heater #2 in place of being diverted to Thermal Fluid Heater #3, prior to sending the auxiliary cooling water to the waste heat chiller, and wherein the Exhaust Blower Fan is positioned in a mid-point position in the exhaust system where it assists in transferring exhaust gas through the system under some aspects of the present disclosure.

A similar concept is shown in the examples of FIG. 24 and FIG. 25 where part of the thermal energy that was previously available in Thermal Fluid Heater #2 3b (that had previously been directed to the ORC 4) is split into two heat exchangers; Thermal Fluid Heater #2 3b and Thermal Fluid Heater #3 3c. The reason for this configuration is that, in some examples, the CCS 200 Absorber and Adsorber require the exhaust gas to be entering at approximately 100 degrees Fahrenheit, whereas the ORC typically requires higher temperatures (say 200 degrees Fahrenheit) to contribute to the generation of power and therefore the spread between the two heat sink temperatures can be dedicated to a Waste Heat Chiller(s) 28 which can generate cooling in that temperature range between 100 and 200 degrees Fahrenheit.

FIG. 24 shows an adsorption CCS Gas Treating System 200 where the engine's auxiliary cooling water is diverted into Thermal Fluid Heater #3 3c (to add/stack thermal energy to the auxiliary cooling water) which is then diverted to the Waste Heat Chiller 28 that produces cooling (chilled thermal fluid) from that waste heat, which chilled thermal fluid is then diverted to cool the exhaust stream that is going to enter the Exhaust Gas Cooler 19. This reduces the temperature of the exhaust gas prior to entering the Adsorber 2d. In the example of FIG. 24 (as well as other examples provided herein, such as FIGS. 25 through 27), the CCS Gas Treating System 200 illustrates the inclusion of the Waste Heat Chiller 28, Thermal Fluid Heater #2 3b and Thermal Fluid Heater #3 3c within the CCS system 200. After picking up thermal energy from the Thermal Fluid Heater #3 3c, the auxiliary cooling water is then diverted to the Waste Heat Chiller 28, where that energy is used to chill thermal fluid that is then diverted to cool the exhaust gas entering the Exhaust Gas Cooler 19. If adequate cooling is supplied to the exhaust gas stream entering the Exhaust Gas Cooler 19 with just the chilled fluid from the Waste Heat Chiller, the Exhaust Gas Cooler Fan 18 will not have to be operate. If surplus cooling water is available, it can be diverted and used in any cooling heat exchangers in the system.

Figure 26:
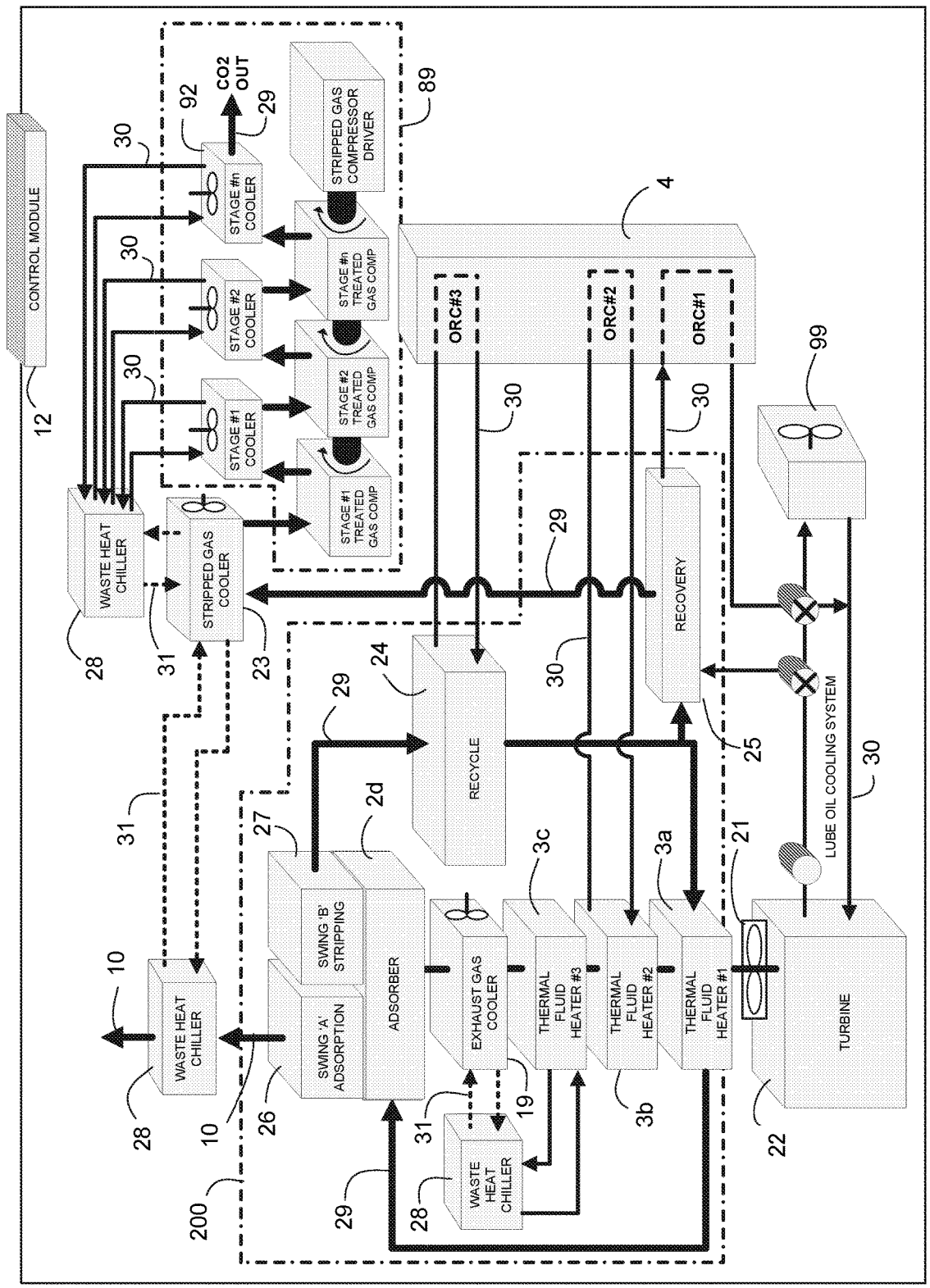
FIG. 26 shows a similar configuration as disclosed in FIG. 25 wherein the reciprocating engine is replaced with a turbine, wherein hot lube oil may be diverted through the CO2 Recovery heat exchanger under some aspects of the present disclosure.
Figure 27:
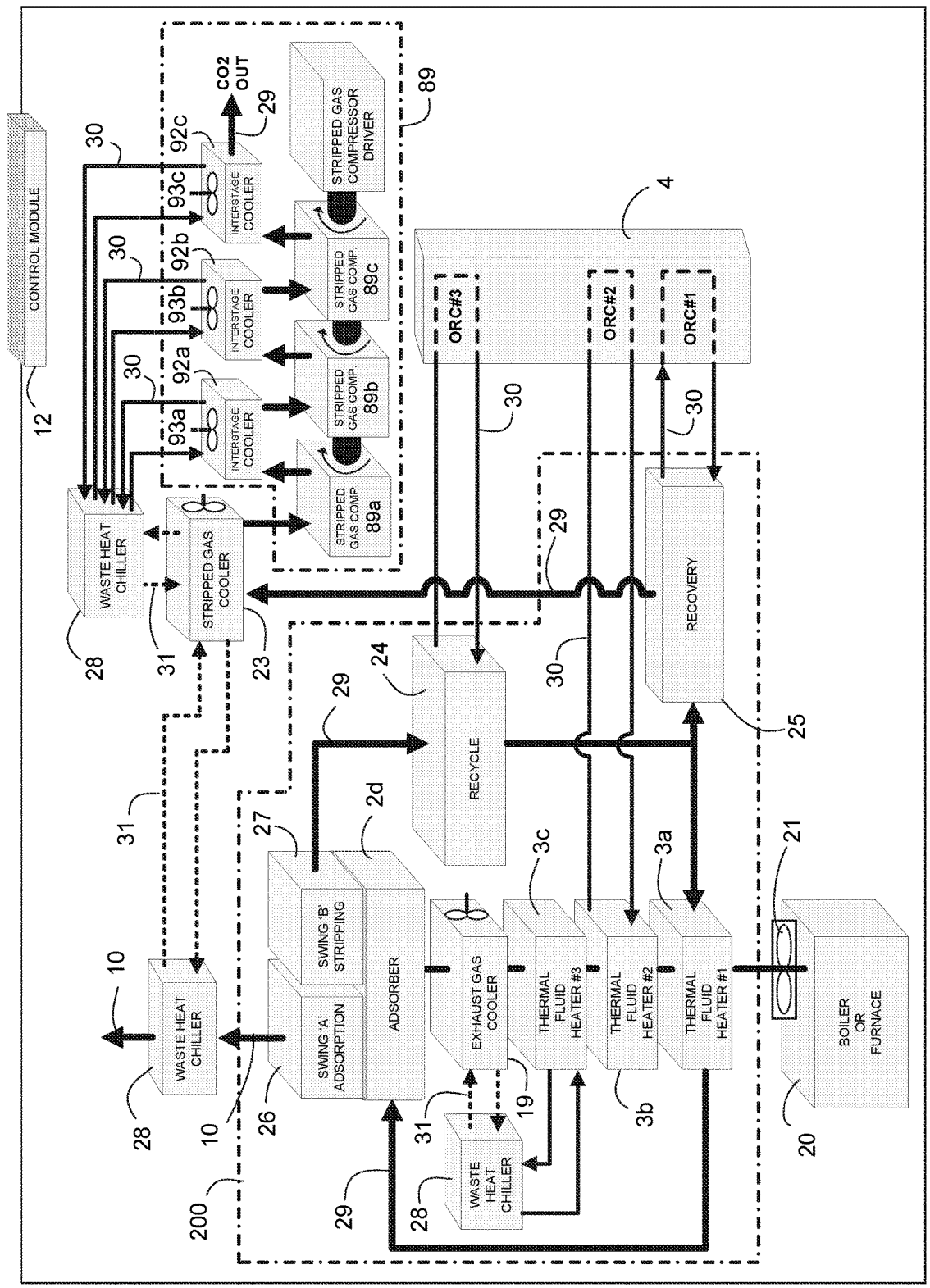
FIG. 27 shows a similar configuration as disclosed in FIG. 26, wherein the turbine engine is replaced with a boiler/furnace, and thermal energy is only recovered from the exhaust gas and the CO2 stripped gas being circulated through the CCS under some aspects of the present disclosure.

FIGS. 16, 17, 24, 26, 27 and 28 show the inclusion of Thermal Fluid Heater #2 3b and FIGS. 24, 26, and 27 show the inclusion of Thermal Fluid Heater #3 3c as part of the Gas Treating CCS System 200, however, one skilled in the art will recognize that not all of these components (Waste Heat Chiller 28, Thermal Fluid Heater #1 3a, Thermal Fluid Heater #2 3b and Thermal Fluid Heater #3 3c) must be included or excluded as part of the CCS 200 (or a GSS 201, when applicable), depending on the type of application being used and the thermal medium involved in the thermal management. Therefore, the depiction of what is included or excluded from the CCS 200 system should not be defining nor used to obviate around their inclusion.

In FIG. 24, the combustion Exhaust Blower Fan 21 is shown as a forced draft fan (to push the combustion exhaust through the rest of the exhaust system), and is placed between the combustion device (in this case the reciprocating engine 1) and the rest of the system. It should be understood that the Exhaust Blower Fan 21 can be placed anywhere in the exhaust system to facilitate blowing the exhaust through the equipment in the exhaust system.

FIG. 24 through FIG. 27 show a Waste Heat Chiller 28 recovering thermal energy from, the Adsorber 2d discharging engine exhaust via Swing 'A' Adsorption module 26 or on the alternative swing from Swing 'B' Stripping module 27 (the operative here is 'or' because the nature of a swing system is that the process swings between Swing 'A' and Swing 'B') and resulting in providing cooling to the (CO2) Stripped Gas Cooler 23.

FIG. 24 through FIG. 27 also show recovery of thermal energy from the heat of compression from the gas entering at least one of the Stripped Gas Compressor's 89 Inter-stage Gas Coolers 92, where a Waste Heat Chiller 28 is providing cooling to the CO2 entering the Stripped Gas Cooler 23. Similarly, the thermal energy rejected from the modules of the Adsorber 2d, can be directed to the other Waste Heat Chillers 28 in the system requiring cooling. In this example, a gas compressor may have one or more stages of compression where each stage of compression will have an associated Inter-stage Gas Cooler 92 (shown as 92, but could be depicted as 92a, 92b, etc. for each separate Inter-stage Gas Cooler 92), configured to transfer thermal energy to the ORC 4 system, Gas Treating CCS System 200, or Waste Heat Chiller(s) 28.

The exemplary fluid and/or gas flow paths provided below are outlined for each of the fluids and/or gases shown in FIG. 24 where the various flow paths can be mixed and matched with flow path combinations of each fluid or gas. It would be prohibitive to list all possible permutations and combinations for each possible configurations, as one having ordinary skill in the art would appreciate additional and/or alternate temperatures and/or flow paths that could be utilized. The structure of the representative flow paths for each fluid will be presented in the following manner:

Engine jacket water flow path
+
Engine auxiliary cooling water flow path
+
Thermal Fluid Heater #2 flow path
+
Thermal Fluid Heater #3 flow path
+
Engine exhaust flow path:
+
(CO2/H2S) Stripped Gas flow path:

1. Possible Engine Jacket Water Flow Paths:
1→9→7$d$→7$e$→8→1
or
1→9→7$d$→7$e$→[8]/[bypass 8]→1 (flow to 8 and 1 can be split/proportioned)
or
1→9→7$d$→25→ORC #1→7$e$→bypass 8→1

2. Possible Engine Auxiliary Cooling Water Flow Paths:
1→9→7$a$→7$b$→8→1
or
1→9→7$a$→7$b$→[8]/[bypass 8]→1
or
1→9→7$a$→3$c$→28→7$b$→bypass 8→1
or
1→9→7$a$→3$c$→28→7$b$→8→1
or
1→9→7$a$→3$c$→28→7$b$→[8]/[bypass 8]→1

3. Possible Thermal Fluid Heater #2 Thermal Fluid Flow Paths:
3$b$→ORC #2→3$b$

4. Possible Thermal Fluid Heater #3 thermal fluid flow paths:
3$c$→28→7$b$→[8]/[bypass 8]→1→9→7$a$→3$c$ 5. Possible Exhaust Gas flow paths:
1→10→21→3$a$→3$b$→3$c$→19→2$d$→26→10→28→10→atmosphere where the exhaust gas passes through the adsorber 2$d$ to 26 (Swing 'A' Adsorbing) where the gas molecules are adsorbed from the exhaust gas stream on the adsorption material on the Swing 'A' section of the Adsorber 2$d$, and then the scrubbed exhaust is vented to atmosphere.

6. Possible Stripped Gas (CO2/H2S) flow paths:
2$d$→27→24→
[25→23→89$a$→92$a$→89$b$→92$b$→atmosphere]/
[3$a$→2$d$]

where the scrubbed gas that circulates through the Adsorber 2$d$ to Swing 13' Stripping 27, where it is stripping the gas molecules off of the adsorption materials that had been adsorbing the CO2 gas molecules from the exhaust gas (on the previous swing), which then flows the stripped gas to the Recycle 24 heat exchanger where the stripped gas is cooled (by giving up thermal energy to the ORC #3). The stripped gas then proceeds to flow either to the Thermal Fluid Heater #1 (3$a$) and then back to 2$d$ (to repeat the process), or flows to Recovery 25 heat exchanger (where thermal energy from the stripped gas is stacked with the energy to be dissipated from the engine jacket water, for transfer to the ORC #1 in the ORC 4), and then to the Stripped Gas Cooler 23 where the stripped gas is then passed into the Stripped Gas Compressor 89$a$. The stripped gas is then compressed in Stripped Gas Compressor 89$a$ (where it heats up due to the heat of compression) and is then passes to Inter-stage Gas Cooler 92$a$ to cool the gas prior to returning to the next stage of compression in Stripped Gas Compressor 89$b$. The stripped gas is then compressed in Stripped Gas Compressor 89$b$ (where it heats up due to the heat of compression) and is then passes to Inter-stage Gas Cooler 92$b$ to cool the gas prior to returning to the next stage of compression in Stripped Gas Compressor 89$c$. The stripped gas is then compressed in Stripped Gas Compressor 89$c$ (where it heats up due to the heat of compression) and is then passes to Inter-stage Gas Cooler 92$c$ to cool the gas prior to the stripped gas discharging from the system.

Some examples of possible combinations and permutations of the various flow paths shown in FIG. 24 are, for example:
Configuration 1:
1→9→7$d$→7$e$→8→1
+
1→9→7$a$→7$b$→8→1
+
3$b$→ORC #2→3$b$
+
(Fluid flow to Thermal Fluid heater is zero.)+
1→10→21→3$a$→3$b$→3$c$→19→2$d$→26→10→28→10→atmosphere
+
2$d$→27→24→25→23→89$a$→92$a$→89$b$→92$b$→atmosphere Configuration 2:
1→9→7$d$→25→ORC #1→7$e$→bypass 8→1
+
1→9→7$a$→3$c$→28→7$b$→[8]/[bypass 8]→1
+
3$b$→ORC #2→3$b$
+
3$c$→28→7$b$→[8]/[bypass 8]→1→9→7$a$→3$c$
+
1→10→21→3$a$→3$b$→3$c$→19→2$d$→26→10→28→10→atmosphere
+
2$d$→27→24→3$a$→2$d$ FIG. 25 is similar to the example of FIG. 24 with the primary difference being that the engine's auxiliary cooling water is first diverted into Thermal Fluid Heater #2 3$b$ to add thermal energy to the auxiliary cooling water, whereas in FIG. 24, the auxiliary cooling water is diverted to Thermal Fluid Heater #3 3$c$. In FIG. 25, the auxiliary cooling water is stacked (picks-up) higher grade heat (and can be configured to pick-up more thermal energy, based on heat exchanger sizing) in Thermal Fluid Heater #2 3$b$ than it would in Thermal Fluid Heater #3 3$c$. The auxiliary cooling water is then diverted to the Waste Heat Chiller 28, where the energy from the auxiliary cooling water (that the engine required to be dissipated in the radiator) and the energy picked-up (stacked into) the Thermal Fluid Heater #2 3$b$ is used to chill water that can be used in a multitude of cooling heat exchangers in the system. The temperature in Thermal Fluid Heater #2 will be higher than that from Thermal Fluid Heater #3.

In the example of FIG. 25, the (combustion) Exhaust Blower Fan 21 is shown as an induced draft fan (to pull the combustion exhaust through the rest of the exhaust system, and is placed between the Exhaust Gas Cooler 19 and the Adsorber 2d where it pulls the combustion exhaust through the Thermal Fluid Heaters 3 and the Exhaust Gas Cooler 19 and pushes the exhaust through the rest of the CCS 200 system (Adsorber and vents 26 and 27). As previously mentioned, the location of the Exhaust Blower Fan 21 can be placed anywhere in the exhaust system piping to facilitate moving the exhaust gases through the various components in the exhaust system in order to meet (or be lower than) the combustion devices allowable back pressure.

FIG. 26 shows a turbine 22 coupled to an adsorption-based CCS system 200. The configuration is similar to FIG. 25 with the primary difference being that the engine shown in FIG. 26 is a turbine and not a reciprocating engine as shown in FIG. 25 and therefore, there is no engine jacket water nor engine auxiliary cooling water. In place of engine jacket water and auxiliary cooling water is the turbines lube oil cooling system. The lube oil is shown to be diverted through the (CO2) Recovery 25 heat exchanger, to the ORC 4 via ORC #1 and then back to the Turbine Lube Oil Cooler 99 or back to the turbine 22 in similar control mechanisms as described for cooling the engine jacket water or auxiliary cooling water return to the engine 1 and the radiator 8. It should be noted that the direction of circulation of thermal fluid (or lube oil if it is directly circulated without an interfacing thermal fluid) could be reversed. Regarding the exhaust flow in this configuration, the turbine 22 exhaust is vented through the same heat exchange configuration as previously described for FIGS. 24 through 27: Thermal Fluid Heater #1 3a, to Thermal Fluid Heater #2 3b, to Thermal Fluid Heater #3 3c, to Exhaust Gas Cooler 19, to Adsorber 2d where the engine exhaust is discharged via Swing 'A' Adsorption module 26 (or Swing 'B' Stripping module 27, depending on which alternate swing the system is on) and then to atmosphere. Similarly, waste heat is recovered from at least the exhaust to provide cooling to the Exhaust Gas Cooler 19. It should be noted that cooling from the Waste Heat Chiller 28 can be applied to other devices in the system such as the Stripped Gas Cooler 23, or Inter-stage Gas Cooler(s) 92, or the Turbine Lube Oil Cooler 99, or the ORC 4 condensers, or other devices not shown.

It should be noted that if the turbine lube oil is at a higher temperature than the CO2 gas passing through (CO2) Recovery 25 heat exchanger, the turbine lube oil should be diverted directly to the ORC 4 without passage through the (CO2) Recovery 25 heat exchanger (bypassing it) because in this circumstance, the (CO2) Recovery 25 heat exchanger would cool the turbine lube oil prior to it reaching the ORC 4, which is not desirable. The turbine lube oil should be inserted in the appropriate temperature cascade in the ORC propellant rank. If this configuration is the case, then the thermal energy in the Recovery 25 heat exchanger can be recovered and passed to the ORC 4 in a separate thermal fluid loop (not shown) and the thermal energy in the lube oil (that is to be dissipated in the Turbine Lube Oil Cooler 99) can be passed directly to the ORC 4 propellant.

FIG. 27 is similar to the example of FIG. 26 with the exception that the turbine 22 is replaced with a boiler 20 or furnace 20. The significance of this change is that a boiler or furnace does not have lube oil cooling systems, because these combustion devices are not rotating equipment. That is why both have the same labelling number associated with them. Therefore, the lube oil heat recovery portion of FIG. 26 is to be removed and there is no blending/stacking or addition of thermal energy to the (CO2) Recovery 25 heat exchanger outside of the CO2 being circulated through the CCS adsorber system 200. Meaning that the thermal energy recovered from the boiler/furnace 20 is strictly combusted exhaust gas or from CO2 discharging from or circulating within the Adsorption based CCS system 200.

As shown in the examples of FIGS. 24 through 27, the ORC 4 may be configured with three thermal energy streams delivered to it. The first stream may deliver thermal energy to the ORC 4 via ORC #3 is from at least the CO2 gas discharging the CCS 200 adsorber system, via (CO2) Recycle 24 heat exchanger. The second stream may deliver thermal energy from the Thermal fluid heater #2 3b which circulates a thermal fluid to the ORC via ORC #2 (with the exception of FIG. 25 that delivers thermal energy from the Thermal fluid heater #3 3c which circulates a thermal fluid to the ORC 4 via ORC #2). The third stream of thermal energy may deliver heat recovered from the (CO2) stripped gas circulating through the adsorber-based CCS system 200, via CO2 Recovery 25 heat exchanger to ORC 4 via ORC #1. The Gas Circulating Device 32 can be a compressor, blower, or other device suitable for circulating gases.

Also shown in FIGS. 24 through 27, includes a Stripped Gas Compressor 89, with three Waste Heat Chillers. The Stripped Gas Compressor 89 with associated Stripped Gas Cooler 23 and the first Waste Heat Chillers 28 may be configured to recover heat from the stripped gas prior to it entering the Stripped Gas Cooler 23 and providing cooling to the stripped gas prior to it entering the Stripped Gas Cooler 23. The second Waste Heat Chiller 28 may be configured to recover heat from the exhaust gas discharging from the Adsorber 2d (via the Swing 'A' Adsorption module) also providing cooling to the stripped gas prior to it entering the Stripped Gas Cooler 23. The third Waste Heat Chiller 28 may be configured to recover heat from the exhaust gas passing through Thermal Oil Heater #3 3c (with the exception of FIG. 25, where the heat is recovered from the Thermal Oil Heater #2 3b and is stacked with thermal energy from the auxiliary cooling water) and providing cooling to that same exhaust gas prior to it entering the Exhaust Gas Cooler 19. The Stripped Gas Compressor 89, with associated first Waste Heat Chiller 28, is configured similarly to that shown in FIG. 19 in this example. The second Waste Heat Chiller 28 is as depicted in FIG. 24 through 27. The third Waste Heat Chiller 28 is similar to that depicted in FIG. 22.

The configuration shown in the example of FIG. 28 is similar to the example shown in FIG. 20 with the primary differences being: 1) the CO2 Stripped Gas Compressor 89 is not shown in FIGS. 28, and 2) the Waste Heat Chiller 28 shown in FIG. 20 is replaced (in the same location) with heat exchanger Thermal Fluid Heater #3 3c, thereby the system shown in FIG. 28 is no longer providing chilled thermal fluid (cooling) to the Exhaust Heat Cooler 19. The thermal energy collected into Thermal Fluid Heater #3 3c from the exhaust discharging from the Adsorber 2d (via the Swing 'A' Adsorption module 26) now provides thermal energy to the ORC 4 (via heat exchanger ORC #4). The thermal energy collected by heat exchanger Thermal Fluid Heater #3 3c is stacked with the thermal energy from the auxiliary cooling water (more specifically, the thermal energy that is to be discharged from the auxiliary cooling water, prior to returning to the engine 1) with a portion of the engine exhaust's thermal energy that is being discharged from the Adsorber 2d module via Swing 'A' Adsorption module 26 (or Swing 'B' Stripping module 27, depending on which alternate swing the system is on) and then to atmosphere.

In some examples, the ORC 4 may be configured to have four thermal energy streams delivered to it, as described in greater detail below.

In this configuration, the first thermal stream delivers thermal energy from the engine's jacket water to the CO2 gas discharging the Adsorber-based CCS system 200 (to pick up more heat into the engine jacket water) via (CO2) Recovery 25 heat exchanger, before it is then diverted to the ORC system 4 where that energy is then transferred to the ORC propellant via heat exchanger "ORC #1", and then the engine jacket water is subsequently returned to the engines radiator or diverted directly back to the engine for reheating. The control valves can bypass the radiator altogether or flow the engine jacket water in parallel, in series or in a split flow between series and parallel to the radiator and the engine 1. This ability to control the returning temperature of the engine jacket water to the engine is critical to operating the engine in order to achieve uninterrupted and consistent (not fluctuating) engine jacket water flow rate. By combining the energy streams, this configuration shows that the number of interfaces between the ORC 4 and the rest of the system can be reduced by one interface (e.g., from five (5) heat exchanges in the ORC to four (4) heat exchanges in the ORC). By combining the jacket water energy with the (CO2) Recovery 25 energy, the one stream is being diverted to the ORC via heat exchanger "ORC #1". The CO2 is circulated through the CO2 Recycle 24 loop via (CO2) Gas Circulating Device 32.

The second stream delivers thermal energy from the engine exhaust to the ORC 4. Specifically, by circulating a thermal fluid between the Thermal fluid heater #2 3b and the ORC 4 (via heat exchanger ORC #2).

The third stream of thermal energy delivers heat recovered from the CO2 stripped gas circulating through the CCS system 200, via (CO2) Recycle 24 heat exchanger by circulating a thermal fluid between the (CO2) Recycle 24 heat exchanger and the ORC 4 (via heat exchanger ORC #3).

The fourth stream of thermal energy shows waste heat recovery from both the engine's exhaust via Thermal Fluid Heater #3 3c (which recovers exhaust from Adsorber 2d via Swing 'A' Adsorption module 26 (or Swing 'B' Stripping module 27, depending on which alternate swing the Adsorber 2d is diverting to)) and the engine's auxiliary cooling water, which after the thermal energy is stacked (added) to the auxiliary cooling water, and the blended energy is then diverted to the ORC 4 (via heat exchanger ORC #4). Meaning, the auxiliary cooling water is circulated from the engine 1, to the Thermal Fluid Heater #3 3c, which then adds (stacks) thermal energy to the auxiliary cooling water from the engines combustion exhaust that is discharging from the Adsorber 2d, via Swing 'A' Adsorption module 26 (or Swing 'B' Stripping module 27 as the case may be), via the Exhaust Pipe 10 conduits, all the while recovering some of the thermal energy that would otherwise be vented to atmosphere.

Recovery and use of the auxiliary cooling water in this example is but one of many potential configurations for stacking thermal energy onto an existing thermal fluid that requires heat dissipation. Stacking thermal energy can prove effective at gaining efficiency to the system. The configuration can be operated with a source of auxiliary cooling water thermal energy being eliminated from the example, or use the engine jacket water as the thermal fluid, or use Turbine lube oil, to provide thermal energy to a Waste Heat Chiller 28, ORC 4 or CCS 200 Reboiler 11, for the same purpose. As mentioned previously, although pumps would be required to circulate the thermal fluids through any and all of these thermal energy transfers, pumps are not explicitly shown in all of the examples for the purposes of brevity. Similar to improving the efficiency by reducing the fan loads on the gas coolers, the same can be applied to using the auxiliary cooling water energy in order to reduce the load on radiator cooling fan 81.

FIG. 29 shows a Gas Sweetening System (GSS) 201 that takes off-market specification or 'sour' natural gas (e.g., from Sour Natural Gas Feed Pipe 300), that may be contaminated with hydrogen sulfide (H2S) or excessive amounts of CO2, and removes the H2S and/or CO2 from the natural gas using an absorption-based amine system. When comparing to the CCS 200 systems depicted throughout this document where the combustion exhaust was scrubbed of CO2, this system removes H2S and associated CO2 from a natural gas stream. The 'sour' natural gas enters the Absorber 2a via Sour Natural Gas Feed Pipe 300 and exits the Absorber 2a via Sweetened Natural Gas Outlet Pipe 301 as 'sweetened' natural gas.

FIG. 29. is similar to FIG. 13 described above, except that the configuration is depicted in the example without a Waste Heat Chiller 28 and without an Exhaust Gas Cooler 19 that are included in the example of FIG. 13. In some examples, the heat management systems (controlled by the Control Module 12) may be configured without Waste Heat Chiller(s) 28 and exhaust gas coolers to save equipment costs because they are typically not necessary in a GSS 201 system. The numbering nomenclature for the Absorption-based (chemical amine absorption) system is the same as that depicted in FIG. 13, with the same referenced numbers representing the same components. Meaning, the components used in a CCS 200 is equivalent to the components used in a GSS 201. In the case where an Adsorption-based gas treating system is used in a GSS 201 application, the components are also directly exchangeable with the CCS 200 system.

The thermal fluids in the example of FIG. 29 are configured with 3 three thermal energy streams delivered to three heat exchangers within the ORC 4. The first stream delivers energy from the engine's jacket water to Thermal Fluid Heater #2 3b, which picks-up (stacks) additional thermal energy to the engine jacket water and then transfers that thermal energy to the ORC 4 (via heat exchanger Mid-ORC 15b) where that thermal energy is transferred to the ORC propellant in the ORC 4, after which the jacket water is returned towards the engine where it will divert to the radiator (for additional cooling) or return directly to the reciprocating engine 1 (or some amount of split flow will be applied where only partial cooling is required). The second thermal stream to the ORC 4 delivers thermal energy from the Thermal Fluid Heater #1 3a which circulates a thermal fluid to the ORC 4 (to heat exchanger High-ORC 5), then with energy remaining is transferred to Reboiler 11, where additional thermal energy is transferred to the Reboiler 11 and the temperature of the thermal fluid is reduced (destacked) and then is transferred back to the Thermal Fluid Heater #1 3a to restart the heat transfer loop. The third thermal stream of thermal energy delivered to the ORC 4 (to heat exchanger Mid-ORC 15a) is from the (CCS 200) Condenser 16 which operates on its own thermal fluid on its own loop. Although a pump would be required to circulate the thermal fluid, one is not shown but anybody skilled in the art would understand that a circulation pump would be required. Further details regarding the equipment configuration may be found in the description of FIG. 13, referenced above. The numbering nomenclature for the Absorption-based (chemical absorption amine) system is the same as that depicted in FIG. 13, with the same referenced numbers representing the same components.

The example of FIG. 29 shows an absorption-based GSS system 200 (used to sweeten natural gas) coupled to an ORC 4 system and a reciprocating engine 1. Similar to the CCS 200 absorption-based system used to extract CO2 from combustion exhaust (shown in FIGS. 1 through 15, 22, 23 and 31) by diverting the combustion exhaust through the Absorber 2a, while in this case the natural gas being diverted through the Absorber 2a is 'sour' off-market specification methane gas. The heat recovery from the engine 1 is used in a similar fashion described above, where the Thermal Fluid Heater #1 3a distributes thermal energy to the ORC 4 and the GSS 201 systems Reboiler 11, and the engine jacket water is circulated to the Thermal Fluid Heater #2 3b to pick up additional thermal energy which is then transferred to the ORC 4. Thermal energy from the GSS 201 Condenser 16 is also transferred to the ORC 4.

In the example of FIG. 29, the exhaust gas from the combustion device (in this case a reciprocating engine) is vented to atmosphere without recovery of the CO2 in the exhaust gas stream. It should be noted that the system depicted in FIG. 29 would be capable of processing both the engine 1 exhaust and the 'sour' off-market specification methane gas through the same Absorber 2a however the stripped gas would end up with a blended stripped gas stream of both CO2 and H2S, which would then require further treating or would be disposed of in an acid injection well or other disposal well.

It is noted that the GSS configuration of FIG. 29 is applicable to any and all of the combustion devices (e.g., reciprocating engines, turbines, boilers and furnaces) and is applicable to any and all of the figures and configurations described or depicted in the present disclosure where in place of treating combustion exhaust gas, the system would process 'sour' off-market specification methane gas. Additionally, the discharge gas from the Condenser 16 is referred to herein as "Acid Gas" (a combination of CO2 and H2S) that will be disposed of in a disposal well because the gases that come out of the system will form acids (carbonic and sulfuric) and will have limited to no market value and therefore are typically injected into a disposal well.

FIG. 30 shows an absorption-based gas treating system with two Absorbers. The first Absorber 2a is shown as being a part of CCS 200 and is configured to process combustion exhaust from the engine and the second Absorber 2b is configured to process 'sour' off-market specification methane gas. The configuration of FIG. 30 has a similar configuration as FIG. 13, with the addition of a second H2S+CO2 Absorber 2b that is configured to sweeten a 'sour' off-market specification methane gas stream as depicted in FIG. 29. It should be noted that a CCS 200 system is primarily designed to recover CO2 however it can append to it additional Absorbers. In this case, Absorber 2b is appended to the CCS 200 for the purpose of Absorber 2b scrubbing 'sour' off-market specification methane gas. If processing raw 'sour' off-market specification methane gas, often both H2S and CO2 (as elemental compounds in the gas) are present and therefore when processed through the CCS 200, both CO2 and H2S will both be recovered. All other components are the same as FIG. 13 therefore refer to the description of FIG. 13 for an explanation of it and the various configuration adaptations that can be made.

The configuration of FIG. 30 illustrates that the two streams of gas from the two Absorbers 2a and Absorber 2b are being cleaned up (one gas stream being natural gas for gas sweetening 2b and the other for recovery of CO2 from the combustion exhaust gas 2a) by using the balance of the CCS 200 Absorption-based amine plant (that includes the Cross Flow Heat Exchanger 88, Stripper 17, Reboiler 11 and Condenser 16), where the stripped gas from both Absorbers 2a and 2b are combined. These stripped gas byproducts may include CO2 and H2O from the carbon capture amine CCS 200 system, as well as H2S and/or CO2 from the gas sweetening Absorber 2b. The combined byproducts may then be processed for stripping, re-boiling and condensing in a single (amine-based) balance of plant CCS 200 system. Because the gas streams would be combined on the discharge from the stripper, the gases more than likely will be sent to a (acid gas) disposal well. In the case where the discharge streams must be segregated, then two separate absorption-based gas treating systems, one operating as a GSS 201, and the second operating as a CCS 200, both with their own (and separate) Cross Flow Heat Exchangers 88a and 88b, Stripper 17a and 17b, Reboiler 11a and 11b, and Condenser 16a and 16b, would be required (but are not shown in this configuration).

In the configuration of FIG. 30, a Waste Heat Chiller 28 may be configured to use the engine's auxiliary cooling water to run the Waste Heat Chiller 28 to cool the engine exhaust in Exhaust Gas Cooler 19 prior to the combusted exhaust gas entering the CCS 200 (CO2) Absorber 2a.

Thus, the example of FIG. 30 illustrates a configuration having two chemical absorption Absorbers, where one is connected to a Carbon Capture System (CCS 200) Absorber 2a (labeled "CO2 Absorber" in the Figure) and the other a gas sweetening system Absorber 2b (labeled "H2S+CO2 Absorber" in the Figure) operating in parallel to one another, both being connected to the CCS 200's balance of plant, an ORC 4 system and a reciprocating engine 1. In some examples, the two Absorbers (2a, 2b) operate in parallel and share the same solvent that is circulated throughout the chemical absorption system, circulating the common solvent through the CCS 200's Cross Flow Heat Exchanger 88, Stripper 17, Reboiler 11 and Condenser 16.

In this example, the GSS Absorber 2b shares amine solvent from the CCS 200.

The ORC 4 in the example can have more or less interaction points with the Absorption-based (chemical absorption amine) system and the combustion device (in this case a reciprocating engine). Integration of gas compressors and Waste Heat Chiller(s) 28 is possible, as depicted in other configurations described in this document. It should be noted that the Waste Heat Chiller 28 shown in FIG. 30 or any of the other FIG's is not required to operate the systems and is included to improve the efficiency of the systems by providing cooling in streams requiring cooling. Further, Waste Heat Chiller(s) 28 can be similarly inserted into any of the processes disclosed in this document.

It should be further noted that the stripped gas that is discharged from the Condenser 16 is typically referred to as Acid Gas (CO2, H2S or a combination of CO2 and H2S, and when mixed with H2O forms acid) that is typically disposed of in a disposal well because the gases that come out of the system form acids (carbonic and sulfuric) that typically have no other place to go but injection into a disposal well. If a pure stream of CO2 is recovered, there are markets and uses for the CO2 gas and therefore it may have value. Moreover, the arrangement of parallel Absorbers 2a, 2b can be applied to at least one, and possibly multiple, CCS (CO2 gas) Absorbers and/or at least one and possibly multiple GSS 201 (H2S/CO2) Absorbers from multiple combustion devices (such as reciprocating engines, turbines, boilers, and furnaces) operating in proximity to one another. Some examples in the oil and gas industry are natural gas compression and heavy oil extraction, where it is common for a facility to have multiple gas compressors and boilers, respectively, operating at one site.

The example of FIG. 31 shows a reciprocating engine 1 coupled to one Natural Gas Compressor 90, a conjoined ORC 4 system (comprised of ORC 4a and ORC 4b) and two separate and distinct gas treating (absorption-based) systems, where one is configured to function as a GSS 201 and the other as a CCS 200.

In this example, a reciprocating engine 1 is coupled to a natural gas compressor 90 is shown with two stages of compression depicted as 90a, 90b (and could contain more stages of compression which would be depicted as 90x), configured with a joined ORC system 4a combined with 4b, which is illustrated in the figure as two ORC systems (4a, 4b) being joined by the dotted line 330 (thus showing a single ORC 4 system split into two portions 4a, 4b in the exemplary illustration), and further integrated with two separate absorption-based gas treating systems (CCS 200 and GSS 201), For simplicity, the Cross Flow Heat Exchangers (e.g., 88) of a typical absorption-based gas treating systems are not shown in this example, but are understood to be included here by either one skilled in the art or based on previous examples in this document. In this example, a first absorption-based system may be configured as a carbon capture CCS system (e.g., Absorber 2a) that recovers CO2 from the combusted exhaust. The CO2 may then be recovered in the Stripper 17a and is discharged from the Stripper 17a to the Condenser 16a.

The thermal energy from the engine's jacket water may be transferred to the ORC 4a (via heat exchanger ORC #1), as shown in previous examples in this document. The exhaust thermal energy recovered in Thermal Fluid Heater #1 3a is distributed to the CCS 200 Reboiler 11a and then to ORC 4a (via heat exchanger ORC #2). It can be noted that the direction of flow can be reversed in this loop from that shown and the system will still function as intended. The thermal energy collected from the CO2/H2O gas Condenser 16a is shown to be transferred via thermal fluid to ORC 4a (via heat exchanger ORC #3). Similar to the other CCS 200 gas treating systems disclosed herein, the $H_2O$ is precipitated out of the CO2 stream such that CO2 is then discharged to either a pipeline or (acid gas) disposal well. The second absorption-based GSS 201 gas treating system (e.g., with components operatively coupled to the "Sour Natural Gas IN" path) is configured to sweeten the 'sour' off-market specification methane gas prior to it being compressed for distribution into a gas gathering system. In this configuration, the reciprocating engine's 1 auxiliary cooling water is transferred to the ORC 4b (via heat exchanger ORC #6). Alternately, or additionally, this stream can be used to run a Waste Heat Chiller 28 (not shown). The thermal energy from the exhaust is recovered into a thermal fluid loop circulating between the Thermal Fluid Heater #2 (3b) and the natural gas compressor stages (e.g., 90a, 90b) to upgrade/stack the temperature of the thermal fluid through heat exchangers located between the compressor stages and the Inter-stage Gas Coolers (e.g., 92a, 92b) that are part of the Natural Gas Compressor 90 package. The extracted thermal energy from the heat of compression is then transferred to the GSS 201 gas treating systems Reboiler 11b. The thermal energy from the GSS 201 Condenser 16b is transferred to the ORC 4b (via heat exchanger ORC #4). The direction of thermal fluid flow circulation in this loop may be better suited to be operated in the opposite direction. The system will function in either direction however the Control Module 12 (with use of an artificial intelligence application) will best determine which direction the fluid should flow in order to optimize the efficiency.

In this example and most other examples in this document, the fuel energy inputted into the reciprocating engine 1 in FIG. 31 is typically combusted and distributed into different energy streams. As an example, a typical reciprocating engine may have an energy distribution of ⅓ of the energy is converted into mechanical energy (shaft horsepower), ⅓ is converted into radiant energy (dissipated into the engine jacket water and auxiliary cooling water), and ⅓ converted into the exhaust waste gas. In the configuration shown in FIG. 31, energy from each of these 3 streams is partially recovered in order to energize (and improve the efficiency) of the ORC 4 and the two gas treating Absorption-based systems (CCS 200 and GSS 201) and the any associated gas compressors (whether that being the Natural Gas Compressor 90 shown, or a Stripped Gas Compressor 89, not shown). The same can apply to any Waste Heat Chillers 28 (not shown) that may be added to the system. For example, the thermal energy in the engine exhaust is used by both gas treating Absorption-based systems via Thermal Fluid Heater #1 3a to the CCS 200 system (e.g., 2a, 4a, 11a, 16a, 17a) and via Thermal Fluid Heater #2 3b to the GSS 201 system (e.g., 2b, 4b, 11b, 16b, 17b). The thermal energy in the engine jacket water may also be diverted to the ORC 4a to heat exchanger ORC #1 and the auxiliary cooler water may be used in ORC 4b to heat exchanger ORC #6, but could also be used in a Waste Heat Chiller 28 and then coupled to Exhaust Gas Cooler (e.g., as shown in FIG. 19) and/or other interconnection points in the process that require cooling. The mechanical energy from the reciprocating engine 1 that is used to compress natural gas may be converted to thermal energy (heat of compression from 90a, and 90b) and then also recovered and used in the overall system. In the example shown, the energy recovery is configured to be able to fully or partially operate two independent gas treating Absorption-based systems, CCS 200 and GSS 201.

Unlike the configuration shown in FIG. 30, where two (or more) gas treating Absorption-based Absorbers 2a, 2b (and can add as many Absorbers 2x as required) operate in parallel to one another with a shared balance of plant required for an absorption-based system (that share the Cross Flow Heat Exchanger 88, Stripper 17, Reboiler 11 and Condenser 16, as shown in FIG. 30), the configuration of FIG. 31 shows two separate and distinct gas treating Absorption-based systems (CCS 200 and GSS 201), coupled to a reciprocating engine 1 coupled to one natural gas compressors 90 (with two stages of compression 90a and 90b), and joined to a single ORC system 4a, 4b (shown as two blocks, but connected by a dashed line 330 to indicate it is one ORC system 4). It should be noted that the example of FIG. 31 may also be configured with, for example, two gas treating Adsorption-based systems, a combination of a gas treating Absorption-based and a gas treating Adsorption-based system, and/or two (or more) Absorption-based gas treating systems.

Further, integration of additional gas compressors (89 or 90) and Waste Heat Chillers 28 is possible, as depicted in other configurations described in this document.

Further integration of additional gas compressors and Waste Heat Chiller(s) 28 is contemplated in the present disclosure, as depicted in other configurations described in this disclosure. It should be noted that a Cross Flow Heat Exchanger (e.g., 88) is not explicitly shown in this example, but is understood to be an integral part of an absorption-based system and would normally be located in between the Stripper and Absorber in each of the gas treating systems. Meaning Cross Flow Heat Exchanger 88a would be located between Stripper 17a and Absorber 2a, and Cross Flow Heat Exchanger 88b would be located between Stripper 17b and Absorber 2b, Therefore, although they are not shown, it is understood that they would normally be included in operational conditions. Similarly, while no Waste Heat Chiller(s) (e.g., 28) are shown in FIG. 31 it is also understood that suitable Waste Heat Chiller(s) can be inserted into the process similarly to what is disclosed in the examples throughout this document.

Furthermore, the arrangement of multiple engines (combustion devices), and associated CCS 200 or GSS 201 systems, can be arranged in parallel with the function of multiple parallel Absorbers (2a, 2b, etc.) and/or parallel Adsorbers (e.g., 2da, 2db, etc.) from those multiple engines (or combustion devices) that can be pooled to the balance of plant required to operate a CCS gas treating Absorption-based system and/or a GSS gas treating Adsorption-based system from multiple engines (and gas compressors) operating in proximity to one another. In other words, in its simplest form, a series of multiple Absorbers (e.g., 2a, 2b) could be operated in parallel to one another such that Absorbers operating as part of a CCS or GSS configuration from multiple engines, could all be pooled to one larger gas treating Absorption-based or Adsorption-based plant to facilitate recovery of the gas compounds.

It should also be noted that in the configuration of FIG. 31, the Carbon Capture System (CCS 200) system and the heat recovery sources can be exchanged with those shown/used in the Gas Sweetening System (GSS 201) such that the initial thermal energy from the engine exhaust (e.g., recovered in Thermal Fluid Heater #1) and the engine jacket water can operate with the GSS 201 system, and the secondary thermal energy recovered from the engine exhaust (e.g., recovered in Thermal Fluid Heater #2) and heat of compression (from the gas compressor) can be used in the CCS 200 system.

The example of FIG. 32 depicts a GSS 201, with an Adsorption-based gas treating system coupled to a reciprocating engine, a natural gas pipeline system and an ORC 4 system where 'sour' off-market specification methane gas from the gas pipeline is sweetened using the adsorption-based gas treating equipment. More specifically, FIG. 32 shows gas treating adsorption-based system having a similar configuration to that shown in the absorption-based system in FIG. 29, where the adsorption system treats a methane gas stream to recover H2S and/or CO2.

The configuration in FIG. 32 depicts a Temperature Swing Adsorption system (e.g., could also be a pressure swing adsorption system) that is configured to recover H2S and/or CO2 from a 'sour' off-market specification methane gas stream using thermal energy from a reciprocating engines exhaust or engine jacket water, and from the adsorption systems Recycle 24 and Recovery 25 heat exchangers being used to transfer thermal energy to the ORC 4. In this configuration, the engine jacket water is circulated via Thermal Fluid Conduits 30 to the (H2S/CO2) Recovery 25 heat exchanger to pick up additional thermal energy to be transferred to the ORC 4 via heat exchanger ORC #1. The engine exhaust may be collected in Thermal Fluid Heater #2 and transferred to ORC 4 via heat exchanger ORC #2 as shown in the figure. The H2S/CO2 gas Recycle 24 heat exchanger may transfer thermal energy to the ORC 4 via heat exchanger ORC #3. Overall, this process will make the gas sweetening process more efficient.

The configuration shown in FIG. 32 is very similar to that shown in FIG. 29 with the exception of the GSS 201 gas treating system in FIG. 29 was illustrated as an absorption-based system whereas in FIG. 32, the gas treating system is a TSA (or can be a PSA) adsorption-based system.

Similar to previously described configurations of the TSA (and/or PSA), the Adsorber 2d is coupled to the "Swing 'A' Adsorption" 26 module and the "Swing 'B' Stripping" 27 module. The process swings the exhaust gas flow between the two modules 26 and 27 allowing time for the accumulation or H2S/CO2 onto the adsorption material in the "Swing 'A' Adsorption" 26 while the "Swing 'B' Stripping" 27 is removing the H2S/CO2 that has accumulated on the adsorption material in the previous swing. The exhaust gas flow diversion between the "Swing 'A' Adsorption" 26 module and the "Swing 'B' Stripping" 27 module is built into the Adsorber 2d and can be controlled by Control Module 12 or by a built-in controller as part of the Adsorber 2d. When the process swings, the roles of the two modules reverses and therefore the flow of the scrubbing gas is diverted to the other module and similarly the sour gas is diverted to the other module and will remain in this swing for a similar amount of time as the previous swing. The piping arrangement showing the alternate swings, where the flow to the two modules is reversed, is not shown for the sake of simplicity, and should be understood by a person of ordinary skill in the art. Meaning, the piping required for each swing exists and is coupled to the "Swing 'A' Adsorption" 26 module and the "Swing 'B' Stripping" 27 modules, and those modules can divert the associated gas to the appropriate equipment.

Figure 33:
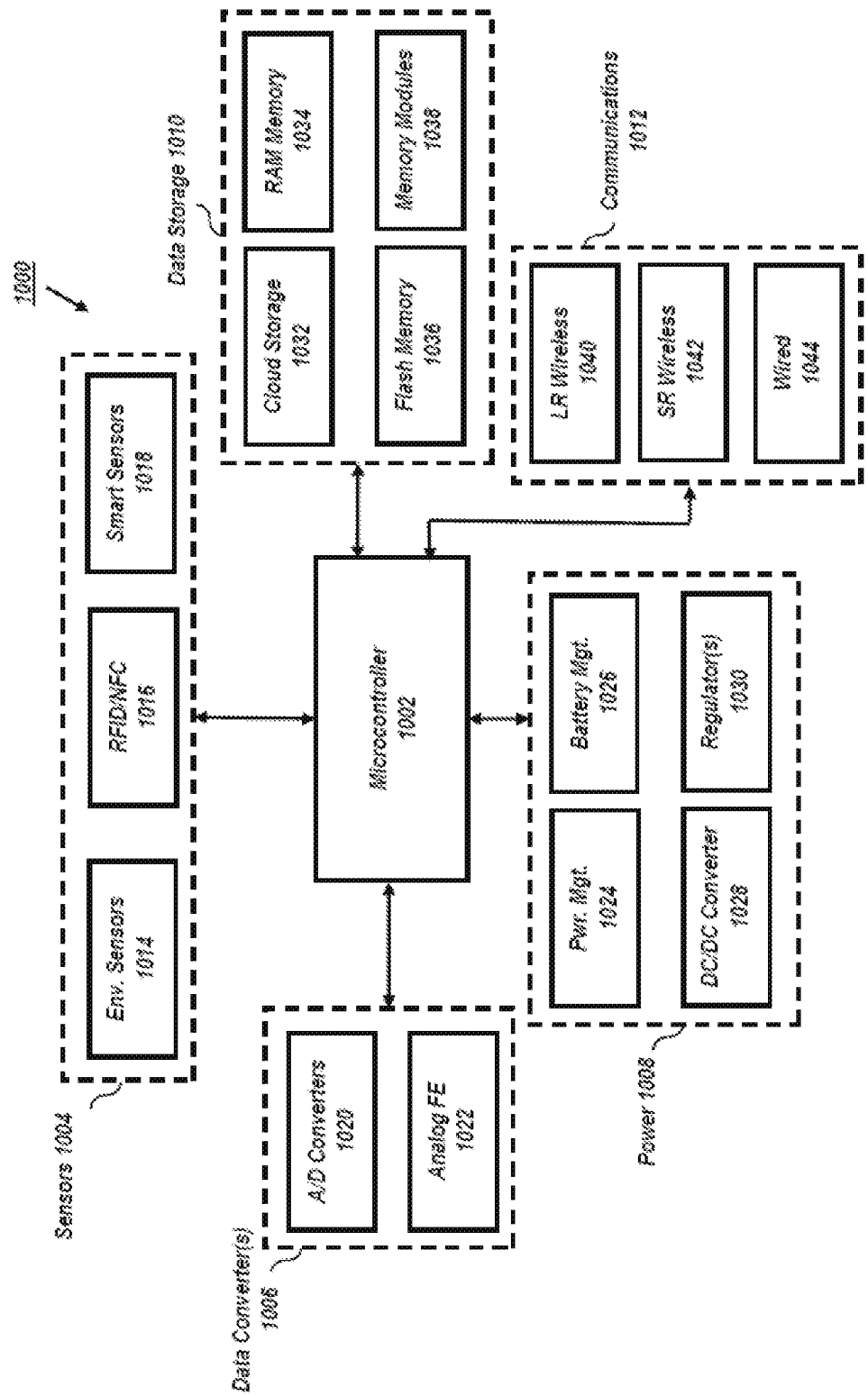
FIG. 33 is a simplified block diagram of a control module for use in CCS/GSS/ORC energy recovery system under some aspects of the present disclosure.

Turning now to FIG. 33, a control module 1000 is shown under an illustrative embodiment. The control module 1000 may be configured as Control Module 12 described above, or may be configured as an additional control module. Control module 1000 comprises a microcontroller 1002 that may be configured with one or more CPUs (processor cores or processors) along with transferable, stored and/or portable memory and programmable input/output peripherals. Program memory in the form of ferroelectric RAM, NOR flash or OTP ROM may also be included on chip, as well as a small amount of RAM or distributed RAM. In some illustrative embodiments, the microcontroller is configured for embedded applications, and may also be configured on a system on a chip (SoC) platform or in virtual cloud operation.

Microcontroller 1002 includes a plurality of general-purpose input/output pins (GPIO) that are software configurable to either an input or an output state. When configured as an input state, GPIO pins may read sensors or external signals. Configured to the output state, GPIO pins can drive external devices such as relays, valves, actuators, dampers, diverters, or motors, often indirectly, through external power electronics. Microcontroller 1002 may receive data from sensors 1004 that may include environmental sensors 1014 (e.g., temperature, pressure, flow, level, etc.), radio frequency identification (RFID) and/or near-field communication (NFC) sensors 1016, as well as smart sensors 1018. The data from sensors 1004 may be received via communications 1012 that may include long-range wireless module 1040 (e.g., CDMA, LTE, 5G, etc.), short range wireless module 1042 (e.g., WiFi, IEEE 802.16.4, Zigbee, Bluetooth, RFID/NFC) or other wireless communication, including by wired communication module 1044.

Microcontroller 1002 may further be coupled to a power module 1008 that includes power management module 1024, battery management module 1026, DC/DC converter 1028 and power regulators 1030. Data converter module 1006 may also be coupled to microcontroller 1002 and may include an analog-to-digital converter 1020 and an analog front end 1022. Analog signals, such as environmental signals, can be fed to A/D converter 1020, which may be configured to measure analog signals and converts the magnitudes to binary numbers. While microcontroller 1002 may be equipped with its own A/D converter, some high speed and/or high precision applications may require a more sophisticated A/D converter such as 1020. Analog Front End 1022 may be used for more complex waveforms, particularly when an A/D converter alone is not sufficient. The analog front end 1022 may be configured with a higher level of integration and include an A/D converter as well as signal conditioning blocks that can include a programmable gain amplifier (PGA) and filtering circuits. In such a configuration, the analog front end 1022 may advantageously perform the work of an A/D converter and several op amps. In some illustrative embodiments, the A/D converter 1020 may also include a digital-to-analog (D/A) converter to allow the microcontroller to output analog signals or voltage levels. Such a configuration may be advantageous when the controller is required to send digital and analog control signals to control valves, dampers, diverters, motors, compressors, pumps, fans, and the like.

Microcontroller 1002 may further be coupled to data storage 1010 that may include cloud storage 1032, RAM memory 1034, flash memory 1036 and/or dedicated memory modules 1038 that may be used as removable memory for expansion, security, or program memory storage. While not explicitly illustrated in the figure, control module 1000 may be configured with a variety of timers, such as a programmable interval timer (PIT). The PIT may either count down from some value to zero, or up to the capacity of the count register, overflowing to zero. Once it reaches zero, the PIT sends an interrupt to the processor indicating that it has finished counting. This is useful for thermal applications that periodically test the temperature around them or to a programmed set point to see if they need to turn control an aspect of the thermal recovery system. Additionally, a dedicated pulse-width modulation (PWM) module may be used to make it possible for the microcontroller to control power converters, resistive loads, switches, positioners, motors, etc., without using significant CPU resources in tight timer loops. Moreover, a universal asynchronous receiver/transmitter (UART) may be used to make it possible to receive and transmit data over a serial line with very little load on the CPU. Dedicated on-chip hardware may also be used to allow microcontroller 1002 to communicate with other devices (chips) in digital formats such as Inter-Integrated Circuit ($I^2C$), Serial Peripheral Interface (SPI), Universal Serial Bus (USB), and Ethernet.

Figure 34:
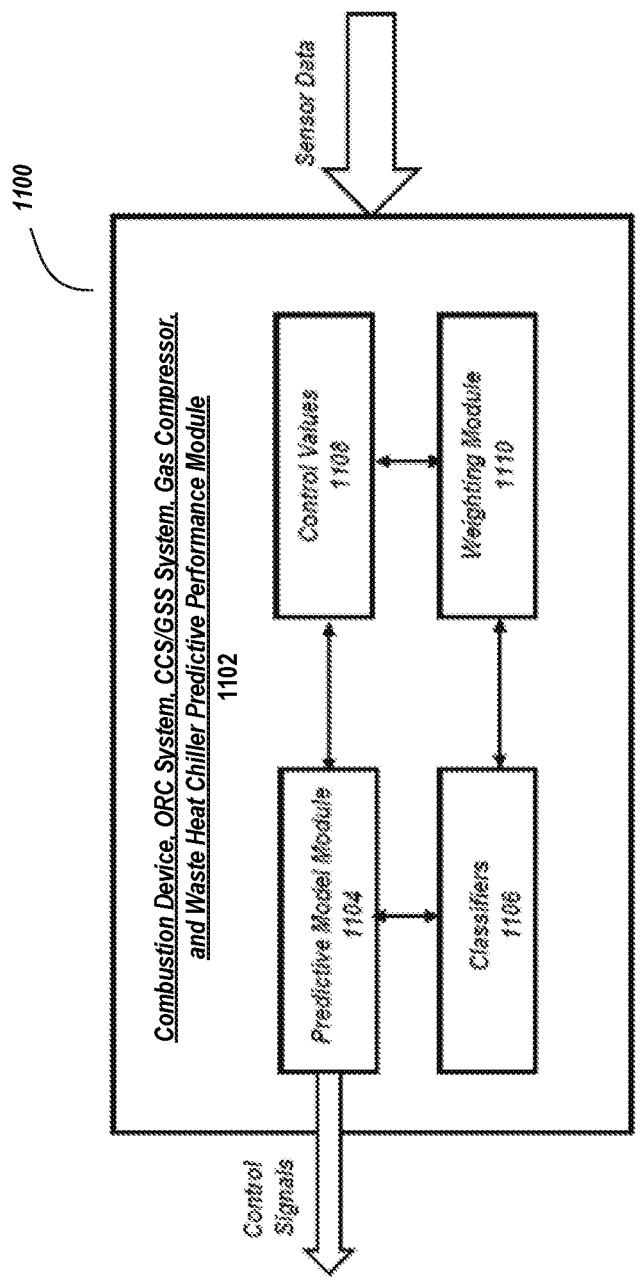
FIG. 34 is a simplified block diagram of a CCS/GSS/ORC energy recovery system predictive module for the control module of FIG. 33 under some aspects of the present disclosure.

Turning to FIG. 34, the figure shows an operating environment 1100 for a performance predictive module 1102 to predict the performance of the system. For the purposes of this example, reference to "The System" may refer to any one or combination of Combustion Device (1, 20 or 22), ORC System (4), CCS/GSS System (200/201), Gas Compressor (89, 90), and/or Waste Heat Chiller (28), which may be configured within the control module 1000. While specific reference is made to The System below, it should be readily apparent to a person of ordinary skill in the art that the technologies and techniques described in the examples are applicable to any of the systems described in this disclosure.

The System's predictive module 1102 comprises a predictive model module 1104, which may be configured to load a simulation program to generate one or more solutions for the predictive performance model into the control module (e.g., 1000) to predict The Systems components gross and net output performance. Predictive models may be stored in data storage 1010, or any other suitable storage means. During operation, The System predictive module 1102 may be configured to receive sensor data as shown in the figure and filter, normalize and otherwise process the sensor data. Iterative simulations can be run based on the operating conditions to predict the theoretical solution, although that solution may not be the optimal, nor representative of what the actual equipment can generate. Under an illustrative embodiment, a predetermined (or "default") predictive model module 1104 may be loaded into the predictive model module 1102. In one example, an artificial neural network (ANN) may be loaded into the predictive performance model module 1102 and be used to predict system performance based on parameters such as ambient air temperature, thermal fluid (including engine jacket water, auxiliary cooling water, turbine lube oil, waste heat chiller fluid, CCS/GSS absorber/amine solvent, and/or ORC propellant) temperatures and flow rates at and through the components and various flow paths presented, exhaust gas temperatures and mass flow at and through the components and various flow paths presented, stripped gas temperature and mass flow rates at and through the components and various flow paths presented, natural gas temperatures and mass flow rates at and through the components and various flow paths presented, as well as work sensed from the pump(s), work sensed from the cooler fan(s) or electric motor loads, heat transfer rates, work produced in the ORC expander, heat transfer rate in the various condensers and heat exchangers, system pressure(s) in the various segments of the ORC, thermal efficiency, enthalpy and/or mass flow rate of the working fluid, etc. of The System and the various components of The System, and the components of the components of The System.

The System predictive model may further include a classifier module 1106, that may include one or more classification algorithms configured to perform pattern recognition from the received sensor data and supervised by predictive model module 1104. Utilizing supervised learning, the classifier module assists in finding a function in the allowed class of functions that matches the sensed data. In other words, the classifier assists in finding the mapping implied by the data. A cost function of The System may be configured as the mismatch between the mapping and the data and it implicitly contains prior knowledge about sensed data. In one example, mean-squared error techniques may be used to minimize the average squared error between the predictive module output and the target value (e.g., set via target setting module 1208) over all the data pairs. Minimizing this cost using gradient descent for the class of neural networks (multilayer perceptrons (MLP)) may be configured to produce a backpropagation algorithm for training neural networks. Utilizing supervised learning, The Systems predictive module 1102 may perform pattern recognition (classification) and regression (function approximation) to allow the system to provide continuous feedback on the quality of the models and the effects of particular control signals. Over time, the differences between the classifier module 1106 classification algorithms and the empirical system operation data, for the various parameters, will train/normalize and The System Predictive Performance Module 1102 will become more efficient at finding the optimal efficiency, and hence the optimal economic operation of the machine.

The control values 1108 and weighting module 1110 are advantageously coupled to predictive model module 1104 to provide adjustments to the control signals (e.g., via control signal values) being transmitted from The System predictive module 1102 and system components (e.g., relays, fans, valves, pumps, motors, flow meters, valve positioners, switches, switch positioners, electric loads, speeds, feed rates, level indicators, temperature transmitters, pressure transmitters, etc.). Weighting module 1110 may be configured to provide weights to the data from module 1104 to make adjustments to the used model if the sensed data is producing excessive errors. As The System operates and the control module 1100 operates and compares its models against empirical data, the solutions will narrow and become more effective. Under the supervision of predictive model module 1104, the existing model loaded in module 1104 may be changed to a new model utilizing the weights provided from module 1110. If the predictive errors fall below a predetermined threshold, the weighted model is saved (e.g., in 1010) for future use.

Figure 35:
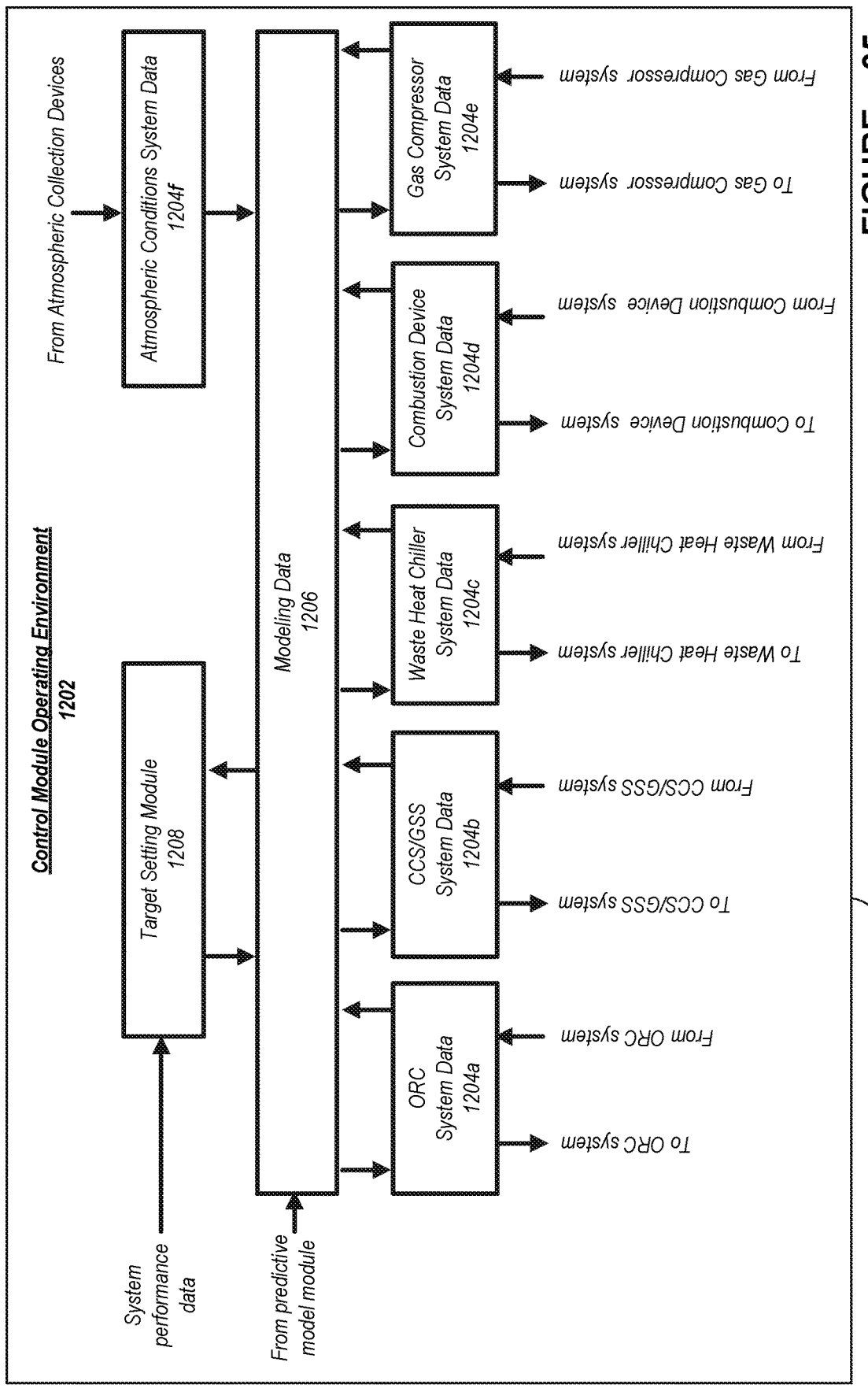
FIG. 35 shows an operating environment for the control module of FIG. 33 under some aspects of the present disclosure.

FIG. 35 shows another operating environment 1200 for the control module 1000 of FIG. 33 under an illustrative embodiment. The operating environment 1200 also includes the features of operating environment 1100. In the example of FIG. 35, control module operating environment 1202 comprises ORC system data 1204a, CCS/GSS System Data 1204b, Waste Heat Chiller System Data 1204c, Combustion Device System Data 1204d, Gas Compressor System Data 1204e, and Atmospheric Conditions 1204f (where Atmospheric Conditions means: atmospheric air temperature, altitude and atmospheric pressure) modeling data 1206 and target setting module 1208. In one example, the ORC system data 1204a receives data sensed from the ORC system. The ORC system data is then processed (e.g., via 1002) using the modeling data 1206. In some illustrative embodiments, the modeling data 1206 may be received independently from the predictive model module (e.g., 1104). Modeling data 1206 is then processed (e.g., via 1002) with system performance data that is used in the target setting module 1208. The target setting module 1208 uses the modeling data to determine if sensed and/or predicted parameters are within predetermined system performance data parameters. The target setting module 1208 may provide feedback to the modeling data 1206, which may then re-process the modeling data using the new data provided by the target setting module 1208 and then loop the newly-processed data back to target setting module 1208. In this example, the modeling data 1206 is adjusted (e.g., via 1104) in accordance with The System performance data in target setting module 1208 to ensure that ORC system parameters, with respect to thermal recovery and system performance, are within predetermined tolerances of performance metrics. Once the modeling data 1206 is processed, the data is provided to The System data 1204 that may then be used by the control module (e.g., 1000) to generate control signals that are transmitted wired or wirelessly to one or more system components (e.g., relay, valve, pump. etc.) to modify operation based on the predictive data. Not only will these systems narrow in on the optimized net output of The System, they will can be programmed to push the operating conditions in both directions (to add heat and to reject heat) to determine which direction the changes take the physical machines net output towards, trending and mapping the results for future considerations in order to optimize the output of The System. Just as much is learned from what doesn't improve performance as does to what does improve performance. Meaning, The System can learn not only what improves efficiency but also what hinders efficiency. As illustrated in the example for the ORC system data 1204a, the same process is concurrently run on CCS/GSS System Data 1204b, Waste Heat Chiller System Data 1204c, Combustion Device System Data 1204d, Gas Compressor System Data 1204e, and Atmospheric Conditions 1204f in order to optimize the operation of The System to maximize efficiency/operation of the equipment owner/operator, depending on the application in which the equipment is being used.

Figure 36:
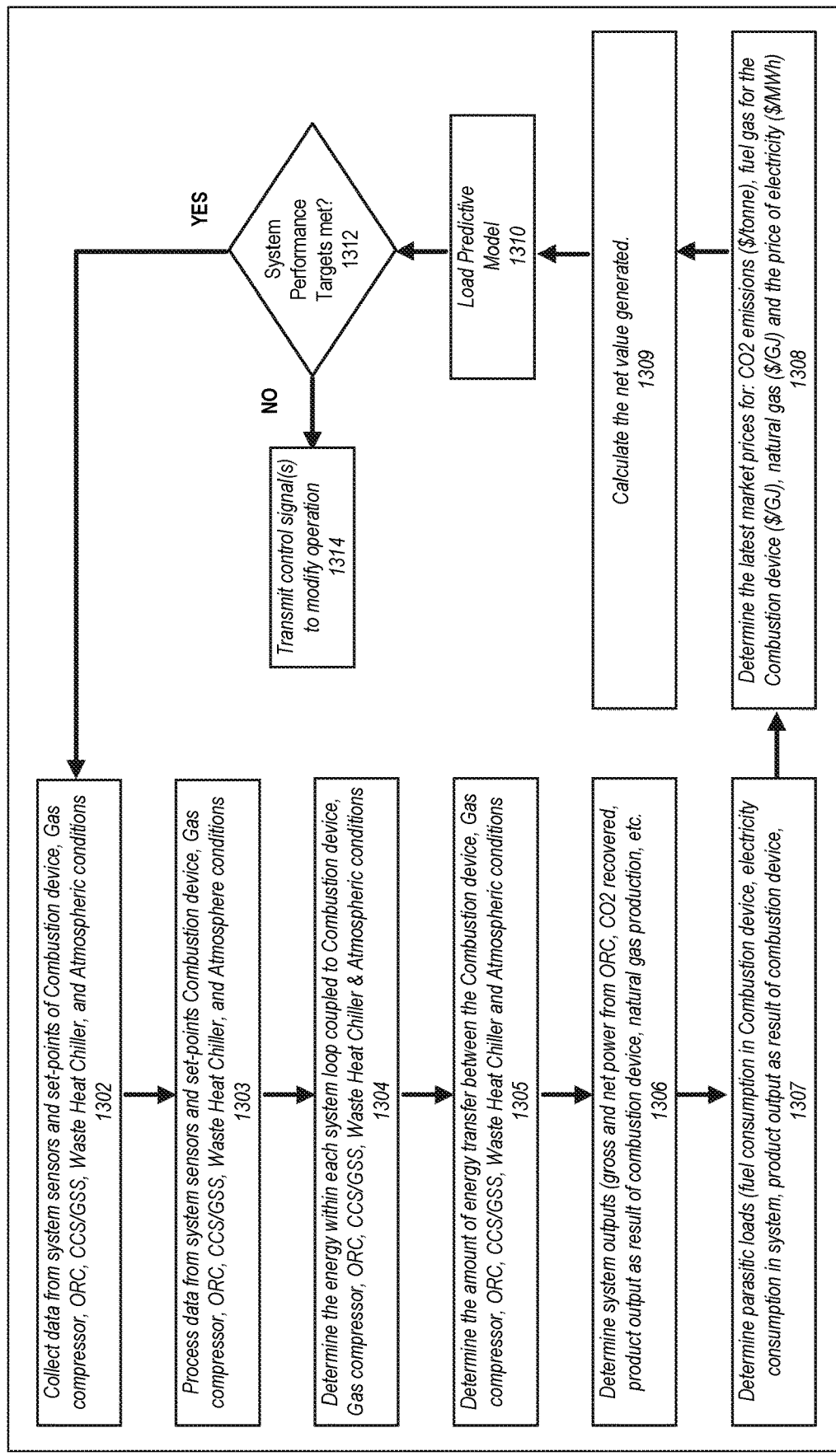
FIG. 36 is a flow diagram for sensing performance of CCS/GSS/ORC energy recovery system for loading a predictive model associated with a system performance target and for transmitting control signals to the CCS/GSS/ORC energy recovery system to alter operation in accordance with one or more performance optimization targets.

FIG. 36 is a flow diagram illustrating a process 1300 for sensing performance of an energy recovery system for loading a predictive model associated with a system performance target and for transmitting control signals to the energy recovery system to alter operation in accordance with one or more performance targets. In block 1302, The System (e.g., via 1000) senses, via sensors, the collection of data from system sensors and set-points (of the Combustion device, Gas compressor, ORC, CCS/GSS, Waste Heat Chiller, and Atmospheric Conditions) in block 1302 and then passes that data to block 1303 which stores the data. In block 1304, The System determines the energy within each system loop (that can be coupled to and between the Combustion device, Gas compressor, ORC, CCS/GSS, Waste Heat Chiller, and atmosphere) and stores the data and then passes that data to block 1305 which calculates the thermal energy flow/transfer between the various system devices. In block 1306, The System determines the component outputs gross and net power from the ORC, CO2 recovered by the CCS, natural gas discharge from the GSS, product output as result of operating the combustion device, combustion device performance, stripped gas recovered, natural gas production, etc.) and stores the data. In block 1307, the parasitic loads of (fuel gas consumption in Combustion device, electricity consumption in system by all of the components (including but not limited to the control module, instruments, waste heat chillers, compressors, pumps and fans), fuel gas consumed in the compressor(s), supplemental fuel gas consumption to run any system heaters or gas compressors, etc.) are determined and then that data is stored. In block 1308, external operational data may be used to configure the parameters and predictive processing for The System. The external operational data may include, but is not limited to, the latest market prices for: CO2 emissions ($/tonne), fuel gas for the Combustion device ($/GJ), natural gas ($/GJ) and the price of electricity ($/MWh) are gathered and stores the data. In block 1309 the net value generated is calculated and then that data is stored. One, any, or all of blocks 1302-1309 are performed, and in block 1310, the predictive model is loaded (e.g., 1104) and the data is processed.

In decision block 1312, The System determines if the sensed data, processed through the predictive model (e.g., 1206) meets system performance targets. If the predictive model shows that the data meets system performance targets ("YES"), the process moves back to blocks 1302-1309, where various operating characteristics of The System are sensed. If not ("NO"), the process moves to block 1314, where the control module 1000 or processor (e.g., 100) transmits one or more control signals to modify operation of The System.

For example, the control module 1000 or processor 100 may transmit control signals to any one of the control valves, positioners, actuators, pumps, cooler fans, motors, sub-control modules for independent system controls (such as a control module for one or any of the: combustion device, waste heat chillers, ORC, CCS/GSS, stripped gas compressors, natural gas compressors, etc.), that would the cause changes in the operation and performance of The System to reach to optimal performance. By causing the various components to change their flow rates, temperatures, etc. it will affect the overall system performance. As an example, if we look at FIG. 23 and FIG. 24 and how the control module 1000 could influence its operation, the following are some examples of the system control (which is not necessarily entirely comprehensive but is indicative to serve as an example of what devices can be controlled):

ORC 4 System (Data 1204a)

The ORC Operating Conditions Will be Affected by:
  a. ORC Propellant:
    i. The flow rates can be determined by flow meters, and controlled by speeding up or slowing down circulation pumps or using control valves to divert flow to the various heat exchangers.
    ii. The temperatures and pressures of propellant can be determined by temperature transmitters and pressure transducers and controlled by diverting the heat sources that interface with the propellant (exhaust gases, thermal fluids, combustion device load, speeding up or slowing down circulation pumps or using control valves) to divert flow to the various heat exchangers. The ORC Condenser Fans can also be sped up or slowed down as required to control propellant temperature.
  b. Jacket water, auxiliary cooling water and/or thermal fluid:
    i. The flow rates through the various jacket water, auxiliary cooling water and/or thermal fluid loops can be determined by flow meters and can be controlled by speeding up or slowing down circulation pumps or using control valves to divert flow (or around, or in split flow) to the various heat exchangers, including the radiator 8, aerial cooler.
    ii. The temperatures and pressures can be determined by temperature transmitters and pressure transducers integrated in the system piping and controlled by diverting the heat sources that interface with the jacket water, auxiliary cooling water and/or thermal fluid (combustion device exhaust gases, thermal fluids, combustion device load, speeding up or slowing down circulation pumps or using control valves) to divert around the heat exchanger interface, or speeding up or slowing down the radiator fan 81, and the energy in the loop will then transmit more or less energy to the various heat exchangers in the ORC, via: ORC #1, ORC #2, ORC #3, and/or ORC #4.
  c. Expander and Generator Speed and power output:
    i. The expander speed can be determined with a speed pick-up and can be controlled by a throttle valve controlling the flow of propellant passing through the expander. The throttle valves position (will be know from a valve positioner) and the rotating speed (from a speed sensor/pick-up) can communicate to the main control module 1000 or the sub-control module what the speed is and the reaction could be to open or close the throttle valve to change the speed.
    ii. The generator power output can be determined using current and potential transformers and can be controlled by a throttle valve controlling the flow of propellant through the expander. Power output can be increased or decreased as determined by the control module 1000.

CCS 200/GSS 201 System (Data 1204b)

The CCS/GSS Operating Conditions Will be Affected by:
  a. Combustion Exhaust Gas:
    i. The flow rates can be determined by flow meters or from the combustion devices on-board sub-control module, and controlled by speeding up or slowing down the Exhaust Blower Fan 21 or using control valves to divert flow to or around the various heat exchangers (Thermal Fluid Heater 3, Exhaust Gas Cooler 19) in the exhaust system or alter the combustion devices load by changing the fuel consumed in the combustion device (which would typically be controlled by a sub-control module).
    ii. The temperatures of the combustion exhaust gas can be determined by temperature transmitters and controlled by diverting the heat sources that interface with the exhaust gas (thermal fluids, chilled thermal fluids, amine solvent flowing through an absorber in an absorption CCS/GSS system, or stripped gas recirculating through an adsorber in an adsorption CCS/GSS system), or controlling (speeding up or slowing down) the Exhaust Gas Cooler Fan 18, or using control valves to divert flow to or around the various heat exchangers in the exhaust system.
  b. Amine solvent flowing through absorption-based system
    i. The flow rates can be determined by flow meters, and controlled by speeding up or slowing down the amine solvent circulation pumps within the absorption-based system or using control valves to divert the solvent flow to or around the various heat exchangers or knock-out tanks (which would typically be controlled by a sub-system controller).
    ii. The temperatures of the amine solvent can be determined by temperature transmitters and controlled by diverting the heat sources that interface with the amine solvent (Reboiler 11, thermal fluids, (stripped gas) absorption-based condenser 16, chilled thermal fluids, the exhaust gas temperature flowing through the absorber), or controlling the Stripped Gas Cooler Fan 87, or using control valves to divert flow to or around the various heat exchangers in the absorption-based CCS/GSS gas treating system.
  c. Stripped gas recirculating through adsorption-based system
    i. The flow rates can be determined by flow meters, and controlled by speeding up or slowing down the (stripped gas or CO2) gas circulating device 32 within the adsorption-based system or using control valves to divert the stripped gas flow (CO2) to or around the various heat exchangers within the adsorption-based system (which would typically be controlled by a sub-system controller).
    ii. The temperatures of the stripped gas (typically CO2) can be determined by temperature transmitters and controlled by diverting the heat sources that interface with the stripped gas (Recycle 24, Recovery 25, thermal fluids, thermal fluid heater 3a, chilled thermal fluids, the exhaust gas temperature flowing through the adsorber 2d), or controlling (speeding up or slowing down) the Exhaust Gas Cooler Fan 18 to alter the temperature of the exhaust that will enter the Adsorber 2d, or controlling the Stripped Gas Cooler Fan 87, or using control valves to divert flow to or around the various heat exchangers in the adsorption-based CCS/GSS gas treating system.

d. Chilled thermal fluid from Waste Heat Chiller:
  i. The chiller thermal fluid flow rates through the various heat exchangers (e.g. located in the exhaust gas flow in front of the Exhaust Gas Cooler 19), can be determined by flow meters and can be controlled by speeding up or slowing down circulation pumps or using control valves to divert flow (or around, or in split flow) to the various heat exchangers.
  ii. The temperatures can be determined by temperature transmitters integrated into the system piping and controlled by diverting the heat sources supplying the waste heat chillers with the thermal energy to operate them (combustion device exhaust gases, thermal fluids, combustion device load, speeding up or slowing down circulation pumps or using control valves) or by diverting the chilled thermal fluid to various heat exchangers to spread around the chilled thermal fluid via diverting valves Waste Heat Chiller 28 System (Data 1204*c*)
The Waste Heat Chillers Operating Conditions Will be Affected by:
  a. Thermal energy supplied to Waste Heat Chiller (Hot Side):
    i. The hot thermal fluid flow rates from the various heat streams in the system that give up thermal energy (whether that is directly or stacked with other thermal energy sources) to the waste heat chillers (e.g. auxiliary cooling water, engine jacket water, thermal fluid, exhaust gas, stripped gas, inter-stage gas coolers, heat of compression, etc.), can be determined by flow meters and can be controlled by speeding up or slowing down circulation pumps or using control valves to divert flow (to, or around, or in split flow) to and from the various heat exchangers.
    ii. The temperatures can be determined by temperature transmitters integrated into the system piping and controlled by diverting the heat sources supplying the waste heat chillers with the thermal energy to operate them (combustion device exhaust gases, thermal fluids, combustion device load, speeding up or slowing down circulation pumps or using control valves, stripped gas), or altering the temperature of the thermal fluid (or gas) delivering the thermal energy to the waste heat chiller.
  b. Chilled thermal fluid from Waste Heat Chiller (Cold Side):
    i. The chilled thermal fluid flow rates from the waste heat chillers will be determined by the amount of thermal energy input into the waste heat chillers.
    ii. The temperatures can be determined by temperature transmitters integrated into the system piping and can be controlled by altering the amount of thermal energy that is input into the waste heat chiller, as well as how much thermal energy is extracted from the chilled thermal fluid that discharges and returns to the waste heat chiller. It is also possible to divert the heat sources supplying the waste heat chillers with the thermal energy to operate them (combustion device exhaust gases, thermal fluids, combustion device load, speeding up or slowing down circulation pumps or using control valves) or by diverting the chilled thermal fluid to various heat exchangers to spread around the chilled thermal fluid via diverting valves Combustion Device 1, 20, 22 System (Data 1204*d*)
The Combustion Device Operating Conditions Will be Affected by:
  a. Sub-control module
    i. The sub-control module on most devices (e.g. engine control module on a reciprocating engine or turbine) will respond to the combustion devices operating load. This will be controlled by altering the fuel gas consumed in the combustion device so that the combustion device can respond to the demand from the work put out by the combustion device. For example, if a natural gas compressor, driven by a reciprocating engine, requires more horsepower to drive the compressor, the engine control module will open the throttle valve on the engine which will then cause more fuel gas to enter the engine for consumption to meet the horsepower requirements.
  b. Atmospheric Conditions
    i. The combustion devices performance will be dependent on: the altitude of the installation of the combustion device, the changing ambient air temperature that will mix with the fuel gas in the combustion process, and the atmospheric pressure.
    ii. Sensors will collect and feed this information into the sub-controllers on each device and The System's main controller 1000. This information will flow in one direction (from the sensors to the processors) however it will affect The Systems performance and therefore will change as the atmospheric conditions change.

Gas Compressor 89, 90 System (Data 1204*e*)
The Gas Compressor's Operating Conditions Will be Primarily Affected by:
  a. Combustion devices (reciprocating engine or turbine) output
    i. The (sub-control module) engine control module on a reciprocating engine or turbine will respond to the combustion devices operating load, and therefore the compression is usually limited by horsepower generated by the engine. This will be controlled by altering the fuel gas consumed in the combustion device so that the combustion device can respond to the demand from the work put out by the combustion device.
  b. Atmospheric Conditions
    i. The combustion devices performance will be dependent on: the altitude of the installation of the combustion device, the changing ambient air temperature that will mix with the fuel gas in the combustion process, and the atmospheric pressure.
    ii. Sensors will collect and feed this information into the sub-controllers on each device and The System's main controller 1000. This information will flow in one direction (from the sensors to the processors) however it will affect The Systems performance and therefore will change as the atmospheric conditions change.
    iii. Gas compression will be affected by the temperature of the gas entering the compressor, therefore the cooler the gas is entering, then more gas can flow through the compressor, therefore the Stripped Gas Cooler 23 (and the associated Stripped Gas Cooler Fan 87) and Waste Heat Chillers 28 (providing cooling to the gas stream) can impact the amount of flow rate through the gas compressor by cooling the inlet gas temperature. Further, each stage of compression affects the amount of gas that can get compressed in the gas compressor and therefore with heat recovery from the heat of compression, more gas will flow through the gas compressor. In the case of a waste heat chiller recovering thermal energy after each stage of compression, the cooling created by the waste heat chiller can be used to reduce the gas prior to entering the gas compressor that heat is being recovered from, or from another gas compressor in the system.

Atmospheric Conditions (1204f)

The Atmospheric Conditions only feed information into The System however the changes in the atmospheric conditions alter the performance of The System, as described above.

An over-arching theme across the efficiency of The System is that not only is it possible to achieve better performance by recovering more waste heat, it is also an important concept to reduce the amount of the parasitic loads The System requires to operate to achieve the same output. Due to the complexity of operating such a system, and understanding that the atmospheric conditions will be constantly changing even if the rest of the system is stable, and that the commercial aspects of commodity values will be changing, a predictive control module would be best suited to operate such a complex system. The predictive system can determine whether it is more beneficial to reduce parasitic loads or increase heat recovery, and where to apply the recovered heat.

The terms "heating", "heat sources", "cooling", "heat sinks", and "chilled thermal fluid sinks" are used in the present disclosure to describe various configurations, the following table provides simplified examples of components that may be used. It should be understood that the examples are illustrative only, and are not limiting.

Aspect 2 may be combined with aspect 1 and includes that the control module is configured to cause heat to be recovered from the combustion device (i) exhaust flow and/or (ii) the jacket water fluid, and/or (iii) the auxiliary cooling water, and/or (iv) the turbine lube oil, to apply the recovered heat to the gas treating system and/or the ORC.

Aspect 3 may be combined with any of aspects 1 and/or 2, and includes that the combustion device comprises at least one of a reciprocating engine, a turbine, a boiler, or a furnace.

Aspect 4 may be combined with any of aspects 1 through 3, and includes that the control module is configured to cause energy to be diverted independently or simultaneously from the one or more of the combustion device exhaust flow, the thermal fluid, the stripped gas, the compressed stripped gas, the natural gas, the compressed natural gas, engine jacket water, the ORC propellant, the chilled thermal fluid, turbine lube oil and/or auxiliary cooling water.

Aspect 5 may be combined with any of aspects 1 through 4, and includes one or more compressors wherein the control module is configured to recover heat of compression from the compressed natural gas and/or the compressed stripped gas, and/or provide cooling to the compressed natural gas and/or the compressed stripped gas.

Aspect 6 may be combined with any of aspects 1 through 5, and includes that the one or more combustion device comprise a plurality of combustion devices, wherein the gas treating system comprises one or more of (i) an additional absorption-based system absorber, and/or (ii) an additional adsorption-based system adsorber, wherein the additional absorption-based system and additional adsorption-based system are configured to be coupled in parallel with the absorption-based system and adsorption-based system, respectively, to form a parallel gas treating system, and

| Heat Sources | Heat Sinks | Chilled Thermal Fluid Sinks |
| --- | --- | --- |
| Combustion device exhaust | Waste Heat Chillers | Inter-stage gas coolers |
| Engine jacket water | Engine radiator | Stripped gas cooler |
| Engine auxiliary cooling water | Inter-stage gas coolers | Exhaust gas cooler |
| Stripped Gas Condenser | Stripped gas cooler | ORC condenser (not shown) |
| Recovery (heat exchanger) | Exhaust gas cooler | Engine exhaust |
| Recycle (heat exchanger) | ORC | Engine jacket water |
| Adsorber/Absorber discharge | Auxiliary cooling water | Auxiliary cooling water |
| Heat of compression | Thermal fluid | Stripped Gas Condenser |
| Turbine lube oil | Engine jacket water | Thermal Fluid |
| Turbine exhaust | Waste Heat Chiller | Stripped gas (CO2/H2S) |
| Boiler or Furnace exhaust | Atmospheric Air | |

The following aspects are illustrative only and may be combined with other aspects or teachings described herein, without limitation.

Aspect 1 is a system, comprising: a gas treating system comprising at least one of (i) an absorption-based system, comprising at least one absorber, and/or (ii) an adsorption-based system comprising at least one adsorber; a combustion device, operatively coupled to the gas treating system; an Organic Rankine Cycle (ORC) operatively coupled to the combustion device and/or to the gas treating system; and a control module, wherein the control module is configured to cause energy to be diverted from one or more of combustion device exhaust flow, thermal fluid, stripped gas, compressed stripped gas, natural gas, compressed natural gas, ORC propellant, chilled thermal fluid, jacket water fluid, auxiliary cooling water, and/or turbine lube oil, through any of the gas treating system, the combustion device and/or the ORC to provide heat and/or cooling and/or power.

wherein the parallel gas treating systems' absorbers and/or adsorbers are operatively coupled to the plurality of combustion devices to operate as a single gas treating systems balance of plant.

Aspect 7 may be combined with any of aspects 1 through 6, and includes one or more waste heat chillers, wherein the control module is configured to cause thermal energy to be diverted to or from the one or more of the combustion device exhaust flow, the thermal fluid, the ORC propellant, the stripped gas, the compressed stripped gas, the natural gas, the compressed natural gas, engine jacket water, and/or auxiliary cooling water, turbine lube oil, to the one or more waste heat chillers.

Aspect 8 may be combined with any of aspects 1 through 7, and includes that the control module is configured to cause the combustion device exhaust flow to be cooled prior to entering the gas treating system.

Aspect 9 may be combined with any of aspects 1 through 8, and includes that the control module is configured to cause the stripped gas to be cooled after leaving the gas treating system.

Aspect 10 may be combined with any of aspects 1 through 9, and includes that the gas treating system is configured to (i) remove CO2 gas from the combustion device exhaust flow, and/or (ii) remove H2S and/or CO2 gas from natural gas during a gas sweetening process.

Aspect 11 may be combined with any of aspects 1 through 10, and includes an engine radiator, configured to provide cooling to at least one of the radiator cooled gas heat exchanger to at least one of: (i) the combustion device exhaust flow prior to it entering the absorption-based system or the adsorption-based system, (ii) the stripped gas prior to it entering a stripped gas cooler, (iii) the compressed natural gas, prior to the compressed natural gas entering an inter-stage gas cooler, and/or (iv) the compressed stripped gas, prior to the compressed stripped gas entering an inter-stage gas cooler.

Aspect 12 is a method for operating a system, comprising: configuring a gas treating system comprising at least one of (i) an absorption-based system, comprising at least one absorber, and/or (ii) an adsorption-based system comprising at least one adsorber; configuring a combustion device, operatively coupled to the gas treating system; configuring an Organic Rankine Cycle (ORC) operatively coupled to the combustion device and/or to the gas treating system; and configuring a control module for diverting energy from one or more of combustion device exhaust flow, thermal fluid, stripped gas, compressed stripped gas, natural gas, compressed natural gas, ORC propellant, chilled thermal fluid, jacket water fluid, auxiliary cooling water, and/or turbine lube oil, through any of the gas treating system, the combustion device and/or the ORC to provide heat and/or cooling and/or power.

Aspect 13 may be combined with aspect 12, and includes that the diverting of the energy comprises causing heat to be recovered from the combustion device (i) exhaust flow and/or (ii) the jacket water fluid, and/or (iii) the auxiliary cooling water, and/or (iv) the turbine lube oil, for applying the recovered heat to the gas treating system and/or the ORC.

Aspect 14 may be combined with any of aspects 12 and/or 13, and includes that the diverting of the energy comprises diverting energy, independently or simultaneously, from the one or more of the combustion device exhaust flow, the thermal fluid, the stripped gas, the compressed stripped gas, the natural gas, the compressed natural gas, engine jacket water, the ORC propellant, the chilled thermal fluid, turbine lube oil and/or auxiliary cooling water.

Aspect 15 may be combined with any of aspects 12 through 14, and includes that recovering heat of compression from the compressed natural gas and/or the compressed stripped gas, and/or providing cooling to the compressed natural gas and/or the compressed stripped gas.

Aspect 16 may be combined with any of aspects 12 through 15, and includes that the diverting of the energy comprises causing thermal energy to be diverted to or from the one or more of the combustion device exhaust flow, the thermal fluid, the ORC propellant, the stripped gas, the compressed stripped gas, the natural gas, the compressed natural gas, engine jacket water, and/or auxiliary cooling water, turbine lube oil, to one or more waste heat chillers.

Aspect 17 may be combined with any of aspects 12 through 16, and includes that the diverting of the energy comprises causing the combustion device exhaust flow to be cooled prior to entering the gas treating system.

Aspect 18 may be combined with any of aspects 12 through 17, and includes (i) removing CO2 gas from the combustion device exhaust flow via the gas treating system, and/or (ii) removing H2S and/or CO2 gas from the natural gas during a gas sweetening process.

Aspect 19 may be combined with any of aspects 12 through 18, and includes providing cooling, via an engine radiator, to at least one of: (i) the combustion device exhaust flow prior to it entering the absorption-based system or the adsorption-based system, (ii) the stripped gas prior to it entering a stripped gas cooler, and/or (iii) the compressed natural gas, prior to the compressed natural gas entering an inter-stage gas cooler, and/or (iv) the compressed stripped gas, prior to the compressed stripped gas entering an inter-stage gas cooler.

Aspect 20 is a system, comprising: a gas treating system comprising a Carbon Capture System (CCS), the CCS comprising one of at least one of (i) an absorption-based system, comprising at least one absorber, and/or (ii) an adsorption-based system comprising at least one adsorber; a combustion device, operatively coupled to the gas treating system; an Organic Rankine Cycle (ORC) operatively coupled to the combustion device and/or to the gas treating system; and a control module, wherein the control module is configured to cause energy to be diverted from one or more of combustion device exhaust flow, thermal fluid, stripped gas, compressed stripped gas, natural gas, compressed natural gas, ORC propellant, chilled thermal fluid, engine jacket water, auxiliary cooling water, and/or turbine lube oil, through any of the gas treating system, the combustion device and/or the ORC to provide heat and/or cooling and/or power.

Certain aspects of the present disclosure delineate between reciprocation engines and combustion devices such as turbines, boilers, furnaces, etc., as reciprocating engines include features such as jacket water and auxiliary cooling water in which thermal energy can be recovered from. However, it should be understood by those skilled in the art that various configurations are contemplated in the present disclosure, in which system integration of can be implemented using only exhaust heat, making the implementation equally applicable between a reciprocating engine and a combustion device.

What is claimed is:

1. A system, comprising:
   a gas treating system comprising at least one of
      (i) an absorption-based system, comprising at least one absorber, the absorption-based system being configured as an independent absorption loop comprising a solvent fluid that circulates to treat a gas stream, and/or
      (ii) an adsorption-based system comprising at least one adsorber, the adsorption-based system being configured as an independent adsorption loop comprising a stripping gas that circulates to strip a gas compound from the adsorber;
   an Organic Rankine Cycle (ORC) operatively coupled to the combustion device and/or to the gas treating system, wherein the ORC is configured as an independent ORC closed-circuit loop for circulating working fluid;
   a thermal fluid loop heat exchange mechanism configured to transfer thermal energy via thermal fluid:

(i) from the combustion device to the:
  a) gas treating system for the gas treating system to recover gas compounds to enhance the efficiency in the system by utilizing waste heat from the combustion device, and/or
  b) ORC system for the ORC system to generate mechanical energy to enhance energy efficiency in the system by utilizing waste heat from the combustion device;
and/or
(ii) from the gas treating system to the ORC system for the ORC system to generate mechanical energy to enhance energy efficiency in the system by utilizing waste heat from gas treating system,
and
a control module, wherein the control module is configured to cause energy to be diverted from one or more of combustion device exhaust flow, thermal fluid, stripped gas, the stripping gas, the solvent fluid, compressed stripped gas, natural gas, compressed natural gas, the ORC working fluid, chilled thermal fluid, jacket water fluid, auxiliary cooling water, and/or lube oil, through any of the gas treating system, the combustion device and/or the ORC to provide heat and/or cooling and/or power.

2. The system of claim 1, wherein the control module is configured to cause heat to be recovered from the combustion device (i) exhaust flow and/or (ii) the jacket water fluid, and/or (iii) the auxiliary cooling water, and/or (iv) the lube oil, to apply the recovered heat to the gas treating system and/or the ORC.

3. The system of claim 1, wherein the combustion device comprises at least one of a reciprocating engine, a turbine, a boiler, or a furnace.

4. The system of claim 1, wherein the control module is configured to cause energy to be diverted independently or simultaneously from the one or more of the combustion device exhaust flow, the thermal fluid, the stripped gas, the compressed stripped gas, the stripping gas, the solvent fluid, the natural gas, the compressed natural gas, the jacket water fluid, the ORC working fluid, the chilled thermal fluid, the lube oil and/or the auxiliary cooling water.

5. The system of claim 1, further comprising one or more compressors wherein the control module is configured to recover heat of compression from the compressed natural gas and/or the compressed stripped gas, and/or provide cooling to the compressed natural gas and/or the compressed stripped gas.

6. The system of claim 1, wherein the one or more combustion device comprise a plurality of combustion devices,
wherein the gas treating system comprises one or more of (i) an additional absorption-based system absorber, and/or (ii) an additional adsorption-based system adsorber, wherein the additional absorption-based system and additional adsorption-based system are configured to be coupled in parallel with the absorption-based system and adsorption-based system, respectively, to form a parallel gas treating system,
and wherein the parallel gas treating systems' absorbers and/or adsorbers are operatively coupled to the plurality of combustion devices to operate as a balance of plant for a single gas treating system.

7. The system of claim 1, further comprising one or more waste heat chillers, wherein the control module is configured to cause thermal energy to be diverted to or from the one or more of the combustion device exhaust flow, the thermal fluid, the ORC working fluid, the stripped gas, the stripping gas, the compressed stripped gas, the solvent, the natural gas, the compressed natural gas, the jacket water fluid, lube oil and/or auxiliary cooling water, to or from the one or more waste heat chillers.

8. The system of claim 1, wherein the control module is configured to cause the combustion device exhaust flow to be cooled prior to entering the gas treating system.

9. The system of claim 1, wherein the control module is configured to cause the stripped gas to be cooled after leaving the gas treating system.

10. The system of claim 1, wherein the gas treating system is configured to (i) remove CO2 gas from the combustion device exhaust flow, and/or (ii) remove H2S and/or CO2 gas from natural gas during a gas sweetening process.

11. The system of claim 1, further comprising an engine radiator, configured to provide cooling to at least one of:
  (i) the combustion device exhaust flow prior to it entering the absorption-based system or the adsorption-based system,
  (ii) the stripped gas prior to it entering a stripped gas cooler,
  (iii) the compressed natural gas, and/or
  (iv) the compressed stripped gas.

12. A method for operating a system, comprising:
configuring a gas treating system, operatively coupled to a combustion device, the gas treating system comprising at least one of
  (i) an absorption-based system, comprising at least one absorber, the absorption-based system being configured as an independent absorption loop comprising a solvent fluid that circulates to treat a gas stream, and/or
  (ii) an adsorption-based system comprising at least one adsorber, the adsorption-based system being configured as an independent adsorption loop comprising a stripping gas that circulates to strip a gas compound from the adsorber;
configuring an Organic Rankine Cycle (ORC) operatively coupled to the combustion device and/or to the gas treating system, wherein the ORC is configured as an independent ORC closed-circuit loop for circulating working fluid;
configuring a thermal fluid loop heat exchange mechanism to transfer thermal energy via thermal fluid:
(i) from the combustion device to the
  a) gas treating system for the gas treating system to recover gas compounds to enhance the efficiency in the system by utilizing waste heat from the combustion device, and/or
  b) ORC system for the ORC system to generate mechanical energy to enhance energy efficiency in the system by utilizing waste heat from the combustion device;
and/or
(ii) from the gas treating system to the ORC system for the ORC system to generate mechanical energy to enhance energy efficiency in the system by utilizing waste heat from gas treating system; and
configuring a control module for diverting energy from one or more of combustion device exhaust flow, thermal fluid, stripped gas, the stripping gas, the solvent fluid, compressed stripped gas, natural gas, compressed natural gas, the ORC working fluid, chilled thermal fluid, jacket water fluid, auxiliary cooling water, and/or lube oil, through any of the gas treating system, the combustion device and/or the ORC to provide heat and/or cooling and/or power.

13. The method of claim 12, wherein the diverting of the energy comprises causing heat to be recovered from the combustion device (i) exhaust flow and/or (ii) the jacket water fluid, and/or (iii) the auxiliary cooling water, and/or (iv) the turbine-lube oil, for applying the recovered heat to the gas treating system and/or the ORC.

14. The method of claim 12, wherein the diverting of the energy comprises diverting energy, independently or simultaneously, from the one or more of the combustion device exhaust flow, the thermal fluid, the stripped gas, the compressed stripped gas, the stripping gas, the solvent fluid, the natural gas, the compressed natural gas, the jacket water fluid, the ORC working fluid, the chilled thermal fluid, the lube oil and/or the auxiliary cooling water.

15. The method of claim 12, further comprising recovering heat of compression from the compressed natural gas and/or the compressed stripped gas, and/or providing cooling to the compressed natural gas and/or the compressed stripped gas.

16. The method of claim 12, wherein the diverting of the energy comprises causing thermal energy to be diverted to or from the one or more of the combustion device exhaust flow, the thermal fluid, the ORC working fluid, the stripped gas, the stripping gas, the compressed stripped gas, the solvent, the natural gas, the compressed natural gas, the jacket water fluid, lube oil, and/or auxiliary cooling water, lube oil, to or from one or more waste heat chillers.

17. The method of claim 12, wherein the diverting of the energy comprises causing the combustion device exhaust flow to be cooled prior to entering the gas treating system.

18. The method of claim 12, further comprising (i) removing CO2 gas from the combustion device exhaust flow via the gas treating system, and/or (ii) removing H2S and/or CO2 gas from the natural gas during a gas sweetening process.

19. The method of claim 12, further comprising providing cooling to at least one of:
(i) the combustion device exhaust flow prior to it entering the absorption-based system or the adsorption-based system,
(ii) the stripped gas prior to it entering a stripped gas cooler, and/or
(iii) the compressed natural gas, and/or
(iv) the compressed stripped gas.

20. A system, comprising:
a gas treating system, operatively coupled to a combustion device, the gas treating system comprising a Carbon Capture System (CCS), the CCS comprising one of at least one of
(i) an absorption-based system, comprising at least one absorber, the absorption-based system being configured as an independent absorption loop comprising a solvent fluid that circulates to treat a gas stream, and/or
(ii) an adsorption-based system comprising at least one adsorber, the adsorption-based system being configured as an independent adsorption loop comprising a stripping gas that circulates to strip a gas compound from the adsorber, the adsorption-based system being configured as an independent adsorption loop comprising a stripping gas that circulates to strip a gas compound from the adsorber;
an Organic Rankine Cycle (ORC) operatively coupled to the combustion device and/or to the gas treating system, wherein the ORC is configured as an independent ORC closed-circuit loop for circulating working fluid;
a thermal fluid loop heat exchange mechanism configured to transfer thermal energy via thermal fluid:
(i) from the combustion device to the:
  (a) gas treating system for the gas treating system to recover gas compounds to enhance the efficiency in the system by utilizing waste heat from the combustion device, and/or
  (b) ORC system for the ORC system to generate mechanical energy to enhance energy efficiency in the system by utilizing waste heat from the combustion device and/or gas treating system, and/or
(ii) from the gas treating system to the ORC system for the ORC system to generate mechanical energy to enhance energy efficiency in the system by utilizing waste heat from gas treating system; and
a control module, wherein the control module is configured to cause energy to be diverted from one or more of combustion device exhaust flow, thermal fluid, stripped gas, the stripping gas, the solvent fluid, compressed stripped gas, natural gas, compressed natural gas, the ORC working fluid, chilled thermal fluid, engine jacket water, auxiliary cooling water, and/or lube oil, through any of the gas treating system, the combustion device and/or the ORC to provide heat and/or cooling and/or power.

\* \* \* \* \*